US010336592B2

(12) United States Patent
Atchley et al.

(10) Patent No.: US 10,336,592 B2
(45) Date of Patent: Jul. 2, 2019

(54) SHOPPING FACILITY ASSISTANCE SYSTEMS, DEVICES, AND METHODS TO FACILITATE RETURNING ITEMS TO THEIR RESPECTIVE DEPARTMENTS

(71) Applicant: Walmart Apollo, LLC, Bentonville, AR (US)

(72) Inventors: Michael D. Atchley, Springdale, AR (US); David C. Winkle, Bella Vista, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 258 days.

(21) Appl. No.: 15/275,019

(22) Filed: Sep. 23, 2016

(65) Prior Publication Data

US 2017/0010610 A1    Jan. 12, 2017

Related U.S. Application Data

(63) Continuation of application No. 15/061,203, filed on Mar. 4, 2016, now Pat. No. 10,071,891.

(Continued)

(51) Int. Cl.
*G05D 1/00* (2006.01)
*B60P 3/06* (2006.01)
(Continued)

(52) U.S. Cl.
CPC .............. *B66F 9/063* (2013.01); *A47F 3/08* (2013.01); *A47F 10/04* (2013.01); *A47F 13/00* (2013.01);
(Continued)

(58) Field of Classification Search
CPC ........ A47F 10/04; A47F 3/08; A47F 2010/005; A47F 2010/025; A47F 13/00; B60P 3/06;
(Continued)

(56) References Cited

U.S. PATENT DOCUMENTS

| 1,001,732 A | 8/1911 | Cummings |
| 1,774,653 A | 9/1930 | Marriott |

(Continued)

FOREIGN PATENT DOCUMENTS

| CA | 2524037 | 5/2006 |
| CA | 2625885 | 4/2007 |

(Continued)

OTHER PUBLICATIONS

Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.

(Continued)

*Primary Examiner* — Khoi H Tran
*Assistant Examiner* — Robert T Nguyen
(74) *Attorney, Agent, or Firm* — Fitch, Even, Tabin & Flannery, LLP

(57) ABSTRACT

A central computer system directs a motorized transport unit through a retail shopping facility to a particular mobile item container having at least one item disposed therein, that item being designated for return to a particular department within the retail shopping facility such that this item can then again be presented for sale. After causing that motorized transport unit to physically attach to this mobile item container, the central computer system then directs that motorized transport unit through the retail shopping facility with the attached particular mobile item container to the one or more departments to which the item or items are to be so returned.

15 Claims, 28 Drawing Sheets

Related U.S. Application Data

(60) Provisional application No. 62/129,726, filed on Mar. 6, 2015, provisional application No. 62/129,727, filed on Mar. 6, 2015, provisional application No. 62/138,877, filed on Mar. 26, 2015, provisional application No. 62/138,885, filed on Mar. 26, 2015, provisional application No. 62/152,421, filed on Apr. 24, 2015, provisional application No. 62/152,465, filed on Apr. 24, 2015, provisional application No. 62/152,440, filed on Apr. 24, 2015, provisional application No. 62/152,630, filed on Apr. 24, 2015, provisional application No. 62/152,711, filed on Apr. 24, 2015, provisional application No. 62/152,610, filed on Apr. 24, 2015, provisional application No. 62/152,667, filed on Apr. 24, 2015, provisional application No. 62/157,388, filed on May 5, 2015, provisional application No. 62/165,579, filed on May 22, 2015, provisional application No. 62/165,416, filed on May 22, 2015, provisional application No. 62/165,586, filed on May 22, 2015, provisional application No. 62/171,822, filed on Jun. 5, 2015, provisional application No. 62/175,182, filed on Jun. 12, 2015, provisional application No. 62/182,339, filed on Jun. 19, 2015, provisional application No. 62/185,478, filed on Jun. 26, 2015, provisional application No. 62/194,131, filed on Jul. 17, 2015, provisional application No. 62/194,119, filed on Jul. 17, 2015, provisional application No. 62/194,121, filed on Jul. 17, 2015, provisional application No. 62/194,127, filed on Jul. 17, 2015, provisional application No. 62/202,744, filed on Aug. 7, 2015, provisional application No. 62/202,747, filed on Aug. 7, 2015, provisional application No. 62/205,548, filed on Aug. 14, 2015, provisional application No. 62/205,569, filed on Aug. 14, 2015, provisional application No. 62/205,555, filed on Aug. 14, 2015, provisional application No. 62/205,539, filed on Aug. 14, 2015, provisional application No. 62/207,858, filed on Aug. 20, 2015, provisional application No. 62/214,826, filed on Sep. 4, 2015, provisional application No. 62/214,824, filed on Sep. 4, 2015, provisional application No. 62/292,084, filed on Feb. 5, 2016, provisional application No. 62/302,547, filed on Mar. 2, 2016, provisional application No. 62/302,567, filed on Mar. 2, 2016, provisional application No. 62/302,713, filed on Mar. 2, 2016, provisional application No. 62/303,021, filed on Mar. 3, 2016.

(51) Int. Cl.

| | | |
|---|---|---|
| *B62B 5/00* | (2006.01) | |
| *G05D 1/02* | (2006.01) | |
| *G06Q 30/00* | (2012.01) | |
| *B66F 9/06* | (2006.01) | |
| *G01C 21/20* | (2006.01) | |
| *G06Q 30/06* | (2012.01) | |
| *A47F 10/04* | (2006.01) | |
| *H04W 4/80* | (2018.01) | |
| *G06Q 10/06* | (2012.01) | |
| *G06Q 10/02* | (2012.01) | |
| *G06Q 50/30* | (2012.01) | |
| *G01S 1/02* | (2010.01) | |
| *G01S 1/70* | (2006.01) | |
| *G01S 1/72* | (2006.01) | |
| *G06Q 10/08* | (2012.01) | |
| *G06Q 30/02* | (2012.01) | |
| *H04W 4/04* | (2009.01) | |
| *A47F 3/08* | (2006.01) | |
| *H04N 5/77* | (2006.01) | |
| *G06Q 50/28* | (2012.01) | |
| *H04N 7/18* | (2006.01) | |
| *E01H 5/06* | (2006.01) | |
| *E01H 5/12* | (2006.01) | |
| *G06Q 10/00* | (2012.01) | |
| *G06Q 10/10* | (2012.01) | |
| *H04W 4/33* | (2018.01) | |
| *G06T 7/73* | (2017.01) | |
| *G06T 7/593* | (2017.01) | |
| *H04N 13/282* | (2018.01) | |
| *A47L 11/40* | (2006.01) | |
| *B60L 11/18* | (2006.01) | |
| *G05D 1/04* | (2006.01) | |
| *G06K 9/00* | (2006.01) | |
| *G06K 9/18* | (2006.01) | |
| *G06K 9/32* | (2006.01) | |
| *G06K 9/62* | (2006.01) | |
| *G06K 9/78* | (2006.01) | |
| *G08G 1/00* | (2006.01) | |
| *G10L 13/04* | (2013.01) | |
| *G10L 15/22* | (2006.01) | |
| *G10L 17/22* | (2013.01) | |
| *H02J 7/00* | (2006.01) | |
| *H04B 10/116* | (2013.01) | |
| *H04L 29/08* | (2006.01) | |
| *H04W 4/30* | (2018.01) | |
| *A47F 13/00* | (2006.01) | |
| *B07C 5/28* | (2006.01) | |
| *B07C 5/342* | (2006.01) | |
| *B65F 3/00* | (2006.01) | |
| *G05B 19/048* | (2006.01) | |
| *G06F 3/01* | (2006.01) | |
| *H04W 4/02* | (2018.01) | |
| *H04W 4/40* | (2018.01) | |
| *G06F 21/60* | (2013.01) | |
| *H04L 29/06* | (2006.01) | |
| *G06Q 20/12* | (2012.01) | |
| *G06F 16/903* | (2019.01) | |
| *A47F 10/02* | (2006.01) | |
| *H04B 1/38* | (2015.01) | |
| *A47F 10/00* | (2006.01) | |
| *G05B 19/12* | (2006.01) | |
| *G06K 7/10* | (2006.01) | |
| *G06K 7/14* | (2006.01) | |

(52) U.S. Cl.
CPC ............ *A47L 11/4011* (2013.01); *B07C 5/28* (2013.01); *B07C 5/3422* (2013.01); *B60L 11/1833* (2013.01); *B60L 11/1844* (2013.01); *B60P 3/06* (2013.01); *B62B 5/0026* (2013.01); *B62B 5/0069* (2013.01); *B62B 5/0076* (2013.01); *B65F 3/00* (2013.01); *E01H 5/061* (2013.01); *E01H 5/12* (2013.01); *G01C 21/206* (2013.01); *G01S 1/02* (2013.01); *G01S 1/70* (2013.01); *G01S 1/72* (2013.01); *G05B 19/048* (2013.01); *G05D 1/0011* (2013.01); *G05D 1/0016* (2013.01); *G05D 1/0022* (2013.01); *G05D 1/0027* (2013.01); *G05D 1/0061* (2013.01); *G05D 1/0088* (2013.01); *G05D 1/021* (2013.01); *G05D 1/028* (2013.01); *G05D 1/0214* (2013.01); *G05D 1/0219* (2013.01); *G05D 1/0234* (2013.01);

G05D 1/0246 (2013.01); G05D 1/0255 (2013.01); G05D 1/0276 (2013.01); G05D 1/0289 (2013.01); G05D 1/0291 (2013.01); G05D 1/0293 (2013.01); G05D 1/0297 (2013.01); G05D 1/04 (2013.01); G06F 3/017 (2013.01); G06K 9/00208 (2013.01); G06K 9/00671 (2013.01); G06K 9/00711 (2013.01); G06K 9/00771 (2013.01); G06K 9/00791 (2013.01); G06K 9/00805 (2013.01); G06K 9/18 (2013.01); G06K 9/3208 (2013.01); G06K 9/6256 (2013.01); G06K 9/78 (2013.01); G06Q 10/02 (2013.01); G06Q 10/0631 (2013.01); G06Q 10/06311 (2013.01); G06Q 10/083 (2013.01); G06Q 10/087 (2013.01); G06Q 10/1095 (2013.01); G06Q 10/30 (2013.01); G06Q 30/016 (2013.01); G06Q 30/0281 (2013.01); G06Q 30/0601 (2013.01); G06Q 30/0605 (2013.01); G06Q 30/0613 (2013.01); G06Q 30/0617 (2013.01); G06Q 30/0619 (2013.01); G06Q 30/0631 (2013.01); G06Q 30/0633 (2013.01); G06Q 30/0635 (2013.01); G06Q 30/0639 (2013.01); G06Q 30/0641 (2013.01); G06Q 50/28 (2013.01); G06Q 50/30 (2013.01); G06T 7/593 (2017.01); G06T 7/74 (2017.01); G08G 1/20 (2013.01); G10L 13/043 (2013.01); G10L 15/22 (2013.01); G10L 17/22 (2013.01); H02J 7/0027 (2013.01); H04B 10/116 (2013.01); H04L 67/12 (2013.01); H04L 67/141 (2013.01); H04L 67/143 (2013.01); H04N 5/77 (2013.01); H04N 7/18 (2013.01); H04N 7/183 (2013.01); H04N 7/185 (2013.01); H04N 13/282 (2018.05); H04W 4/02 (2013.01); H04W 4/043 (2013.01); H04W 4/30 (2018.02); H04W 4/33 (2018.02); H04W 4/40 (2018.02); H04W 4/80 (2018.02); A47F 2010/005 (2013.01); A47F 2010/025 (2013.01); A47L 2201/04 (2013.01); B07C 2501/0045 (2013.01); B07C 2501/0054 (2013.01); B07C 2501/0063 (2013.01); B60Y 2410/10 (2013.01); B65F 2210/168 (2013.01); G05B 19/124 (2013.01); G05B 2219/23363 (2013.01); G05B 2219/39107 (2013.01); G05D 2201/0203 (2013.01); G05D 2201/0216 (2013.01); G06F 16/90335 (2019.01); G06F 21/606 (2013.01); G06K 7/10297 (2013.01); G06K 7/10821 (2013.01); G06K 7/1413 (2013.01); G06K 9/00624 (2013.01); G06K 2009/00738 (2013.01); G06Q 10/06315 (2013.01); G06Q 20/12 (2013.01); G06T 2207/10028 (2013.01); G10L 2015/223 (2013.01); H02J 2007/0096 (2013.01); H04B 1/38 (2013.01); H04L 63/06 (2013.01); H04L 63/08 (2013.01); H04L 63/0846 (2013.01); Y02W 30/82 (2015.05); Y02W 30/827 (2015.05); Y02W 90/20 (2015.05); Y04S 10/54 (2013.01); Y10S 901/01 (2013.01)

(58) Field of Classification Search
CPC ... B62B 5/0026; B62B 5/0069; B62B 5/0076; B66F 9/063; E01H 5/061; E01H 5/12; G01C 21/206; G01S 1/02; G01S 1/70; G01S 1/72; G05D 1/0011; G05D 1/0016; G05D 1/0022; G05D 1/0027; G05D 1/0061; G05D 1/0088; G05D 1/021; G05D 1/0214; G05D 1/0219; G05D 1/0234; G05D 1/0246; G05D 1/0255; G05D 1/0276; G05D 1/028; G05D 1/0289; G05D 1/0291; G05D 1/0293; G05D 1/0297; G05D 1/04; G05D 2201/0203; G05D 2201/0216; G06Q 10/02; G06Q 10/06311; G06Q 10/06315; G06Q 10/083; G06Q 10/087; G06Q 10/1095; G06Q 10/30; G06Q 30/016; G06Q 30/0281; G06Q 30/0601; G06Q 30/0605; G06Q 30/0613; G06Q 30/0617; G06Q 30/0619; G06Q 30/0631; G06Q 30/0633; G06Q 30/0635; G06Q 30/0639; G06Q 30/0641; G06Q 50/28; G06Q 50/30; H04N 5/77; H04N 7/18; H04N 7/183; H04N 7/185; H04N 13/282; H04W 4/02; H04W 4/043; H04W 4/30; H04W 4/33; H04W 4/40; H04W 4/80; Y02W 30/82; Y02W 30/827; Y02W 90/20; Y10S 901/01; A47L 11/4011; A47L 2201/04; B07C 5/28; B07C 5/3422; B07C 2501/0045; B07C 2501/0054; B07C 2501/0063; B60L 11/1833; B60L 11/1844; B60Y 2410/10; B65F 3/00; B65F 2210/168; G05B 19/048; G05B 19/124; G05B 2219/23363; G05B 2219/39107; G06F 17/30979; G06K 7/10297; G06K 7/10821; G06K 7/1413; G06K 9/00208; G06K 9/00671; G06K 9/00711; G06K 9/00771; G06K 9/00791; G06K 9/00805; G06K 9/18; G06K 9/3208; G06K 9/6256; G06K 9/78; G06K 2009/00738; G06T 7/593; G06T 7/74; G06T 2207/10028; G08G 1/20; G10L 13/043; G10L 15/22; G10L 17/22; G10L 2015/223; H02J 7/0027; H02J 2007/0096; H04B 10/116; H04B 1/38; H04L 67/12; H04L 67/141; H04L 67/143
USPC ................................. 700/214; 235/383
See application file for complete search history.

(56) References Cited

U.S. PATENT DOCUMENTS

| | | |
|---|---|---|
| 2,669,345 A | 2/1954 | Brown |
| 3,765,546 A | 10/1973 | Westerling |
| 4,071,740 A | 1/1978 | Gogulski |
| 4,158,416 A | 6/1979 | Podesta |
| 4,588,349 A | 5/1986 | Reuter |
| 4,672,280 A | 6/1987 | Honjo |
| 4,777,416 A | 10/1988 | George |
| 4,791,482 A | 12/1988 | Barry |
| 4,868,544 A | 9/1989 | Havens |
| 4,911,608 A | 3/1990 | Krappitz |
| 5,119,087 A | 6/1992 | Lucas |
| 5,279,672 A | 1/1994 | Betker |
| 5,287,266 A | 2/1994 | Malec |
| 5,295,551 A | 3/1994 | Sukonick |
| 5,363,305 A | 11/1994 | Cox |
| 5,380,138 A | 1/1995 | Kasai |
| 5,384,450 A | 1/1995 | Goetz, Jr. |
| 5,395,206 A | 3/1995 | Cerny, Jr. |
| 5,402,051 A | 3/1995 | Fujiwara |
| 5,548,515 A | 8/1996 | Pilley |
| 5,632,381 A | 5/1997 | Thust |
| 5,652,489 A | 7/1997 | Kawakami |
| 5,671,362 A | 9/1997 | Cowe |
| 5,777,571 A | 7/1998 | Chuang |
| 5,801,340 A | 9/1998 | Peter |
| 5,917,174 A | 6/1999 | Moore |
| 5,920,261 A | 7/1999 | Hughes |

(56) References Cited

U.S. PATENT DOCUMENTS

| | | |
|---|---|---|
| 5,969,317 A | 10/1999 | Espy |
| 6,018,397 A | 1/2000 | Cloutier |
| 6,199,753 B1 | 3/2001 | Tracy |
| 6,201,203 B1 | 3/2001 | Tilles |
| 6,240,342 B1 | 5/2001 | Fiegert |
| 6,339,735 B1 | 1/2002 | Peless |
| 6,365,857 B1 | 4/2002 | Maehata |
| 6,374,155 B1 | 4/2002 | Wallach |
| 6,394,519 B1 | 5/2002 | Byers |
| 6,431,078 B2 | 8/2002 | Serrano |
| 6,522,952 B1 | 2/2003 | Arai |
| 6,525,509 B1 | 2/2003 | Petersson |
| 6,535,793 B2 | 3/2003 | Allard |
| 6,550,672 B1 | 4/2003 | Tracy |
| 6,571,693 B1 | 6/2003 | Kaldenberg |
| 6,584,375 B2 | 6/2003 | Bancroft |
| 6,584,376 B1 | 6/2003 | VanKommer |
| 6,600,418 B2 | 7/2003 | Francis |
| 6,601,759 B2 | 8/2003 | Fife |
| 6,606,411 B1 | 8/2003 | Loui |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1 | 1/2004 | Hofheins |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,745,186 B1 | 6/2004 | Testa |
| 6,752,582 B2 | 6/2004 | Garcia |
| 6,810,149 B1 | 10/2004 | Squilla |
| 6,816,085 B1 | 11/2004 | Haynes |
| 6,832,884 B2 | 12/2004 | Robinson |
| 6,841,963 B2 | 1/2005 | Song |
| 6,850,899 B1 | 2/2005 | Chow |
| 6,883,201 B2 | 4/2005 | Jones |
| 6,885,736 B2 | 4/2005 | Uppaluru |
| 6,886,101 B2 | 4/2005 | Glazer |
| 6,895,301 B2 | 5/2005 | Mountz |
| 6,910,828 B1 | 6/2005 | Hughes |
| 6,937,989 B2 | 8/2005 | McIntyre |
| 6,954,695 B2 | 10/2005 | Bonilla |
| 6,967,455 B2 | 11/2005 | Nakadai |
| 6,975,997 B1 | 12/2005 | Murakami |
| 7,039,499 B1 | 5/2006 | Nasr |
| 7,066,291 B2 | 6/2006 | Martins |
| 7,101,113 B2 | 9/2006 | Hughes |
| 7,101,139 B1 | 9/2006 | Benedict |
| 7,117,902 B2 | 10/2006 | Osborne |
| 7,145,562 B2 | 12/2006 | Schechter |
| 7,147,154 B2 | 12/2006 | Myers |
| 7,177,820 B2 | 2/2007 | McIntyre |
| 7,184,586 B2 | 2/2007 | Jeon |
| 7,205,016 B2 | 4/2007 | Garwood |
| 7,206,753 B2 | 4/2007 | Bancroft |
| 7,222,363 B2 | 5/2007 | Rice |
| 7,233,241 B2 | 6/2007 | Overhultz |
| 7,234,609 B2 | 6/2007 | DeLazzer |
| 7,261,511 B2 | 8/2007 | Felder |
| 7,367,245 B2 | 5/2008 | Okazaki |
| 7,381,022 B1 | 6/2008 | King |
| 7,402,018 B2 | 7/2008 | Mountz |
| 7,431,208 B2 | 10/2008 | Feldman |
| 7,447,564 B2 | 11/2008 | Yasukawa |
| 7,463,147 B1 | 12/2008 | Laffoon |
| 7,474,945 B2 | 1/2009 | Matsunaga |
| 7,487,913 B2 | 2/2009 | Adema |
| 7,533,029 B2 | 5/2009 | Mallett |
| 7,554,282 B2 | 6/2009 | Nakamoto |
| 7,556,108 B2 | 7/2009 | Won |
| 7,556,219 B2 | 7/2009 | Page |
| 7,587,756 B2 | 9/2009 | Peart |
| 7,613,544 B2 | 11/2009 | Park |
| 7,627,515 B2 | 12/2009 | Borgs |
| 7,636,045 B2 | 12/2009 | Sugiyama |
| 7,648,068 B2 | 1/2010 | Silverbrook |
| 7,653,603 B1 | 1/2010 | Holtkamp |
| 7,658,327 B2 | 2/2010 | Tuchman |
| 7,689,322 B2 | 3/2010 | Tanaka |
| 7,693,605 B2 | 4/2010 | Park |
| 7,693,745 B1 | 4/2010 | Pomerantz |
| 7,693,757 B2 | 4/2010 | Zimmerman |
| 7,706,917 B1 | 4/2010 | Chiappetta |
| 7,716,064 B2 | 5/2010 | McIntyre |
| 7,726,563 B2 | 6/2010 | Scott |
| 7,762,458 B2 | 7/2010 | Stawar |
| 7,783,527 B2 | 8/2010 | Bonner |
| 7,787,985 B2 | 8/2010 | Tsujimoto |
| 7,817,394 B2 | 10/2010 | Mukherjee |
| 7,826,919 B2 | 11/2010 | DAndrea |
| 7,835,281 B2 | 11/2010 | Lee |
| 7,894,932 B2 * | 2/2011 | Mountz ............... G06Q 10/087 700/214 |
| 7,894,939 B2 | 2/2011 | Zini |
| 7,957,837 B2 | 6/2011 | Ziegler |
| 7,969,297 B2 | 6/2011 | Haartsen |
| 7,996,109 B2 | 8/2011 | Zini |
| 8,010,230 B2 | 8/2011 | Zini |
| 8,032,249 B1 | 10/2011 | Shakes |
| 8,041,455 B2 | 10/2011 | Thorne |
| 8,050,976 B2 | 11/2011 | Staib |
| 8,065,032 B2 | 11/2011 | Stifter |
| 8,065,353 B2 | 11/2011 | Eckhoff-Hornback |
| 8,069,092 B2 | 11/2011 | Bryant |
| 8,083,013 B2 | 12/2011 | Bewley |
| 8,099,191 B2 | 1/2012 | Blanc |
| 8,103,398 B2 | 1/2012 | Duggan |
| 8,195,333 B2 | 6/2012 | Ziegler |
| 8,239,276 B2 | 8/2012 | Lin |
| 8,244,041 B1 | 8/2012 | Silver |
| 8,248,467 B1 | 8/2012 | Ganick |
| 8,260,456 B2 | 9/2012 | Siegel |
| 8,284,240 B2 | 10/2012 | Saint-Pierre |
| 8,295,542 B2 | 10/2012 | Albertson |
| 8,321,303 B1 | 11/2012 | Krishnamurthy |
| 8,325,036 B1 | 12/2012 | Fuhr |
| 8,342,467 B2 | 1/2013 | Stachowski |
| 8,352,110 B1 | 1/2013 | Szybalski |
| 8,359,122 B2 | 1/2013 | Koselka |
| 8,380,349 B1 | 2/2013 | Hickman |
| 8,393,846 B1 | 3/2013 | Coots |
| 8,412,400 B2 | 4/2013 | DAndrea |
| 8,423,280 B2 | 4/2013 | Edwards |
| 8,425,173 B2 | 4/2013 | Lert |
| 8,429,004 B2 | 4/2013 | Hamilton |
| 8,430,192 B2 | 4/2013 | Gillett |
| 8,433,470 B1 | 4/2013 | Szybalski |
| 8,433,507 B2 | 4/2013 | Hannah |
| 8,437,875 B2 | 5/2013 | Hernandez |
| 8,444,369 B2 | 5/2013 | Watt |
| 8,447,863 B1 | 5/2013 | Francis, Jr. |
| 8,452,450 B2 | 5/2013 | Dooley |
| 8,474,090 B2 | 7/2013 | Jones |
| 8,494,908 B2 | 7/2013 | Herwig |
| 8,504,202 B2 | 8/2013 | Ichinose |
| 8,508,590 B2 | 8/2013 | Laws |
| 8,510,033 B2 | 8/2013 | Park |
| 8,511,606 B1 | 8/2013 | Lutke |
| 8,515,580 B2 | 8/2013 | Taylor |
| 8,516,651 B2 | 8/2013 | Jones |
| 8,538,577 B2 | 9/2013 | Bell |
| 8,544,858 B2 | 10/2013 | Eberlein |
| 8,571,700 B2 | 10/2013 | Keller |
| 8,572,712 B2 | 10/2013 | Rice |
| 8,577,538 B2 | 11/2013 | Lenser |
| 8,587,662 B1 | 11/2013 | Moll |
| 8,588,969 B2 | 11/2013 | Frazier |
| 8,594,834 B1 | 11/2013 | Clark |
| 8,606,314 B2 | 12/2013 | Barnes, Jr. |
| 8,606,392 B2 | 12/2013 | Wurman |
| 8,639,382 B1 | 1/2014 | Clark |
| 8,645,223 B2 | 2/2014 | Ouimet |
| 8,649,557 B2 | 2/2014 | Hyung |

(56) References Cited

U.S. PATENT DOCUMENTS

| | | |
|---|---|---|
| 8,656,550 B2 | 2/2014 | Jones |
| 8,670,866 B2 | 3/2014 | Ziegler |
| 8,671,507 B2 | 3/2014 | Jones |
| 8,676,377 B2 | 3/2014 | Siegel |
| 8,676,420 B2 | 3/2014 | Kume |
| 8,676,480 B2 | 3/2014 | Lynch |
| 8,700,230 B1 | 4/2014 | Hannah |
| 8,708,285 B1 | 4/2014 | Carreiro |
| 8,718,814 B1 | 5/2014 | Clark |
| 8,724,282 B2 | 5/2014 | Hiremath |
| 8,732,039 B1 | 5/2014 | Chen |
| 8,744,626 B2 | 6/2014 | Johnson |
| 8,751,042 B2 | 6/2014 | Lee |
| 8,763,199 B2 | 7/2014 | Jones |
| 8,770,976 B2 | 7/2014 | Moser |
| 8,775,064 B2 | 7/2014 | Zeng |
| 8,798,786 B2 | 8/2014 | Wurman |
| 8,798,840 B2 | 8/2014 | Fong |
| 8,814,039 B2 | 8/2014 | Bishop |
| 8,818,556 B2 | 8/2014 | Sanchez |
| 8,820,633 B2 | 9/2014 | Bishop |
| 8,825,226 B1 | 9/2014 | Worley, III |
| 8,831,984 B2 | 9/2014 | Hoffman |
| 8,838,268 B2 | 9/2014 | Friedman |
| 8,843,244 B2 | 9/2014 | Phillips |
| 8,851,369 B2 | 10/2014 | Bishop |
| 8,882,432 B2 | 11/2014 | Bastian, II |
| 8,886,390 B2 | 11/2014 | Wolfe |
| 8,892,240 B1 | 11/2014 | Vliet |
| 8,892,241 B2 | 11/2014 | Weiss |
| 8,899,903 B1 | 12/2014 | Saad |
| 8,918,202 B2 | 12/2014 | Kawano |
| 8,918,230 B2 | 12/2014 | Chen |
| 8,930,044 B1 | 1/2015 | Peeters |
| 8,965,561 B2 | 2/2015 | Jacobus |
| 8,972,045 B1 | 3/2015 | Mountz |
| 8,972,061 B2 | 3/2015 | Rosenstein |
| 8,983,647 B1 | 3/2015 | Dwarakanath |
| 8,989,053 B1 | 3/2015 | Skaaksrud |
| 9,002,506 B1* | 4/2015 | Agarwal ............... B65G 1/137 700/216 |
| 9,008,827 B1* | 4/2015 | Dwarakanath ....... G06Q 10/087 700/213 |
| 9,008,829 B2 | 4/2015 | Worsley |
| 9,014,848 B2 | 4/2015 | Farlow |
| 9,075,136 B1 | 7/2015 | Joao |
| 9,129,277 B2 | 9/2015 | MacIntosh |
| 9,170,117 B1 | 10/2015 | Abuelsaad |
| 9,173,816 B2 | 11/2015 | Reinhardt |
| 9,190,304 B2 | 11/2015 | MacKnight |
| 9,278,839 B2 | 3/2016 | Gilbride |
| 9,305,280 B1 | 4/2016 | Berg |
| 9,329,597 B2 | 5/2016 | Stoschek |
| 9,495,703 B1 | 11/2016 | Kaye, III |
| 9,534,906 B2 | 1/2017 | High |
| 9,550,577 B1 | 1/2017 | Beckman |
| 9,573,684 B2 | 2/2017 | Kimchi |
| 9,578,282 B1 | 2/2017 | Sills |
| 9,607,285 B1 | 3/2017 | Wellman |
| 9,623,923 B2 | 4/2017 | Riedel |
| 9,649,766 B2 | 5/2017 | Stubbs |
| 9,656,805 B1 | 5/2017 | Evans |
| 9,658,622 B2 | 5/2017 | Walton |
| 9,663,292 B1 | 5/2017 | Brazeau |
| 9,663,293 B2 | 5/2017 | Wurman |
| 9,663,295 B1 | 5/2017 | Wurman |
| 9,663,296 B1 | 5/2017 | Dingle |
| 9,747,480 B2 | 8/2017 | McAllister |
| 9,757,002 B2 | 9/2017 | Thompson |
| 9,796,093 B2 | 10/2017 | Mascorro Medina |
| 9,801,517 B2 | 10/2017 | High |
| 9,827,678 B1 | 11/2017 | Gilbertson |
| 9,875,502 B2 | 1/2018 | Kay |
| 9,875,503 B2 | 1/2018 | High |
| 9,896,315 B2 | 3/2018 | High |
| 9,908,760 B2 | 3/2018 | High |
| 9,948,917 B2 | 4/2018 | Inacio De Matos |
| 9,994,434 B2 | 6/2018 | High |
| 10,017,322 B2 | 7/2018 | High |
| 10,071,891 B2 | 9/2018 | High |
| 10,071,892 B2 | 9/2018 | High |
| 10,071,893 B2 | 9/2018 | High |
| 10,081,525 B2 | 9/2018 | High |
| 2001/0042024 A1 | 11/2001 | Rogers |
| 2002/0060542 A1 | 5/2002 | Song |
| 2002/0095342 A1 | 7/2002 | Feldman |
| 2002/0154974 A1 | 10/2002 | Fukuda |
| 2002/0156551 A1 | 10/2002 | Tackett |
| 2002/0165638 A1 | 11/2002 | Bancroft |
| 2002/0165643 A1 | 11/2002 | Bancroft |
| 2002/0165790 A1 | 11/2002 | Bancroft |
| 2002/0170961 A1 | 11/2002 | Dickson |
| 2002/0174021 A1 | 11/2002 | Chu |
| 2003/0028284 A1 | 2/2003 | Chirnomas |
| 2003/0152679 A1 | 8/2003 | Garwood |
| 2003/0170357 A1 | 9/2003 | Garwood |
| 2003/0185948 A1 | 10/2003 | Garwood |
| 2003/0222798 A1 | 12/2003 | Floros |
| 2004/0068348 A1 | 4/2004 | Jager |
| 2004/0081729 A1 | 4/2004 | Garwood |
| 2004/0093650 A1 | 5/2004 | Martins |
| 2004/0098167 A1 | 5/2004 | Yi |
| 2004/0117063 A1 | 6/2004 | Sabe |
| 2004/0146602 A1 | 7/2004 | Garwood |
| 2004/0216339 A1 | 11/2004 | Garberg |
| 2004/0217166 A1 | 11/2004 | Myers |
| 2004/0221790 A1 | 11/2004 | Sinclair |
| 2004/0225613 A1 | 11/2004 | Narayanaswami |
| 2004/0249497 A1 | 12/2004 | Saigh |
| 2005/0008463 A1 | 1/2005 | Stehr |
| 2005/0047895 A1 | 3/2005 | Lert |
| 2005/0072651 A1 | 4/2005 | Wieth |
| 2005/0080520 A1 | 4/2005 | Kline |
| 2005/0104547 A1 | 5/2005 | Wang |
| 2005/0149414 A1 | 7/2005 | Schrodt |
| 2005/0154265 A1 | 7/2005 | Miro |
| 2005/0177446 A1 | 8/2005 | Hoblit |
| 2005/0216126 A1 | 9/2005 | Koselka |
| 2005/0222712 A1 | 10/2005 | Orita |
| 2005/0230472 A1 | 10/2005 | Chang |
| 2005/0238465 A1 | 10/2005 | Razumov |
| 2006/0107067 A1 | 5/2006 | Safal |
| 2006/0147087 A1 | 7/2006 | Goncalves |
| 2006/0163350 A1 | 7/2006 | Melton |
| 2006/0178777 A1 | 8/2006 | Park |
| 2006/0206235 A1 | 9/2006 | Shakes |
| 2006/0210382 A1 | 9/2006 | Mountz |
| 2006/0220809 A1 | 10/2006 | Stigall |
| 2006/0221072 A1 | 10/2006 | Se |
| 2006/0231301 A1 | 10/2006 | Rose |
| 2006/0235570 A1 | 10/2006 | Jung |
| 2006/0241827 A1 | 10/2006 | Fukuchi |
| 2006/0244588 A1 | 11/2006 | Hannah |
| 2006/0279421 A1 | 12/2006 | French |
| 2006/0293810 A1 | 12/2006 | Nakamoto |
| 2007/0005179 A1 | 1/2007 | Mccrackin |
| 2007/0017855 A1 | 1/2007 | Pippin |
| 2007/0045018 A1 | 3/2007 | Carter |
| 2007/0061210 A1 | 3/2007 | Chen |
| 2007/0069014 A1 | 3/2007 | Heckel |
| 2007/0072662 A1 | 3/2007 | Templeman |
| 2007/0085682 A1 | 4/2007 | Murofushi |
| 2007/0125727 A1 | 6/2007 | Winkler |
| 2007/0150368 A1 | 6/2007 | Arora |
| 2007/0152057 A1 | 7/2007 | Cato |
| 2007/0222679 A1* | 9/2007 | Morris ................. G01S 13/878 342/407 |
| 2007/0269299 A1 | 11/2007 | Ross |
| 2007/0284442 A1 | 12/2007 | Herskovitz |
| 2007/0288123 A1 | 12/2007 | D Andrea |
| 2007/0288127 A1 | 12/2007 | Haq |
| 2007/0293978 A1 | 12/2007 | Wurman |
| 2008/0011836 A1* | 1/2008 | Adema ................. G06Q 10/00 235/383 |

(56) References Cited

U.S. PATENT DOCUMENTS

| | | |
|---|---|---|
| 2008/0031491 A1 | 2/2008 | Ma |
| 2008/0041644 A1 | 2/2008 | Tudek |
| 2008/0042836 A1* | 2/2008 | Christopher .......... G06Q 10/08 340/568.1 |
| 2008/0075566 A1 | 3/2008 | Benedict |
| 2008/0075568 A1 | 3/2008 | Benedict |
| 2008/0075569 A1 | 3/2008 | Benedict |
| 2008/0077511 A1 | 3/2008 | Zimmerman |
| 2008/0105445 A1 | 5/2008 | Dayton |
| 2008/0131255 A1 | 6/2008 | Hessler |
| 2008/0140253 A1 | 6/2008 | Brown |
| 2008/0154720 A1 | 6/2008 | Gounares |
| 2008/0201227 A1 | 8/2008 | Bakewell |
| 2008/0226129 A1 | 9/2008 | Kundu |
| 2008/0267759 A1 | 10/2008 | Morency |
| 2008/0281515 A1 | 11/2008 | Ann |
| 2008/0281664 A1 | 11/2008 | Campbell |
| 2008/0294288 A1 | 11/2008 | Yamauchi |
| 2008/0306787 A1 | 12/2008 | Hamilton |
| 2008/0308630 A1 | 12/2008 | Bhogal |
| 2008/0314667 A1 | 12/2008 | Hannah |
| 2009/0074545 A1 | 3/2009 | Lert |
| 2009/0132250 A1 | 5/2009 | Chiang |
| 2009/0134572 A1 | 5/2009 | Obuchi |
| 2009/0138375 A1 | 5/2009 | Schwartz |
| 2009/0154708 A1 | 6/2009 | Kolar Sunder |
| 2009/0155033 A1 | 6/2009 | Olsen |
| 2009/0164902 A1 | 6/2009 | Cohen |
| 2009/0177323 A1 | 7/2009 | Ziegler |
| 2009/0210536 A1 | 8/2009 | Allen |
| 2009/0240571 A1 | 9/2009 | Bonner |
| 2009/0259571 A1 | 10/2009 | Ebling |
| 2009/0265193 A1 | 10/2009 | Collins |
| 2009/0269173 A1 | 10/2009 | De Leo |
| 2009/0299822 A1 | 12/2009 | Harari |
| 2009/0319399 A1 | 12/2009 | Resta |
| 2010/0025964 A1 | 2/2010 | Fisk |
| 2010/0030417 A1 | 2/2010 | Fang |
| 2010/0076959 A1 | 3/2010 | Ramani |
| 2010/0131103 A1 | 5/2010 | Herzog |
| 2010/0138281 A1 | 6/2010 | Zhang |
| 2010/0143089 A1 | 6/2010 | Hvass |
| 2010/0171826 A1 | 7/2010 | Hamilton |
| 2010/0176922 A1 | 7/2010 | Schwab |
| 2010/0211441 A1 | 8/2010 | Sprigg |
| 2010/0222925 A1 | 9/2010 | Anezaki |
| 2010/0262278 A1 | 10/2010 | Winkler |
| 2010/0268697 A1 | 10/2010 | Karlsson |
| 2010/0295847 A1 | 11/2010 | Titus |
| 2010/0299065 A1 | 11/2010 | Mays |
| 2010/0302102 A1 | 12/2010 | Desai |
| 2010/0316470 A1 | 12/2010 | Lert |
| 2010/0324773 A1 | 12/2010 | Choi |
| 2011/0010023 A1 | 1/2011 | Kunzig |
| 2011/0022201 A1 | 1/2011 | Reumerman |
| 2011/0098920 A1 | 4/2011 | Chuang |
| 2011/0153081 A1 | 6/2011 | Romanov |
| 2011/0163160 A1 | 7/2011 | Zini |
| 2011/0176803 A1 | 7/2011 | Song |
| 2011/0225071 A1 | 9/2011 | Sano |
| 2011/0238211 A1 | 9/2011 | Shirado |
| 2011/0240777 A1 | 10/2011 | Johns |
| 2011/0258060 A1 | 10/2011 | Sweeney |
| 2011/0260865 A1 | 10/2011 | Bergman |
| 2011/0279252 A1 | 11/2011 | Carter |
| 2011/0288684 A1 | 11/2011 | Farlow |
| 2011/0288763 A1 | 11/2011 | Hui |
| 2011/0295424 A1 | 12/2011 | Johnson |
| 2011/0301757 A1* | 12/2011 | Jones .................... A01G 9/088 700/258 |
| 2011/0320034 A1 | 12/2011 | Dearlove |
| 2011/0320322 A1 | 12/2011 | Roslak |
| 2012/0000024 A1 | 1/2012 | Layton |
| 2012/0029697 A1 | 2/2012 | Ota |
| 2012/0035823 A1 | 2/2012 | Carter |
| 2012/0046998 A1 | 2/2012 | Staib |
| 2012/0059743 A1 | 3/2012 | Rao |
| 2012/0072303 A1 | 3/2012 | Brown |
| 2012/0134771 A1 | 5/2012 | Larson |
| 2012/0143726 A1 | 6/2012 | Chirnomas |
| 2012/0166241 A1* | 6/2012 | Livingston ......... G06Q 10/0631 705/7.12 |
| 2012/0185094 A1 | 7/2012 | Rosenstein |
| 2012/0185355 A1 | 7/2012 | Kilroy |
| 2012/0192260 A1 | 7/2012 | Kontsevich |
| 2012/0197431 A1 | 8/2012 | Toebes |
| 2012/0226556 A1 | 9/2012 | Itagaki |
| 2012/0239224 A1 | 9/2012 | McCabe |
| 2012/0255810 A1 | 10/2012 | Yang |
| 2012/0259732 A1 | 10/2012 | Sasankan |
| 2012/0272500 A1 | 11/2012 | Reuteler |
| 2012/0294698 A1 | 11/2012 | Villamar |
| 2012/0303263 A1 | 11/2012 | Alam |
| 2012/0303479 A1 | 11/2012 | Derks |
| 2012/0330458 A1 | 12/2012 | Weiss |
| 2013/0016011 A1 | 1/2013 | Harriman |
| 2013/0026224 A1 | 1/2013 | Ganick |
| 2013/0051667 A1 | 2/2013 | Deng |
| 2013/0054052 A1 | 2/2013 | Waltz |
| 2013/0054280 A1 | 2/2013 | Moshfeghi |
| 2013/0060461 A1 | 3/2013 | Wong |
| 2013/0073405 A1 | 3/2013 | Ariyibi |
| 2013/0096735 A1 | 4/2013 | Byford |
| 2013/0103539 A1 | 4/2013 | Abraham |
| 2013/0105036 A1 | 5/2013 | Smith |
| 2013/0110671 A1 | 5/2013 | Gray |
| 2013/0141555 A1 | 6/2013 | Ganick |
| 2013/0145572 A1 | 6/2013 | Schregardus |
| 2013/0151335 A1 | 6/2013 | Avadhanam |
| 2013/0155058 A1 | 6/2013 | Golparvar-Fard |
| 2013/0174371 A1 | 7/2013 | Jones |
| 2013/0181370 A1 | 7/2013 | Rafie |
| 2013/0211953 A1 | 8/2013 | Abraham |
| 2013/0218453 A1 | 8/2013 | Geelen |
| 2013/0231779 A1 | 9/2013 | Purkayastha |
| 2013/0235206 A1 | 9/2013 | Smith |
| 2013/0238130 A1 | 9/2013 | Dorschel |
| 2013/0245810 A1 | 9/2013 | Sullivan |
| 2013/0276004 A1 | 10/2013 | Boncyk |
| 2013/0300729 A1 | 11/2013 | Grimaud |
| 2013/0302132 A1 | 11/2013 | DAndrea |
| 2013/0309637 A1 | 11/2013 | Minvielle Eugenio |
| 2013/0317642 A1 | 11/2013 | Asaria |
| 2013/0333961 A1 | 12/2013 | ODonnell |
| 2013/0338825 A1 | 12/2013 | Cantor |
| 2014/0006229 A1 | 1/2014 | Birch |
| 2014/0014470 A1 | 1/2014 | Razumov |
| 2014/0032034 A1 | 1/2014 | Raptopoulos |
| 2014/0032379 A1 | 1/2014 | Schuetz |
| 2014/0037404 A1 | 2/2014 | Hancock |
| 2014/0046512 A1 | 2/2014 | Villamar |
| 2014/0058556 A1 | 2/2014 | Kawano |
| 2014/0067564 A1 | 3/2014 | Yuan |
| 2014/0081445 A1 | 3/2014 | Villamar |
| 2014/0091013 A1 | 4/2014 | Streufert |
| 2014/0100715 A1 | 4/2014 | Mountz |
| 2014/0100768 A1 | 4/2014 | Kessens |
| 2014/0100769 A1* | 4/2014 | Wurman ............... G06Q 10/087 701/301 |
| 2014/0100998 A1 | 4/2014 | Mountz |
| 2014/0100999 A1 | 4/2014 | Mountz |
| 2014/0101690 A1 | 4/2014 | Boncyk |
| 2014/0108087 A1 | 4/2014 | Fukui |
| 2014/0124004 A1 | 5/2014 | Rosenstein |
| 2014/0129054 A1 | 5/2014 | Huntzicker |
| 2014/0133943 A1 | 5/2014 | Razumov |
| 2014/0135984 A1 | 5/2014 | Hirata |
| 2014/0143039 A1 | 5/2014 | Branton |
| 2014/0149958 A1 | 5/2014 | Samadi |
| 2014/0152507 A1 | 6/2014 | McAllister |
| 2014/0156450 A1 | 6/2014 | Ruckart |
| 2014/0156461 A1 | 6/2014 | Lerner |
| 2014/0157156 A1 | 6/2014 | Kawamoto |
| 2014/0164123 A1 | 6/2014 | Wissner-Gross |

(56) References Cited

U.S. PATENT DOCUMENTS

| | | | |
|---|---|---|---|
| 2014/0172197 A1 | 6/2014 | Ganz | |
| 2014/0172727 A1 | 6/2014 | Abhyanker | |
| 2014/0177907 A1* | 6/2014 | Argue | G06T 7/0002 382/103 |
| 2014/0177924 A1* | 6/2014 | Argue | G06K 9/00771 382/104 |
| 2014/0180478 A1 | 6/2014 | Letsky | |
| 2014/0180528 A1* | 6/2014 | Argue | G06T 7/0004 701/31.4 |
| 2014/0180865 A1 | 6/2014 | Argue | |
| 2014/0180914 A1 | 6/2014 | Abhyanker | |
| 2014/0201041 A1 | 7/2014 | Meyer | |
| 2014/0207614 A1 | 7/2014 | Ramaswamy | |
| 2014/0209514 A1 | 7/2014 | Gitschel | |
| 2014/0211988 A1 | 7/2014 | Fan | |
| 2014/0214205 A1 | 7/2014 | Kwon | |
| 2014/0217242 A1 | 8/2014 | Muren | |
| 2014/0228999 A1 | 8/2014 | D'Andrea | |
| 2014/0229320 A1 | 8/2014 | Mohammed | |
| 2014/0244026 A1 | 8/2014 | Neiser | |
| 2014/0244207 A1 | 8/2014 | Hicks | |
| 2014/0246257 A1 | 9/2014 | Jacobsen | |
| 2014/0247116 A1 | 9/2014 | Birch | |
| 2014/0250613 A1 | 9/2014 | Jones | |
| 2014/0254896 A1 | 9/2014 | Zhou | |
| 2014/0257928 A1 | 9/2014 | Chen | |
| 2014/0266616 A1 | 9/2014 | Jones | |
| 2014/0267409 A1 | 9/2014 | Fein | |
| 2014/0274309 A1 | 9/2014 | Nguyen | |
| 2014/0277693 A1 | 9/2014 | Naylor | |
| 2014/0277742 A1 | 9/2014 | Wells | |
| 2014/0277841 A1 | 9/2014 | Klicpera | |
| 2014/0285134 A1 | 9/2014 | Kim | |
| 2014/0289009 A1 | 9/2014 | Campbell | |
| 2014/0297090 A1 | 10/2014 | Ichinose | |
| 2014/0304107 A1 | 10/2014 | McAllister | |
| 2014/0306654 A1 | 10/2014 | Partovi | |
| 2014/0309809 A1 | 10/2014 | Dixon | |
| 2014/0330456 A1 | 11/2014 | LopezMorales | |
| 2014/0330677 A1 | 11/2014 | Boncyk | |
| 2014/0344011 A1 | 11/2014 | Dogin | |
| 2014/0344118 A1 | 11/2014 | Parpia | |
| 2014/0350725 A1 | 11/2014 | LaFary | |
| 2014/0350851 A1 | 11/2014 | Carter | |
| 2014/0350855 A1 | 11/2014 | Vishnuvajhala | |
| 2014/0361077 A1 | 12/2014 | Davidson | |
| 2014/0369558 A1 | 12/2014 | Holz | |
| 2014/0371912 A1 | 12/2014 | Passot | |
| 2014/0379588 A1 | 12/2014 | Gates | |
| 2015/0006319 A1 | 1/2015 | Thomas | |
| 2015/0029339 A1* | 1/2015 | Kobres | H04N 7/181 348/150 |
| 2015/0032252 A1 | 1/2015 | Galluzzo | |
| 2015/0045992 A1 | 2/2015 | Ashby | |
| 2015/0046299 A1 | 2/2015 | Yan | |
| 2015/0066283 A1 | 3/2015 | Wurman | |
| 2015/0073589 A1 | 3/2015 | Khodl | |
| 2015/0098775 A1 | 4/2015 | Razumov | |
| 2015/0100439 A1 | 4/2015 | Lu | |
| 2015/0100461 A1 | 4/2015 | Baryakar | |
| 2015/0112826 A1 | 4/2015 | Crutchfield | |
| 2015/0120094 A1 | 4/2015 | Kimchi | |
| 2015/0123973 A1 | 5/2015 | Larsen | |
| 2015/0142249 A1 | 5/2015 | Ooga | |
| 2015/0203140 A1 | 7/2015 | Holtan | |
| 2015/0205298 A1 | 7/2015 | Stoschek | |
| 2015/0205300 A1 | 7/2015 | Caver | |
| 2015/0217449 A1 | 8/2015 | Meier | |
| 2015/0217790 A1 | 8/2015 | Golden | |
| 2015/0221854 A1 | 8/2015 | Melz | |
| 2015/0228004 A1 | 8/2015 | Bednarek | |
| 2015/0229906 A1 | 8/2015 | Inacio De Matos | |
| 2015/0231873 A1 | 8/2015 | Okamoto | |
| 2015/0277440 A1 | 10/2015 | Kimchi | |
| 2015/0278889 A1 | 10/2015 | Qian | |
| 2015/0325128 A1 | 11/2015 | Lord | |
| 2015/0336668 A1 | 11/2015 | Pasko | |
| 2015/0360865 A1 | 12/2015 | Massey | |
| 2016/0016731 A1 | 1/2016 | Razumov | |
| 2016/0023675 A1 | 1/2016 | Hannah | |
| 2016/0052139 A1 | 2/2016 | Hyde | |
| 2016/0101794 A1 | 4/2016 | Fowler | |
| 2016/0101936 A1 | 4/2016 | Chamberlin | |
| 2016/0101940 A1 | 4/2016 | Grinnell | |
| 2016/0110701 A1 | 4/2016 | Herring | |
| 2016/0114488 A1 | 4/2016 | Mascorro Medina | |
| 2016/0167557 A1 | 6/2016 | Mecklinger | |
| 2016/0167577 A1 | 6/2016 | Simmons | |
| 2016/0176638 A1 | 6/2016 | Toebes | |
| 2016/0196755 A1 | 7/2016 | Navot | |
| 2016/0207193 A1* | 7/2016 | Wise | B25J 5/007 |
| 2016/0210602 A1 | 7/2016 | Siddique | |
| 2016/0236867 A1 | 8/2016 | Brazeau | |
| 2016/0255969 A1 | 9/2016 | High | |
| 2016/0257212 A1 | 9/2016 | Thompson | |
| 2016/0257240 A1 | 9/2016 | High | |
| 2016/0257401 A1 | 9/2016 | Buchmueller | |
| 2016/0258762 A1 | 9/2016 | Taylor | |
| 2016/0258763 A1 | 9/2016 | High | |
| 2016/0259028 A1 | 9/2016 | High | |
| 2016/0259329 A1 | 9/2016 | High | |
| 2016/0259331 A1 | 9/2016 | Thompson | |
| 2016/0259339 A1 | 9/2016 | High | |
| 2016/0259340 A1 | 9/2016 | Kay | |
| 2016/0259341 A1 | 9/2016 | High | |
| 2016/0259342 A1 | 9/2016 | High | |
| 2016/0259343 A1 | 9/2016 | High | |
| 2016/0259344 A1 | 9/2016 | High | |
| 2016/0259345 A1 | 9/2016 | McHale | |
| 2016/0259346 A1 | 9/2016 | High | |
| 2016/0260049 A1 | 9/2016 | High | |
| 2016/0260054 A1 | 9/2016 | High | |
| 2016/0260055 A1 | 9/2016 | High | |
| 2016/0260142 A1 | 9/2016 | Winkle | |
| 2016/0260145 A1 | 9/2016 | High | |
| 2016/0260148 A1 | 9/2016 | High | |
| 2016/0260158 A1 | 9/2016 | High | |
| 2016/0260159 A1 | 9/2016 | Atchley | |
| 2016/0260161 A1 | 9/2016 | Atchley | |
| 2016/0261698 A1 | 9/2016 | Thompson | |
| 2016/0274586 A1 | 9/2016 | Stubbs | |
| 2016/0288601 A1 | 10/2016 | Gehrke | |
| 2016/0288687 A1 | 10/2016 | Scherle | |
| 2016/0300291 A1 | 10/2016 | Carmeli | |
| 2016/0301698 A1 | 10/2016 | Katara | |
| 2016/0325932 A1 | 11/2016 | Hognaland | |
| 2016/0349754 A1 | 12/2016 | Mohr | |
| 2016/0355337 A1 | 12/2016 | Lert | |
| 2016/0364785 A1 | 12/2016 | Wankhede | |
| 2016/0364786 A1 | 12/2016 | Wankhede | |
| 2017/0009417 A1 | 1/2017 | High | |
| 2017/0010608 A1 | 1/2017 | High | |
| 2017/0010609 A1 | 1/2017 | High | |
| 2017/0020354 A1 | 1/2017 | High | |
| 2017/0024806 A1 | 1/2017 | High | |
| 2017/0080846 A1 | 3/2017 | Lord | |
| 2017/0107055 A1 | 4/2017 | Magens | |
| 2017/0110017 A1 | 4/2017 | Kimchi | |
| 2017/0120443 A1 | 5/2017 | Kang | |
| 2017/0129602 A1 | 5/2017 | Alduaiji | |
| 2017/0137235 A1 | 5/2017 | Thompson | |
| 2017/0148075 A1 | 5/2017 | High | |
| 2017/0158430 A1 | 6/2017 | Raizer | |
| 2017/0166399 A1* | 6/2017 | Stubbs | B25J 9/0096 |
| 2017/0176986 A1 | 6/2017 | High | |
| 2017/0178066 A1 | 6/2017 | High | |
| 2017/0178082 A1 | 6/2017 | High | |
| 2017/0183159 A1* | 6/2017 | Weiss | B65G 1/1378 |
| 2017/0283171 A1 | 10/2017 | High | |
| 2017/0355081 A1 | 12/2017 | Fisher | |
| 2018/0020896 A1 | 1/2018 | High | |
| 2018/0068357 A1 | 3/2018 | High | |
| 2018/0075403 A1 | 3/2018 | Mascorro Medina | |

(56) References Cited

U.S. PATENT DOCUMENTS

| | | | |
|---|---|---|---|
| 2018/0099846 A1 | 4/2018 | High | |
| 2018/0170729 A1 | 6/2018 | High | |
| 2018/0170730 A1 | 6/2018 | High | |

FOREIGN PATENT DOCUMENTS

| | | |
|---|---|---|
| CN | 100999277 | 7/2007 |
| CN | 102079433 | 6/2011 |
| CN | 202847767 | 4/2013 |
| CN | 103136923 | 5/2013 |
| CN | 103213115 | 7/2013 |
| CN | 203166399 | 8/2013 |
| CN | 203191819 | 9/2013 |
| CN | 203401274 | 1/2014 |
| CN | 203402565 | 1/2014 |
| CN | 103625808 | 3/2014 |
| CN | 203468521 | 3/2014 |
| CN | 103696393 | 4/2014 |
| CN | 103723403 | 4/2014 |
| CN | 203512491 | 4/2014 |
| CN | 103770117 | 5/2014 |
| CN | 203782622 | 8/2014 |
| CN | 104102188 | 10/2014 |
| CN | 104102219 | 10/2014 |
| CN | 102393739 | 12/2014 |
| CN | 204054062 | 12/2014 |
| CN | 204309852 | 12/2014 |
| CN | 204331404 | 5/2015 |
| CN | 105460051 | 4/2016 |
| DE | 102013013438 | 2/2015 |
| EP | 861415 | 5/1997 |
| EP | 1136052 | 9/2001 |
| EP | 0887491 | 4/2004 |
| EP | 1439039 | 7/2004 |
| EP | 1447726 | 8/2004 |
| EP | 2148169 | 1/2010 |
| EP | 2106886 | 3/2011 |
| EP | 2309487 | 4/2011 |
| EP | 2050544 | 8/2011 |
| EP | 2498158 | 9/2012 |
| EP | 2571660 | 3/2013 |
| EP | 2590041 | 5/2013 |
| EP | 2608163 | 6/2013 |
| EP | 2662831 | 11/2013 |
| EP | 2730377 | 5/2014 |
| EP | 2886020 | 6/2015 |
| FR | 2710330 | 3/1995 |
| GB | 1382806 | 2/1971 |
| GB | 2530626 | 3/2016 |
| GB | 2542472 | 3/2017 |
| GB | 2542905 | 5/2017 |
| JP | 62247458 | 10/1987 |
| JP | H10129996 | 5/1998 |
| JP | 2003288396 | 10/2003 |
| JP | 2005350222 | 12/2005 |
| JP | 2009284944 | 12/2009 |
| JP | 2010105644 | 5/2010 |
| JP | 2010231470 | 10/2010 |
| KR | 20120100505 A | 9/2012 |
| WO | 8503277 A | 8/1985 |
| WO | 9603305 | 7/1995 |
| WO | 1997018523 | 5/1997 |
| WO | 9855903 | 12/1998 |
| WO | 2000061438 | 10/2000 |
| WO | 0132366 | 5/2001 |
| WO | 2004092858 | 10/2004 |
| WO | 2005102875 | 11/2005 |
| WO | 2006056614 | 6/2006 |
| WO | 2006120636 | 11/2006 |
| WO | 2006137072 | 12/2006 |
| WO | 2007007354 | 1/2007 |
| WO | 2007047514 | 4/2007 |
| WO | 2007149196 | 12/2007 |
| WO | 2008118906 | 10/2008 |
| WO | 2008144638 | 11/2008 |
| WO | 2008151345 | 12/2008 |
| WO | 2009022859 | 2/2009 |
| WO | 2009027835 | 3/2009 |
| WO | 2009103008 | 8/2009 |
| WO | 2011063527 | 6/2011 |
| WO | 2012075196 | 6/2012 |
| WO | 2013138193 | 9/2013 |
| WO | 2013138333 | 9/2013 |
| WO | 2013176762 | 11/2013 |
| WO | 2014022366 | 2/2014 |
| WO | 2014022496 | 2/2014 |
| WO | 2014045225 | 3/2014 |
| WO | 2014046757 | 3/2014 |
| WO | 2014101714 | 7/2014 |
| WO | 2014116947 | 7/2014 |
| WO | 2014138472 | 9/2014 |
| WO | 2014165286 | 10/2014 |
| WO | 2015021958 | 2/2015 |
| WO | 2015104263 | 7/2015 |
| WO | 2015155556 | 10/2015 |
| WO | 2016009423 | 1/2016 |
| WO | 2016015000 | 1/2016 |
| WO | 2016144765 | 9/2016 |

OTHER PUBLICATIONS

Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.

Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec. 15-18, 2007; pp. 1506-1511.

Onozato, Taishi et al.; "A Control System for the Robot Shopping Cart"; 2010 IRAST International Congress on Computer Applications and Computational Science (CACS 2010); 2010; pp. 907-910.

Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.

SK Telecom Co.; "SK Telecom Launches Smart Cart Pilot Test in Korea"; http://www.sktelecom.com/en/press/press_detail.do?idx=971; Oct. 4, 2011; pp. 1-2.

U.S. Appl. No. 15/060,953, filed Mar. 4, 2016, High.
U.S. Appl. No. 15/061,025, filed Mar. 4, 2016, High.
U.S. Appl. No. 15/061,054, filed Mar. 4, 2016, Kay.
U.S. Appl. No. 15/061,203, filed Mar. 4, 2016, High.
U.S. Appl. No. 15/061,265, filed Mar. 4, 2016, High.
U.S. Appl. No. 15/061,285, filed Mar. 4, 2016, High.
U.S. Appl. No. 15/061,325, filed Mar. 4, 2016, High.
U.S. Appl. No. 15/061,350, filed Mar. 4, 2016, Thompson.
U.S. Appl. No. 15/061,402, filed Mar. 4, 2016, High.
U.S. Appl. No. 15/061,406, filed Mar. 4, 2016, High.
U.S. Appl. No. 15/061,474, filed Mar. 4, 2016, High.
U.S. Appl. No. 15/061,507, filed Mar. 4, 2016, High.
U.S. Appl. No. 15/061,671, filed Mar. 4, 2016, High.
U.S. Appl. No. 15/061,677, filed Mar. 4, 2016, Taylor.
U.S. Appl. No. 15/061,686, filed Mar. 4, 2016, High.
U.S. Appl. No. 15/061,688, filed Mar. 4, 2016, Thompson.
U.S. Appl. No. 15/061,722, filed Mar. 4, 2016, High.
U.S. Appl. No. 15/061,770, filed Mar. 4, 2016, Atchley.
U.S. Appl. No. 15/061,792, filed Mar. 4, 2016, Winkle.
U.S. Appl. No. 15/061,801, filed Mar. 4, 2016, High.
U.S. Appl. No. 15/061,805, filed Mar. 4, 2016, Atchley.
U.S. Appl. No. 15/061,844, filed Mar. 4, 2016, High.
U.S. Appl. No. 15/061,848, filed Mar. 4, 2016, McHale.
U.S. Appl. No. 15/061,908, filed Mar. 4, 2016, High.
U.S. Appl. No. 15/061,980, filed Mar. 4, 2016, Thompson.

ABBROBOTICS; "ABB Robotics—Innovative Packaging Solutions", https://www.youtube.com/watch?v=e5jif-IUvHY, published on May 16, 2013, pp. 1-5.

(56) References Cited

OTHER PUBLICATIONS

Ang, Fitzwatler, et al.; "Automated Waste Sorter With Mobile Robot Delivery Waste System", De La Salle University Research Congress 2013, Mar. 7-9, 2013, pp. 1-7.
Ansari, Sameer, et al.; "Automated Trash Collection & Removal in Office Cubicle Environments", Squad Collaborative Robots, Sep. 27, 2013, pp. 1-23.
Armstrong, Jean, et al.; "Visible Light Positioning: A Roadmap for International Standardization", IEEE Communications Magazine, Dec. 2013, pp. 2-7.
Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.
Atherton, Kelsey D.; "New GPS Receiver Offers Navigation Accurate to an Inch", Popular Science, www.popsci.com/technology/article/2013-08/global-positioning-down-inches, Aug. 16, 2013, pp. 1-2.
Avezbadalov, Ariel, et al.; "Snow Shoveling Robot", engineering. nyu.edu/mechatronics/projects/ME3484/2006/Snow Shoveling Robot/ Mechatronics Snow Robot Presentation Update 12-19-06.pdf, 2006, pp. 1-24.
Bares, John, et al.; "Designing Crash-Survivable Unmanned Vehicles", AUVSI Symposium, Jul. 10, 2002, pp. 1-15.
Bohren; Jonathan et al.; "Towards Autonomous Robotic Butlers: Lessons Learned with the PR2", Willow Garage, pp. 1-8.
Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.
Burns, Tom; "irobot roomba 780 review best robot vacuum floor cleaning robot review video demo", https://www.youtube.com/watch?v=MkwtlyVAaEY, published on Feb. 13, 2013, pp. 1-10.
BYTELIGHT; "Scalable Indoor Location", http://www.bytelight.com/, Dec. 12, 2014, pp. 1-2.
Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.
Capel, Claudine; "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.
Carnegie Mellon Univeristy; "AndyVision—The Future of Retail", https://www.youtube.com/watch?v=n5309ILTV2s, published on Jul. 16, 2012, pp. 1-9.
Carnegie Mellon University; "Robots in Retail", www.cmu.edu/homepage/computing/2012/summer/robots-in-retail.shmtl, 2012, pp. 1.
Chopade, Jayesh, et al.; "Control of Spy Robot by Voice and Computer Commands", International Journal of Advanced Research in Computer and Communication Engineering, vol. 2, Issue 4, Apr. 2013, pp. 1-3.
CNET; "iRobot Braava 380t—No standing ovation for this robotic floor mop", https://www.youtube.com/watch?v=JAtClxFtC6Q, published on May 7, 2014, pp. 1-6.
Coltin, Brian & Ventura, Rodrigo; "Dynamic User Task Scheduling for Mobile Robots", Association for the Advancement of Artificial Intelligence, 2011, pp. 1-6.
Couceiro, Micael S., et al.; "Marsupial teams of robots: deployment of miniature robots for swarm exploration under communication constraints", Robotica, Cambridge University Press, downloaded Jan. 14, 2014, pp. 1-22.
Coxworth, Ben; "Robot designed to sort trash for recycling", Gizmag, http://www.gizmag.com/robot-sorts-trash-for-recycling/18426/, Apr. 18, 2011, pp. 1-7.
Davis, Jo; "The Future of Retail: In Store Now", Online Brands, http://onlinebrands.co.nz/587/future-retail-store-now/, Nov. 16, 2014, pp. 1-5.
DENSO; "X-mobility", pp. 1.

DHL; "Self-Driving Vehicles in Logistics: A DHL perspective on implications and use cases for the logistics industry", 2014, pp. 1-39.
Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.
Dronewatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.
Dyson US; "See the new Dyson 360 Eye robot vacuum cleaner in action #DysonRobot", https://www.youtube.com/watch?v=OadhulCDAjk, published on Sep. 4, 2014, pp. 1-7.
Edwards, Lin; "Supermarket robot to help the elderly (w/Video)", Phys.Org, http://phys.org/news/2009-12-supermarket-robot-elderly-video.html, Dec. 17, 2009, pp. 1-5.
Elfes, Alberto; "Using Occupancy Grids for Mobile Robot Perception and Navigation", IEEE, 1989, pp. 46-57.
Elkins, Herschel T.; "Important 2014 New Consumer Laws", County of Los Angeles Department of Consumer Affairs Community Outreach & Education, updated Jan. 6, 2014, pp. 1-46.
Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.
Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.
Fellow Robots; "Meet OSHBOT", http://fellowrobots.com/oshbot/, pp. 1-3.
Fellowrobots; "Oshbot Progress—Fellow Robots", https://vimeo.com/139532370, published Sep. 16, 2015, pp. 1-5.
fora.tv; "A Day in the Life of a Kiva Robot", https://www.youtube.com/watch?v=6KRjuuEVEZs, published on May 11, 2011, pp. 1-11.
GAMMA2VIDEO; "FridayBeerBot.wmv", https://www.youtube.com/watch?v=KXXIIDYatxQ, published on Apr. 27, 2010, pp. 1-7.
Glas, Dylan F., et al.; "The Network Robot System: Enabling Social Human-Robot Interaction in Public Spaces", Journal of Human-Robot Interaction, vol. 1, No. 2, 2012, pp. 5-32.
Green, A., et al; "Report on evaluation of the robot trolley", CommRob IST-045441, Advanced Behaviour and High-Level Multimodal Communications with and among Robots, pp. 10-67.
Gross, H.-M., et al.; TOOMAS: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, pp. 2005-2012.
Habib, Maki K., "Real Time Mapping and Dynamic Navigation for Mobile Robots", International Journal of Advanced Robotic Systems, vol. 4, No. 3, 2007, pp. 323-338.
HRJ3 Productions; "Japanese Automatic Golf Cart", https://www.youtube.com/watch?v=8diWYtqb6C0, published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=IWsMdN7HMuA, published on Jul. 21, 2008, pp. 1-11.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com31acae05zf8i/trash-disposal-robot/, Jan. 9, 2015, pp. 1-7.

(56) References Cited

OTHER PUBLICATIONS

Kibria, Shafkat, "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.
Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.
Kiva Systems; "how a Kiva system makes use of the vertical space—Kiva Systems", http://www.kivasystems.com/solutions/vertical-storage/, printed on Apr. 2, 2015, pp. 1-2.
Kiva Systems; "How Kiva Systems and Warehouse Management Systems Interact", 2010, pp. 1-12.
Kiva Systems; "Kiva's warehouse automation system is the most powerful and flexible A . . . ", http://www.kivasystems.com/solutions/, printed on Apr. 2, 2015, pp. 1-2.
Kiva Systems; "Kiva replenishment is more productive and accurate than replenishing pick faces in traditional distribution operations", http//www.kivasystems.com/solutions/replenishment/, printed on Apr. 2, 2015, pp. 1-2.
Kiva Systems; "Kiva warehouse control software, Kiva WCS—Kiva Systems", http://www.kivasystems.com/solutions/software/, printed on Apr. 2, 2015, pp. 1-2.
Kiva Systems; "Shipping Sortation—Kiva Systems", http://www.kivasystems.com/solutions/shipping-sortation/, printed on Apr. 2, 2015, pp. 1-2.
Kohtsuka, Takafumi, et al.; "Design of a Control System for Robot Shopping Carts", Knowledge-Based and Intelligent Information and Engineering Systems, 15th International Conference, KES 2011, Kaiserslautern, Germany, Sep. 12-14, 2011, pp. 280-288.
Koubaa, Anis; "A Service-Oriented Architecture for Virtualizing Robots in Robot-as-a-Service Clouds", pp. 1-13.
Kumar, Swagat; "Robotics-as-a-Service: Transforming the Future of Retail", Tata Consultancy Services, http://www.tcs.com/resources/white_papers/Pages/Robotics-as-Service.aspx, printed on May 13, 2015, pp. 1-4.
Kumar Paradkar, Prashant; "Voice Controlled Robotic Project using interfacing of Andruino and Bluetooth HC-05", Robotics Projects C/C++_Android.
Lejepekov, Fedor; "Yuki-taro. Snow recycle robot.", https://www.youtube.com/watch?v=gl2j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe's Home Improvement; "OSHbots from Lowe's Innovation Labs", https://www.youtube.com/watch?v=W-RKAjP1dtA, published on Dec. 15, 2014, pp. 1-8.
Lowe's Innovation Labs; "Autonomous Retail Service Robots", http://www.lowesinnovationlabs.com/innovation-robots/, printed on Feb. 26, 2015, pp. 1-4.
Matos, Luis; "wi-GO—The autonomous and self-driven shopping cart"; https://www.indiegogo.com/projects/wi-go-the-autonomous-and-self-driven-shopping-cart; printed on Feb. 27, 2015, pp. 1-16.
Meena, M., & Thilagavahi, P.; "Automatic Docking System with Recharging and Battery Replacement for Surveillance Robot", International Journal of Electronics and Computer Science Engineering, pp. 1148-1154.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.
Nakajima, Madoka & Haruyama, Shinichiro; "New indoor navigation system for visually impaired people using visible light communication", EURASIP Journal on Wireless Communications and Networking, 2013, pp. 1-10.
NEUROBTV; "Shopping Robot Toomas 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.
Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.
Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=oBHYwYlo1UE, published on Sep. 8, 2014, pp. 1-6.
Rodriguez, Ashley; "Meet Lowe's Newest Sales Associate—OSHbot, the Robot", Advertising Age, http://adage.com/article/cmo-strategy/meet-lowe-s-newest-sales-associate-oshbot-robot/295591/, Oct. 28, 2014, pp. 1-8.
Sebaali, G., et al.; "Smart Shopping Cart", Department of Electrical and Computer Engineering, American University of Beirut, pp. 1-6.
Shukla, Neha; "SaviOne the Butler Bot: Service Robot for Hospitality Industry", TechieTonics, http://www.techietonics.com/robo-tonics/savione-the-butler-bot-service-for-hospitality-industry.html, pp. 1-5.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.
Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.
Stewart Golf; "Introducing the New Stewart Golf X9 Follow", https://www.youtube.com/watch?v=HHivFGtiuE, published on Apr. 9, 2014, pp. 1-9.
Sun, Eric; ""Smart Bin & Trash" Route system—RMIT 2012 Green Inventors Competition", http://www.youtube.com/watch?v=OrTA57alO0k, published on Nov. 14, 2012, pp. 1-8.
Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, pp. 1.
Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.
Universal Robotics; "Neocortex Enables Random Part Handling and Automated Assembly", http://www.universalrobotics.com/random-bin-picking, printed on Dec. 22, 2015, pp. 1-3.
Uphigh Productions; "Behold the Future (E017 Robot Sales Assistant)", https://www.youtube.com/watch?v=8WbvjaPm7d4, published on Nov. 19, 2014, pp. 1-7.

(56) References Cited

OTHER PUBLICATIONS

Urankar, Sandeep, et al.; "Robo-Sloth: A Rope-Climbing Robot", Department of Mechanical Engineering, Indian Institute of Technology, 2003, pp. 1-10.
Vasilescu, Iuliu, et al.; "Autonomous Modular Optical Underwater Robot (AMOUR) Design, Prototype and Feasibility Study", pp. 1-7.
VMECAVACUUMTECH; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.
Webb, Mick; "Robovie II—the personal robotic shopping", Gizmag, http://www.gizmag.com/robovie-ii-robotic-shopping-assistance/13664/, Dec. 23, 2009, pp. 1-5.
Weise, Elizabeth; "15,000 robots usher in Amazon's Cyber Monday", USATODAY, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wired; "High-Speed Robots Part 1: Meet BettyBot in "Human Exclusion Zone" Warehouses-The Window-Wired", https://www.youtube.com/watch?v=8gy5tYVR-28, published on Jul. 2, 2013, pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_S0Kc, published on Jul. 12, 2012, pp. 1-7.
Intelligent Autonomous Systems; "TUM James goes shopping", https://www.youtube.com/watch?v=JS2zycc4AUE, published on May 23, 2011, pp. 1-13.
PCT App No. PCT/US2016/020919; International Search Report & Written Opinion dated May 17, 2016 (25 pgs.).
U.S. Appl. No. 15/061,686; Notice of Allowance dated Oct. 28, 2016.
U.S. Appl. No. 15/061,054; Office Action dated Dec. 12, 2016.
U.S. Appl. No. 15/061,443, filed Mar. 4, 2016, High.
U.S. Appl. No. 15/275,009, filed Sep. 23, 2016, High.
U.S. Appl. No. 15/275,047, filed Sep. 23, 2016, High.
U.S. Appl. No. 15/282,951, filed Sep. 30, 2016, High.
U.S. Appl. No. 15/288,923, filed Oct. 7, 2016, High.
U.S. Appl. No. 15/238,812, filed Feb. 3, 2017, High.
U.S. Appl. No. 15/446,914, filed Mar. 1, 2017, High.
U.S. Appl. No. 15/447,175, filed Mar. 2, 2017, High.
U.S. Appl. No. 15/447,202, filed Mar. 2, 2017, High.
U.S. Appl. No. 15/471,278, filed Mar. 28, 2017, High.
U.S. Appl. No. 15/692,226, filed Aug. 31, 2017, High.
U.S. Appl. No. 15/836,708, filed Dec. 8, 2017, High.
Daily Mail; "Dancing with your phone: The gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Owano, Nancy; "HEARBO robot can tell beeps, notes, and spoken word (w/ Video)", Phys.org, Nov. 21, 2012, https://phys.org/news/2012-11-hearbo-robot-beeps-spoken-word.html, pp. 1-4.
Sales, Jorge, et al.; "CompaRob: The Shopping Cart Assistance Robot", International Journal of Distributed Sensor Networks, vol. 2016, Article ID 4781280, Jan. 3, 2016, http://dx.doi.org/10.1155/2016/4781280, pp. 1-16.

Bohren; Jonathan et al.; "Towards Autonomous Robotic Butlers: Lessons Learned with the PR2", Willow Garage, May 9, 2011, pp. 1-8.
DENSO; "X-mobility", Oct. 10, 2014, pp. 1-2, including machine translation.
Fellow Robots; "Meet OSHBOT", http://fellowrobots.com/oshbot/, May 19, 2015, pp. 1-3.
Green, A., et al; "Report on evaluation of the robot trolley", CommRob IST-045441, Advanced Behaviour and High-Level Multimodal Communications with and among Robots, Jun. 14, 2010, pp. 10-67.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.
Meena, M., & Thilagavathi, P.; "Automatic Docking System with Recharging and Battery Replacement for Surveillance Robot", International Journal of Electronics and Computer Science Engineering, 2012, pp. 1148-1154.
Sebaali, G., et al.; "Smart Shopping Cart", Department of Electrical and Computer Engineering, American University of Beirut, 2014, pp. 1-6.
Shukla, Neha; "SaviOne the Butler Bot: Service Robot for Hospitality Industry", TechieTonics, http://www.techietonics.com/robo-tonics/savione-the-butler-bot-service-for-hospitality-industry.html, Aug. 14, 2014, pp. 1-5.
SWISSLOG; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Vasilescu, Iuliu, et al.; "Autonomous Modular Optical Underwater Robot (AMOUR) Design, Prototype and Feasibility Study", Apr. 18, 2005, pp. 1-7.
Wikipedia; "Leeds Kirkgate Market"; https://en.wikipedia.org/wiki/Leeds_Kirkgate_Market; Retrieved on Apr. 5, 2017; 8 pages.
U.S. Appl. No. 15/892,250, filed Feb. 8, 2018, High.
U.S. Appl. No. 15/894,155, filed Feb. 12, 2018, High.
Budgee; "The Robotic Shopping Cart Budgee "; https://www.youtube.com/watch?v=2dYNdVPF4VM; published on Mar. 20, 2015; pp. 1-6.
Follow Inspiration; "wiiGO"; https://www.youtube.com/watch?v=dhHXIdpknC4; published on Jun. 16, 2015; pp. 1-7.
Technion; "Autonomous Tracking Shopping Cart—Shopping Made Easy from Technion"; https://www.youtube.com/watch?v=pQcb9fofmXg; published on Nov. 23, 2014; pp. 1-10.
UKIPO; App. No. 1714769.5; Office Action dated Mar. 27, 2018.
UKIPO; App. No. 1715523.5; Office Action dated Mar. 26, 2018.
UKIPO; App. No. GB1613851.3; Examination Report dated Feb. 9, 2018.
UKIPO; App. No. GB1721298.6; Office Action dated Jan. 31, 2018.
U.S. Appl. No. 15/275,047; Notice of Allowance dated May 21, 2018 (pp. 1-5).
U.S. Appl. No. 15/061,203; Notice of Allowance dated May 8, 2018.
U.S. Appl. No. 15/061,406; Notice of Allowance dated May 15, 2018.
U.S. Appl. No. 15/061,443; Office Action dated Apr. 4, 2018.
U.S. Appl. No. 15/061,671; Office Action dated Apr. 18, 2018.
U.S. Appl. No. 15/061,688; Office Action dated Mar. 26, 2018.
U.S. Appl. No. 15/274,991; Office Action dated May 17, 2018.
U.S. Appl. No. 15/282,951; Office Action dated Mar. 30, 2018.
U.S. Appl. No. 15/471,278; Notice of Allowance dated Apr. 19, 2018.
U.S. Appl. No. 15/061,350; Notice of Allowance dated Apr. 4, 2018.
U.S. Appl. No. 15/698,068, filed Sep. 7, 2017, High.
U.S. Appl. No. 15/990,274, filed May 25, 2018, High.
U.S. Appl. No. 16/001,774, filed Jun. 6, 2018, High.
U.S. Appl. No. 16/059,431, filed Aug. 9, 2018, High.
U.S. Appl. No. 16/100,064, filed Aug. 9, 2018, High.
U.S. Appl. No. 16/109,290, filed Aug. 22, 2018, High.

* cited by examiner

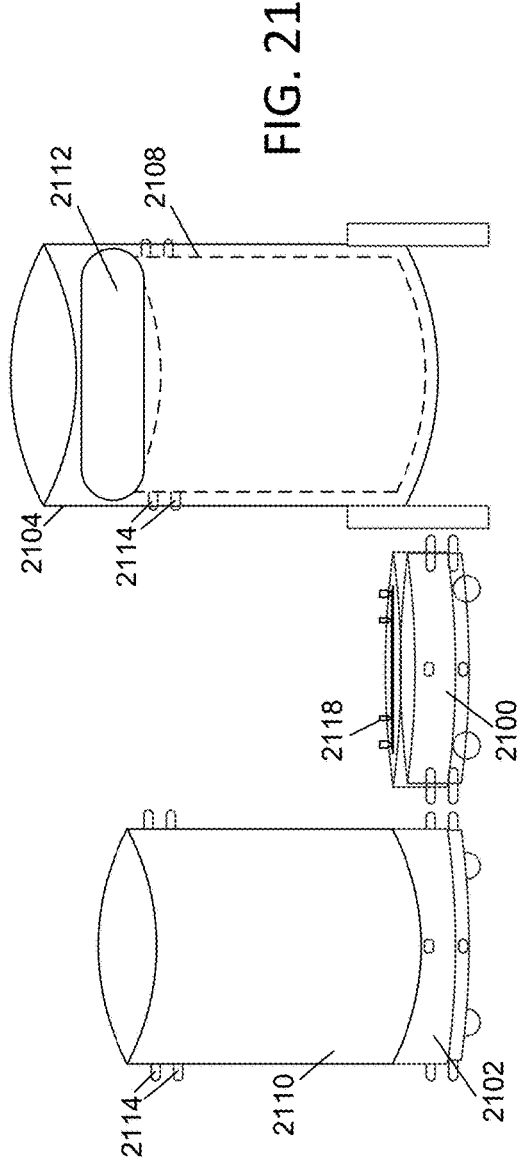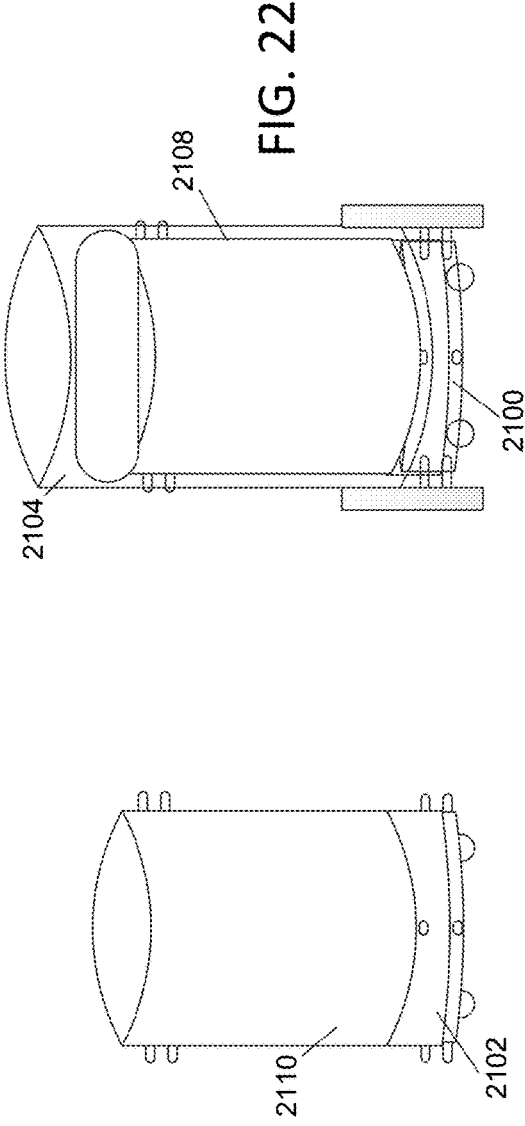

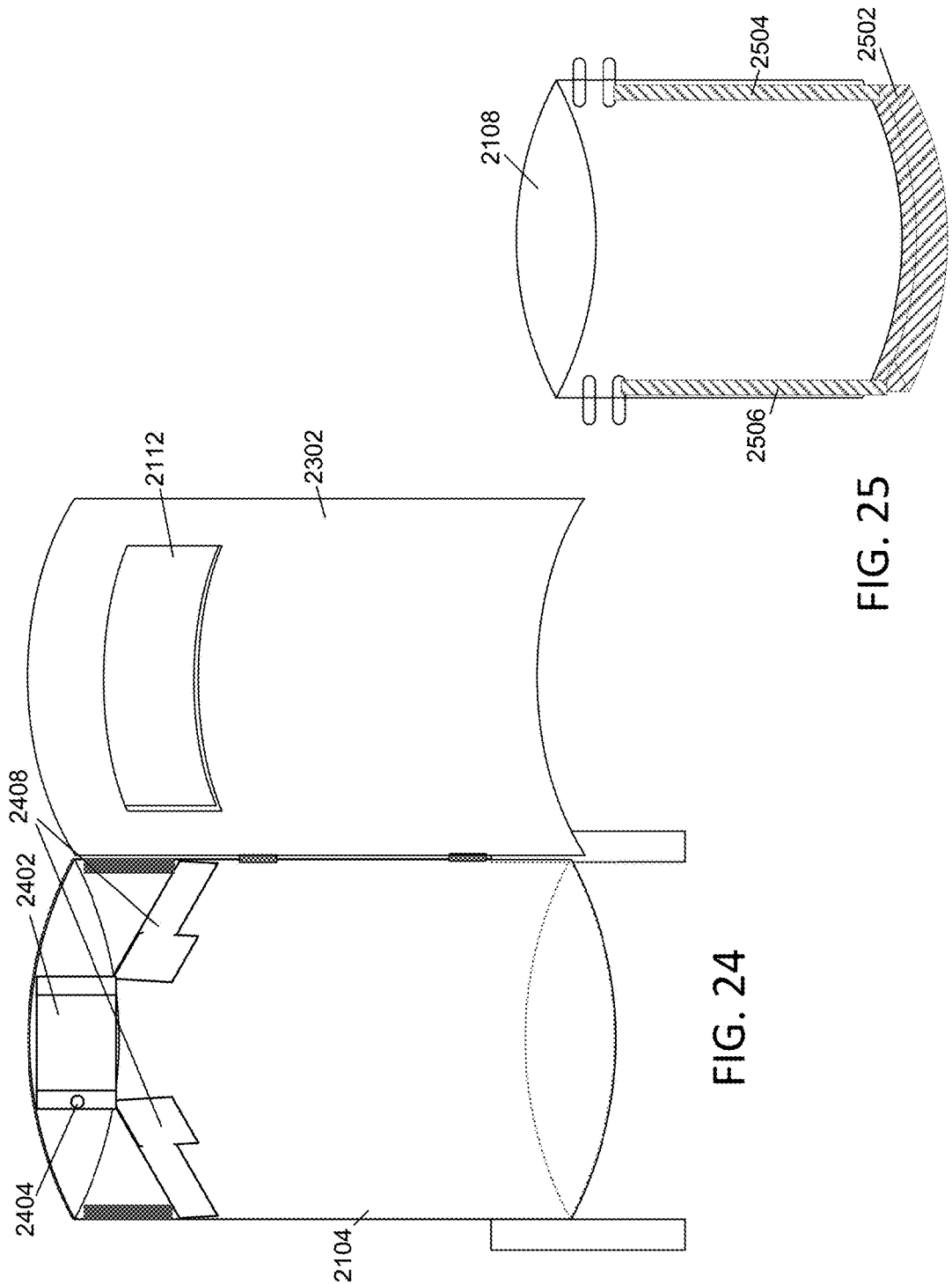

SHOPPING FACILITY ASSISTANCE SYSTEMS, DEVICES, AND METHODS TO FACILITATE RETURNING ITEMS TO THEIR RESPECTIVE DEPARTMENTS

RELATED APPLICATIONS

This application is a continuation of U.S. application Ser. No. 15/061,203, filed Mar. 4, 2016, which claims the benefit of each of the following U.S. Provisional applications: U.S. Provisional Application No. 62/129,726, filed Mar. 6, 2015, U.S. Provisional Application No. 62/129,727, filed Mar. 6, 2015; U.S. Provisional Application No. 62/138,877, filed Mar. 26, 2015; U.S. Provisional Application No. 62/138,885, filed Mar. 26, 2015; U.S. Provisional Application No. 62/152,421, filed Apr. 24, 2015; U.S. Provisional Application No. 62/152,465, filed Apr. 24, 2015; U.S. Provisional Application No. 62/152,440, filed Apr. 24, 2015; U.S. Provisional Application No. 62/152,630, filed Apr. 24, 2015; U.S. Provisional Application No. 62/152,711, filed Apr. 24, 2015; U.S. Provisional Application No. 62/152,610, filed Apr. 24, 2015; U.S. Provisional Application No. 62/152,667, filed Apr. 24, 2015; U.S. Provisional Application No. 62/157,388, filed May 5, 2015; U.S. Provisional Application No. 62/165,579, filed May 22, 2015; U.S. Provisional Application No. 62/165,416, filed May 22, 2015; U.S. Provisional Application No. 62/165,586, filed May 22, 2015; U.S. Provisional Application No. 62/171,822, filed Jun. 5, 2015; U.S. Provisional Application No. 62/175,182, filed Jun. 12, 2015; U.S. Provisional Application No. 62/182,339, filed Jun. 19, 2015; U.S. Provisional Application No. 62/185,478, filed Jun. 26, 2015; U.S. Provisional Application No. 62/194,131, filed Jul. 17, 2015; U.S. Provisional Application No. 62/194,119, filed Jul. 17, 2015; U.S. Provisional Application No. 62/194,121, filed Jul. 17, 2015; U.S. Provisional Application No. 62/194,127, filed Jul. 17, 2015; U.S. Provisional Application No. 62/202,744, filed Aug. 7, 2015; U.S. Provisional Application No. 62/202,747, filed Aug. 7, 2015; U.S. Provisional Application No. 62/205,548, filed Aug. 14, 2015; U.S. Provisional Application No. 62/205,569, filed Aug. 14, 2015, U.S. Provisional Application No. 62/205,555, filed Aug. 14, 2015; U.S. Provisional Application No. 62/205,539, filed Aug. 14, 2015; U.S. Provisional Application No. 62/207,858, filed Aug. 20, 2015; U.S. Provisional Application No. 62/214,826, filed Sep. 4, 2015; U.S. Provisional Application No. 62/214,824, filed Sep. 4, 2015; U.S. Provisional Application No. 62/292,084, filed Feb. 5, 2016; U.S. Provisional Application No. 62/302,547, filed Mar. 2, 2016; U.S. Provisional Application No. 62/302,567, filed Mar. 2, 2016; U.S. Provisional Application No. 62/302,713, filed Mar. 2, 2016; and U.S. Provisional Application No. 62/303,021, filed Mar. 3, 2016, all of these applications being incorporated herein by reference in their entirety.

TECHNICAL FIELD

These teachings relate generally to shopping environments and more particularly to devices, systems and methods for assisting customers and/or workers in those shopping environments.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, particularly during peak hours, there may not be enough employees available to assist customers such that customer questions go unanswered. Additionally, due to high employee turnover rates, available employees may not be fully trained or have access to information to adequately support customers. Other routine tasks also are difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF THE DRAWINGS

The above needs are at least partially met through provision of embodiments of systems, devices, and methods designed to provide assistance to customers and/or workers in a shopping facility, such as described in the following detailed description, particularly when studied in conjunction with the drawings, wherein:

FIG. 21 illustrates a simplified block diagram of an exemplary first motorized transport unit and an exemplary second motorized transport unit approaching an exemplary trash can receptacle that is to be serviced, in accordance with some embodiments;

FIG. 22 illustrates the first motorized transport unit of FIG. 21 moving into position relative to the trash can receptacle, in accordance with some embodiments;

FIG. 24 illustrates a simplified block diagram of an exemplary trash can receptacle, in accordance with some embodiments;

FIG. 25 illustrates a simplified block diagram of an exemplary trash can in accordance with some embodiments;

Figure 1:
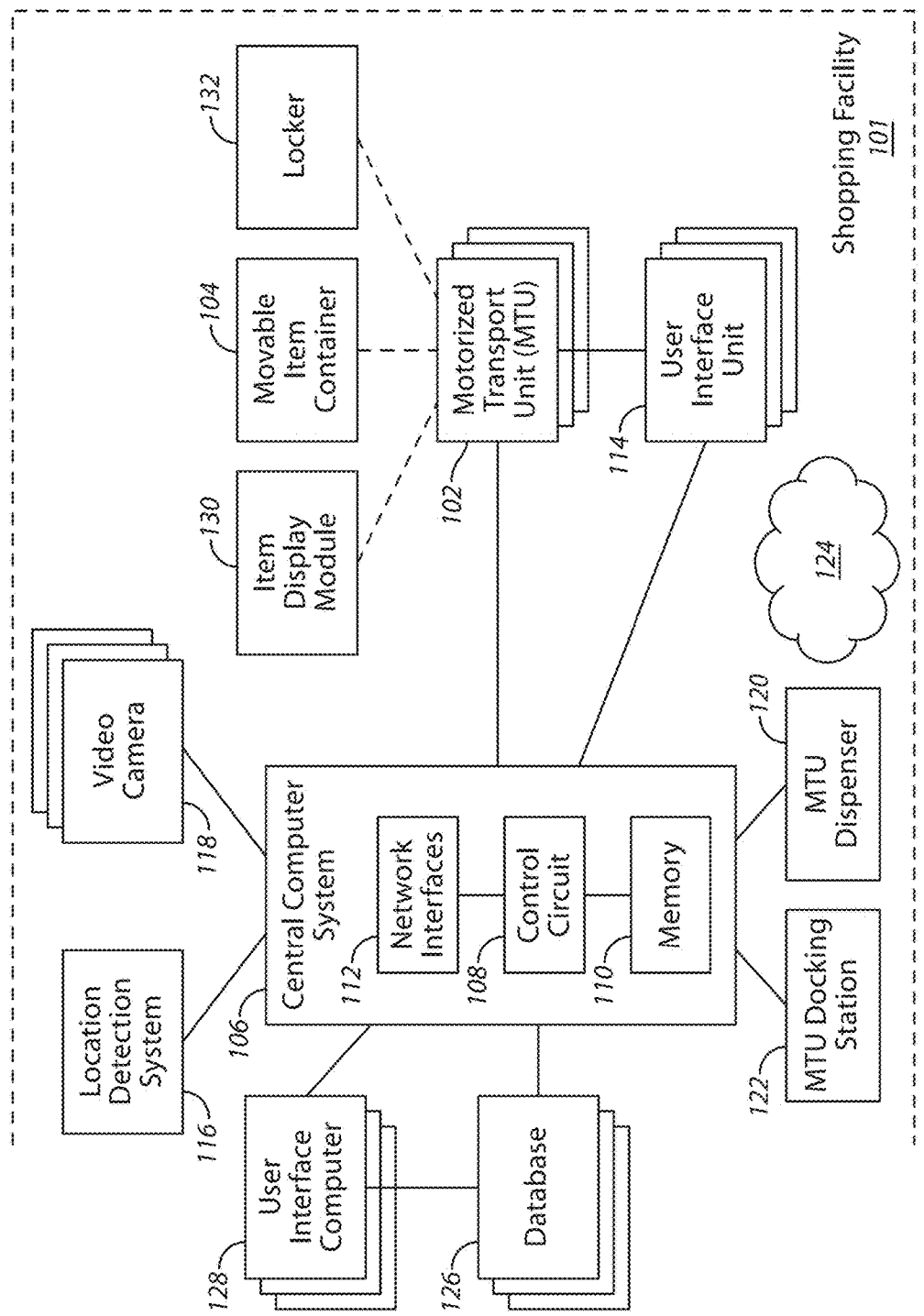
FIG. 1 comprises a block diagram of a shopping assistance system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided for assistance of persons at a shopping facility. Generally, assistance may be provided to customers or shoppers at the facility and/or to workers at the facility. The facility may be any type of shopping facility at a location in which products for display and/or for sale are variously distributed throughout the shopping facility space. The shopping facility may be a retail sales facility, or any other type of facility in which products are displayed and/or sold. The shopping facility may include one or more of sales floor areas, checkout locations, parking locations, entrance and exit areas, stock room areas, stock receiving areas, hallway areas, common areas shared by merchants, and so on. Generally, a shopping facility includes areas that may be dynamic in terms of the physical structures occupying the space or area and objects, items, machinery and/or persons moving in the area. For example, the shopping area may include product storage units, shelves, racks, modules, bins, etc., and other walls, dividers, partitions, etc. that may be configured in different layouts or physical arrangements. In other example, persons or other movable objects may be freely and independently traveling through the shopping facility space. And in other example, the persons or movable objects move according to known travel patterns and timing. The facility may be any size of format facility, and may include products from one or more merchants. For example, a facility may be a single store operated by one merchant or may be a collection of stores covering multiple merchants such as a mall. Generally, the system makes use of automated, robotic mobile devices, e.g., motorized transport units, that are capable of self-powered movement through a space of the shopping facility and providing any number of functions. Movement and operation of such devices may be controlled by a central computer system or may be autonomously controlled by the motorized transport units themselves. Various embodiments provide one or more user interfaces to allow various users to interact with the system including the automated mobile devices and/or to directly interact with the automated mobile devices. In some embodiments, the automated mobile devices and the corresponding system serve to enhance a customer shopping experience in the shopping facility, e.g., by assisting shoppers and/or workers at the facility.

In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units through the shopping facility space based at least on inputs from the plurality of user interface units.

System Overview

Referring now to the drawings, FIG. 1 illustrates embodiments of a shopping facility assistance system 100 that can serve to carry out at least some of the teachings set forth herein. It will be understood that the details of this example are intended to serve in an illustrative capacity and are not necessarily intended to suggest any limitations as regards the present teachings. It is noted that generally, FIGS. 1-5 describe the general functionality of several embodiments of a system, and FIGS. 6-32 expand on some functionalities of some embodiments of the system and/or embodiments independent of such systems.

In the example of FIG. 1, a shopping assistance system 100 is implemented in whole or in part at a shopping facility 101. Generally, the system 100 includes one or more motorized transport units (MTUs) 102; one or more item containers 104; a central computer system 106 having at least one control circuit 108, at least one memory 110 and at least one network interface 112; at least one user interface unit 114; a location determination system 116; at least one video camera 118; at least one motorized transport unit (MTU) dispenser 120; at least one motorized transport unit (MTU) docking station 122; at least one wireless network 124; at least one database 126; at least one user interface computer device 128; an item display module 130; and a locker or an item storage unit 132. It is understood that more or fewer of such components may be included in different embodiments of the system 100.

These motorized transport units 102 are located in the shopping facility 101 and are configured to move throughout the shopping facility space. Further details regarding such motorized transport units 102 appear further below. Generally speaking, these motorized transport units 102 are configured to either comprise, or to selectively couple to, a corresponding movable item container 104. A simple example of an item container 104 would be a shopping cart as one typically finds at many retail facilities, or a rocket cart, a flatbed cart or any other mobile basket or platform that may be used to gather items for potential purchase.

In some embodiments, these motorized transport units 102 wirelessly communicate with, and are wholly or largely controlled by, the central computer system 106. In particular, in some embodiments, the central computer system 106 is configured to control movement of the motorized transport units 102 through the shopping facility space based on a variety of inputs. For example, the central computer system 106 communicates with each motorized transport unit 102 via the wireless network 124 which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 102 according to any known wireless protocols, including but not limited to a cellular, Wi-Fi, Zigbee or Bluetooth network.

By one approach the central computer system 106 is a computer based device and includes at least one control circuit 108, at least one memory 110 and at least one wired and/or wireless network interface 112. Such a control circuit 108 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 108 is configured (for example, by using corresponding programming stored in the memory 110 as will be well understood by those skilled in the art) to carry out one or more of the steps, actions, and/or functions described herein.

In this illustrative example the control circuit 108 operably couples to one or more memories 110. The memory 110 may be integral to the control circuit 108 or can be physically discrete (in whole or in part) from the control circuit 108 as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Additionally, at least one database 126 may be accessible by the central computer system 106. Such databases may be integrated into the central computer system 106 or separate from it. Such databases may be at the location of the shopping facility 101 or remote from the shopping facility 101. Regardless of location, the databases comprise memory to store and organize certain data for use by the central control system 106. In some embodiments, the at least one database 126 may store data pertaining to one or more of: shopping facility mapping data, customer data, customer shopping data and patterns, inventory data, product pricing data, and so on.

In this illustrative example, the central computer system 106 also wirelessly communicates with a plurality of user interface units 114. These teachings will accommodate a variety of user interface units including, but not limited to, mobile and/or handheld electronic devices such as so-called smart phones and portable computers such as tablet/pad-styled computers. Generally speaking, these user interface units 114 should be able to wirelessly communicate with the central computer system 106 via a wireless network, such as the wireless network 124 of the shopping facility 101 (such as a Wi-Fi wireless network). These user interface units 114 generally provide a user interface for interaction with the system. In some embodiments, a given motorized transport unit 102 is paired with, associated with, assigned to or otherwise made to correspond with a given user interface unit 114. In some embodiments, these user interface units 114 should also be able to receive verbally-expressed input from a user and forward that content to the central computer system 106 or a motorized transport unit 102 and/or convert that verbally-expressed input into a form useful to the central computer system 106 or a motorized transport unit 102.

By one approach at least some of the user interface units 114 belong to corresponding customers who have come to the shopping facility 101 to shop. By another approach, in lieu of the foregoing or in combination therewith, at least some of the user interface units 114 belong to the shopping facility 101 and are loaned to individual customers to employ as described herein. In some embodiments, one or more user interface units 114 are attachable to a given movable item container 104 or are integrated with the movable item container 104. Similarly, in some embodiments, one or more user interface units 114 may be those of shopping facility workers, belong to the shopping facility 101 and are loaned to the workers, or a combination thereof.

In some embodiments, the user interface units 114 may be general purpose computer devices that include computer programming code to allow it to interact with the system 106. For example, such programming may be in the form of an application installed on the user interface unit 114 or in the form of a browser that displays a user interface provided by the central computer system 106 or other remote computer or server (such as a web server). In some embodiments, one or more user interface units 114 may be special purpose devices that are programmed to primarily function as a user interface for the system 100. Depending on the functionality and use case, user interface units 114 may be operated by customers of the shopping facility or may be operated by workers at the shopping facility, such as facility employees (associates or colleagues), vendors, suppliers, contractors, etc.

By one approach, the system 100 optionally includes one or more video cameras 118. Captured video imagery from such a video camera 118 can be provided to the central computer system 106. That information can then serve, for example, to help the central computer system 106 determine a present location of one or more of the motorized transport units 102 and/or determine issues or concerns regarding automated movement of those motorized transport units 102 in the shopping facility space. As one simple example in these regards, such video information can permit the central computer system 106, at least in part, to detect an object in a path of movement of a particular one of the motorized transport units 102.

By one approach these video cameras 118 comprise existing surveillance equipment employed at the shopping facility 101 to serve, for example, various security purposes. By another approach these video cameras 118 are dedicated to providing video content to the central computer system 106 to facilitate the latter's control of the motorized transport units 102. If desired, the video cameras 118 can have a selectively movable field of view and/or zoom capability that the central computer system 106 controls as appropriate to help ensure receipt of useful information at any given moment.

In some embodiments, a location detection system 116 is provided at the shopping facility 101. The location detection system 116 provides input to the central computer system 106 useful to help determine the location of one or more of the motorized transport units 102. In some embodiments, the location detection system 116 includes a series of light sources (e.g., LEDs (light-emitting diodes)) that are mounted in the ceiling at known positions throughout the space and that each encode data in the emitted light that identifies the source of the light (and thus, the location of the light). As a given motorized transport unit 102 moves through the space, light sensors (or light receivers) at the motorized transport unit 102, on the movable item container 104 and/or at the user interface unit 114 receive the light and can decode the data. This data is sent back to the central computer system 106 which can determine the position of the motorized transport unit 102 by the data of the light it receives, since it can relate the light data to a mapping of the light sources to locations at the facility 101. Generally, such lighting systems are known and commercially available, e.g., the ByteLight system from ByteLight of Boston, Mass. In embodiments using a ByteLight system, a typical display screen of the typical smart phone device can be used as a light sensor or light receiver to receive and process data encoded into the light from the ByteLight light sources.

In other embodiments, the location detection system 116 includes a series of low energy radio beacons (e.g., Bluetooth low energy beacons) at known positions throughout the space and that each encode data in the emitted radio signal that identifies the beacon (and thus, the location of the beacon). As a given motorized transport unit 102 moves through the space, low energy receivers at the motorized transport unit 102, on the movable item container 104 and/or at the user interface unit 114 receive the radio signal and can decode the data. This data is sent back to the central computer system 106 which can determine the position of the motorized transport unit 102 by the location encoded in the radio signal it receives, since it can relate the location data to a mapping of the low energy radio beacons to locations at the facility 101. Generally, such low energy radio systems are known and commercially available. In embodiments using a Bluetooth low energy radio system, a typical Bluetooth radio of a typical smart phone device can be used as a receiver to receive and process data encoded into the Bluetooth low energy radio signals from the Bluetooth low energy beacons.

In still other embodiments, the location detection system 116 includes a series of audio beacons at known positions throughout the space and that each encode data in the emitted audio signal that identifies the beacon (and thus, the location of the beacon). As a given motorized transport unit 102 moves through the space, microphones at the motorized transport unit 102, on the movable item container 104 and/or at the user interface unit 114 receive the audio signal and can decode the data. This data is sent back to the central computer system 106 which can determine the position of the motorized transport unit 102 by the location encoded in the audio signal it receives, since it can relate the location data to a mapping of the audio beacons to locations at the facility 101. Generally, such audio beacon systems are known and commercially available. In embodiments using an audio beacon system, a typical microphone of a typical smart phone device can be used as a receiver to receive and process data encoded into the audio signals from the audio beacon.

Also optionally, the central computer system 106 can operably couple to one or more user interface computers 128 (comprising, for example, a display and a user input interface such as a keyboard, touch screen, and/or cursor-movement device). Such a user interface computer 128 can permit, for example, a worker (e.g., an associate, analyst, etc.) at the retail or shopping facility 101 to monitor the operations of the central computer system 106 and/or to attend to any of a variety of administrative, configuration or evaluation tasks as may correspond to the programming and operation of the central computer system 106. Such user interface computers 128 may be at or remote from the location of the facility 101 and may access one or more the databases 126.

In some embodiments, the system 100 includes at least one motorized transport unit (MTU) storage unit or dispenser 120 at various locations in the shopping facility 101. The dispenser 120 provides for storage of motorized transport units 102 that are ready to be assigned to customers and/or workers. In some embodiments, the dispenser 120 takes the form of a cylinder within which motorized transports units 102 are stacked and released through the bottom of the dispenser 120. Further details of such embodiments are provided further below. In some embodiments, the dispenser 120 may be fixed in location or may be mobile and capable of transporting itself to a given location or utilizing a motorized transport unit 102 to transport the dispenser 120, then dispense one or more motorized transport units 102.

In some embodiments, the system 100 includes at least one motorized transport unit (MTU) docking station 122. These docking stations 122 provide locations where motorized transport units 102 can travel and connect to. For example, the motorized transport units 102 may be stored and charged at the docking station 122 for later use, and/or may be serviced at the docking station 122.

In accordance with some embodiments, a given motorized transport unit 102 detachably connects to a movable item container 104 and is configured to move the movable item container 104 through the shopping facility space under control of the central computer system 106 and/or the user interface unit 114. For example, a motorized transport unit 102 can move to a position underneath a movable item container 104 (such as a shopping cart, a rocket cart, a flatbed cart, or any other mobile basket or platform), align itself with the movable item container 104 (e.g., using sensors) and then raise itself to engage an undersurface of the movable item container 104 and lift a portion of the movable item container 104. Once the motorized transport unit is cooperating with the movable item container 104 (e.g., lifting a portion of the movable item container), the motorized transport unit 102 can continue to move throughout the facility space 101 taking the movable item container 104 with it. In some examples, the motorized transport unit 102 takes the form of the motorized transport unit 202 of FIGS. 2A-3B as it engages and detachably connects to a given movable item container 104. It is understood that in other embodiments, the motorized transport unit 102 may not lift a portion of the movable item container 104, but that it removably latches to, connects to or otherwise attaches to a portion of the movable item container 104 such that the movable item container 104 can be moved by the motorized transport unit 102. For example, the motorized transport unit 102 can connect to a given movable item container using a hook, a mating connector, a magnet, and so on.

In addition to detachably coupling to movable item containers 104 (such as shopping carts), in some embodiments, motorized transport units 102 can move to and engage or connect to an item display module 130 and/or an item storage unit or locker 132. For example, an item display module 130 may take the form of a mobile display rack or shelving unit configured to house and display certain items for sale. It may be desired to position the display module 130 at various locations within the shopping facility 101 at various times. Thus, one or more motorized transport units 102 may move (as controlled by the central computer system 106) underneath the item display module 130, extend upward to lift the module 130 and then move it to the desired location. A storage locker 132 may be a storage device where items for purchase are collected and placed therein for a customer and/or worker to later retrieve. In some embodiments, one or more motorized transport units 102 may be used to move the storage locker to a desired location in the shopping facility 101. Similar to how a motorized transport unit engages a movable item container 104 or item display module 130, one or more motorized transport units 102 may move (as controlled by the central computer system 106) underneath the storage locker 132, extend upward to lift the locker 132 and then move it to the desired location.

Figure 2A:
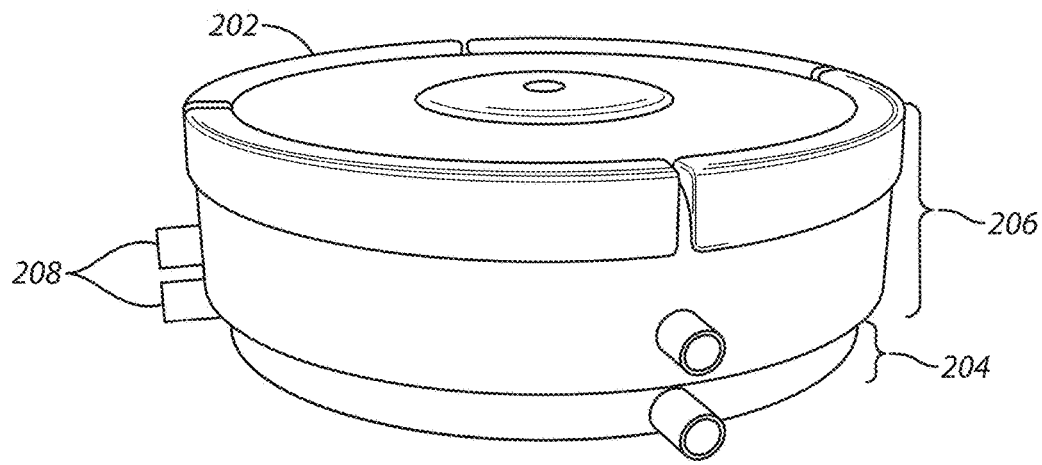
FIGS. 2A and 2B are illustrations of a motorized transport unit of the system of FIG. 1 in a retracted orientation and an extended orientation in accordance with some embodiments.
Figure 2B:
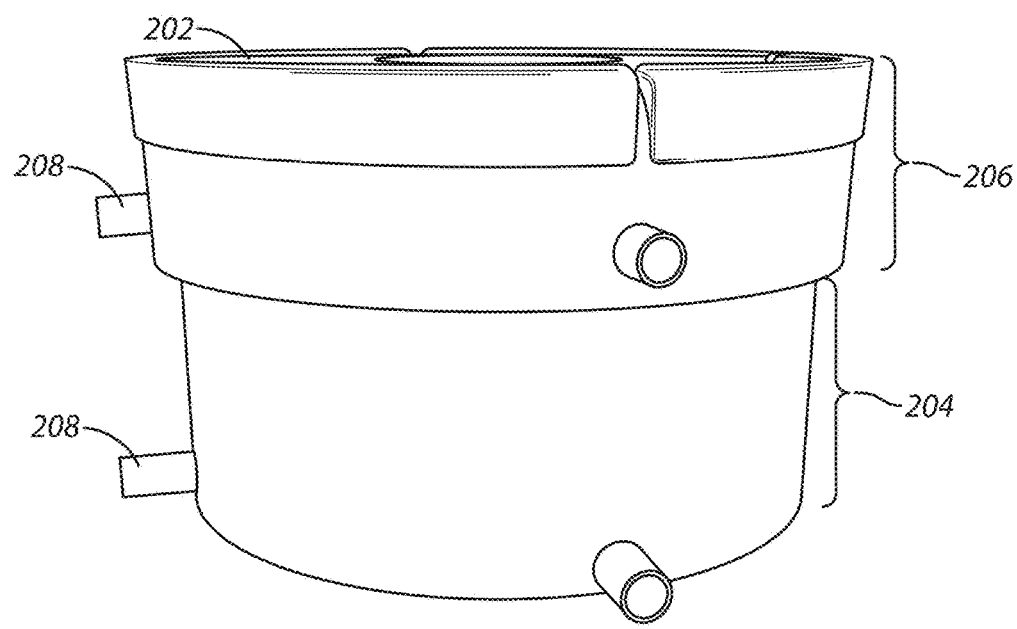

FIGS. 2A and 2B illustrate some embodiments of a motorized transport unit 202, similar to the motorized transport unit 102 shown in the system of FIG. 1. In this embodiment, the motorized transport unit 202 takes the form of a disc-shaped robotic device having motorized wheels (not shown), a lower body portion 204 and an upper body portion 206 that fits over at least part of the lower body portion 204. It is noted that in other embodiments, the motorized transport unit may have other shapes and/or configurations, and is not limited to disc-shaped. For example, the motorized transport unit may be cubic, octagonal, triangular, or other shapes, and may be dependent on a movable item container with which the motorized transport unit is intended to cooperate. Also included are guide members 208. In FIG. 2A, the motorized transport unit 202 is shown in a retracted position in which the upper body portion 206 fits over the lower body portion 204 such that the motorized transport unit 202 is in its lowest profile orientation which is generally the preferred orientation for movement when it is unattached to a movable item container 104 for example. In FIG. 2B, the motorized transport unit 202 is shown in an extended position in which the upper body portion 206 is moved upward relative to the lower body portion 204 such that the motorized transport unit 202 is in its highest profile orientation for movement when it is lifting and attaching to a movable item container 104 for example. The mechanism within the motorized transport unit 202 is designed to provide sufficient lifting force to lift the weight of the upper body portion 206 and other objects to be lifted by the motorized transport unit 202, such as movable item containers 104 and items placed within the movable item container, item display modules 130 and items supported by the item display module, and storage lockers 132 and items placed within the storage locker. The guide members 208 are embodied as pegs or shafts that extend horizontally from the both the upper body portion 206 and the lower body portion 204. In some embodiments, these guide members 208 assist docking the motorized transport unit 202 to a docking station 122 or a dispenser 120. In some embodiments, the lower body portion 204 and the upper body portion are capable to moving independently of each other. For example, the upper body portion 206 may be raised and/or rotated relative to the lower body portion 204.

That is, one or both of the upper body portion 206 and the lower body portion 204 may move toward/away from the other or rotated relative to the other. In some embodiments, in order to raise the upper body portion 206 relative to the lower body portion 204, the motorized transport unit 202 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 3B:
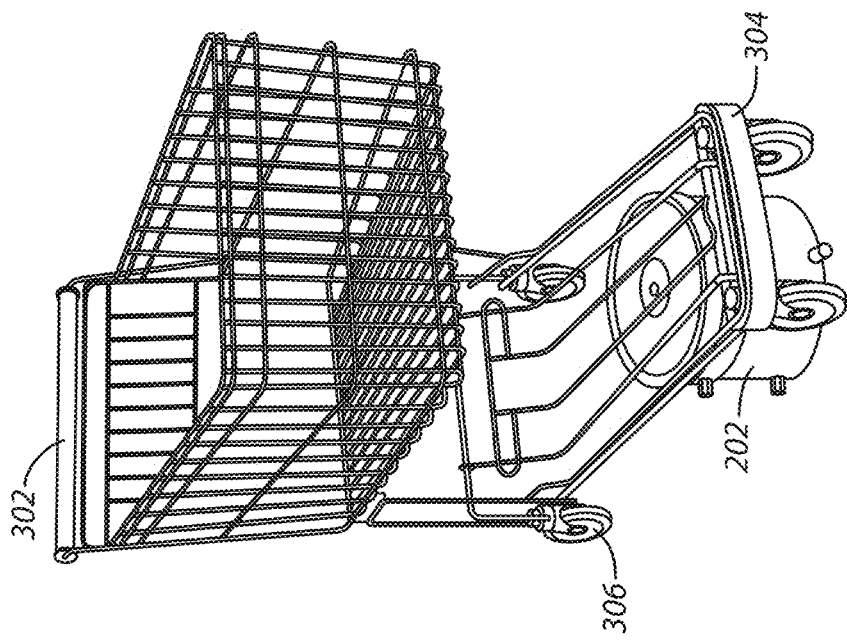
FIGS. 3A and 3B are illustrations of the motorized transport unit of FIGS. 2A and 2B detachably coupling to a movable item container, such as a shopping cart, in accordance with some embodiments.
Figure 3A:
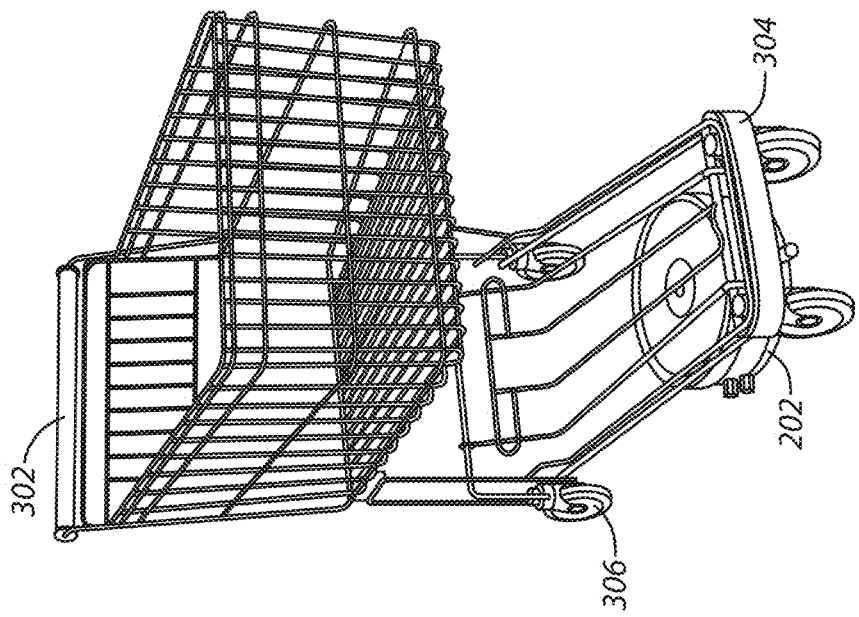

FIGS. 3A and 3B illustrate some embodiments of the motorized transport unit 202 detachably engaging a movable item container embodied as a shopping cart 302. In FIG. 3A, the motorized transport unit 202 is in the orientation of FIG. 2A such that it is retracted and able to move in position underneath a portion of the shopping cart 302. Once the motorized transport unit 202 is in position (e.g., using sensors), as illustrated in FIG. 3B, the motorized transport unit 202 is moved to the extended position of FIG. 2B such that the front portion 304 of the shopping cart is lifted off of the ground by the motorized transport unit 202, with the wheels 306 at the rear of the shopping cart 302 remaining on the ground. In this orientation, the motorized transport unit 202 is able to move the shopping cart 302 throughout the shopping facility. It is noted that in these embodiments, the motorized transport unit 202 does not bear the weight of the entire cart 302 since the rear wheels 306 rest on the floor. It is understood that in some embodiments, the motorized transport unit 202 may be configured to detachably engage other types of movable item containers, such as rocket carts, flatbed carts or other mobile baskets or platforms.

Figure 4:
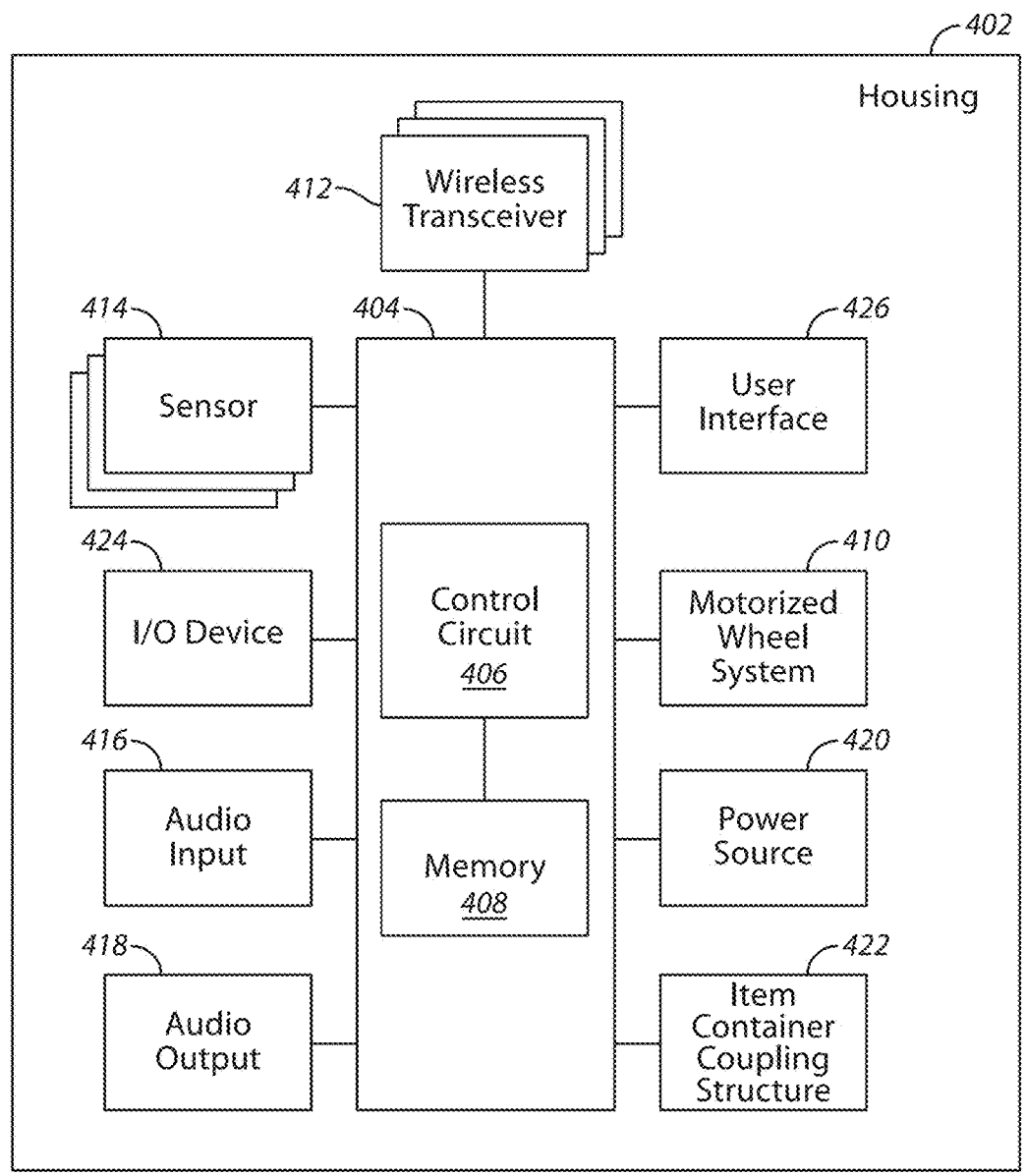
FIG. 4 comprises a block diagram of a motorized transport unit as configured in accordance with various embodiments of these teachings.

FIG. 4 presents a more detailed example of some embodiments of the motorized transport unit 102 of FIG. 1. In this example, the motorized transport unit 102 has a housing 402 that contains (partially or fully) or at least supports and carries a number of components. These components include a control unit 404 comprising a control circuit 406 that, like the control circuit 108 of the central computer system 106, controls the general operations of the motorized transport unit 102. Accordingly, the control unit 404 also includes a memory 408 coupled to the control circuit 406 and that stores, for example, operating instructions and/or useful data.

The control circuit 406 operably couples to a motorized wheel system 410. This motorized wheel system 410 functions as a locomotion system to permit the motorized transport unit 102 to move within the aforementioned retail or shopping facility 101 (thus, the motorized wheel system 410 may more generically be referred to as a locomotion system). Generally speaking, this motorized wheel system 410 will include at least one drive wheel (i.e., a wheel that rotates (around a horizontal axis) under power to thereby cause the motorized transport unit 102 to move through interaction with, for example, the floor of the shopping facility 101). The motorized wheel system 410 can include any number of rotating wheels and/or other floor-contacting mechanisms as may be desired and/or appropriate to the application setting.

The motorized wheel system 410 also includes a steering mechanism of choice. One simple example in these regards comprises one or more of the aforementioned wheels that can swivel about a vertical axis to thereby cause the moving motorized transport unit 102 to turn as well.

Numerous examples of motorized wheel systems are known in the art. Accordingly, further elaboration in these regards is not provided here for the sake of brevity save to note that the aforementioned control circuit 406 is configured to control the various operating states of the motorized wheel system 410 to thereby control when and how the motorized wheel system 410 operates.

In this illustrative example, the control circuit 406 also operably couples to at least one wireless transceiver 412 that operates according to any known wireless protocol. This wireless transceiver 412 can comprise, for example, a Wi-Fi-compatible and/or Bluetooth-compatible transceiver that can communicate with the aforementioned central computer system 106 via the aforementioned wireless network 124 of the shopping facility 101. So configured the control circuit 406 of the motorized transport unit 102 can provide information to the central computer system 106 and can receive information and/or instructions from the central computer system 106. As one simple example in these regards, the control circuit 406 can receive instructions from the central computer system 106 regarding movement of the motorized transport unit 102.

These teachings will accommodate using any of a wide variety of wireless technologies as desired and/or as may be appropriate in a given application setting. These teachings will also accommodate employing two or more different wireless transceivers 412 if desired.

The control circuit 406 also couples to one or more on-board sensors 414. These teachings will accommodate a wide variety of sensor technologies and form factors. By one approach at least one such sensor 414 can comprise a light sensor or light receiver. When the aforementioned location detection system 116 comprises a plurality of light emitters disposed at particular locations within the shopping facility 101, such a light sensor can provide information that the control circuit 406 and/or the central computer system 106 employs to determine a present location and/or orientation of the motorized transport unit 102.

As another example, such a sensor 414 can comprise a distance measurement unit configured to detect a distance between the motorized transport unit 102 and one or more objects or surfaces around the motorized transport unit 102 (such as an object that lies in a projected path of movement for the motorized transport unit 102 through the shopping facility 101). These teachings will accommodate any of a variety of distance measurement units including optical units and sound/ultrasound units. In one example, a sensor 414 comprises a laser distance sensor device capable of determining a distance to objects in proximity to the sensor. In some embodiments, a sensor 414 comprises an optical based scanning device to sense and read optical patterns in proximity to the sensor, such as bar codes variously located on structures in the shopping facility 101. In some embodiments, a sensor 414 comprises a radio frequency identification (RFID) tag reader capable of reading RFID tags in proximity to the sensor. Such sensors may be useful to determine proximity to nearby objects, avoid collisions, orient the motorized transport unit at a proper alignment orientation to engage a movable item container, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 102 in a given application setting.

By one optional approach an audio input 416 (such as a microphone) and/or an audio output 418 (such as a speaker) can also operably couple to the control circuit 406. So configured the control circuit 406 can provide a variety of audible sounds to thereby communicate with a user of the motorized transport unit 102, other persons in the vicinity of the motorized transport unit 102, or even other motorized transport units 102 in the area. These audible sounds can include any of a variety of tones and other non-verbal sounds. These audible sounds can also include, in lieu of the foregoing or in combination therewith, pre-recorded or synthesized speech.

The audio input 416, in turn, provides a mechanism whereby, for example, a user provides verbal input to the control circuit 406. That verbal input can comprise, for example, instructions, inquiries, or information. So configured, a user can provide, for example, a question to the motorized transport unit 102 (such as, "Where are the towels?"). The control circuit 406 can cause that verbalized question to be transmitted to the central computer system 106 via the motorized transport unit's wireless transceiver 412. The central computer system 106 can process that verbal input to recognize the speech content and to then determine an appropriate response. That response might comprise, for example, transmitting back to the motorized transport unit 102 specific instructions regarding how to move the motorized transport unit 102 (via the aforementioned motorized wheel system 410) to the location in the shopping facility 101 where the towels are displayed.

In this example the motorized transport unit 102 includes a rechargeable power source 420 such as one or more batteries. The power provided by the rechargeable power source 420 can be made available to whichever components of the motorized transport unit 102 require electrical energy. By one approach the motorized transport unit 102 includes a plug or other electrically conductive interface that the control circuit 406 can utilize to automatically connect to an external source of electrical energy to thereby recharge the rechargeable power source 420.

By one approach the motorized transport unit 102 comprises an integral part of a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 402 to the item container using bolts or other threaded fasteners as versus, for example, a clip.

These teachings will also accommodate selectively and temporarily attaching the motorized transport unit 102 to an item container 104. In such a case the motorized transport unit 102 can include a movable item container coupling structure 422. By one approach this movable item container coupling structure 422 operably couples to a control circuit 202 to thereby permit the latter to control, for example, the latched and unlatched states of the movable item container coupling structure 422. So configured, by one approach the control circuit 406 can automatically and selectively move the motorized transport unit 102 (via the motorized wheel system 410) towards a particular item container until the movable item container coupling structure 422 can engage the item container to thereby temporarily physically couple the motorized transport unit 102 to the item container. So latched, the motorized transport unit 102 can then cause the item container to move with the motorized transport unit 102. In embodiments such as illustrated in FIGS. 2A-3B, the movable item container coupling structure 422 includes a lifting system (e.g., including an electric drive or motor) to cause a portion of the body or housing 402 to engage and lift a portion of the item container off of the ground such that the motorized transport unit 102 can carry a portion of the item container. In other embodiments, the movable transport unit latches to a portion of the movable item container without lifting a portion thereof off of the ground.

In either case, by combining the motorized transport unit 102 with an item container, and by controlling movement of the motorized transport unit 102 via the aforementioned central computer system 106, these teachings will facilitate a wide variety of useful ways to assist both customers and associates in a shopping facility setting. For example, the motorized transport unit 102 can be configured to follow a particular customer as they shop within the shopping facility 101. The customer can then place items they intend to purchase into the item container that is associated with the motorized transport unit 102.

In some embodiments, the motorized transport unit 102 includes an input/output (I/O) device 424 that is coupled to the control circuit 406. The I/O device 424 allows an external device to couple to the control unit 404. The function and purpose of connecting devices will depend on the application. In some examples, devices connecting to the I/O device 424 may add functionality to the control unit 404, allow the exporting of data from the control unit 404, allow the diagnosing of the motorized transport unit 102, and so on.

In some embodiments, the motorized transport unit 102 includes a user interface 426 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 426 may work together with or separate from any user interface implemented at a user interface unit 114 (such as a smart phone or tablet device).

The control unit 404 includes a memory 408 coupled to the control circuit 406 and that stores, for example, operating instructions and/or useful data. The control circuit 406 can comprise a fixed-purpose hard-wired platform or can comprise a partially or wholly programmable platform. These architectural options are well known and understood in the art and require no further description here. This control circuit 406 is configured (for example, by using corresponding programming stored in the memory 408 as will be well understood by those skilled in the art) to carry out one or more of the steps, actions, and/or functions described herein. The memory 408 may be integral to the control circuit 406 or can be physically discrete (in whole or in part) from the control circuit 406 as desired. This memory 408 can also be local with respect to the control circuit 406 (where, for example, both share a common circuit board, chassis, power supply, and/or housing) or can be partially or wholly remote with respect to the control circuit 406. This memory 408 can serve, for example, to non-transitorily store the computer instructions that, when executed by the control circuit 406, cause the control circuit 406 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

It is noted that not all components illustrated in FIG. 4 are included in all embodiments of the motorized transport unit 102. That is, some components may be optional depending on the implementation.

Figure 5:
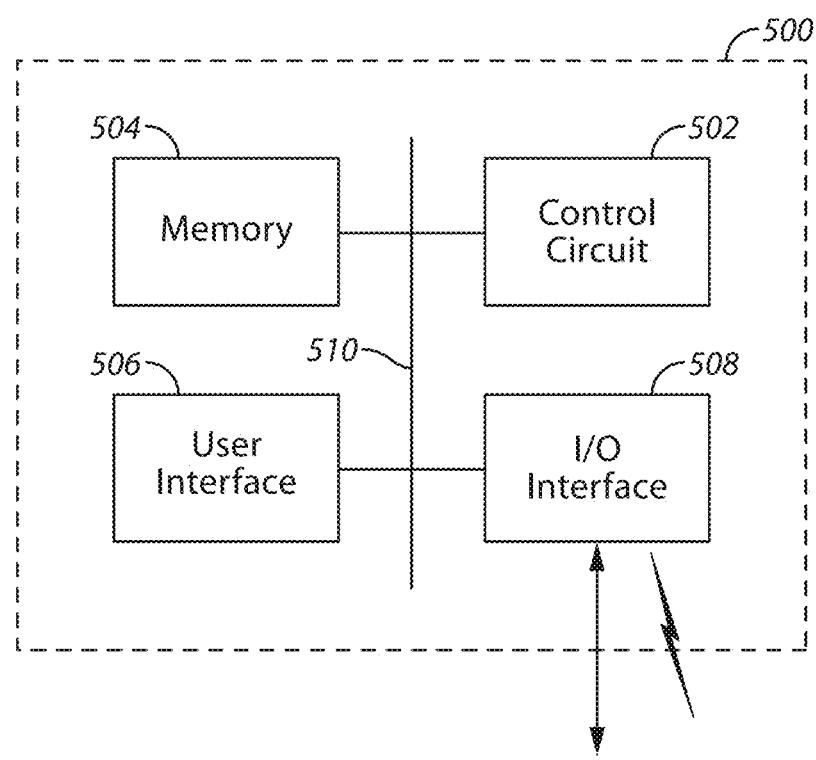
FIG. 5 comprises a block diagram of a computer device as configured in accordance with various embodiments of these teachings.

FIG. 5 illustrates a functional block diagram that may generally represent any number of various electronic components of the system 100 that are computer type devices. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of the central computer system 106, the motorized transport unit 102, the user interface unit 114, the location detection system 116, the user interface computer 128, the MTU docking station 122 and the MTU dispenser 120, or any other device or component in the system that is implemented as a computer device.

Additional Features Overview

Referring generally to FIGS. 1-5, the shopping assistance system 100 may implement one or more of several different features depending on the configuration of the system and its components. The following provides a brief description of several additional features that could be implemented by the system. One or more of these features could also be implemented in other systems separate from embodiments of the system. This is not meant to be an exhaustive description of all features and not meant to be an exhaustive description of the details any one of the features. Further details with regards to one or more features beyond this overview may be provided herein.

Tagalong Steering: This feature allows a given motorized transport unit 102 to lead or follow a user (e.g., a customer and/or a worker) throughout the shopping facility 101. For example, the central computer system 106 uses the location detection system 116 to determine the location of the motorized transport unit 102. For example, LED smart lights (e.g., the ByteLight system) of the location detection system 116 transmit a location number to smart devices which are with the customer (e.g., user interface units 114), and/or on the item container 104/motorized transport unit 102. The central computer system 106 receives the LED location numbers received by the smart devices through the wireless network 124. Using this information, in some embodiments, the central computer system 106 uses a grid placed upon a 2D CAD map and 3D point cloud model (e.g., from the databases 126) to direct, track, and plot paths for the other devices. Using the grid, the motorized transport unit 102 can drive a movable item container 104 in a straight path rather than zigzagging around the facility. As the user moves from one grid to another, the motorized transport unit 102 drives the container 104 from one grid to the other. In some embodiments, as the user moves towards the motorized transport unit, it stays still until the customer moves beyond an adjoining grid.

Detecting Objects: In some embodiments, motorized transport units 102 detect objects through several sensors mounted on motorized transport unit 102, through independent cameras (e.g., video cameras 118), through sensors of a corresponding movable item container 104, and through communications with the central computer system 106. In some embodiments, with semi-autonomous capabilities, the motorized transport unit 102 will attempt to avoid obstacles, and if unable to avoid, it will notify the central computer system 106 of an exception condition. In some embodiments, using sensors 414 (such as distance measurement units, e.g., laser or other optical-based distance measurement sensors), the motorized transport unit 102 detects obstacles in its path, and will move to avoid, or stop until the obstacle is clear.

Visual Remote Steering: This feature enables movement and/or operation of a motorized transport unit 102 to be controlled by a user on-site, off-site, or anywhere in the world. This is due to the architecture of some embodiments where the central computer system 106 outputs the control signals to the motorized transport unit 102. These controls signals could have originated at any device in communication with the central computer system 106. For example, the movement signals sent to the motorized transport unit 102 may be movement instructions determined by the central computer system 106; commands received at a user interface unit 114 from a user; and commands received at the central computer system 106 from a remote user not located at the shopping facility space.

Determining Location: Similar to that described above, this feature enables the central computer system 106 to determine the location of devices in the shopping facility 101. For example, the central computer system 106 maps received LED light transmissions, Bluetooth low energy radio signals or audio signals (or other received signals encoded with location data) to a 2D map of the shopping facility. Objects within the area of the shopping facility are also mapped and associated with those transmissions. Using this information, the central computer system 106 can determine the location of devices such as motorized transport units.

Digital Physical Map Integration: In some embodiments, the system 100 is capable of integrating 2D and 3D maps of the shopping facility with physical locations of objects and workers. Once the central computer system 106 maps all objects to specific locations using algorithms, measurements and LED geo-location, for example, grids are applied which sections off the maps into access ways and blocked sections. Motorized transport units 102 use these grids for navigation and recognition. In some cases, grids are applied to 2D horizontal maps along with 3D models. In some cases, grids start at a higher unit level and then can be broken down into smaller units of measure by the central computer system 106 when needed to provide more accuracy.

Calling a Motorized Transport Unit: This feature provides multiple methods to request and schedule a motorized transport unit 102 for assistance in the shopping facility. In some embodiments, users can request use of a motorized transport unit 102 through the user interface unit 114. The central computer system 106 can check to see if there is an available motorized transport unit. Once assigned to a given user, other users will not be able to control the already assigned transport unit. Workers, such as store associates, may also reserve multiple motorized transport units in order to accomplish a coordinated large job.

Locker Delivery: In some embodiments, one or more motorized transport units 102 may be used to pick, pack, and deliver items to a particular storage locker 132. The motorized transport units 102 can couple to and move the storage locker to a desired location. In some embodiments, once delivered, the requestor will be notified that the items are ready to be picked up, and will be provided the locker location and locker security code key.

Route Optimization: In some embodiments, the central computer system automatically generates a travel route for one or more motorized transport units through the shopping facility space. In some embodiments, this route is based on one or more of a user provided list of items entered by the user via a user interface unit 114; user selected route preferences entered by the user via the user interface unit 114; user profile data received from a user information database (e.g., from one of databases 126); and product availability information from a retail inventory database (e.g., from one of databases 126). In some cases, the route intends to minimize the time it takes to get through the facility, and in some cases, may route the shopper to the least busy checkout area. Frequently, there will be multiple possible optimum routes. The route chosen may take the user by things the user is more likely to purchase (in case they forgot something), and away from things they are not likely to buy (to avoid embarrassment). That is, routing a customer through sporting goods, women's lingerie, baby food, or feminine products, who has never purchased such products based on past customer behavior would be non-productive, and potentially embarrassing to the customer. In some cases, a route may be determined from multiple possible routes based on past shopping behavior, e.g., if the customer typically buys a cold Diet Coke product, children's shoes or power tools, this information would be used to add weight to the best alternative routes, and determine the route accordingly.

Store Facing Features: In some embodiments, these features enable functions to support workers in performing store functions. For example, the system can assist workers to know what products and items are on the shelves and which ones need attention. For example, using 3D scanning and point cloud measurements, the central computer system can determine where products are supposed to be, enabling workers to be alerted to facing or zoning of issues along with potential inventory issues.

Phone Home: This feature allows users in a shopping facility 101 to be able to contact remote users who are not at the shopping facility 101 and include them in the shopping experience. For example, the user interface unit 114 may allow the user to place a voice call, a video call, or send a text message. With video call capabilities, a remote person can virtually accompany an in-store shopper, visually sharing the shopping experience while seeing and talking with the shopper. One or more remote shoppers may join the experience.

Returns: In some embodiments, the central computer system 106 can task a motorized transport unit 102 to keep the returns area clear of returned merchandise. For example, the transport unit may be instructed to move a cart from the returns area to a different department or area. Such commands may be initiated from video analytics (the central computer system analyzing camera footage showing a cart full), from an associate command (digital or verbal), or on a schedule, as other priority tasks allow. The motorized transport unit 102 can first bring an empty cart to the returns area, prior to removing a full one.

Bring a Container: One or more motorized transport units can retrieve a movable item container 104 (such as a shopping cart) to use. For example, upon a customer or worker request, the motorized transport unit 102 can reposition one or more item containers 104 from one location to another. In some cases, the system instructs the motorized transport unit where to obtain an empty item container for use. For example, the system can recognize an empty and idle item container that has been abandoned or instruct that one be retrieved from a cart storage area. In some cases, the call to retrieve an item container may be initiated through a call button placed throughout the facility, or through the interface of a user interface unit 114.

Respond to Voice Commands: In some cases, control of a given motorized transport unit is implemented through the acceptance of voice commands. For example, the user may speak voice commands to the motorized transport unit 102 itself and/or to the user interface unit 114. In some embodiments, a voice print is used to authorize to use of a motorized transport unit 102 to allow voice commands from single user at a time.

Retrieve Abandoned Item Containers: This feature allows the central computer system to track movement of movable item containers in and around the area of the shopping facility 101, including both the sale floor areas and the back-room areas. For example, using visual recognition through store cameras 118 or through user interface units 114, the central computer system 106 can identify abandoned and out-of-place movable item containers. In some cases, each movable item container has a transmitter or smart device which will send a unique identifier to facilitate tracking or other tasks and its position using LED geo-location identification. Using LED geo-location identification with the Determining Location feature through smart devices on each cart, the central computer system 106 can determine the length of time a movable item container 104 is stationary.

Stocker Assistance: This feature allows the central computer system to track movement of merchandise flow into and around the back-room areas. For example, using visual recognition and captured images, the central computer system 106 can determine if carts are loaded or not for moving merchandise between the back room areas and the sale floor areas. Tasks or alerts may be sent to workers to assign tasks.

Self-Docking: Motorized transport units 102 will run low or out of power when used. Before this happens, the motorized transport units 102 need to recharge to stay in service. According to this feature, motorized transport units 102 will self-dock and recharge (e.g., at an MTU docking station 122) to stay at maximum efficiency, when not in use. When use is completed, the motorized transport unit 102 will return to a docking station 122. In some cases, if the power is running low during use, a replacement motorized transport unit can be assigned to move into position and replace the motorized transport unit with low power. The transition from one unit to the next can be seamless to the user.

Item Container Retrieval: With this feature, the central computer system 106 can cause multiple motorized transport units 102 to retrieve abandoned item containers from exterior areas such as parking lots. For example, multiple motorized transport units are loaded into a movable dispenser, e.g., the motorized transport units are vertically stacked in the dispenser. The dispenser is moved to the exterior area and the transport units are dispensed. Based on video analytics, it is determined which item containers 104 are abandoned and for how long. A transport unit will attach to an abandoned cart and return it to a storage bay.

Motorized Transport Unit Dispenser: This feature provides the movable dispenser that contains and moves a group of motorized transport units to a given area (e.g., an exterior area such as a parking lot) to be dispensed for use. For example, motorized transport units can be moved to the parking lot to retrieve abandoned item containers 104. In some cases, the interior of the dispenser includes helically wound guide rails that mate with the guide member 208 to allow the motorized transport units to be guided to a position to be dispensed.

Specialized Module Retrieval: This feature allows the system 100 to track movement of merchandise flow into and around the sales floor areas and the back-room areas including special modules that may be needed to move to the sales floor. For example, using video analytics, the system can determine if a modular unit it loaded or empty. Such modular units may house items that are of seasonal or temporary use on the sales floor. For example, when it is raining, it is useful to move a module unit displaying umbrellas from a back room area (or a lesser accessed area of the sales floor) to a desired area of the sales floor area.

Authentication: This feature uses a voice imprint with an attention code/word to authenticate a user to a given motorized transport unit. One motorized transport unit can be swapped for another using this authentication. For example, a token is used during the session with the user. The token is a unique identifier for the session which is dropped once the session is ended. A logical token may be a session id used by the application of the user interface unit 114 to establish the session id when user logs on and when deciding to do use the system 100. In some embodiments, communications throughout the session are encrypted using SSL or other methods at transport level.

Further Details of Some Embodiments

In accordance with some embodiments, further details are now provided for one or more of these and other features. A system and method for providing passenger transport is provided herein.

In some embodiments, a motorized transport unit (MTU) system may be a progressively intelligent system with the capabilities of integrating smart devices, internet, cell services, indoor and outdoor location, and many other features that enhances the safety and enjoyment of customers and associates in a shopping space. An MTU may be configured for intelligent steering by using a concert of sensors, voice recognition, geo-location, predetermined routes, boundaries, store map, intelligent tag, GPS, compass, smart device, and "bird's eye view" video analytics to select the optimal path to travel to perform various tasks. Intelligent steering may also be utilized to enable MTUs to drive passenger carriers to transport customer(s) or associate(s) around the shopping floor or the parking lot of a shopping facility.

There are situations where customers or associates are unable to walk (or would prefer not to walk) from the parking lot or may have difficulty standing or walking throughout the store. The technologies used to maneuver MTUs around a shopping facility can also be used to maneuver a mobility assistance vehicle or golf cart-like passenger carrier around the shopping space. An MTU driven passenger carrier system allows for better utilization of the parking lot and can enable customers with limited mobility to shop in a store. Having MTU driven passenger carriers also allow stores to be built in locations that cannot provide adequate parking spaces nearby. An MTU driven passenger carrier system also allows for handicap spaces to be placed further from the doors of the stores. An MTU can also be fitted with a carrier for multiple (e.g. up to more than 4) passengers. An MTU may stop and pick up multiple customers within the parking lot and bring them to the door of a store. Multiple MTUs may be assigned to a passenger carrier to ensure that the weight-bearing requirement of holding multiple people is met. In some embodiments, the MTU may attach to a passenger carrier with similar means used to attach to a shopping cart described herein. The intelligence of the MTU system can be attached or given to any vehicle/cart by having the MTU drive the vehicle. The customer will be able to walk or ride through the aisles with two open hands while MTU drives and steers the passenger carrier.

In some embodiments, a passenger carrier may be a modified handicap grocery cart, golf cart, or other similar device without manual controls and steering. Steering capabilities may be provided by MTUs that are automated using the same methods that control an MTU's maneuvering in a shopping space for other tasks described herein. The intelligence of the MTU system to maneuver is added to each such device through the central computer system and network. Added capabilities may include remotely starting the vehicle, responsive breaking and accelerating, turn signals, beacon lights, and a backup alarms.

As with other uses of the MTU, a route or path may be established for passenger transporting MTUs. In the parking lot, the MTU system may record customers' parking spots to optimize the routes for transporting passengers to and from their vehicles. For stores with very large lots, continuous shuttle routes may be served by MTUs. Additionally, for customers with disabilities, a cart can be summoned using a portable user device and a passenger carrier may be instructed to meet the customer once he/she is parked. The MTU may determine the customer location through the customer's user device and/or through video image analysis.

Figure 6:
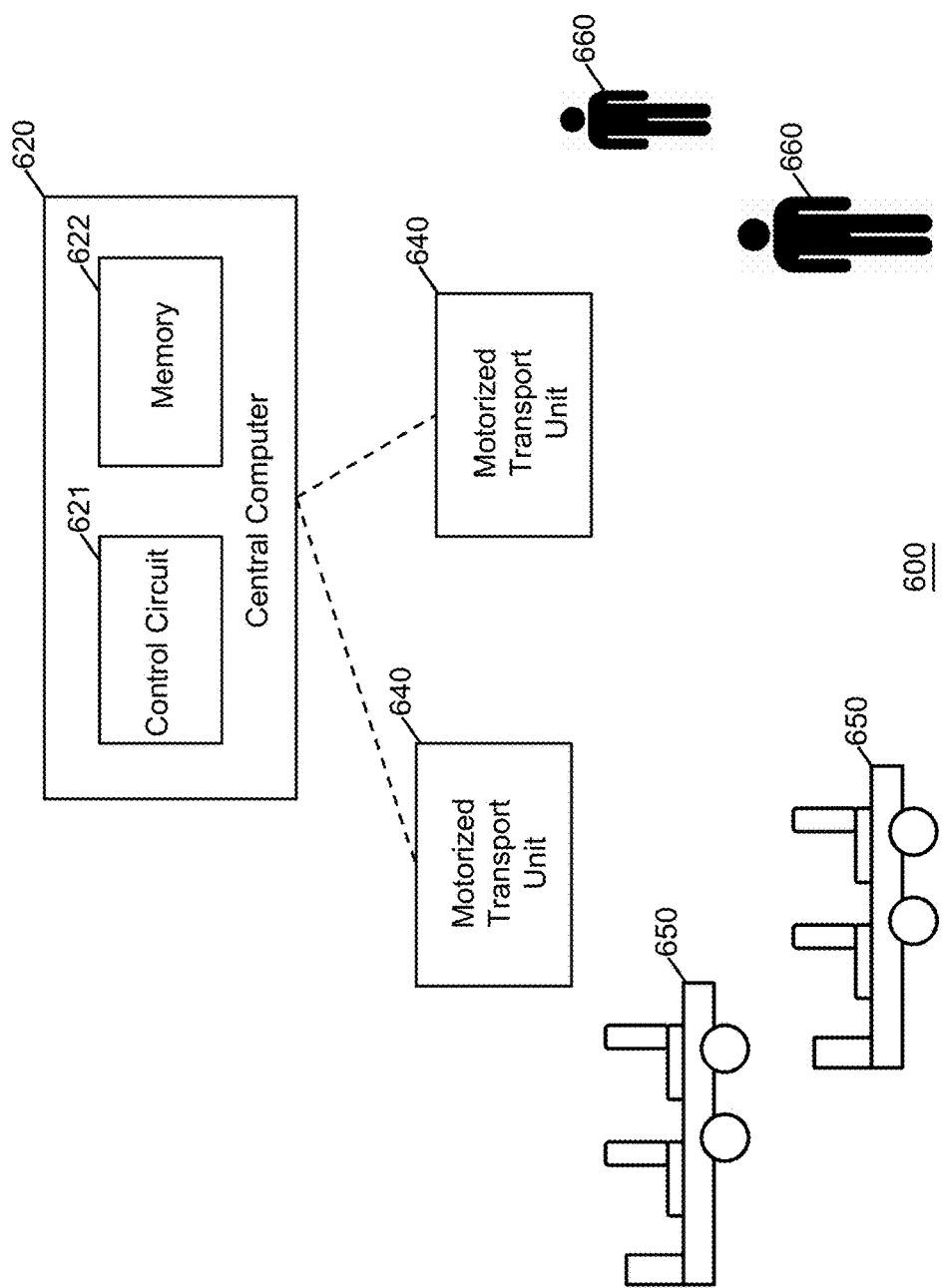
FIG. 6 comprises a block diagram of a system for providing passenger transport in accordance with some embodiments.

FIG. 6 illustrates a block diagram of a passenger transport system 600 as configured in accordance with various embodiments of these teachings. The passenger transport system 600 includes a central computer system 620, and a number of motorized transport units 640 (MTUs 640) each configured to attach to and transport passenger carriers 650 for carrying customers 660 as passengers. The passenger transport system 600 may include or be implemented at least partially with one or more components shown in FIGS. 1, 4, and 5 or may be more generically implemented outside of the embodiments of FIGS. 1, 4 and 5.

The central computer system 620 includes a control circuit 621 and a memory 622 and may be generally referred to as a processor-based device, a computing device, a server, and the like. In some embodiments, the central computer system 620 may be implemented with one or more of the central computer system 106 and/or the computer device 500 described above. For example, the functionalities of the central computer system 620 described herein may be implemented as one or more software and/or hardware modules in the central computer system 106.

The central computer system 620 has stored on its memory 622, a set of computer readable instructions that is executable by the control circuit 621 to cause the control circuit 621 to instruct an MTU 640 to attach itself to a passenger carrier 650 to provide transportation to one or more customers 660. The central computer system 620 may further be configured to instruct the MTU 640 as it travels through a shopping space with a passenger carrier 650 and one or more customers 660. In some embodiments, the central computer system 620 may be located inside of and serve a specific shopping space. In some embodiments, the central computer system 620 may be at least partially implemented on a remote or cloud-based server that provides instructions to MTUs in one or more shopping spaces.

The central computer system 620 may further be communicatively coupled to a set of sensors (not shown). The sensors may include one or more of optical sensors, image sensors, proximity sensors, the location detection system 116, the video camera system 118, and sensors on MTUs 102 described with reference to FIG. 1 above. Generally, the sensors are configured to provide the central computer system information for locating one or more of the MTUs 640, the passenger carriers 650, and customers 660. In some embodiments, the sensors 116 may include one or more sensors attached to one or more of the MTU 640, the passenger carrier 650, and a portable user device carried by a customer 660. In some embodiments, one or more of the MTUs 605, the passenger carrier 650, and the user interface device may include a sensor that detects geolocation beacon transmissions for determining location. The detected geolocation beacon transmission may be relayed back to the central computer system 620 to indicate a location of the MTU 640, the passenger carrier 650, and/or a user device carried by a customer. In some embodiments, the sensors include a set of cameras for providing images of the shopping space to the central computer system 620. The central computer system 620 may analyze the images captured by the cameras and determine the location of one or more of the passenger carrier 650, the customer 660, and/or a passenger vehicle. The cameras may be stationary cameras mounted in the shopping space and/or mounted on or integrated with the MTUs and/or user interface devices.

In some embodiments, each motorized transport unit 640 may be the MTU 102 described in FIG. 1, the MTU shown in FIGS. 2A-3B, and/or the MTU 102 described in FIG. 4. Generally, an MTU 640 may be a motorized device configured to transport a passenger carrier through a shopping space according to instructions received from a central computer system 620. The MTUs may couple to a passenger carrier 650 through similar coupling means as shown in FIGS. 3A-B above. For example, the MTU 640 may extend upward and partially lift the passenger carrier 650 to carry the passenger carrier 650. In some embodiments, a different type of MTU may be used for transporting passenger carriers. In some embodiments, the MTU 640 may include attachment means such as a magnet, a hook, a latch, and the like for attaching to the passenger carrier 650. The attachment means may selectively engage and disengage the passenger carrier from the MTU 640. In some embodiments, the MTU 640 may include other input and output devices such as a speaker, an audio input device, a visual status indicators, and the like for communicating with passengers.

The passenger carrier 650 may generally be any movable passenger carrier configured to be coupled to an MTU 640. While two seat carts are illustrated in FIG. 6, in some embodiments, the system may include different types of passenger carriers such as carts with different passenger capacities, carts with child seats, carts with mobility assistance features, carts with different types of item containers, etc. The central computer system 620 may be configured to select a passenger carrier 650 based on the number of customers it needs to carry and/or the customer's requested type of passenger carrier. Generally, the passenger carriers 650 may include wheels and one or more passengers seats. In some embodiments, a passenger carrier 650 comprises wheels that are not powered and no steering controls for the passengers. In some embodiments, a passenger carrier 650 includes only limited safety controls such as an emergency break and a button to call for help. In some embodiments, a passenger carrier 650 includes one or more input/output means communicatively coupled to the MTU 540. For example, the passenger carrier 650 may include a user interface that displays information provided by the MTU 540 to the passenger and may relay touch and/or voice inputs form the passenger to the MTU 540. In some embodiments, the MTU includes turn or break signals lights and/or backup alarms that can be controlled by the MTU 540. In some embodiments, the passenger carriers 650 do not directly communicate with the central computer system 620 or a portable user device. In some embodiments, the steering and the input/output devices of the passenger carriers 650 are powered and/or controlled solely by inputs from the MTU 520 attached to it. In some embodiments, the passenger carrier may be a powered vehicle, and the steering and controls may be disabled when an MTU is attached to the vehicle.

In some embodiments, the central computer system 620 may further be in communication with user interface devices (not shown). The user interface devices may include user interface unit 114 and may include one or more of a portable user device (e.g. smartphone, tablet computer, wearable device, head mounted device, etc.), a user interface attached to the MTU 640, an in-store stationary user interface unit, and the like. The customers 660 may make a ride request to the central computer system 620 via a user interface device. For example, the customer 660 may use an mobile application ("app") running on his/her portable device to request a ride from his/her vehicle and the central computer may instruct an MTU 640 to meet the customer 660 with a passenger carrier 650 in the parking lot. The customer may further select points in the store to visit using the portable user device and/or the MTU's user interface. For example, a passenger may enter a shopping list and/or select sections, areas, and/or items from the user device. The system may then configure a route for the user based on the entered information. In some embodiments, user interface devices may be implemented as stationary devices. For example, a customer may approach a ride station and request a ride using a user interface device in the ride station.

Figures 7, 8:
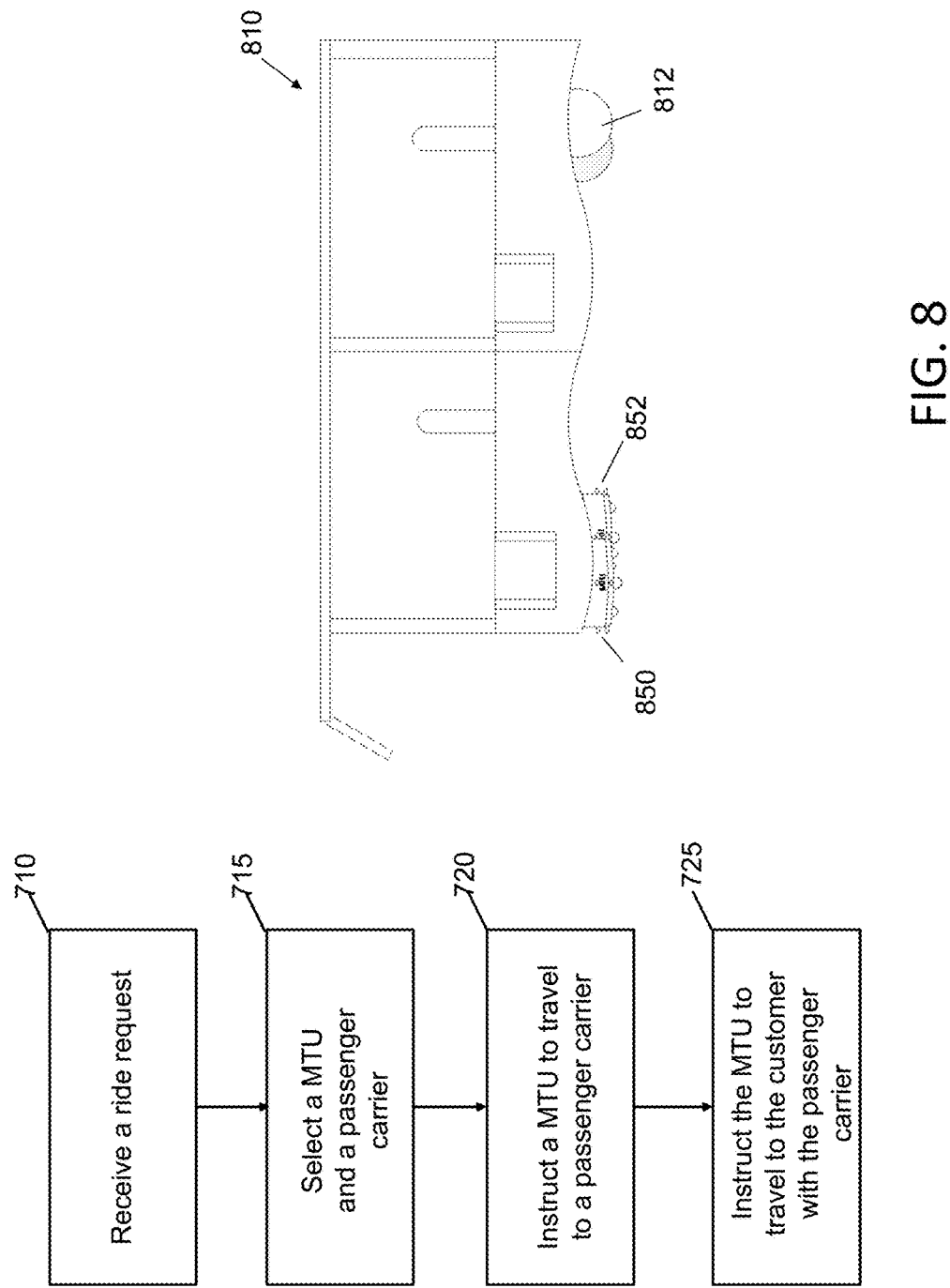
FIG. 7 comprises a flow diagram of a method for providing passenger transport in accordance with some embodiments.
FIG. 8 comprises an illustration of a passenger carrier in accordance with some embodiments.

FIG. 7 shows a flow diagram of a method for providing passenger transport in a shopping space in accordance with various embodiments of these teachings. The steps shown in FIG. 7 may be performed by one or more of the central computer system 620 in FIG. 6, the central computer system 106 in FIG. 1, and the computer device 500 in FIG. 5, for example. In some embodiments, the steps are performed by a processor-based device executing a set of computer readable instructions stored on a memory device.

In step 710, the control circuit receives a ride request. A ride request may be made via a user interface device such as user interface unit 114, which may be a customer's personal device or a store-owned mobile or stationary device configured to communicate with a central computer system. The user interface unit may include a software or hardware button for requesting a ride. In some embodiments, the request may further include a request for a specific type of passenger carrier and/or a number of passengers. For example, a customer may request for a passenger carrier with four seats, a passenger carrier with a child seat, a passenger carrier with mobility assistance features, etc. The user interface unit may display the different available passenger carrier options to the user. In some embodiments, a ride request may comprise a spoken command. For example, the customer may say to an MTU unit and/or a user interface device: "I need a ride." In some embodiments, when a ride is requested, the system also determines a location of the requesting customer and/or device. For example, the requesting user interface device may record a GPS coordinate or pick up a location beacon signal (e.g. smart LED) and provide that information to the system along with the ride request. In some embodiments, the customer may specify a time and/or pickup location for the requested ride. For example, prior to arriving at the store, the customer may reserve a passenger carrier and have that passenger carrier meet them in the parking lot when they arrive. In some embodiments, the system may continue to receive location information from the requesting device to determine when the customer will arrive at the store and where the customer should be picked up. The recorded location information may also be used at the end of the shopping trip to return the customer to their starting point, which may correspond to where they parked their vehicle. In some embodiments, in step 715, the system stores an initial location for the customer, which may correspond to one or more of: a location of the customer when the customer makes the ride request, a location of the customer when the customer boards the passenger carrier, and a location where a customer vehicle is parked.

In step 715, the control circuit selects an MTU from a plurality of MTUs and a passenger carrier from a plurality of passenger carriers in the system. In some embodiments, the passenger carrier and MTU combination that can be provided to the customer in the shortest amount of time may be selected. The time it takes for a passenger carrier to be brought to a customer may be estimated based on one or more of the customer's location, the location of the passenger carrier, the location of the MTU, length of the path of travel, congestion conditions of the path of travel, etc. In some embodiments, if the customer makes a ride request to an MTU already assigned to the customer, the system may use the assigned MTU to retrieve a passenger carrier and provide passenger transport. In some embodiments, if the ride request includes a selection of a specific type of passenger carrier, the system may select a passenger carrier according to the selection. In some embodiments, the ride request in step 710 may include an indication of the number of passengers in the party. The system may then select a passenger carrier with sufficient carrying capacity to accommodate the entire party. In some embodiments, idle passenger carriers may be stored in a passenger carrier parking area such as a cart bay. The system may instruct the MTU to attach itself to the first accessible passenger carrier in the carrier parking area. In some embodiments, if a shopping space includes two or more passenger carrier parking areas, the system may further select a carrier parking area based on one or more of the MTU's location, store traffic condition, the pickup location, etc. In some embodiments, the system may select a specific type of passenger carrier from the available carriers based on one or more of user request, user demographic information, stored user shopping habit, user location, etc.

In some embodiments, in step 715, the system may determine that the selected passenger carrier requires two or more MTUs to transport and select the required number of MTUs. For example, power from two MTUs may be needed to carry a multi-passenger carrier at its maximum capacity. In such case, the system may instruct two MTUs to travel to the same passenger carrier and attach to the passenger carrier at different locations (e.g. front right and front left). The system may then instruct the two MTUs to simultaneously provide locomotion to the passenger carrier.

In step 720, the system provides instructions to the MTU selected in step 715 to travel to the selected passenger carrier and attach to the passenger carrier. The instructions may include a current location of the passenger carrier and/or a passenger carrier parking area. In some embodiments, the instructions may include real-time route guidance. When the MTU arrives at the passenger carrier, the MTU attaches itself to the carrier. In some embodiments, the MTUs may attach to a passenger carrier with similar means and methods as those used for carrying a shopping cart. In some embodiments, the MTU may include attachment means such as a magnet, a hook, a latch, a wedge, etc. for coupling with the passenger carrier. Generally, the MTU and the passenger carrier may be coupled through any known coupling means. In some embodiments, the attachment motion may be guided by one or more sensors on the MTU. For example, the passenger carrier may include markers to help the MTU orient and align itself for proper attachment. In some embodiments, the carrier parking area may include guides for attaching and/or detaching MTUs and passenger carriers.

In step 725, the system instructs the MTU to bring the passenger carrier to the location of the requesting customer and/or requesting device. The location of the customer may be manually entered by the customer and/or be based on the location information of the requesting device. In some embodiments, the system may provide real-time route guidance to the MTU. In some embodiments, the system may keep track of the current location of the customer and update the instruction to the MTU accordingly such that the MTU is able to "catch up" with the customer if the customer continues to move after making the request in step 710. After the MTU arrives at the customer's location, the MTU may become assigned to the customer and only receives commands associated with the customer during the shopping trip. In some embodiments, the MTU may be instructed to carry the passenger based on one or more of a customer voice command, a customer selected destination, a customer shopping list, store area restrictions, a customer profile, and store promotions.

In some embodiments, the MTU may request passenger authentication prior to providing transport to the boarded passenger to ensure that the passenger is the customer that requested the ride. For example, the system may provide a passcode to the requesting user device. The customer may be required to enter or scan in the passcode before the MTU would accept commands from the customer. In some embodiments, the system may prompt the customer to scan a code and/or a RFID tag on the MTU and/or passenger carrier with their user device to confirm that they are boarding the correct passenger carrier.

In some embodiments, after step 725, the MTU may enter into a passenger transport mode in which the MTU would only accept a set of commands associated with the mode. For example, the MTU may accept commands to travel to a section, an item, a point of interest within the shopping space (e.g. "go to checkout counter," "take me to apples," etc.) but may not permit direct directional or steering control (e.g. "go forward," "turn right," "speed up," etc.) from the customer. In some embodiments, a customer may enter a list of items they wish to purchase and the system may automatically select a route for the customer based on their shopping list. Generally, the route may take the customer by every item on their shopping list. In some embodiments, the route may further take the customer to areas with items the customer may be interested in purchasing but are not on the shopping list. The system may select items the customer may be interested in purchasing based on one or more of the customer's past purchase history, the customer's demographic, the entered shopping list, store discounts, etc. If more than one passenger is transported by a carrier, the system may combine one or more of the passengers' shopping list, preference, purchase history, and demographics in determining a route for the group transported by the MTU. In some embodiments, the route may further take into account real-time congestion conditions in the shopping space. In some embodiments, the MTU may be instructed to travel according to a default route that takes the customer through frequented sections of the store. In some embodiments, an MTU may only provide transportation in the parking lot and only carry the passengers between the front door of the store and their vehicle. In some embodiments, the MTU may provide transportation between a public transportation station (e.g. a bus stop, a subway exit, etc.) and the store. In such embodiments, the MTU may automatically transport the passenger either to or from the store without further input from the passenger. In some embodiments, an MTU may be configured to respond to two or more ride requests. For example, the system may receive requests from multiple customers in the parking lot that wishes to be brought to the store. The system may instruct the MTU to pick up each passenger at their requested pickup location and bring them to the store in the same passenger carrier. In some embodiments, the same or a different MTU may continue to transport the customers inside the store.

In some embodiments, after step 725, the MTU may be instructed to bring the customer back to the location where the passenger was picked up. For example, if the customer was picked up near his/her vehicle, the system may record the location of the customer's vehicle and return the customer back to the vehicle at the end of his/her shopping trip. In some embodiments, after the passenger is dropped off, the MTU may be instructed to return the passenger carrier back to a carrier parking area. The MTU may be further instructed to detach from the passenger carrier in the carrier storage area. After the MTU is detached from the passenger carrier, the system may assign other types of tasks described herein to the MTU. For example, the MTU may be instructed to escort a walking customer, clean a spill, scan shelves, carry a shopping cart, etc.

FIG. 8 is an illustration of a passenger carrier driven by MTUs according to some embodiments. The passenger carrier 810 includes a set of non-motorized wheels 812 and is coupled to MTUs 850 and 852 that together provide locomotion to the passenger carrier 810. The passenger carrier 810 is shown to be pulled by two MTUs 850 and 852. In some embodiments, the number of MTUs used to drive a passenger carrier may be based on the weight of the passenger carrier and passengers. For example, some passenger carriers may be configured to be driven by only one MTU. In some embodiments, the MTUs may couple to the passenger carrier 810 by partially lifting one end of the passenger carrier 810. In some embodiments, the passenger carrier 810 may couple to the MTU by one or more of a magnet, a hook, a latch, a wedge, and the like. In some embodiments, the passenger carrier 810 also comprises a coupling mechanism for coupling with the MTU(s) at the designated location. In some embodiments, the MTUs may couple to the front, back, and/or side portions of the passenger carrier 810. Generally, the passenger carrier may be driven by the MTUs 850 and 852 based on instructions received from a central server. In some embodiments, at least one of the MTUs 850 and 852 may be communicatively coupled to the passenger carrier 810 to control one or more input/output devices on the passenger carrier. For example, the MTU may be configured to control one or more of turn and break signals, backup alarms, speakers, microphones, and/or displays on the passenger carrier. The communication link between the MTU and the passenger carrier that allows for the control of the input/output devices on the passenger carrier may be part of the mechanical coupling mechanism and/or be a wireless communication link. While the passenger carrier 810 shown in FIG. 8 includes two rows of seats and a protective roof, passenger carriers with other carrying capacities and configurations may be used in the described system without departing from the spirit of the present disclosure.

Figure 9:
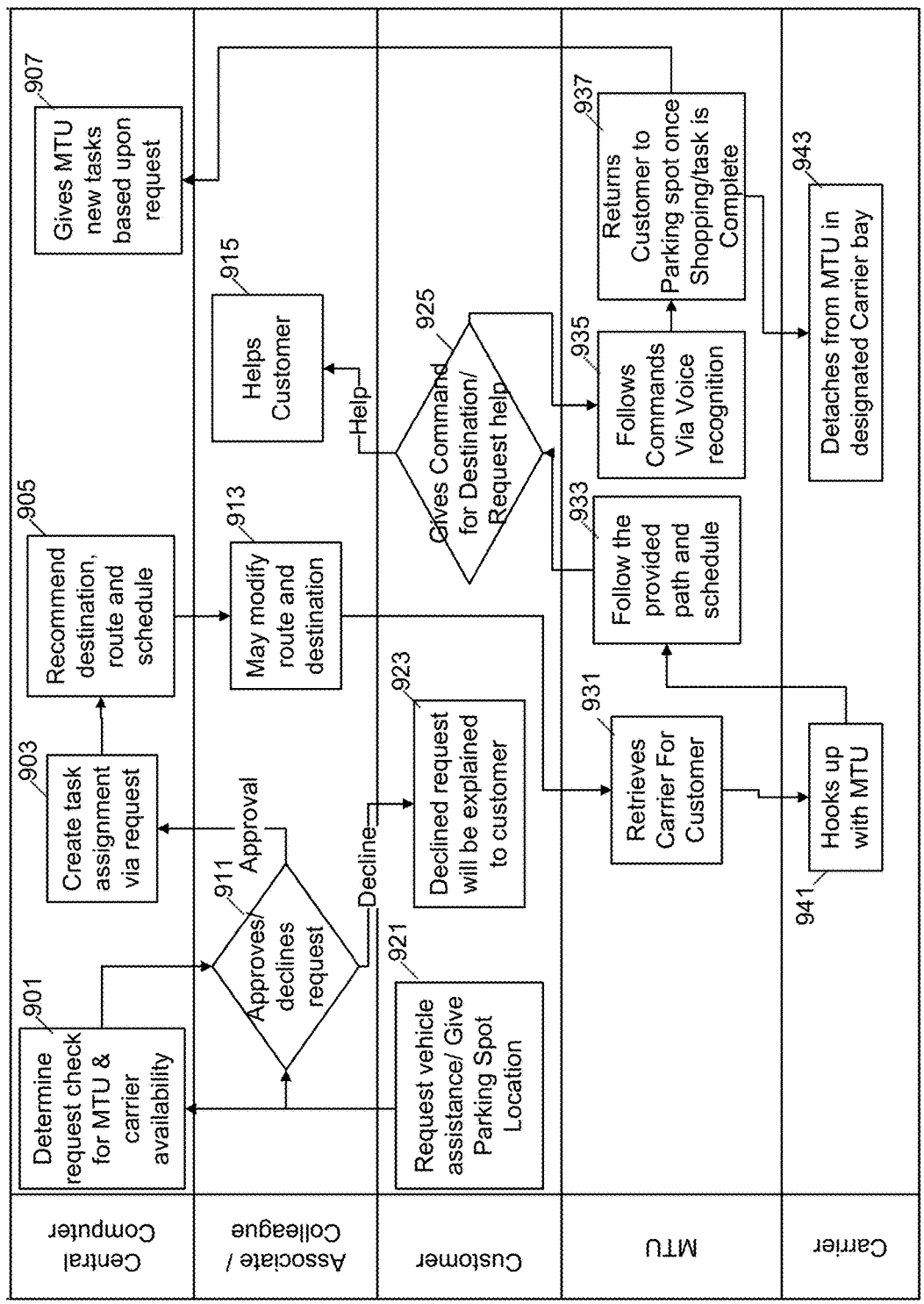
FIG. 9 comprises a flow diagram of a process for providing passenger transport in accordance with some embodiments.

FIG. 9 is an illustration of a process for providing passenger transport with MTUs. In some embodiments, the steps in FIG. 9 may be implemented by one or more components of the systems shown in FIG. 1 and FIG. 6. In step 921, the customer requests a vehicle and provides a pick up location, such as he/her parking spot. In step 901, the central computer verifies the request and checks for MTU and passenger carrier availability. The availability of MTUs and passenger carriers may be based on the requested carrier type and/or the number of passengers needing a ride. In step 911, a store associate or a colleague approves or declines the request. Step 911 may also be options. In some embodiments, the central computer may be configured to automatically approve or decline the request based on the customer's stored profile and/or MTU and carrier availability. For example, some customers may have preapproval to use mobility assistance services and the system may automatically approve any request from the preapproved customers. If the request is declined, in step 923, the declined request is explained to the customer.

If the ride request is approved, in step 903, the central computer creates a task assignment based on the request. In step 905, the central computer further determines recommended destination, route, and/or schedule for the customer. The recommended destination, route, and/or schedule may be based on one or more of a customer entered shopping list, a customer purchase history, a customer profile, a customer demographic, and store congestion condition, etc. In step 913, a store associate may optionally manually modify the route and destination.

In step 931, the MTU is instructed to retrieve a passenger carrier for the customer. In some embodiments, the passenger carriers are stored in a carrier bay and the MTU is instructed to travel to the carrier bay. In step 941, a passenger carrier is hooked up with the MTU. The MTU may then travel to the requesting customer. In step 933, the MTU follows the path and schedule provided by the central computer once the requesting customer has boarded. In some embodiments, during step 933, the central computer continues to provide real-time navigation instructions to the MTU.

In step 925, the customer gives commands and/or requests for help while being carried by the passenger carrier driven by the MTU. If the customer requested assistance in step 925, in step 915, an associate may be notified to provide help to the customer. If the customer makes a voice command, in step 935, the MTU performs voice recognition and responds to the voice commands. In some embodiments, in step 935, the MTU relays the voice command to the central computer and the central computer may determine how the MTU should respond to the command from the customer. For example, the user may request to be brought to an item, brought to a store feature (e.g. customer service counter, checkout counter, restroom, etc.), or end the shopping trip. The central computer system may determine a new route for the MTU based on the customer input. In some embodiments, the central computer system may determine that the requested action is not permissible in the transport mode of the MTU and would notify the customer via MTU. In some embodiments, a customer command may be entered either through voice command or through a user interface device such as a portable user device.

At the conclusion of a shopping trip, in step 937, the MTU may return the customer to the starting point, which may be his/her parking spot. The location of the parking spot may be the location provided and recorded in step 921. In step 943, the MTU may bring the passenger carrier back to a carrier bay and the carrier detaches from the MTU. After the passenger carrier is detached, in step 907, the central computer may give the MTU new tasks based upon other requests. For example, the MTU may be instructed to escort another customer who is walking in the shopping space, to collect abandoned shopping carts, to clean up a spill, etc.

In some embodiments, apparatuses and methods are provided herein useful for providing passenger transport. In some embodiments, a system for providing passenger transport includes a plurality of passenger carriers, a plurality of motorized transport units each configured to mechanically couple at least one of the plurality of passenger carriers, and a central computer system communicatively coupled to the plurality of motorized transport units. The central computer system being configured to receive a ride request from a customer, instruct a motorized transport unit to travel to a passenger carrier and couple to the passenger carrier, and instruct the motorized transport unit coupled to the passenger carrier to travel to the customer to provide transportation to the customer.

In some embodiments, a method for providing passenger transport is provided. The method comprises receiving, at a central computer system, a ride request from a customer, selecting, by the central computer system, a motorized transport unit from a plurality of motorized transport units and a passenger carrier from a plurality of passenger carriers, instructing the motorized transport unit to travel to the passenger carrier and mechanically couple to the passenger carrier, and instructing the motorized transport unit coupled to the passenger carrier to travel to the customer.

In some embodiments, an apparatus for providing passenger transport is provided. The apparatus comprising a wireless transceiver configured to communicate wirelessly with a central computer system, a motorized wheel system, a coupling structure for mechanically coupling with passenger carriers, and a control circuit coupled to the wireless transceiver and the motorized wheel system, the control circuit being configured to cause the apparatus to: travel, using the motorized wheel system, to a passenger carrier, couple to a passenger carrier apparatus via the coupling structure, travel, using the motorized wheel system, to a passenger location for passenger pickup, and travel through a shopping space based on instructions received from the central computer system via the wireless transceiver.

In accordance with some embodiments, further details are now provided for one or more of these and other features. For example, generally speaking, pursuant to various embodiments, systems, apparatuses, processes and methods are provided herein that enable a shopping facility assistance system and method to retrieve in-store abandoned mobile item containers.

By one approach the aforementioned central computer system is configured to identify a mobile item container physically inside a retail shopping facility as being abandoned. The central computer system then directs a particular one of the aforementioned plurality of motorized transport units through the retail shopping facility to the abandoned mobile item container and causes that motorized transport unit to physically attach to the abandoned mobile item container. The central computer system then directs that motorized transport unit through the retail shopping facility with the attached abandoned mobile item container to a specified destination within the retail shopping facility.

By one approach the central computer system identifies a mobile item container as being a candidate abandoned mobile item container, at least in part, based on video information of the retail shopping facility. The central computer system can determine that a candidate mobile item container is abandoned as a function, at least in part, of determining that the mobile item container is both stationary and unattended for at least a predetermined amount of time.

By one approach the central computer system can use different predetermined amounts of time when assessing abandonment depending upon where in the retail shopping facility the mobile item containers are located. For example, the central computer system can use shorter predetermined amounts of time when assessing abandonment of mobile item containers located in a low traffic area as compared to mobile item containers that are located in a high traffic area such as a shopping aisle.

These teachings are highly flexible in practice and will accommodate a wide variety of modifications and embellishments. As one example of flexibility, by one approach the central computer system is configured to determine the aforementioned specified destination to which an abandoned mobile item container shall be returned as a function, at least in part, of whether the abandoned mobile item container contains any items. For example, when the abandoned mobile item container is empty of any items the central computer system can specify an empty cart deployment area as the specified destination. Conversely, when the abandoned mobile item container contains one or more items, the central computer system can specify a cart processing area (such as but not limited to a customer service area of the retail shopping facility) as the specified destination to which the abandoned mobile item container shall be taken.

So configured, abandoned in-store mobile item containers can be readily and quickly identified and returned safely to an appropriate deployment and/or processing area. Suitably employed, these teachings can greatly mitigate the problems associated with abandoned mobile item containers without necessitating a concurrent undue dedication of human resources.

Figure 10:
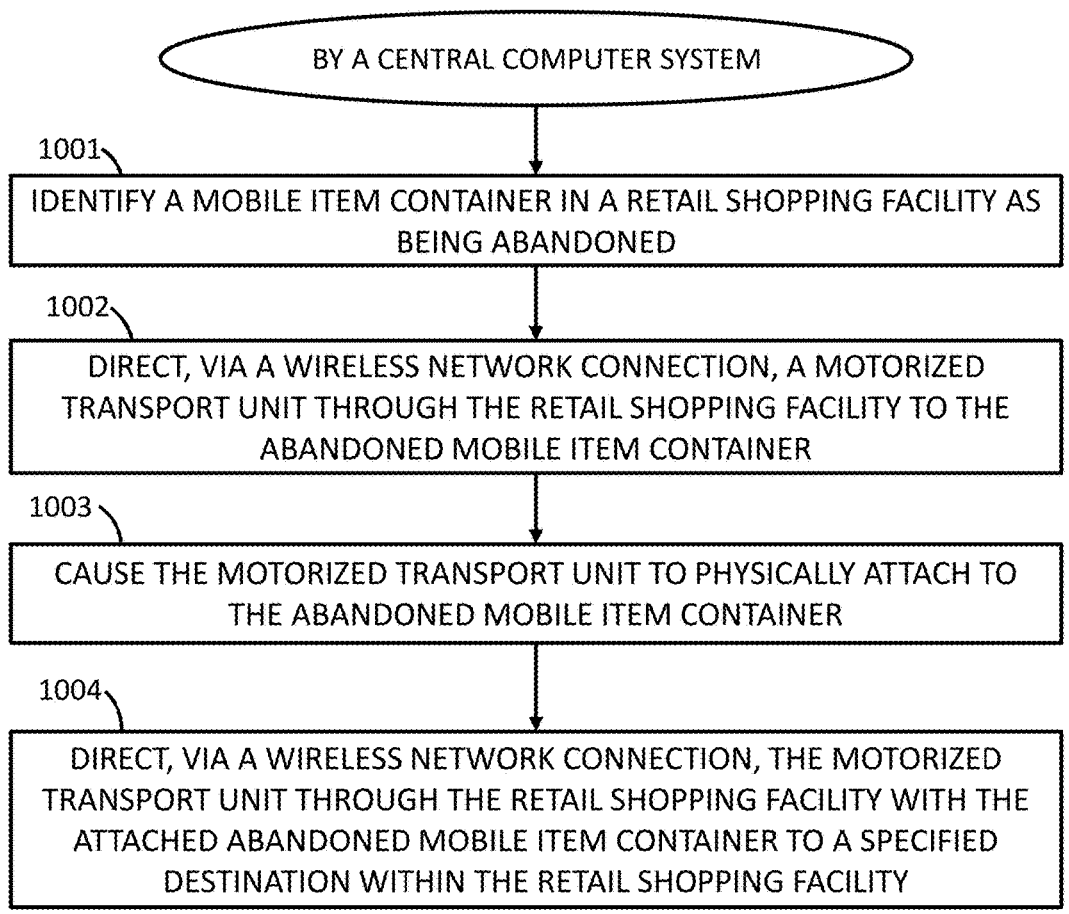
FIG. 10 comprises a flow diagram as configured in accordance with various embodiments of these teachings.

FIG. 10 presents an illustrative process 1000 that accords with many of these teachings. This process 1000 can be carried out by the central computer system 106 described above. For the sake of an illustrative example this description will presume the mobile item container to be a standard wheeled shopping cart. It will be understood, however, that the specifics corresponding to such an example are not intended to suggest any particular limitations with respect to the scope of these teachings.

Figure 11:
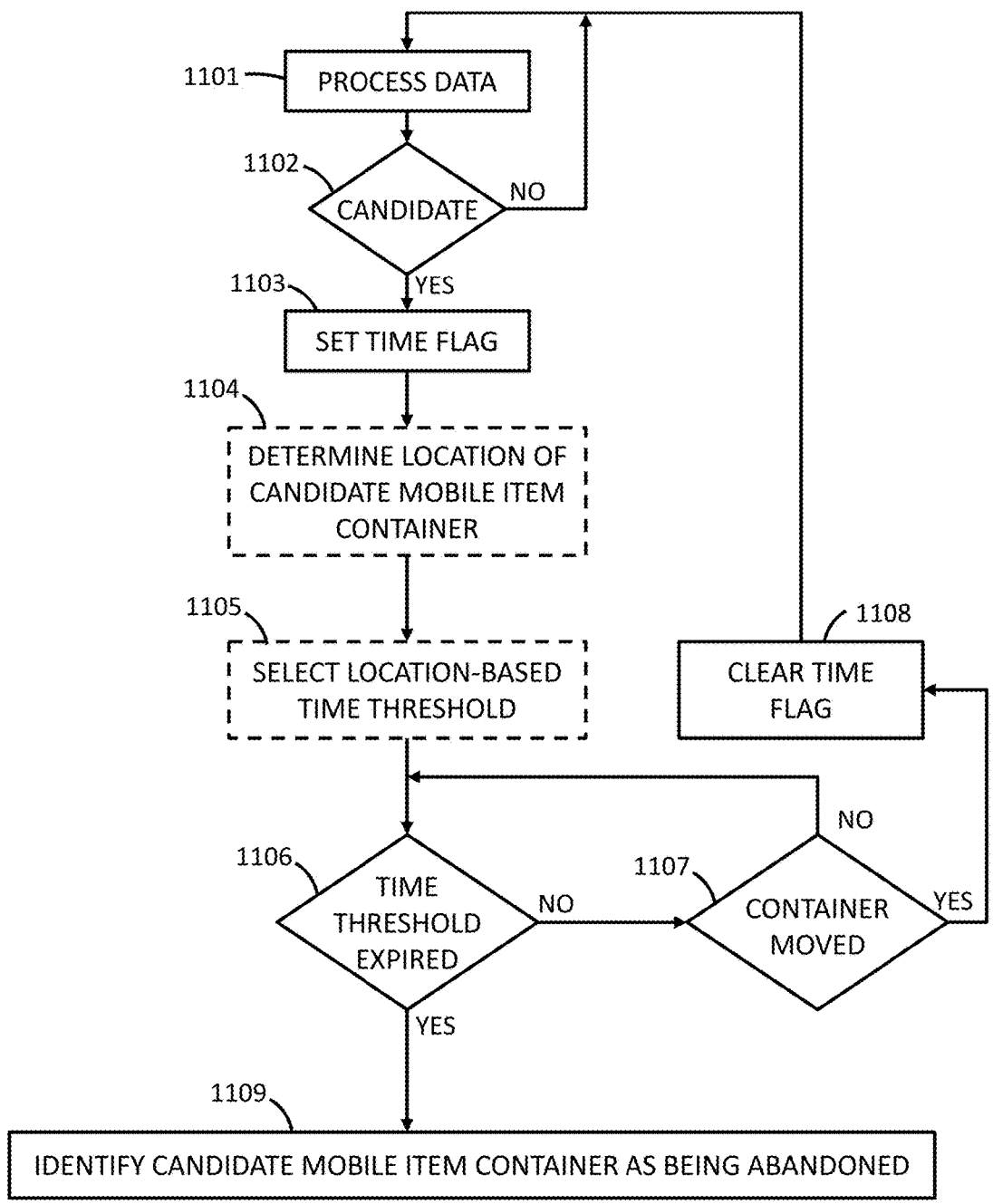
FIG. 11 comprises a flow diagram as configured in accordance with various embodiments of these teachings.

At block 1001 the central computer system 106 identifies a mobile item container 104 in a retail shopping facility 101 as being abandoned. FIG. 11 provides further details as to how the central computer system 106 carries out this identification. No particular limitations are intended by way of the specificity of this example.

Figure 12:
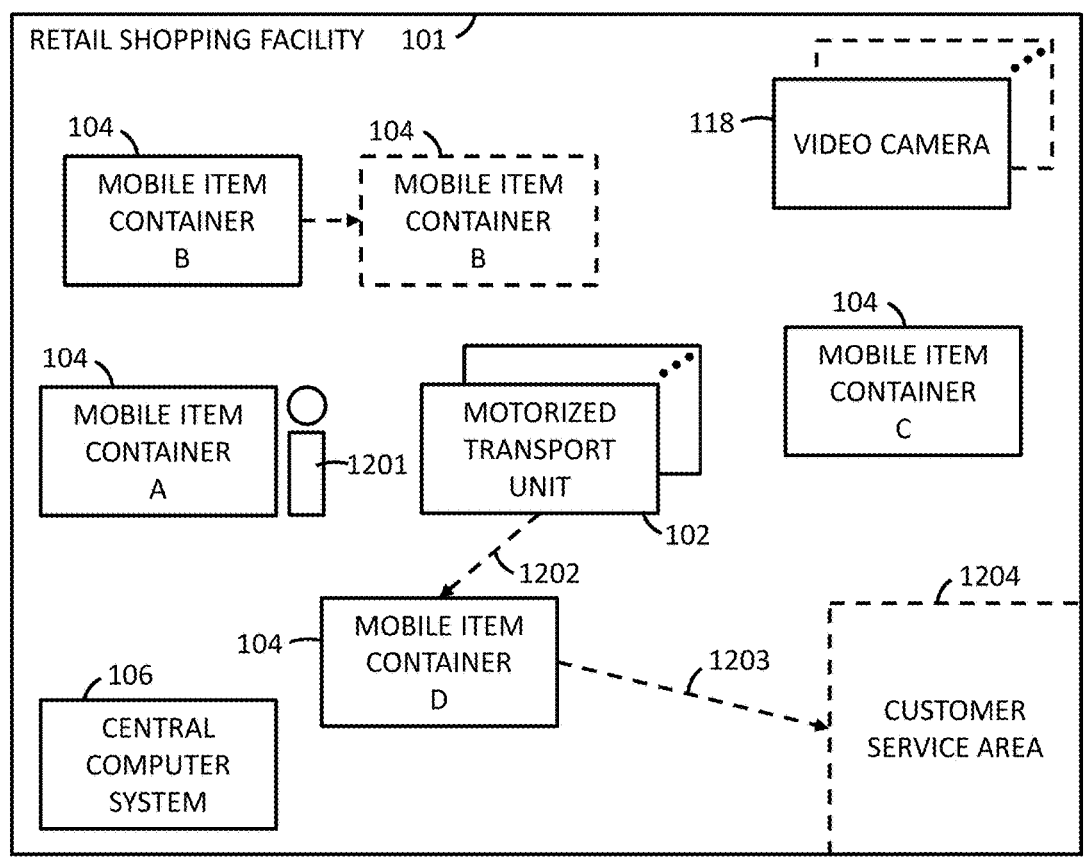
FIG. 12 comprises a schematic block diagram as configured in accordance with various embodiments of these teachings.

With continued reference to FIG. 11 and with reference as well to FIG. 12, at block 1101 the central computer system 106 processes data to identify mobile item containers 104 in the retail shopping facility 101. By one optional approach the central computer system 106 identifies mobile item containers 104 in the retail shopping facility 101, at least in part, based on video information. That video information can be provided, for example, by video cameras 118 that are positioned such that at least a part of the captured field of views include at least some parts of the retail shopping facility 101. In such a case the central computer system 106 can have access to image processing and/or pattern-matching programs that facilitate identifying a particular object in a field of view as comprising a mobile item container 104, a customer 1201, an item in a mobile item container 104, and so forth. Such image processing and pattern-matching comprises a known area of prior art endeavor. As the present teachings are not particularly sensitive to any particular selections in these regards, further elaboration is not provided here regarding such techniques.

By another approach, used in combination with the foregoing or in lieu thereof, the central computer system 106 identifies mobile item containers 104 in the retail shopping facility 101, at least in part, based on external-environment sensor information provided by the aforementioned location detection system 116 or one or more of the plurality of motorized transport units 102. Such external-environment sensor information can be developed, for example, by an on-board sensor 414 as described above that specifically serves in these regards. As one simple example in these regards, the mobile item containers 104 may be equipped with RFID tags or other close-range transponders or transmitters that the aforementioned on-board sensor 414 can detect and provide to the central computer system 106 as the aforementioned external-environment sensor information.

At decision block 1102, the central computer system 106 determines whether a mobile item container 104 identified when processing the data as described above constitutes a candidate abandoned mobile item container 104. By one approach, this determination can be based upon determining both that the mobile item container 104 is stationary and that no one is presently sufficiently proximal to that mobile item container 104.

These teachings will accommodate various approaches as to what constitutes that sufficient proximity. By one approach, for example, the central computer system 106 may consider any stationary mobile item container 104 to be a candidate unless someone is presently touching that mobile item container 104. By another approach, the central computer system 106 may consider an untouched stationary mobile item container 104 to not yet be a candidate so long as someone is at least within some predetermined distance of the mobile item container 104 (such as, for example, 1 cm, 5 cm, 10 cm, 1 m, or some other suitable distance of choice).

When not true (i.e., the mobile item container 104 does not meet the central computer system's 106 criteria for potentially being considered abandoned), the central computer system 106 can continue with the aforementioned data processing activity to thereby continue to identify mobile item containers 104 in the retail shopping facility 101. By way of an illustrative example, and referring to FIG. 12, the central computer system 106 so considers the mobile item container 104 denoted by the alphabetic character A and determines that a person 1201 is sufficiently close to this mobile item container A to preclude characterizing this otherwise-stationary mobile item container A as being a candidate abandoned movable item container.

When true, however, the central computer system 106, at block 1103, sets a time flag for each candidate abandoned mobile item container 104. This permits the central computer system 106 to track how long a particular stationary mobile item container 104 remains stationary. Skipping ahead in FIG. 11, at decision block 1106 the central computer system 106 can determine from time to time whether some corresponding time threshold has expired. If the time threshold is five minutes, for example, this activity comprises determining whether five minutes or more have elapsed since the aforementioned time flag was set for a particular stationary movable item container 104.

If the time threshold has not yet expired the central computer system 106 then determines, at block 1107, whether the movable item container 104 has been moved. When the movable item container 104 has remained stationary, the central computer system 106 continues to monitor for the passing of time and movement of the movable item container 104 as just described. If, however, the central computer system 106 determines that the monitored movable item container 104 has been moved, the central computer system clears the previously set time flag at block 1108 and continues with this process 1001.

By way of an illustrative example, and referring to FIG. 12, the central computer system 106 so monitors the mobile item container 104 denoted by the alphabetic character B for movement after having identified this mobile item container B as being a candidate abandoned mobile item container and prior to determining that a corresponding time threshold has expired. Upon detecting that this mobile item container B moves (as represented by the phantom representation of this mobile item container B) during this monitoring interval, and as per the process 1001 illustrated in FIG. 11, the central computer system 106 clears the previously set time flag for this mobile item container B and effectively clears this mobile item container B from the pool of candidates. If the mobile item container B again meets the criteria described above, the central computer system 106 will again treat the mobile item container B as a candidate and begin anew the aforementioned monitoring activity.

When the candidate mobile item container 104 remains stationary for the requisite period of time, at block 1109 the central computer system 106 identifies the candidate mobile item container 104 as being abandoned. By way of an illustrative example, and referring again to FIG. 12, the central computer system 106 so monitors the mobile item container 104 denoted by the alphabetic character C and detects that this mobile item container C has remained stationary for the requisite period of time and therefore now identifies this mobile item container C as being abandoned.

As noted above, the central computer system 106 can identify a candidate mobile item container 104 as being abandoned as a function of how long the candidate mobile item container 104 has remained stationary. By one approach this can comprise, for example, using shorter predetermined amounts of time when assessing abandonment for mobile item containers 104 located in a low traffic area for mobile item containers 104 and/or customers than when assessing abandonment of mobile item containers 104 located in higher traffic areas such as, for example, shopping aisles.

By way of an illustrative example, and referring again to FIG. 12, the central computer system 106 might employ a time threshold of, say, 15 minutes when assessing abandonment of mobile item container C which happens to be located in a low traffic area of the retail shopping facility 101 and a time threshold of, say, five minutes when assessing abandonment of mobile item container D which happens to be located in a high traffic area of the retail shopping facility 101.

Accordingly, and referring again to FIG. 11, this process 1001 can include the optional activity shown at block 1104 where the central computer system 106 determines the location of a candidate mobile item container 104 (at least to the extent of determining whether the candidate mobile item container 104 is in a low traffic or high traffic area) followed by optional block 1105 where the central computer system 106 selects a location-based time threshold as a function of the previously-determine the location of the candidate mobile item container 104. The central computer system 106 can then carry out the other steps of this process 1001 as described above albeit with a particularly-chosen time threshold that has been selected as a function of the location of the candidate mobile item container 104.

Referring again to FIG. 10 and with continued reference to FIG. 12, upon having identified a mobile item container 104 in a retail shopping facility 101 as being abandoned at block 1001 as described above, the central computer system 106 can, at block 1002, direct a motorized transport unit 102 through the retail shopping facility 101 to the abandoned mobile item container. In the example of FIG. 12, the central computer system 106 has determined that the mobile item container D is abandoned and has directed a motorized transport unit 102 to travel to the mobile item container D as represented by the arrow denoted by reference numeral 1202. As described above, the central computer system 106 can communicate with the motorized transport unit 102 to communicate such an instruction via an available wireless network connection.

By one approach the central computer system 106 simply provides a destination to this motorized transport unit 102. By another approach the central computer system 106 provides step-by-step movement instructions to the motorized transport unit 102 to thereby guide the motorized transport unit 102 to the location of the abandoned mobile item container D.

At block 1003 the central computer system 106 also causes the motorized transport unit 102 to physically attach to the abandoned mobile item container D as described above.

At block 1004 the central computer system 106 directs (again via an available wireless network connection as described above) the motorized transport unit 102 through the retail shopping facility 101 with the attached abandoned mobile item container D to a specified destination within the retail shopping facility 101. By one approach the central computer system 106 determines this specified destination as a function, at least in part, of whether the abandoned mobile item container contains any items. When the abandoned mobile item container is empty of items, for example, the central computer system 106 may specify that the motorized transport unit 102 bring the mobile item container to an empty cart deployment area as the specified destination. An empty cart deployment area can comprise, for example, a shopping cart bay where shopping carts are organized and otherwise made available to customers arriving at the retail shopping facility 101.

When, however, the mobile item container contains one or more items (such as un-purchased items that were removed from their respective displays and into the mobile item container by a customer and/or personal items that might belong to a customer that has now left the premises) the central computer system 106 can instead direct the motorized transport unit 102 to take the abandoned mobile item container to a cart processing area such as a customer service area 1204 of the retail shopping facility 101. FIG. 12 illustrates such an action by the arrow denoted by reference numeral 1203 which represents that the motorized transport unit 102 is taking the mobile item container D to the aforementioned customer service area 1204.

A customer service area can comprise, for example, an area of a retail shopping facility 101 that provides one or more services to a customer other than serving primarily as a point of sale. Customer service areas often serve as one of their primary functions to process the return of previously-purchased goods by customers, gift recipients, and so forth. Accordingly, customer service areas often gather items that need to be returned back into inventory, which items are often temporarily stored in one or more mobile item containers 104. This being so, a customer service area can serve as a useful, efficient, and helpful area to receive an abandoned mobile item container 104 that includes one or more items contained therein.

So configured, a shopping facility assistance system can help to prevent abandoned shopping carts from impeding customer and/or associate movement for an undue length of time. These same teachings can also help to minimize or at least reduce the amount of time that an item removed from its display is otherwise unavailable to be purchased by an interested customer.

Some embodiments provide shopping facility assistance systems that comprise a plurality of motorized transport units configured to move through a retail shopping facility, and a central computer system having a network interface such that the central computer system wirelessly communicates with the plurality of motorized transport units. The central computer system is configured to identify a mobile item container inside the retail shopping facility as being abandoned; direct a particular one of the plurality of motorized transport units through the retail shopping facility to the abandoned mobile item container; cause the particular one of the plurality of motorized transport units to physically attach to the abandoned mobile item container; and direct, via a wireless network connection, the particular one of the plurality of motorized transport units through the retail shopping facility with the attached unattended mobile item container to a specified destination within the retail shopping facility. In some applications, the mobile item container comprises a wheeled shopping cart. The central computer system may be configured to identify the mobile item container in the shopping facility as being abandoned, at least in part, based on video information of the retail shopping facility. In some instances, at least some of the plurality of motorized transport units include at least one external-environment sensor and wherein the central computer system is further configured to identify the mobile item container in the retail shopping facility as being abandoned, at least in part, based on external-environment sensor information provided by at least one of the plurality of motorized transport units.

In some embodiments, the central computer system is configured to identify a mobile item container as being abandoned as a function, at least in part, of determining that the mobile item container is both stationary and unattended for at least a predetermined amount of time. The central computer system, in some applications, uses different predetermined amounts of time when assessing abandonment of mobile item containers depending upon where in the retail shopping facility the mobile item containers are located. In some embodiments, the central computer system may use shorter predetermined amounts of time when assessing abandonment of mobile item containers located in a low traffic area for mobile item containers than when assessing abandonment of mobile item containers located in shopping aisles. The central computer system may determine the specified destination as a function, at least in part, of whether the abandoned mobile item container contains any items. In some applications, the central computer system specifies an empty cart deployment area as the specified destination when the abandoned mobile item container is empty of any items.

In some embodiments, the central computer system specifies a cart processing area as the specified destination when the abandoned mobile item container contains any items. In some instances, the cart processing area can comprise a customer service area of the retail shopping facility.

Some embodiments provide methods comprising: by a central computer system: identifying a mobile item container in a retail shopping facility as being abandoned; directing, via a wireless network connection, a motorized transport unit through the retail shopping facility to the abandoned mobile item container; causing the motorized transport unit to physically attach to the abandoned mobile item container; directing, via a wireless network connection, the motorized transport unit through the retail shopping facility with the attached abandoned mobile item container to a specified destination within the retail shopping facility. The central computer system, in some instances, is configured to identify the mobile item container in the retail shopping facility as being abandoned by, at least in part, using video information of the retail shopping facility.

In some embodiments the central computer system is configured to identify a mobile item container as being abandoned by, at least in part, determining that the mobile item container is both stationary and unattended for at least a predetermined amount of time. The central computer system, in some implementations, may use different predetermined amounts of time when assessing abandonment of mobile item containers depending upon where in the retail shopping facility the mobile item containers are located. Similarly, in some embodiments, the central computer system may use shorter predetermined amounts of time when assessing abandonment of mobile item containers located in a low traffic area for mobile item containers than when assessing abandonment of mobile item containers located in shopping aisles.

Some embodiments provide methods where a central computer system determines the specified destination as a function, at least in part, of whether the abandoned mobile item container contains any items. The central computer system may specify an empty cart deployment area as the specified destination when the abandoned mobile item container is empty of any items. In some applications, the central computer system specifies a cart processing area as the specified destination when the abandoned mobile item container contains any items. In some instances, the cart processing area comprises a customer service area of the retail shopping facility.

In accordance with some embodiments, further details are now provided for one or more of these and other features. For example, generally speaking, pursuant to various embodiments, systems, apparatuses, processes and methods are provided herein that help customers find products within a shopping facility. In many instances, the shopping facility may include thousands of different products spaced through a relatively large area. Accordingly, it can often be difficult and/or time consuming for a customer to locate a product of interest. It is important for a customer to be able to find an item in order to make a buying decision. Typically, a customer knows what, at least generally, she/he is looking for. Often times, however, customers do not know where to find the product within the shopping facility. In some instances, when an item cannot be found a customer may ask an associate or leave the store without making a purchase. This creates additional work for an associate, as well as cost the customer valuable shopping time. If the customer is unable to locate a product or takes too long to locate a product the customer may leave unsatisfied and heading to a competitor location in order to find the item they are looking for.

The central computer system and/or an inventory database maintains location information of available products, and can readily obtain location information for items in the shopping facility, and can even let a customer know when a product is out of stock and/or not carried at the shopping facility. Further, some embodiments utilize the motorized transport units 102 to interact with customers and locate for customers their products of interest within the shopping facilities.

Figure 13:
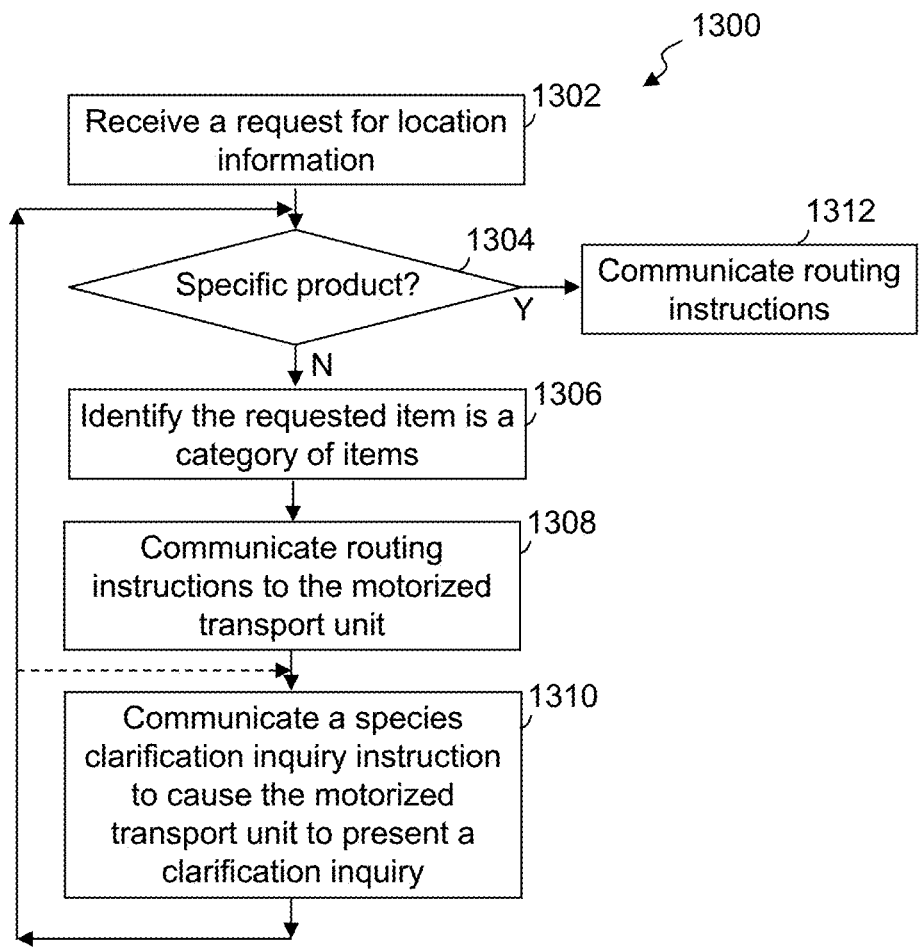
FIG. 13 illustrates a simplified flow diagram of an exemplary process of providing a customer with product location information, in accordance with some embodiments.

FIG. 13 illustrates a simplified flow diagram of an exemplary process 1300 of providing a customer with product location information, in accordance with some embodiments. In step 1302, a request is received from a customer requesting location information for a requested item. Typically, the request is receive through a motorized transport unit, such as through a verbal request from a customer that is detected by a voice recognition and/or an audio system of the motorized transport unit. In other instances, the customer may type in the request through one or more buttons or displayed buttons and/or options (e.g., displayed key board). Similarly, in some instances, the customer may communicate the customer inquiry through a user interface unit 114, such as through an audio communication, a text message, an email, a selection through an APP implemented on the user interface unit, or the like.

In many instances, the item identified by the customer may not be a specifically identified product. Accordingly, in step 1304 it is determined whether the item being requested is a specific product that is specifically distinguishable from other similar products. This determination includes an evaluation of information provided by the customer in identifying the item. The evaluation in some instances can include extracting one or more terms, words, and the like and preforming a search through a listing, database and/or other such information. Again, voice recognition may be performed in identifying terms and/or parameters requested by the customer. The specific identification may include a specific size and/or weight, a specific number of content, a specific brand, and/or other such information that allows the central computer system to specifically identify the product. In some instances, the customer may scan a bar code (e.g., using a scanner of the motorized transport unit), allow the motorized transport unit to capture an image of the product of interest that is forwarded to the central computer system to identify, the user may select the specific product through a user interface on the motorized transport unit or other interface (e.g., through an APP on the customer's user interface unit, a kiosks at the shopping facility, etc.), receive a description via voice recognition, or otherwise provide specific information. When a specific product is identified, the process advances to step 1312.

In step 1306, the request is evaluated and it is identified that the requested item is a category of items and not a specific product. The identification of a category may be based, for example, on a word search through a listing and/or database, and the listing and/or database may identify a match as a category, the match may be associated with multiple different specific products, or other such indication that the request is a category of products. In such situations, typically, the requested item may correspond to multiple products that may be generally grouped together through some relationship. Examples of categories include, but are not limited to, toys, action figures, dolls, balls, produce, fruit, vegetables, apples, cloths, shirts, shoes, swimsuits, books, electronics, games, and other such categories of products. Upon identifying a category of products, category location information can be identified that corresponds to the requested category. For example, a customer may request "toys," and the central computer system may identify location information based on the store mapping that includes the location information of products within the store mapping (e.g., a 2D and/or 3D mapping). The identified location information may be a central location in a region of the shopping facility where a majority of the category is found, a closest corner or other boundary of a region closest to the customer's current location of a region of the shopping facility where a majority of products of the category is located, a location of a most popular product (e.g., most purchased over the last defined period of time) of the category of products, or other such location information. Still further, in some instances, the location information may be dependent on the customer who is asking for the location information. As such, some embodiments utilize customer profile information in identifying one or more products defined as being part of the category of products that the customer is more likely to be search for. Other factors may be taken into consideration in selecting category location information.

In step 1308, routing instructions are communicated from the central computer system to the motorized transport unit based on the category location information. The routing instructions are configured to be implemented by the motorized transport unit to cause the motorized transport unit to initiate physical movement through at least a portion of the shopping facility in moving toward the category location in the shopping facility. The route instructions may be a most direct route. In other instances, however, the route may be based on the customer (e.g., routing the customer by one or more products the customer often purchases and/or is likely to purchase based on customer profile information), based on traffic in the shopping facility, other activity occurring in the shopping facility (e.g., one or more isles are blocked because of restocking, clean-up, etc.), other such factors, or combination of two or more of such factors. Additionally or alternatively, in some embodiments, the routing and/or a mapping may be provided to the customer's user interface unit or another interface device (e.g., on an item container). This mapping may cause a mapping of at least a portion of the store to be displayed with a route that the customer can follow in reaching the intended location of the category of products and/or a specific product. Details may additionally or alternatively be provided such as text describing the route (e.g., proceed down isle 14, turn left at the first junction and turn right on isle 18).

In step 1310, the central computer system, based on the identified category, further communicates one or more species clarification inquiry instructions to the motorized transport unit, the customer's user interface unit, a user interface of an item container being driven by the motorized transport unit or the like. The clarification inquiry instructions configured to cause the motorized transport unit (or other device) to present, while implementing routing instructions to move toward the category location, one or more clarification inquiries to the customer in attempts to seek clarification in narrowing the identified category to one or more products or sub-categories categorized within the identified category that the customer is attempting to locate. The clarification inquiry is typically audio output generated through a speaker or the like. The customer can verbally respond with the audio system of the motorized transport unit detecting the audible response. The clarification inquiries may be identified from a listing associated with a requested category, based on the customer's previous shopping purchases, based on other customers' experiences from similar requests, and the like.

In some instances, multiple clarification inquiries may be sequentially presented to the customer with responses being forwarded to and evaluated by the central computer system in attempts to identify a sub-category or products, or a specific product. In some instances, the process returns to step 1304 in determining whether a specific product is identified in a response to the clarification inquiry. Accordingly, one or more products of interest may be identified based on multiple clarification replies from the customer to multiple clarification inquiries presented to the customer. When a specific product is identified the process 1300 advances to step 1312 to identify location information corresponding to the product of interest, and the location information and/or routing instructions to the specific product location can be communicated and provided to the customer (e.g., communicated to the motorized transport unit and/or the customer's user interface unit). When a sub-category is identified, some embodiments communicate refined routing instructions to a location corresponding to the sub-category based on the motorized transport unit's current location.

As such, the central computer system utilizes the motorized transport unit to enhance customer support by routing the customer through the shopping facility based on the category of products. While taking the customer through the shopping facility the system can attempt to further narrow down the product the customer is searching for. As such, the system does not waste the customer's time trying to identify the specific product attempting to be found before starting to take the customer toward the region of the shopping facility most likely containing the product of interest. Further, moving the customer into the shopping facility while trying to more accurately identify the product the customer is looking for can provide multiple advantages in addition to saving the customer time. For example, one benefit is that the customer is moved away from an entrance and exit of the shopping facility and reduces traffic and avoids backing up and/or cluttering up the entrance and exit. Another example is that the customer is moved into the shopping facility where the customer is exposed to other products the customer may be interested in purchasing and/or exposes the customer to additional marketing of products attempting to be sold. Still further, additional information may be obtained from the customer that may be later used with the same customer in later visits and/or other customers that may present similar queries. Some embodiments may additionally collecting information regarding what customer are looking for (e.g., items the shopping facility may want to carry, items the shopping facility may want to move to a new location, identifying items the shopping facility may want to feature, etc.).

Further, some embodiments are configured to identify, based on the identified category and/or based on a reply from the customer to one or more clarification inquiries, one or more products of interest. Based on the one or more products of interest and from an inventory database, the central computer system can obtain identifying information of one or more recommended companion products that correspond with the one or more products of interest that the customer may further wish to purchase in relation to one or more products categorized within the identified category. For example, when the customer may be attempting to purchase a gift, one or more companion products may be proposed based on the customer buying a gift, such as wrapping paper, ribbon, card, and the like. As another example, the customer may be attempting to purchase a razor, and one or more companion products may be identified such as replacement blades, saving gel, aftershave, lotion and/or other such companion products. Another example may include identifying the customer is looking for meat to cook for dinner, and one or more companion products may be identified that can be used in cooking the meat (e.g., based on one or more proposed recipes), and/or one or more companion products that may be severed with the meat as part of a complete meal (e.g., vegetable, fruit, etc.). In some embodiments, a user profile of the customer is used in identifying the one or more companion products so that the companion products selected are products the customer is more likely to purchase. Similarly, the companion products may be products attempting to be marketed and/or pushed by the shopping facility (e.g., in trying to address overstock, products approaching expiration, etc.). The identification of one or more companion products may be based on a listing that associates categories, sub-categories, and/or products with other products. For example, the inventory database may link one or more products together, categories may be associated with specific products or other categories and/or sub-categories, and the like. Further, associations between products may be identified, for example, based on recipes, customer's previous shopping history, based on work projects (e.g., paint brushes when a customer purchases paint), and the like.

Upon identifying one or more companion products, the central computer system may communicate a companion product instruction to the motorized transport unit and/or the customer's user interface unit. The companion product instruction causes the motorized transport unit and/or user interface unit to propose the purchase of at least one of the companion products by presenting to the customer the identifying information of at least one companion product. The proposed companion products can be presented through audio output, through video content on a user interface, text data, and the like, or a combination thereof.

Further, in some instances, the central computer system may obtain marketing information regarding the category of products identified, one or more products of interest, and/or one or more of the companion products. This marketing material may also be communicated to cause the motorized transport unit to present the marketing information when proposing the at least one companion product to the customer. Again, this may be presented through audio, video, text, other such presentation, or combination. For example, the marketing material may include identifying a price of the product, a price of the product compared to a competitor's price, an explanation of how the companion product is utilized and/or beneficial in view of the product or category of interest, notifying the customer the product or companion product is on sale, and other such marketing.

The customer can respond to the offer of the one or more companion products by acknowledging an interest in purchasing the one or more companion products. The acknowledgment may be made through a verbal statement (e.g., "yes", "I would like to buy that", "please take me to that product", etc.), by selecting a key or displayed option (e.g., selecting a displayed "Yes" button), selecting an option on a user interface unit, or through other such methods. In response to an acknowledgment of interest, some embodiments further identify companion product location information corresponding to each of the companion products for which the customer is interest. In some embodiments, the routing to the original category of interest and/or the identified or determined product of interest may include routing the customer through the shopping facility in such a way as to direct the customer by one or more of the potential companion products. In some embodiments, this routing by a companion product can be performed regardless of whether the customer has expressed an interest in a companion product or not. Accordingly, the communication of the routing instructions to the motorized transport unit and/or a user interface unit may direct the customer to a location of a product of interest as well as a location of the at least one companion product.

Some embodiments further enhance customer support when directing the customer to a product of interest by identifying where the product can be found on a shelf or other such product storage unit. Often a product of interest may be surrounded by numerous other similar products. Accordingly, the customer may still have some difficulty in finding the product of interest even though the customer has been directed to or taken to a location where the product can be found. In some implementations, based on information provided by the customer (e.g., in a response to the clarification inquiry) a product of interest may be identified. The inventory database may be accessed to identify location information corresponding to the product of interest with the location information for the product of interest including an instruction and/or a visual representation of a vertical placement of the product of interest on a storage unit within the shopping facility relative to one or more other surrounding products. This product placement may have been obtained through previous three-dimensional (3D) scanning of the product storage units, based on scans of products and receiving location information so that the product can be mapped to the specific 3D coordinates within the shopping facility mapping, or other such information, or a combination of two or more of such information.

The visual representation, for example, may be an image or video that can be displayed on a display of the motorized transport unit, a customer's user interface unit, a user interface of an item container, or the like that shows the product on the shelf so that the customer, when reaching the location of the product can easily identify the product of interest. Additionally or alternatively, audio may be generated explaining where the product is located on the storage unit (e.g., "third shelf up from the floor between the product X and the product Y"). The location information can be communicated to the motorized transport unit and/or the user interface unit such that the location information of the product of interest is provided to the customer including causing the visual representation of the vertical placement of the product of interest to provided (e.g., displayed and visible to the customer, audibly played, etc.). In some instances, the visual representation may be provided to the customer's user interface unit or other display device (e.g., display on the motorized transport unit or item container), while the mapping and/or routing is only provided to the motorized transport unit. Still further, in some instances, the motorized transport unit may direct a light to illuminate the product of interest (e.g., a laser pointer).

The visual representation may be a picture, an image or other rendering of a 3D scan of an area of the storage unit and the product of interest on the storage unit, a rendering of the product appropriately placed on a rendering of the storage unit, and the like. Further, in some instances the visual representation further highlights the product of interest so that it stands out from surrounding products. For example, the product of interest may be shown in color while surrounding products are in black and white or grey scale; a virtual square or other distinguishing boundary may be superimposed about the product of interest; illumination intensity may be increased along an outline of the products of interest; or other such indicators or distinctions, or combination of such.

The routing instructions communicated to the motorized transport unit cause the motorized transport unit to initiate the instructions and implement movement through the shopping facility toward the identified category, sub-category or product of interest. While the motorized transport unit is moving through the shopping facilities one or more clarification inquiries can be communicated and presented to the customer and/or information about other products that the customer might be interested in may be provided as the motorized transport unit takes the customer along the instructed route. Again, the routing may further include taking the customer by products that may not be specifically requested but that the customer is likely to also purchase, and/or products attempting to be marketed to customers. The additional products may be based on the product the customer is searching for, may be based on customer's prior shopping history, other customers shopping history, products on sale or otherwise being marketed, and the like. The location information may additionally or alternatively include mapping information and/or directions. The mapping or directions may be communicated to the motorized transport unit, a customer's user interface unit, an interface unit on an item container, or other such device that can display the mapping, audibly present relevant information (e.g., directions) or otherwise present the information to the customer.

The specialized product finding capabilities allows the system to identify location information of a category of products and direct the customer to the category of products. Further, through one or more follow up questions the central computer system may narrow down the potential products and/or help the customer identify one or more specific products of interest. In some instances, the central computer system is capable of interpreting an item description, looking up the relevant location information within the store where the item should be located, communication routing information and/or provide directions to a customer on how to get to the product. Some embodiments further utilize the visual (e.g., cameras, scanners, etc.) and voice recognition capabilities of the motorized transport units in attempting to identify one or more products of interest. The motorized transport unit can be utilized and an interface to the central computer system allowing customers to ask questions and locate products (e.g., acting as a shopping facility telephone operator). For example, a customer may ask the motorized transport unit, "where are the iPhones". The question may be relayed to the central computer system that can identify the category and/or specific product and provide one or more answers (e.g., "Yes, we have the lowest price for the iPhone 6. It's one dollar ninety five for a ten year contract. You can find it in the Electronics department . . . "). The motorized transport unit can take the customer to the location or provide more detailed directions. Similarly, the central computer system may communicate a mapping and/or route to the customer's user interface unit (e.g., through an APP implemented on the customer's smart phone).

Again, in some instances, the central computer system may suggest one or more additional products, or may even suggest a different item (based on customer knowledge), and suggest purchasing "cross sell" item(s) to go with the product being sought (e.g., "you may also want to check out our large assortment of iPhone cases just behind the electronics counter . . . "). The central computer system can determine inventory based on a received request. When a product not stocked on the sales floor the motorized transport unit can report this to the customer. Additionally, the central computer system may notify a worker to acquire the product and take it to the customer (e.g., based on a predefined location, based on a location of the motorized transport unit while the customer continues to shop with the assistance of the motorized transport unit, etc.), and/or instructs the worker to restock the sales floor product storage unit. Similarly, when the product that the customer is looking for is out of stock or not carried by the shopping facility, the central computer system can detect this and notify the customer. Information about when the product will back be in stack may also be provided, and/or one or more alternatives may be presented (e.g., based on similarities to the requested product, customer's response to one or more clarification inquiries, customer's buying history, etc.). Still further, in some instances, the central computer system may identify where the product may be acquired (e.g., from another store, through an on-line service, etc.), and may provide information such as pricing.

In some instances, marketing information and/or other information may be provided to the customer regarding the category and/or product requested, companion products or other products that the customer may be interested in. Taking advantage of travel time through the store as the motorized transport unit guides the customer to a location of a category of products or one or more specific products, the central computer system can provide product information and/or marketing information about the category of products, one or more products within the category of products, and other products. Such information may include customer ratings of products in helping the customer identify a product the customer may want to purchase, most purchased products, pricing information, sales information, product marketing information (e.g., differences about a product over other products), price comparisons between other products and/or other retailers, and other such information. For example, a customer and clarification inquiry exchange may be similar to a customer asking "Where are the toys?", with a replay similar to "Certainly, toys are located on isles 15-19, let me guide you."; as the motorized transport unit is guiding the customer a clarification inquiry may include "Are you looking for a toy for a boy or a girl?"; with the customer responding "a girl"; a subsequent clarification inquiry may be "How old is the girl?"; with the customer responding "five."; and one or more subsequent clarification inquiries being further details about toys for five year old girls, such as "The top rated toy for girls age five is currently product G", "The top three selling toys for five year older girls through this shopping facility are currently products G, H and J", "May we recommend product K, which is one of our most popular toys for girls age five and is on sale for $X", or other such information. This exchange can occur while the customer is being guided through the shopping facility, saving the customer time and perhaps making selecting a product easier (again saving the customer time). Again, in some instances, cross-marketing may be presented, such as "Do you also need wrapping paper or a gift bag?".

Figure 14:
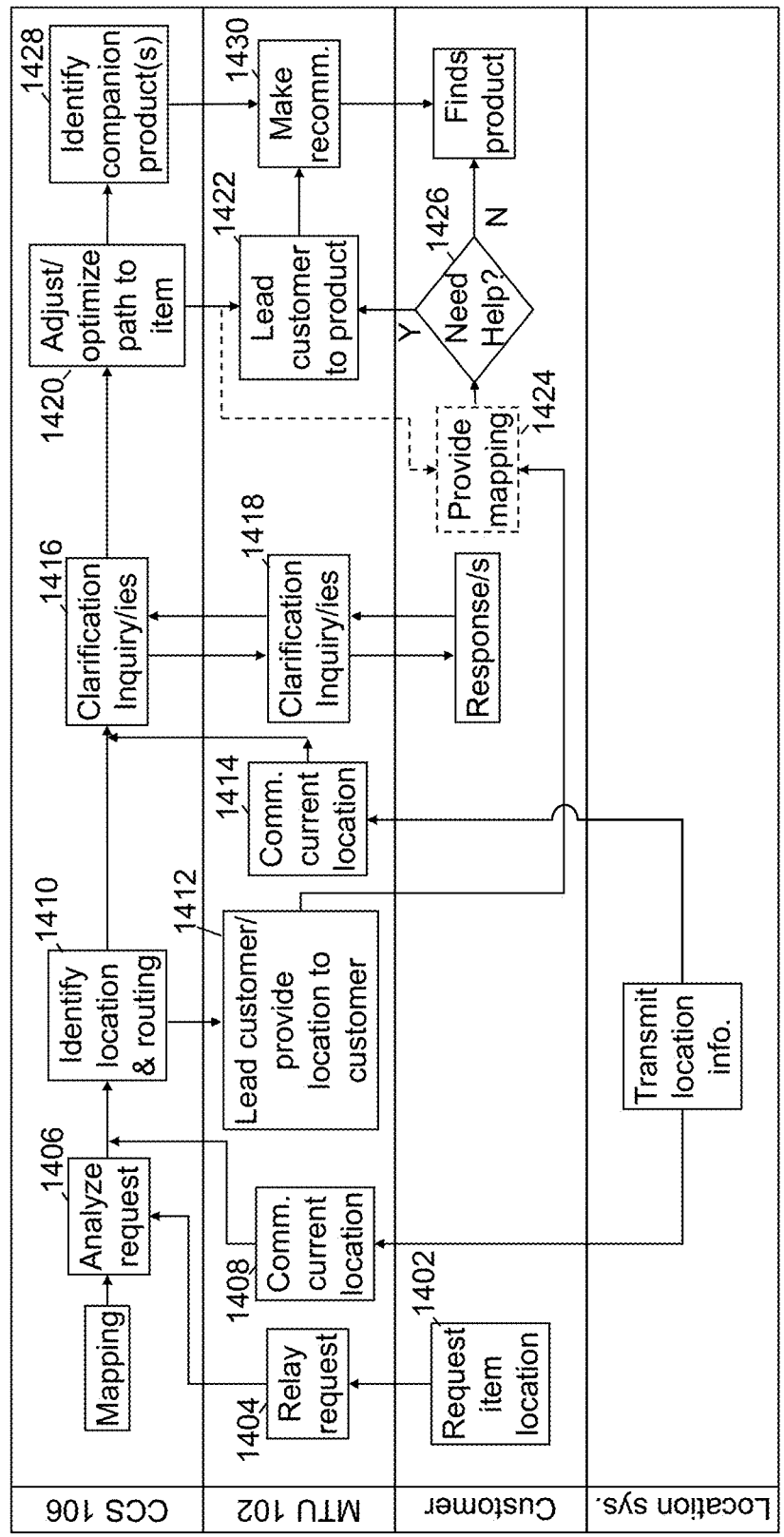
FIG. 14 illustrates an exemplary flow diagram of a process of supporting a customer, in accordance with some embodiments.

FIG. 14 illustrates an exemplary flow diagram of a process of supporting a customer, in accordance with some embodiments. In step 1402, a customer requests location information for an item. Again, the request may identify a specific product or a category of items. In step 1404, the motorized transport unit receives the request and forwards the request to the central computer system 106. Using mapping information and product inventory information, the central computer system in step 1406 analyzes the request.

The analysis can include identifying one or more relevant search terms (e.g., by comparing terms to a listing of relevant and/or non-relevant terms), accessing a listing of products, categories, sub-categories, and/or other such organization of product information, initiating a search through a database, other such evaluations, or a combination of two or more of such evaluations. In step 1408, the motorized transport unit and/or the customer's user interface unit communicates current location information. For example, in some instances, light identifiers are detected by one or more sensors of the motorized transport unit, item container or the like and forwarded to the central computer system; location codes that are positioned at known locations in the shopping facility are read and forwarded to the central computer system; movement sensor information from movement sensors of the motorized transport unit can be provided to the central computer system; and other such location information or a combinations of two or more of such information can be provided to the central computer system.

In step 1410, central computer system identifies a location of the requested category and/or product of interest. In some embodiments, the central computer system accesses an inventory database and acquires the location information. The location information of the customer and/or motorized transport unit is used in combination with the location of the category, sub-category, product of interest in determining a route that the motorized transport unit is to travel and/or a route that is to be recommended to the customer. In step 1412, the routing instructions are communicated to the motorized transport unit to cause the motorized transport unit to travel through the shopping facility toward the intended category and/or product of interest. Additionally or alternatively, in some instances audio instructions are communicated from the central computer system that cause the motorized transport unit to generate an audible output of directions that direct the customer to the location of the category and/or desired product. Typically, the motorized transport unit, and in some instances a user interface unit, continue to communicate location information in step 1414 to the central computer system allowing the central computer system to adjust routing if needed.

Some embodiments include step 1416 where the central computer system evaluates one or more responses from the customer in identifying a category of products and communicates one or more clarification inquiry instructions to the motorized transport unit. In step 1418, the motorized transport unit presents the one or more inquiries to the customer (e.g., through audible output, display, user interface unit, etc.), and returns one or more responses to the central computer system. Often, the clarification inquiry is presented while the motorized transport unit is traveling through the shopping facility directing the customer to an intended location (e.g., category location). Further, any number of exchanges between the central computer system and the motorized transport unit (or user interface unit) may occur as the central computer system evaluates one or more responses and communicates one or more follow up clarification inquiries.

In some instances, the central computer system may further adjust and/or change routing instructions at step 1420 to redirect the motorized transport unit based on one or more factors such as, but not limited to, responses to clarification inquiries, congestion in the shopping facility, determined companion products, and the like. In step 1422, the motorized transport unit continues to lead the customer to the category and/or product of interest. In some embodiments, a mapping may be presented to the customer in step 1424. Further, the customer can be asked in step 1426 whether the customer would like help in finding the product and/or to have the motorized transport unit take the customer to the intended location. In step 1428, the central computer system may identify one or more companion products and/or other products to market to the customer. In step 1430, the central computer system can communicate companion product instructions to the motorized transport unit to cause the motorized transport unit to propose the purchase of at least one of the companion products by presenting to the customer the identifying information of the at least one companion product (e.g., audible output with the recommendation, displaying a recommendation, etc.). One or more of the steps and/or combinations of steps can be repeated until one or more products are found.

One or more motorized transport units can be called on at any time to assist a customer, worker or the like to locate an item within the shopping facility and route the customer to the item. Some embodiments use voice recognition to capture a request, and direct the request to the central computer system that identifies the location of a category of items, items, a specific product, etc., and communicate location information to the motorized transport unit, the customer's user interface unit or the like. The central computer system may be further configured to evaluate and/or determine inventory based on the request. Further, a mapping may be displayed (e.g., through user interface), and/or communicated to a customer's user interface unit. Using the determine location information, the map may display the customer's current location and the location of the category of products, a particular product, etc., and a routing through the shopping facility. The routing may be a quickest path for the customer, based on a location of one or more potential companion products, other products a customer may be interested in purchasing, etc. Further, the location information may include a representation, image (e.g., 2D or 3D image) of the shelf on which the requested product is placed to help the customer establish both a horizontal and vertical position of the product. Some embodiments may further present marketing material (e.g., pricing, price comparison, benefits, ratings, etc.).

Again, the motorized transport unit is a multi-function device. In some instances, the motorized transport unit, in addition to performing an item location task and directing a customer to a product or category, the motorized transport unit may also be driving an item container through the shopping facility for the customer. When not performing an item location function, the motorized transport unit may perform other tasks, such as transport products from a back storage area, implementing a clean-up, transporting one or more item containers, and other such tasks. As described above, the central computer system may communicate an item container instruction directing the motorized transport unit to temporarily cooperate with a movable item container. Further, the motorized transport unit may be cooperated with an item container such that the motorized transport unit in implementing routing instructions drives the item container toward one or more products categorized within an identified category. The motorized transport unit may notify the central computer system when it has completed an item location task.

In some embodiments, apparatuses and methods are provided herein useful to enhance customer service. In some embodiments, a system comprises: multiple self-propelled motorized transport units; a wireless communication network; and a central computer system that is separate and distinct from the multiple motorized transport units; wherein the central computer system comprises: a transceiver configured to communicate with the multiple motorized transport units located at the shopping facility; a control circuit coupled with the transceiver; and a memory coupled to the control circuit and storing computer instructions that when executed by the control circuit cause the control circuit to: receive, through a motorized transport unit, a request from a customer requesting location information for a requested item; identify the requested item is a category of items and not a specific product, and identify category location information corresponding to the requested category; communicate routing instructions to the motorized transport unit based on the category location information causing the motorized transport unit to initiate physical movement; and communicate to the motorized transport unit a species clarification inquiry instruction configured to cause the motorized transport unit, while implementing routing instructions to move toward the category location, to present a clarification inquiry to the customer seeking clarification in narrowing the identified category to one or more products categorized within the identified category.

Some embodiments provide methods of directing customers to product locations within a shopping facility in response to a customer inquiry. In some embodiments, a method of providing customer assistance comprises: by a control circuit: receiving, through a motorized transport unit at a shopping facility, a request from a customer requesting location information for a requested item; identifying the requested item is a category of items and not a specific product, and identifying category location information corresponding to the requested category; communicating routing instructions to the motorized transport unit based on the category location information causing the motorized transport unit to initiate physical movement; and communicating to the motorized transport unit a species clarification inquiry instruction configured to cause the motorized transport unit, while implementing routing instructions to move toward the category location, to present a clarification inquiry to the customer seeking clarification in narrowing the identified category to one or more products categorized within the identified category.

Some embodiments provide a system providing customer assistance at a shopping facility, comprising: multiple self-propelled motorized transport units; a wireless communication network; and a central computer system that is separate and distinct from the multiple motorized transport units; wherein the central computer system comprises: a transceiver configured to communicate with the multiple motorized transport units located at the shopping facility; a control circuit coupled with the transceiver; and a memory coupled to the control circuit and storing computer instructions that when executed by the control circuit cause the control circuit to: receive, through a motorized transport unit, a request from a customer requesting location information for a requested item; identify the requested item is a category of items and not a specific product, and identify category location information corresponding to the requested category; communicate routing instructions to the motorized transport unit based on the category location information causing the motorized transport unit to initiate physical movement; and communicate to the motorized transport unit a species clarification inquiry instruction configured to cause the motorized transport unit, while implementing routing instructions to move toward the category location, to present a clarification inquiry to the customer seeking clarification in narrowing the identified category to one or more products categorized within the identified category. In some implementations, the control circuit in executing the instructions is further configured to: identify, based on a reply from the customer to the clarification inquiry, one or more products of interest; obtain, based on the one or more products of interest and from an inventory database, identifying information of one or more recommended companion products that correspond with the one or more products of interest that the customer may further wish to purchase in relation to one or more products categorized within the identified category; and communicate a companion product instruction to the motorized transport unit configured cause the motorized transport unit to propose the purchase of at least one of the companion products by presenting to the customer the identifying information of the at least one companion product.

Marketing information regarding the at least one companion product may be obtained in some implementations, wherein the communication of the companion product instruction is further configured to cause the motorized transport unit to present the marketing information when proposing the at least one companion product to the customer. The control circuit in executing the instructions can be configured to: identify companion product location information corresponding to the at least one companion product; wherein the communicating the routing instructions to the motorized transport unit directs the customer to a location of a product of interest and a location of the at least one companion product.

In some embodiments, the control circuit in executing the instructions is further configured to: identify, based on information provided by the customer in a response to the clarification inquiry, a product of interest; identify, as specified in an inventory database, location information corresponding to the product of interest, wherein the location information for the product of interest comprises a visual representation of a vertical placement of the product of interest on a storage unit within the shopping facility relative to one or more other surrounding products; and cause the location information to be communicated such that the location information of the product of interest is provided to the customer including causing the visual representation of the vertical placement of the product of interest to be displayed and visible to the customer. The control circuit, in some implementations, is configured to: identify, based on multiple clarification replies from the customer to multiple clarification inquiries presented to the customer, a product of interest; identify, as specified in an inventory database, location information corresponding to the product of interest; and cause the location information to be communicated such that the location information is provided to the customer. The control circuit in causing the location information to be communicated may cause mapping information to be wirelessly communicated to the customer's user interface unit to be displayed on the user interface unit. In some implementations, the control circuit in executing the instructions is further configured to communicate an item container instruction directing the motorized transport unit to temporarily cooperate with a movable item container such that the motorized transport unit in implementing routing instructions drives the item container toward the one or more products categorized within the identified category.

Some embodiments provide a method of providing customer assistance at a shopping facility, comprising: by a control circuit: receiving, through a motorized transport unit at a shopping facility, a request from a customer requesting location information for a requested item; identifying the requested item is a category of items and not a specific product, and identifying category location information corresponding to the requested category; communicating routing instructions to the motorized transport unit based on the category location information causing the motorized transport unit to initiate physical movement; and communicating to the motorized transport unit a species clarification inquiry instruction configured to cause the motorized transport unit, while implementing routing instructions to move toward the category location, to present a clarification inquiry to the customer seeking clarification in narrowing the identified category to one or more products categorized within the identified category. Some embodiments identify, based on a reply from the customer to the clarification inquiry, one or more products of interest; obtaining, based on the one or more products of interest and from an inventory database, identify information of one or more recommended companion products that correspond with the one or more products of interest that the customer may further wish to purchase in relation to one or more products categorized within the identified category; and communicate a companion product instruction to the motorized transport unit configured cause the motorized transport unit to propose the purchase of at least one of the companion products by presenting to the customer the identifying information of the at least one companion product.

In some instances, the method comprises obtaining marketing information regarding the at least one companion product; wherein the communicating the companion product instruction is further configured to cause the motorized transport unit to present the marketing information when proposing the at least one companion product to the customer. Some implementations identify companion product location information corresponding to the at least one companion product; wherein the communicating the routing instructions to the motorized transport unit directs the customer to a location of a product of interest and a location of the at least one companion product. Some implementations identify, based on information provided by the customer in a response to the clarification inquiry, a product of interest; identify, as specified in an inventory database, location information corresponding to the product of interest, wherein the location information for the product of interest comprises a visual representation of a vertical placement of the product of interest on a storage unit within the shopping facility relative to one or more other surrounding products; and cause the location information to be communicated such that the location information of the product of interest is provided to the customer including causing the visual representation of the vertical placement of the product of interest to be displayed and visible to the customer.

In some embodiments, a method comprises: identifying, based multiple clarification replies from the customer to multiple clarification inquiries presented to the customer, a product of interest; identifying, as specified in an inventory database, location information corresponding to the product of interest; and causing the location information to be communicated such that the location information is provided to the customer. The causing the location information to be communicated, in some applications, comprises causes mapping information to be wirelessly communicated to the customer's user interface unit to be displayed on the user interface unit. Some embodiments communicate an item container instruction directing the motorized transport unit to temporarily cooperate with a movable item container such that the motorized transport unit in implementing routing instructions drives the item container toward the one or more products categorized within the identified category.

In accordance with some embodiments, further details are now provided for one or more of these and other features. For example, generally speaking, pursuant to various embodiments, systems, apparatuses, processes and methods are provided herein that enable restoring shopping space conditions is provided.

An MTU may be an intelligent robotic device capable of carrying out various tasks either alone, in conjunction with another MTU, or in concert with a remote central system. An MTU with store cleaner capabilities allows store associates and/or a central computer system to direct the MTU to a specific location within the store for the purpose of performing clean up. Using cleaning equipment as well as multiple other assisting technologies on board, an MTU can drive itself to specific location to restore the condition of a specific region of the store floor. The MTU may use one or more of sensors, predetermined routes, boundaries, store map, intelligent tag, GPS, compass, smart device, and "bird's eye view" video analytics to carryout facility floor cleaning tasks.

The systems and methods described herein may support many situations including searching, identifying, monitoring, and cleaning locations on the store floor space, and alerting and communicating with a central system and/or store associates regarding any detected spill condition. An MTU system with floor cleaning capabilities can function to increase productivity in a retail outlet or distribution center by enabling teams to carry out more value added activities.

An MTU with cleaning capabilities may be configured to be directed to go to specific location within the store, identify specific area (the MTU may also put signs around the area to be cleaned) at that specific location for the purpose of cleaning it, and alerting a store manager/associate when the job is done or not. Multiple MTUs may be configured to collaborate to carry out a cleaning task. An automated MTU store floor cleaner may be configured to follow instructions from a central computer system and/or from an associate in store to carry out cleaning operation.

There may be times during the store operation hours when an area of the floor of the facility become dirty/messy due to a spill of liquid or other things on the floor. A spill may prevent an in-store customers from freely navigating within the store. A spill can potentially be a considerable problem for store associates especially when there are lots of customers to take care of but not enough associates in the store at the time to go clean up the mess. Much time and effort is required for keeping the facility floor in optimal condition where the customers would feel safe and welcomed to shop within the store.

An MTU may attach itself with a cleaning part and travel to a dirty floor location. The MTU may then scan the floor to determine optimal cleaning steps. As an MTU determines the cleaning steps, it may seek collaboration from other MTU. For example, an MTU may place a wet floor sign and/or a boundary around the dirty area so that the other MTU can reliably complete the cleaning steps. In some embodiments, the MTU may also seek assistance from store associates. While assistance from other MTU may be utilized for more complex cleaning task, a single MTU may perform some cleaning tasks on its own.

In some embodiments, floor spill cleaning may be a capability of an MTU that responds to an associate request for spill clean-up. The associate may input aisle number and closest module number into their smart device to request a spill cleaner MTU. In some embodiments, customers can also notify an MTU unit of a spill and the MTU may relay that information to the central computer system to send a spill cleaner unit to the spill site. In some embodiments, a spill detection system (e.g. a camera system for providing image for video analytics of the sales floor) may notify the central computer of a stagnant obstacle and cause a spill cleaning unit to travel to the location of the obstacle. Spill cleaner functionality of the MTU system can function to simultaneously address two problems. The first problem is when a spill occurs, an associate has to stop what they are doing and guard the spill until maintenance can get there. A spill cleaner MTU can be utilized to reduce or eliminate the wait time from when a call for maintenance is made to when maintenance arrives, which will shorten the time that an associate is not working. Along with getting the associate back to their tasks, the MTU may also allow maintenance to continue with their designated task. A spiller cleaner MTU may also help address the issue of shrink in inventory tracking. An MTU may be configured to automatically scan the invisible/visible bar code(s) around the spill, process the label image, and/or read the RFID of the product when it cleans up the mess. The gathered information may be automatically sent to the central computer and added to the claims log to update inventory information. For example, a spilled item may be reported as shrinkage and deducted from the inventory count. In some embodiments, if the MTU cannot detect the wasted product, it may notify an associate for assistance. The associate may then override the scan or scan another whole product of the same type and kind to report to the claims log.

The MTU may combine the use of a geo-location beacon (e.g. smart LED) to navigate near a floor location, perform video analytics and object detection to identify a specific floor area of the spill, and place a boundary with placing signboards around the identified area. An MTU may further be attached to or include cleaning parts for carrying out cleanup.

Figure 15:
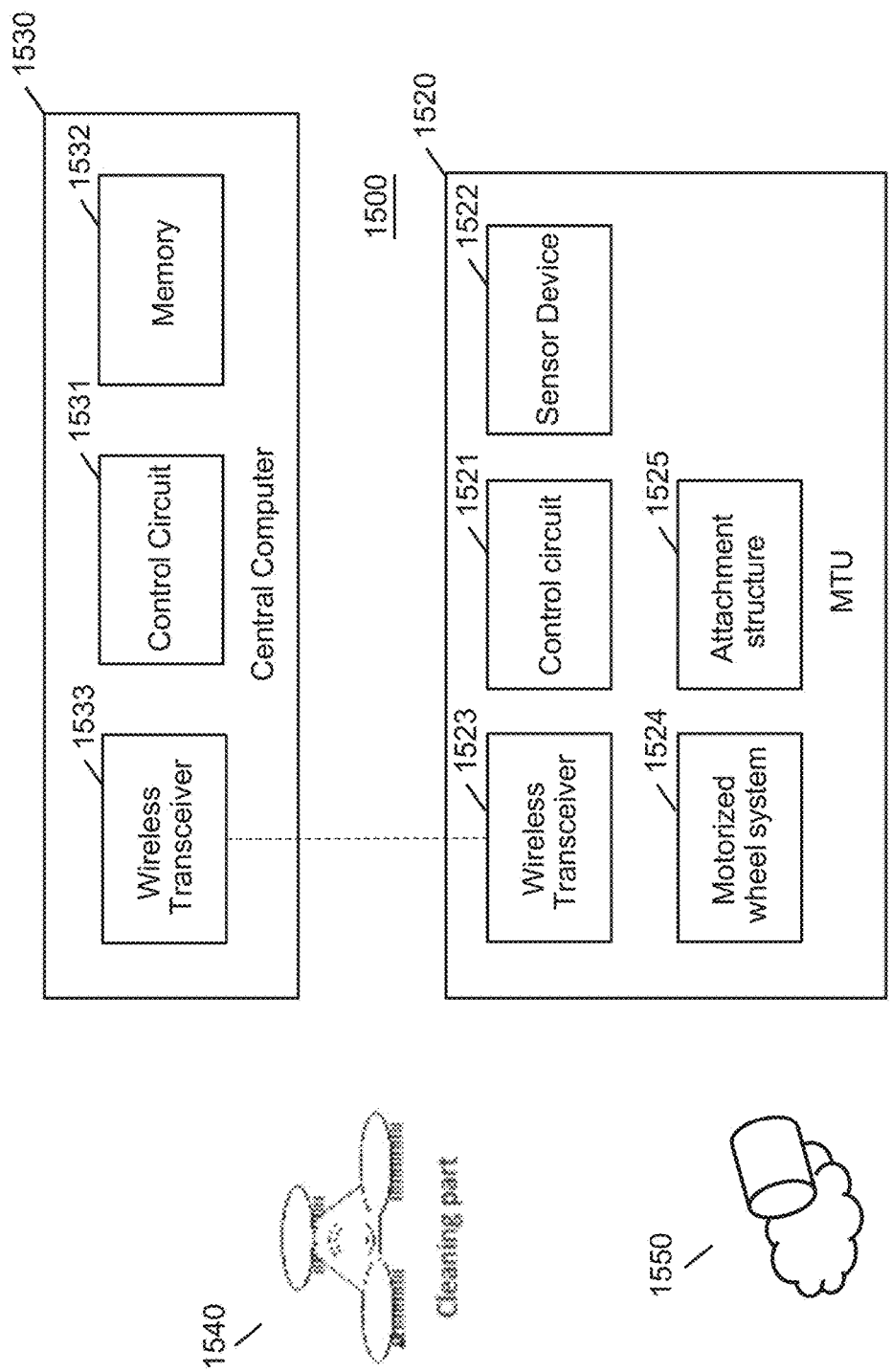
FIG. 15 comprises a block diagram of a system for restoring shopping space conditions in accordance with some embodiments.

FIG. 15 illustrates a block diagram of a system 1500 for restoring shopping space conditions as configured in accordance with various embodiments of these teachings. The system 1500 includes a central computer system 1530 and an MTU 1520. The system is configured to identify a dropped item 1550 and assign a cleaning task based on the detected dropped item 1550. In some embodiments, the system is further configured to cause the MTU 1520 to attach to a cleaning part 1540 to clean a spill associated with the dropped item 1550. The system 1500 may include or may be implemented at least partially with one or more components shown in FIGS. 1, 4, and 5 or may be more generically implemented outside of the system described with reference to FIGS. 1, 4 and 5.

The central computer system 1530 includes a control circuit 1531, a memory 1532, and a wireless transceiver 1533. The central computer system 1530 may generally be referred to as a processor-based device, a computing device, a server, and the like. In some embodiments, the central computer system 1530 may be implemented with one or more of the central computer system 106 and/or the computer device 500 described above. For example, the functionalities of the central computer system 1530 described herein may be implemented as one or more software and/or hardware modules in the central computer system 106.

The central computer system 1530 has stored on its memory 1532, a set of computer readable instructions that is executable by the control circuit 1531 to cause the control circuit 1531 to detect a dropped item 1550, identify at least one characteristic of the dropped item, and assign a cleaning task based on the identified characteristic of the dropped item. The central computer system 1530 may receive sensor data from the MTU 1520 via the wireless transceiver 1533 and/or may provide instructions to perform one or more tasks to the MTU 1520 via the wireless transceiver 1533.

In some embodiments, the central computer system may receive a dropped item notification from one or more of a customer, a store associate, an MTU, and a store sensor system. In some embodiments, the central computer system 1530 may receive images from an image sensor implemented on the MTU 1520, another MTU, or a stationary camera system to detect the dropped item. For example, the central computer system 1530 may compare a current image of a section of the shopping space with a baseline image to determine whether an item has been dropped on the floor. In some embodiments, the baseline image may be a pattern of the flooring in the shopping space. In some embodiments, the system may compare images of a section taken over time to distinguish between dropped items and moving objects such as customers in the shopping space. In some embodiments, the central computer system 1530 may further receive sensor data from the MTU 1520 to determine a characteristic of the dropped item. In some embodiments, the central computer system 1530 may be located inside of and serve a specific shopping space. In some embodiments, the central computer system 1530 may be at least partially implemented on a remote or cloud-based server that provides instructions to MTUs in one or more shopping spaces. Embodiments of the functions of the central computer system 1530 in a system for restoring store condition is describe in more detail herein with reference to FIGS. 16-18 below.

The MTU 1520 may be the MTU 102 described in FIG. 1, the MTU shown in FIGS. 2A-3B, and/or the MTU described in FIG. 4. Generally, an MTU may be a motorized device having a control circuit 1521, a wireless transceiver 1523, a sensor device 1522, a motorized wheel system, and an attachment structure 1525 for attaching to cleaning part 1540. The MTU 102 may generally be configured to travel in a shopping space according to instructions received from a central computer system 1530.

The control circuit 1521 may be configured to receive a dropped item location from the central computer system 1530 via the wireless transceiver, cause the motorized wheel system 1524 to travel to the location of the dropped item 1550, and use the sensor device 1522 to collect information about the dropped item 1550. In some embodiments, the control circuit 1521 is further configured to receive a cleaning task from the central computer system 1530, travel to a specified cleaning part 1540, attach to the cleaning part 1540 via the attachment structure 1525, and travel back to the dropped item 1550 to perform a cleaning task using the cleaning part 1540.

The wireless transceiver 1523 may be any wireless communication transceiver such as wi-fi transceiver, blue-tooth transceiver, and the like. The attachment structure 1525 may include one or more of a clamp, a clip, a magnet, a latch, and the like for attaching to the cleaning part 1540. In some embodiments, the attachment structure 1525 may attach to the cleaning part 1540 with similar means as the structure for attaching to a shopping cart described herein with reference to FIGS. 2A-B and 3A-B herein. The motorized wheel system 1524 may include and/or be similar to the motorized wheel system 410 described herein.

The sensor device 1522 may include one or more of an image sensor, an infrared sensor, a temperature sensor, a gas sensor, a moisture sensor, a sonar sensor, a range sensor, a bar-code reader, a radio frequency identification (RFID) reader, etc. In some embodiments, sensor device 1522 may include one or more of the sensors on MTUs 102 described with reference to FIG. 1 above. The system 1500 may use the sensor device 1522 to capture in image of the dropped item, scan an optically readable code on the dropped item, and/or read a RFID tag on the dropped item to determine the identity of the dropped item. In some embodiments, the system may further use one or more of the temperature sensor, the moisture sensor, and the gas sensor to determine whether liquid, solid, or gas has spilled in the area of the dropped item. Based on the information gathered by the sensor device 1522, the system may determine whether the spill include one or more of a polar liquid, a non-polar liquid, a powder, a solid, a loose item, glass, a sharp object, fumes, a hazardous material, etc. The system may further be configured to select a cleaning task according to the determined characteristic of the dropped item.

In some embodiments, the MTU 1520 may further be configured to detect the presence of a dropped item and/or a spill using the sensor device 1522. For example, when an MTU is traveling around the store on one or more assigned tasks, it may captured images of its surrounding and report any detected dropped item and/or spill to the central computer system 1530. In some embodiments, the central computer system 1530 may further instruct the MTU 1520 or another MTU unit to perform a cleaning task to remove the dropped item 1550 and any associated spill from the shopping space. In some embodiments, the MTU 1520 may be configured to place signs and/or cones around the spill to prevent customers from stepping on the spill. In some embodiments, the MTU 1520 be configured to travel to a cleaning part 1540 and attach itself to a cleaning part 1540. The MTU may then return to the spill area to perform clean up using the cleaning part 1540.

In some embodiments, a cleaning task may be assigned to two or more MTUs to perform together. For example, an MTU may be instructed to brush the dropped item 1550 into a pan attached to a second MTU. In some embodiments, the MTU 1520 may be instructed to perform a cleanup task with a store associate. For example, an MTU may provide audio and/or visual instructions to an associate on how to perform the clean-up. In some embodiments, the MTU may retrieve one or more cleaning supplies for an associate. In some embodiments, the MTU may carry the dropped item and/or the used cleaning supply away from the shopping space for the associate.

The cleaning part 1540 may include one or more of a brush, a broom, a dust pen, a dry mop, a wet mop, a vacuum, and the like. In some embodiments, the cleaning part may also include different types of cleaning solutions such as water, cleaning alcohol, soap, bleach, solvent, etc. In some embodiments, the MTU 1520 may be further instructed to retrieve the cleaning solution in addition to the cleaning part. In some embodiments, the cleaning part 1540 may include an attachment device for attaching to the MTU 1520. The cleaning part 1540 may be attached to the bottom, top, or side of the MTU 1520. In some embodiments, the cleaning part 1540 may be pushed or pulled by the MTU 1520. The cleaning part 1540 may be powered or unpowered. The cleaning part 1540 may include its own power supply or may be powered by the battery of the MTU 1520. In some embodiments, the MTU may be configured to request assistance from associates in attaching itself to a cleaning part. While the cleaning part 1540 is shown as separate from the MTU 1520 in FIG. 15, in some embodiments, the cleaning part 1540 may be integrated with or semi-permanently attached to an MTU. In some embodiments, instead of instructing the MTU 1520 to attach to a cleaning part 1540, the system may instruct a specialized MTU having a cleaning part to travel to the dropped item to perform cleanup. In some embodiments, the same or different MTUs may initially detect the dropped item 1550, collect information to determine one or more characteristics of the dropped item, and perform the cleanup task.

The dropped item 1550 may generally may be any item in the shopping space. For example, the dropped item may be a can, a bottle, a produce item, a boxed item, and the like. The dropped item may be an item offered for sale, a store signage, a store decoration, a customer item (e.g. beverage brought in by a customer), etc. In the description herein, a dropped item may or may not include a spill of the content of the item and a spill may refer to one or more of solid and liquid substance on the floor of a shopping space.

The central computer system 1530 may further include or communicate with an item characteristics database (not shown). The item characteristics database may be a non-transitory memory storage that stores one or more characteristics of a plurality of items. The item characteristics database may be coupled to the central computer system 1530 through one or more of local, remote, cloud-based, wired, and wireless connections. In some embodiments, the item characteristics database may be at least partially implemented on one or more of the memory 1532, the database 126, the memory 110, the memory 408, and the memory 504 described herein. The item characteristics database may have stored upon it a plurality of item identifiers (product name, product type, barcode, RFID tag, etc.) and one or more characteristics associated with each item identifier. For example, each item may be tagged as including one or more of a polar liquid, a non-polar liquid, a powder, a solid, a loose item, glass, a sharp object, fume, a hazardous material, etc. For example, a glass bottle of olive oil may be tagged as including non-polar liquid (e.g. oil) and sharp object (e.g. glass bottle). In another example, a can of pickles may be tagged as including polar liquid (e.g. pickling juice) and solid (e.g. pickle). When the system 1500 identifies the dropped item 1550, the system may retrieve the characteristics associated with the dropped item from the item characteristics database to determine the appropriate cleanup task. In some embodiments, the sensor device 1522 on the MTU 1520 may be used to determine addition characteristics of the dropped item and/or whether the content of the item has actually been spilled. For example, the MTU 1520 may measure the moisture level and/or the temperature around the dropped item 1550 to determine whether there is liquid on the floor. In another example, the MTU 1520 may capture images of the dropped item 1550 so that the system can determine whether the content of the dropped item 1550 has been spilled using image analysis. In some embodiments, if the dropped item 1550 is not an item in the item characteristics database (e.g. a beverage brought in by a customer), the system may rely on the sensor device 1522 and/or a camera system to determine one or more characteristics of the dropped item and/or the spill.

Figure 16:
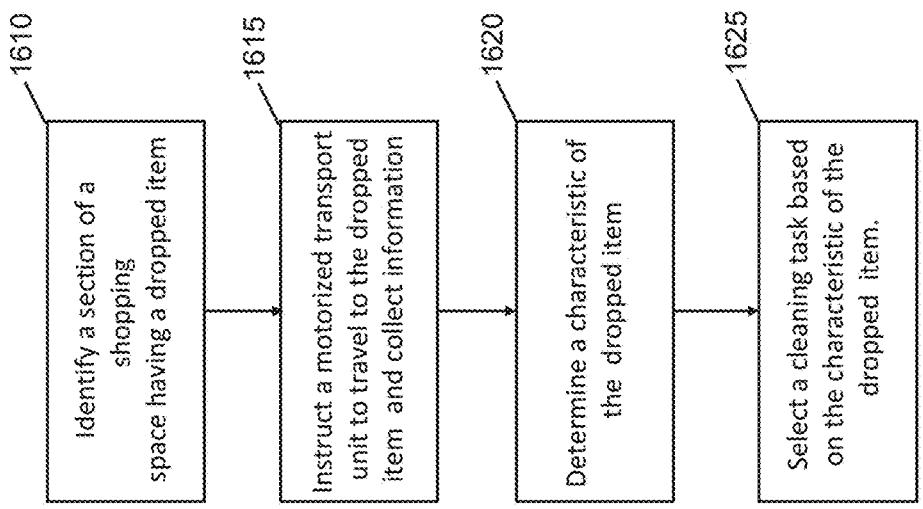
FIG. 16 comprises a flow diagram of a method for restoring shopping space conditions in accordance with some embodiments.

FIG. 16 shows a flow diagram of a method for restoring shopping space conditions in accordance with various embodiments of these teachings. In some embodiments, the steps shown in FIG. 16 may be performed by one or more of the central computer system 1530 in FIG. 15, the central computer system 106 in FIG. 1, and the computer device 500 in FIG. 5, for example. In some embodiments, the steps are performed by a processor-based device executing a set of computer readable instructions stored on a memory device.

In step 1610, the system identifies a section of a shopping space having a dropped item. In some embodiments, the system may monitor sections of a shopping space with a camera system stationed around the shopping space. In some embodiments, the system may compare images of floors in the shopping space with known patterns of flooring. In some embodiments, the system may compare the images of a second taken over time to distinguish moving objects (customers, carts, baskets, etc.) from stationary objects which may likely be a dropped item. In some embodiments, the system may receive a dropped item notification from an MTU that is traveling around the shopping space on a task unrelated to the dropped item (e.g. escort customer, retrieve shopping cart, scan shelves, etc.). An MTU may continuously capture images of its surrounding when it travels around the shopping space and may identify a dropped item on a spacing space floor. An MTU may also encounter a dropped item at least partially abstracting its path of travel. In such embodiments, the MTU may provide images and/or other sensor data of the dropped item to the system for further identification and analysis. In some embodiments, the system may receive a dropped item notification from a customer and/or a store associate. The customer and/or the store associate may alert the system of a dropped item via one or more of an MTU and/or a stationary or portable user interface unit (e.g. portable computer, mobile device, smartphone, etc.). The system may use the location information of the MTU and/or the stationary or portable user interface unit to determine an approximate location of the dropped item. In some embodiments, the system may prompt the customer and/or store associate to enter a location (e.g. aisle or module number) for the dropped item. In some embodiments, after receiving a dropped item alert, the system may use the in-store camera system to confirm and/or determine a more precise location of the dropped item.

In step 1615, the system instructs a motorized transport unit to travel to the section of the shopping space having the dropped item and collect information relating to the dropped item. In some embodiments, if the dropped item was initially noticed by an MTU, the system may instruct the same MTU to approach the item to collect additional information. In some embodiments, the system may instruct the first MTU that noticed the dropped item to carry on its original task (e.g. escort customer, retrieve shopping cart, etc.) and instruct a second MTU to investigate the dropped item. The system may instruct the MTU to travel to the general area (e.g. a cell in a grid) associated with the dropped item and the MTU may use one or more sensors to pin point the location of the dropped item within the area. In some embodiments, the MTU may be instructed to keep a distance from the dropped item as to not travel over the spillage content. In some embodiments, the MTU and/or the system may determine a perimeter of any spillage content before approaching the dropped item.

Also in step 1615, once the MTU is in proximity of the dropped item and/or spillage, the MTU collects information associated with the dropped item using at least one sensor on the MTU. The MTU may include one or more of an image sensor, an infrared sensor, a temperature sensor, a gas sensor, a moisture sensor, a sonar sensor, a range sensor, a bar-code reader, a radio frequency identification (RFID) reader, etc. The MTU may travel to the location of the dropped item and selectively turn on one or more sensors based on instructions received from the central computer system. The MTU may then relay the collected information to the central computer system for analysis.

In step 1620, the system determines at least one characteristic of the dropped item based on information collected by the sensor on the MTU in step 1615. The system may use the sensor on the MTU to capture in image of the dropped item, scan an optically readable code on the dropped item, or read a RFID tag on the dropped item to identify of the dropped item. In some embodiments, the characteristic of a dropped item may be retrieved from an item characteristics database based on the determined identity of the item. For example, an item having a barcode that correspond to a glass bottle of olive oil may be determined to have the characteristics of non-polar liquid (e.g. oil) and sharp object (e.g. glass bottle). In another example, an image of the dropped item includes a label for dill pickle may be determined to have the characteristics of polar liquid (e.g. pickling juice) and solid (e.g. pickle). In some embodiments, the system may use one or more of the temperature sensor, the moisture sensor, and the gas sensor to determine whether liquid, solid, and/or gas has spilled in the area of the dropped item. For example, the MTU may use a remote temperature sensor to measure the temperature of a clean floor area and the area around the dropped item. If a temperature differential exceeding a threshold value is detected, the system may determine that the liquid has been spilled. In another example, a gas sensor on the MTU may detect for harmful gas in the air to determine whether hazardous gas has leaked. In yet another example, an optical sensor on the MTU may be used to determine one or more chemical properties of the content of the spill. In some embodiments, the system may retrieve at least some of the characteristics of the dropped item from the item characteristic database and the sensor on the MTU may be used to determine whether the content of the item has actually been spilled. In some embodiments, if the dropped item is not an item in the item characteristics database (e.g. a beverage brought in by a customer) or the dropped item is not easily identifiable (e.g. label and/or barcode is not visible to the MTU), the system may rely on the sensor and/or a camera system to determine one or more characteristics of the dropped item and/or the spill.

In step 1625, the system selects a cleaning task based on the characteristics of the dropped item determined in step 1620. In some embodiments, the cleaning task may be selected form one or more of retrieve a cleaning tool, retrieve a cleaning supply, place a barrier around the dropped item, remove the dropped item from the section of the shopping space, and report a hazardous condition. In some embodiments, the cleaning task may be machine instructions provided to one or more MTUs to carry out the cleaning task and/or natural language instructions provided to a store associated. In some embodiments, the cleaning task may be assigned to two or more MTUs and/or store associates to perform together. The system may further select a cleaning tool from a plurality of cleaning tools and/or a cleaning supply from a plurality of cleaning supplies based on the characteristics of the dropped item. For example, if the content of the dropped item is not spilled, the task may be to inspect the item for damage and either remove the item from the shopping space or return the item to the display shelf based on the condition of the item. If the spill content of the item is solid (e.g. a box of breakfast cereal) the cleaning task may specify a broom-type cleaning tool for sweeping the solid content. If the spilled content of the item includes polar liquid (e.g. oil), the cleaning task may specify a mop-type cleaning tool and a soap-type cleaning solution. In some embodiments, the dropped item contains hazardous material (e.g. toxic liquid or fume) the system may issue an alert and have either the MTU and/or store associates keep customers away from the spill area. In some embodiments, multiple cleaning tasks may be assigned based on one dropped item. For example, a first task may be assigned to an MTU or a store associate to place signs around the spillage, a second task may be assigned to an MTU to retrieve cleaning supply, and a third task may be assigned to a store associate to pick up the dropped item using the retrieve cleaning supply. Generally, the system may variously configure the cleaning task assignment based on one or more characteristics of the dropped item and/or the spill to more effectively restore the shopping space after an item is dropped on the shopping space floor without departing from the spirit of the present disclosure.

In some embodiments, after step 1625, the system may communicate the cleaning task selected in step 1625 to one or more MTUs and/or associates. The instructions may be provided as machine instructions to MTUs and/or as natural language descriptions to store associates (e.g. "bring mop and bucket to aisle 4"). The system may continue to provide real-time route guidance information to assist in the navigation of the MTU in retrieving cleaning supplies and cleaning the dropped item. For example, the system may communicate the location of the appropriate cleaning supply to the MTU and instruct the MTU as to which cleaning tool it should retrieve. The system may further monitor the cleaning of the dropped item and/or the spill to identify when the task is completed. For example, the system may continue to capture images of the spill area with MTU image sensor(s) and/or in-store image sensor(s) to determine whether any spill remains on the floor. In some embodiments, the system may modify or assign new cleaning tasks based on the clean-up progress. For example, if one cleaning solution is not effective, the system may instruct an MTU to retrieve a different solution and/or ask a store associate for assistance. The MTU may further provide instructions on the disposal of the dropped item and/or spill and the return of cleaning supplies after the clean-up. For example, if the item contains sharp material (e.g. broken glass), the system may provide instructions for safe disposal of the sharp objects (e.g. place in special bin, wrap in paper, etc.). After an MTU completes a cleaning task, the MTU may become available to receive other types of task assignment such as escorting a customer, carrying a shopping cart, etc. In some embodiments, the system may identify the dropped item and report a loss of the dropped item to an inventory database associated with the shopping space.

Figure 17:
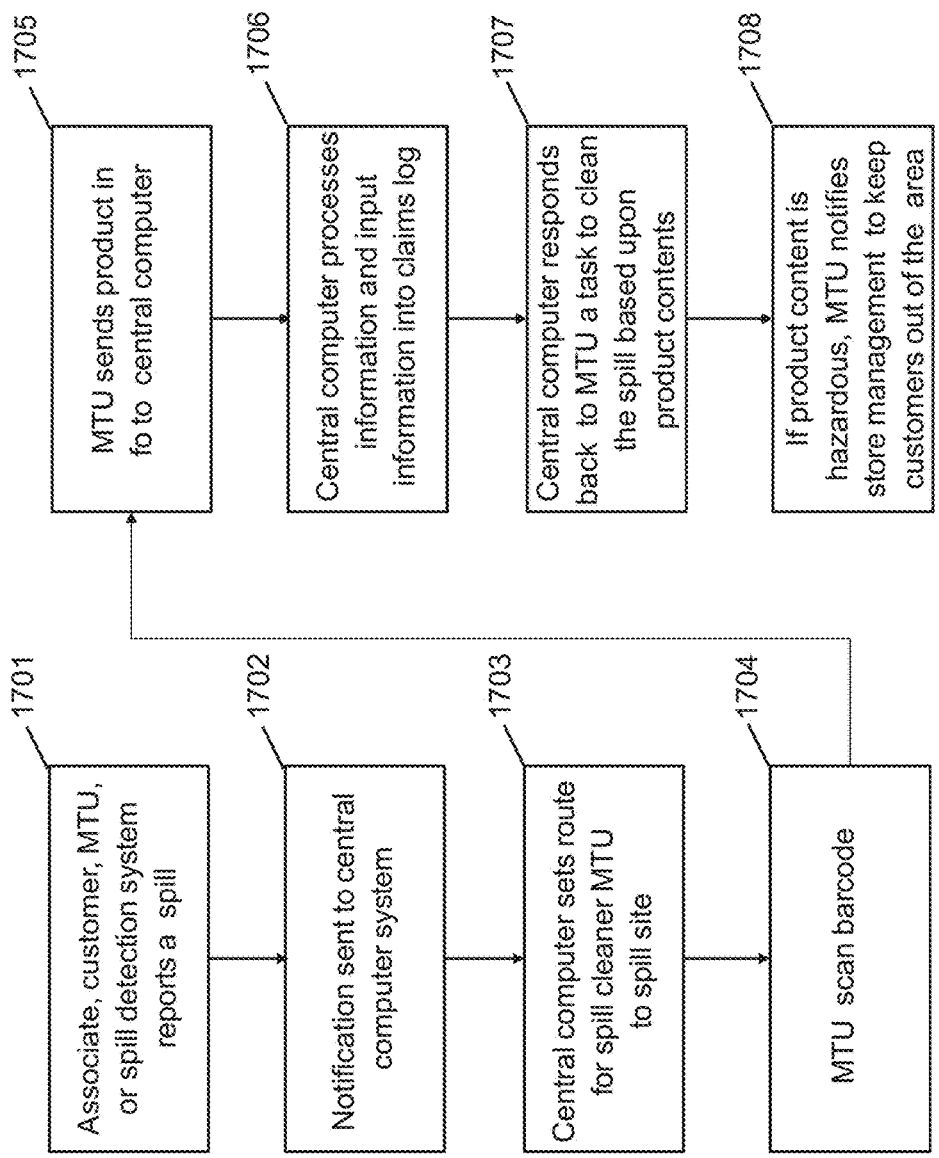
FIG. 17 comprises a flow diagram of a process for restoring shopping space conditions in accordance with some embodiments.

FIG. 17 is a flow diagram of a process for storing shopping space conditions according to some embodiments. In some embodiments, the steps shown in FIG. 17 may be performed by one or more of the system 1500 in FIG. 15, the central computer system 106 in FIG. 1, and the computer device 500 in FIG. 5, for example. In some embodiments, the steps are performed by a processor-based device executing a set of computer readable instructions stored on a memory device.

In step 1701, an associate, a customer, an MTU, or a spill detection system reports a spill to the central system. An associate and a customer may notice a spill and communicate with the central system via a user interface device. An MTU may capture images of its surrounding as it travels through the shopping space performing one or more tasks. The MTU and/or the central computer system may identify a spill condition in the images captured by the MTU. A spill detection system may include one or more sensors such as cameras, liquid, and gas sensors throughout a shopping space that can detect spills in the shopping space. In step 1702, a notification is sent to the central computer system. In some embodiments, the notification may include a location of the spill and/or an image of the spill. In step 1703, the central computer sets a route for the spill cleaner MTU to the spill site. The route may be configured and instructed according to the MTU navigation and maneuvering means described herein. In step 1704, the MTU approaches the spill site and scans the barcode of the dropped item associated with the spill. In some embodiments, the MTU may alternatively scan an invisible code and/or a RFID tag of the dropped item. In step 1705, the MTU sends the product information obtained in step 1704 to the central computer. In step 1706, the center computer processes the information and inputs the information into a claims log. The claims log generally keeps track of items that are damaged or otherwise become unsellable. The claims log may be used to report lost and/or shrinkage of products and update inventory information. In step 1707, the central computer responds back to MTU a task to clean the spill based upon the product's content. The central computer may determine the product content based on the information received on step 1705. In some embodiments, the central computer may also gather other information using one or more sensors on the MTU. The task may be selected from among different types of method of cleaning based on the content. For example, if the spilled content is liquid, the cleaning task may specify the retrieval of a mop; if the spilled content is mostly solid, the cleaning task may specify the retrieval of a broom. In step 1708, if the product content is hazardous, the MTU may notify store management to keep customers out of the area. For example, if drain cleaners has been spilled, the MTU may notify store management to clear the area of customers while the area is being cleaned.

Figure 18:
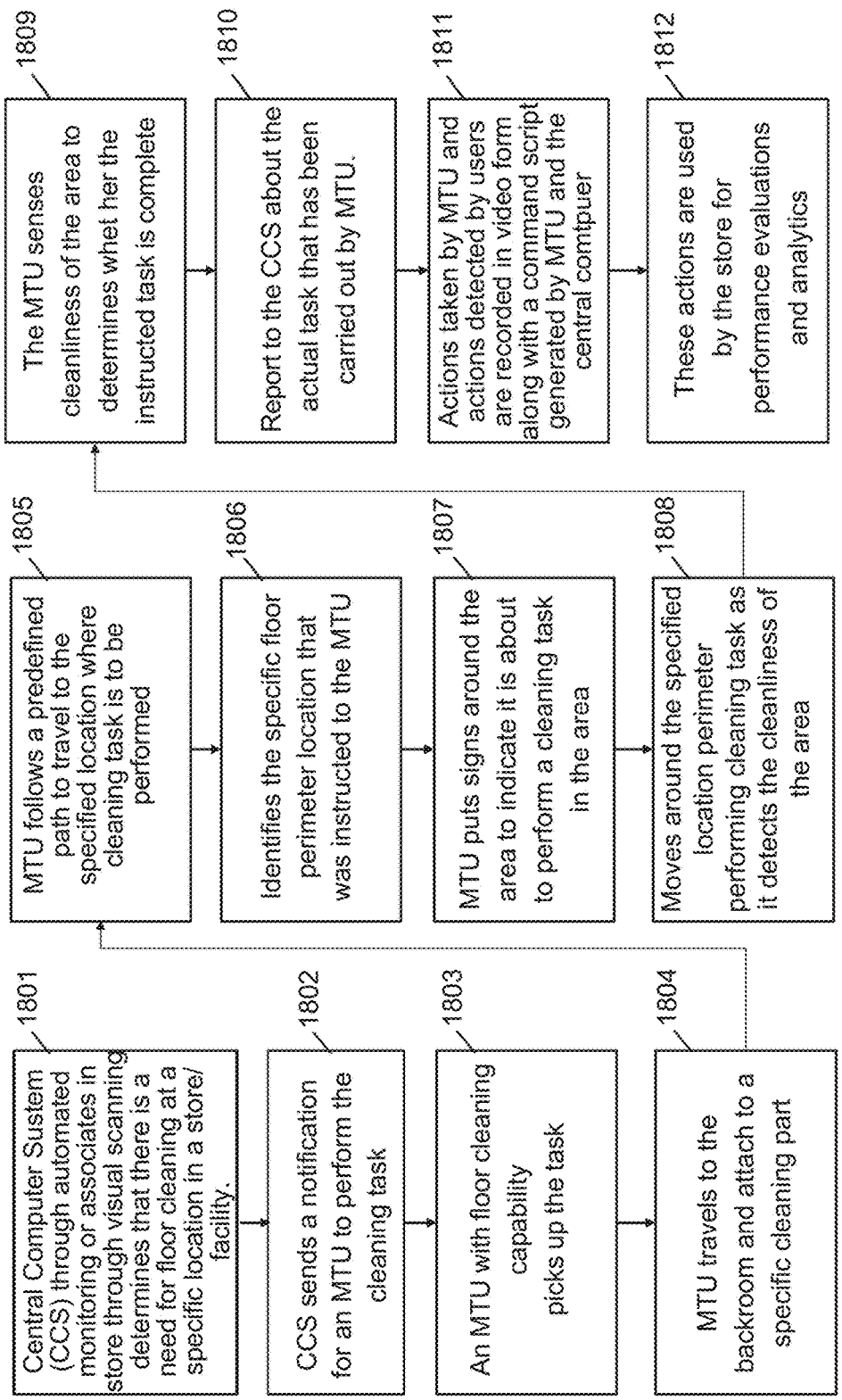
FIG. 18 comprises a flow diagram of another process for restoring shopping space conditions in accordance with some embodiments.

FIG. 18 is flow diagram of a process for storing shopping space condition according to some embodiments. In some embodiments, the steps shown in FIG. 18 may be performed by one or more of the system 1500 in FIG. 15, the central computer system 106 in FIG. 1, and the computer device 500 in FIG. 5, for example. In some embodiments, the steps are performed by a processor-based device executing a set of computer readable instructions stored on a memory device.

In step 1801, the central computer system determines that there is a need for floor cleaning at a specific location in a store or facility through automated monitoring or through an associate in the store. In step 1802, the central computer system sends a notification for an MTU to perform the cleaning task. In step 1803, an MTU with floor cleaning capability picks up the task. In step 1804, the MTU travels to the backroom and attach to a cleaning part specified by the cleaning task assigned in step 1802.

In step 1805, the MTU follows a path defined by the central computer system to travel to the specified location where the cleaning task is to be performed. In step 1806, the system and the MTU identifies the specific floor perimeter location that was instructed to the MTU. In some embodiments, the path in step 1805 takes the MTU to a grid section (e.g. block, cell) in the shopping space and the MTU may use one or more sensors to locate the location of the spill within the grid section. In some embodiments, the MTU uses one or more sensors to determine the area covered by the spill. In step 1807, the MTU puts signs around the area to indicate that it is about to perform a cleaning task in the area. For example, the MTU may rope off or place multiple cones around the perimeter of the spill before starting to clean up the area such that customers does not step on the spill. In step 1808, the MTU moves around the specified location perimeter performing cleaning task as it detects the cleanliness of the area. In step 1809, the MTU uses one or more sensors to sense cleanliness of the area to determine whether the instructed task is complete. In step 1810, the MTU reports to the central computer system about the actual task that has been carried out. In some embodiments, if further actions need to be taken to fully clean up the area, the system may assign additional tasks. In step 1811, actions taken by the MTU and actions detected by users are recorded in video form along with a command scrip generated by the MTU and the central computer. In step 1812, the information recorded in step 1811 may be used by the store management and/or central system for performance evaluation and analytics.

In some embodiments, apparatuses and methods are provided herein useful for restoring shopping space conditions in a shopping space. In some embodiments, a system for restoring shopping space conditions comprises a motorized transport unit comprising at least one sensor and a central computer system comprising a wireless transceiver for communicating with the motorized transport unit. The central computer system being configured to identify a section of a shopping space having a dropped item, instruct the motorized transport unit to travel to the section of the shopping space and collect information associated with the dropped item using the at least one sensor, determine a characteristic of the dropped item in the section of the shopping space using the at least one sensor of the motorized transport unit, and select a cleaning task from a plurality of cleaning tasks based on the characteristic of the dropped item.

In some embodiments, a method for restoring shopping space conditions comprising: identifying, at a central computer system, a section of a shopping space having a dropped item, instructing, via a wireless transceiver, a motorized transport unit to travel to the section of the shopping space, the motorized transport unit comprises at least one sensor, determining, at a central computer system, a characteristic of the dropped item in the section of the shopping space based on information associated with the dropped item collected by the at least one sensor of the motorized transport unit, and selecting, by a central computer system, a cleaning task from a plurality of cleaning tasks based on the characteristic of the dropped item.

In some embodiments, an apparatus for restoring shopping space condition comprising: a wireless transceiver configured to communicate with a central computer system, a motorized wheel system, a sensor device, an attachment structure configured to attach to a cleaning tool, and a control circuit coupled to the wireless transceiver, the motorized wheel system, and the sensor device. The control circuit being configured to: travel, via the motorized wheel system, to a section of a shopping space based on instructions received from the central computer system via the wireless transceiver, collect information about a dropped item in the section of the shopping space using the sensor device and provide the information about the dropped item to the central computer system, receive an cleanup task from the central computer system, travel to a cleaning tool and attach to the cleaning tool via the attachment structure, and remove the dropped item from the section of the shopping space based on the cleanup task.

Some embodiments identify a section of the shopping space having a dropped item; instruct the motorized transport unit to travel to the section of the shopping space and collect information associated with the dropped item using the at least one sensor; determine a characteristic of the dropped item in the section of the shopping space using the at least one sensor of the motorized transport unit; and select a cleaning task from a plurality of cleaning tasks based on the characteristic of the dropped item. Some embodiments comprise a central computer system that is configured to instruct the motorized transport unit to perform the cleaning task. In some instances, the cleaning task comprises one or more of: retrieve a cleaning tool, retrieve a cleaning supply, place a barrier around the dropped item, remove the dropped item from the section of the shopping space, and report a hazardous condition. The central computer system may be configured to select at least one of a cleaning supply from a plurality of cleaning supplies and a cleaning tool from a plurality of cleaning tools based on the characteristic of the dropped item.

Some embodiment include central computer system that determines the characteristic of the dropped item by determining whether the dropped item comprises one or more of: a polar liquid, a non-polar liquid, a powder, a solid, a loose item, glass, a sharp object, fumes, and a hazardous material. The at least one sensor of the motorized transport unit can comprise one or more of an image sensor, an infrared sensor, a temperature sensor, a gas sensor, a moisture sensor, a sonar sensor, a range sensor, a bar-code reader, and a radio frequency identification (RFID) reader. In some implementations, the motorized transport unit further comprises an attachment structure configured to attach to a cleaning tool. The section of the shopping space having the dropped item may, in some instances, be identified based on comparing a baseline image associated with the section of the shopping space with a current image of the section of the shopping space. Some embodiments further comprise a plurality of stationary image sensors, wherein the current image of the section of the shopping space is captured by at least one of the plurality of stationary image sensors. The central computer system can be further configured to: identify the dropped item and report a loss of the dropped item to an inventory database associated with the shopping space.

Some embodiments provide methods for restoring shopping space conditions. In some implementations, a method comprises instructing the motorized transport unit to perform the cleaning task. Some embodiments select a cleaning task that comprises one or more of: retrieve a cleaning tool, retrieve a cleaning supply, place a barrier around the dropped item, remove the dropped item from the section of the shopping space, and report a hazardous condition. Some applications select at least one of a cleaning supply from a plurality of cleaning supplies and a cleaning tool from a plurality of cleaning tools based on the characteristic of the dropped item. The central computer system may determine the characteristic of the dropped item by determining whether the dropped item comprises one or more of: a polar liquid, a non-polar liquid, a powder, a solid, a loose item, glass, a sharp object, fumes, and a hazardous material. Sensors may be used, and in some instances, at least one sensor comprises one or more of an image sensor, an infrared sensor, a temperature sensor, a gas sensor, a moisture sensor, a sonar sensor, a range sensor, a bar-code reader, and a radio frequency identification (RFID) reader. A motorized transport unit can comprise an attachment structure configured to attach to a cleaning tool. In some embodiments, a section of the shopping space having the dropped item is identified based on comparing a baseline image associated with the section of the shopping space with a current image of the section of the shopping space. A current image of the section of the shopping space may be captured by a plurality of stationary image sensors coupled to the central computer system. Some implementations identify the dropped item and reporting a loss of the dropped item to an inventory database associated with the shopping space.

Some embodiments provide an apparatus for restoring shopping space condition comprising: a wireless transceiver configured to communicate with a central computer system; a motorized wheel system; a sensor device; an attachment structure configured to attach to a cleaning tool; and a control circuit coupled to the wireless transceiver, the motorized wheel system, and the sensor device, the control circuit being configured to: travel, via the motorized wheel system, to a section of the shopping space based on instructions received from the central computer system via the wireless transceiver; collect information about a dropped item in the section of the shopping space using the sensor device and provide the information about the dropped item to the central computer system; receive an cleanup task from the central computer system; travel to the cleaning tool and attach to the cleaning tool via the attachment structure; and remove the dropped item from the section of the shopping space based on the cleanup task. In some instances, the sensor device comprises one or more of an image sensor, an infrared sensor, a temperature sensor, a gas sensor, a moisture sensor, a sonar sensor, a range sensor, a bar-code reader, and a radio frequency identification (RFID) reader.

In accordance with some embodiments, further details are now provided for one or more of these and other features. For example, generally speaking, pursuant to various embodiments, systems, apparatuses, processes and methods employing such a shopping facility assistance system to return items to their respective departments.

Generally speaking, these teachings are especially useful when employed in a retail shopping facility that is organized as a plurality of departments that present corresponding items for sale. In such a case, the aforementioned central computer system can direct a particular motorized transport unit through a retail shopping facility to a particular mobile item container having at least one item disposed therein, that item being designated for return to a particular one of the plurality of departments such that this item can then again be presented for sale. After causing that motorized transport unit to physically attach to this mobile item container, the central computer system can direct that motorized transport unit through the retail shopping facility with the attached particular mobile item container to the one or more departments to which the item or items are to be so returned.

By one approach, the central computer system is further configured to receive information that identifies one or more of the items that are placed in that mobile item container and uses that information to determine which of the plurality of departments are to be visited to facilitate the return of those items. These teachings are highly flexible in practice and will accommodate, for example, returning various items to a plurality of departments when those items share a common mobile item container. In such a case, if desired, the central computer system can direct the motorized transport unit to each of those various departments by selecting and using an efficient order of visitation.

These teachings are highly flexible in practice and will accommodate a variety of modifications to suit the needs and/or opportunities as characterize a given application setting. So configured, this shopping facility assistance system can efficiently and accurately facilitate the return of any of a variety of items to their respective departments to ensure their availability for selection and purchase by customers while avoiding the need to so task one or more associates in these regards. Accordingly, these teachings permit a greater number of associates to be available to more directly assist customers without necessarily increasing headcount.

Figure 19:
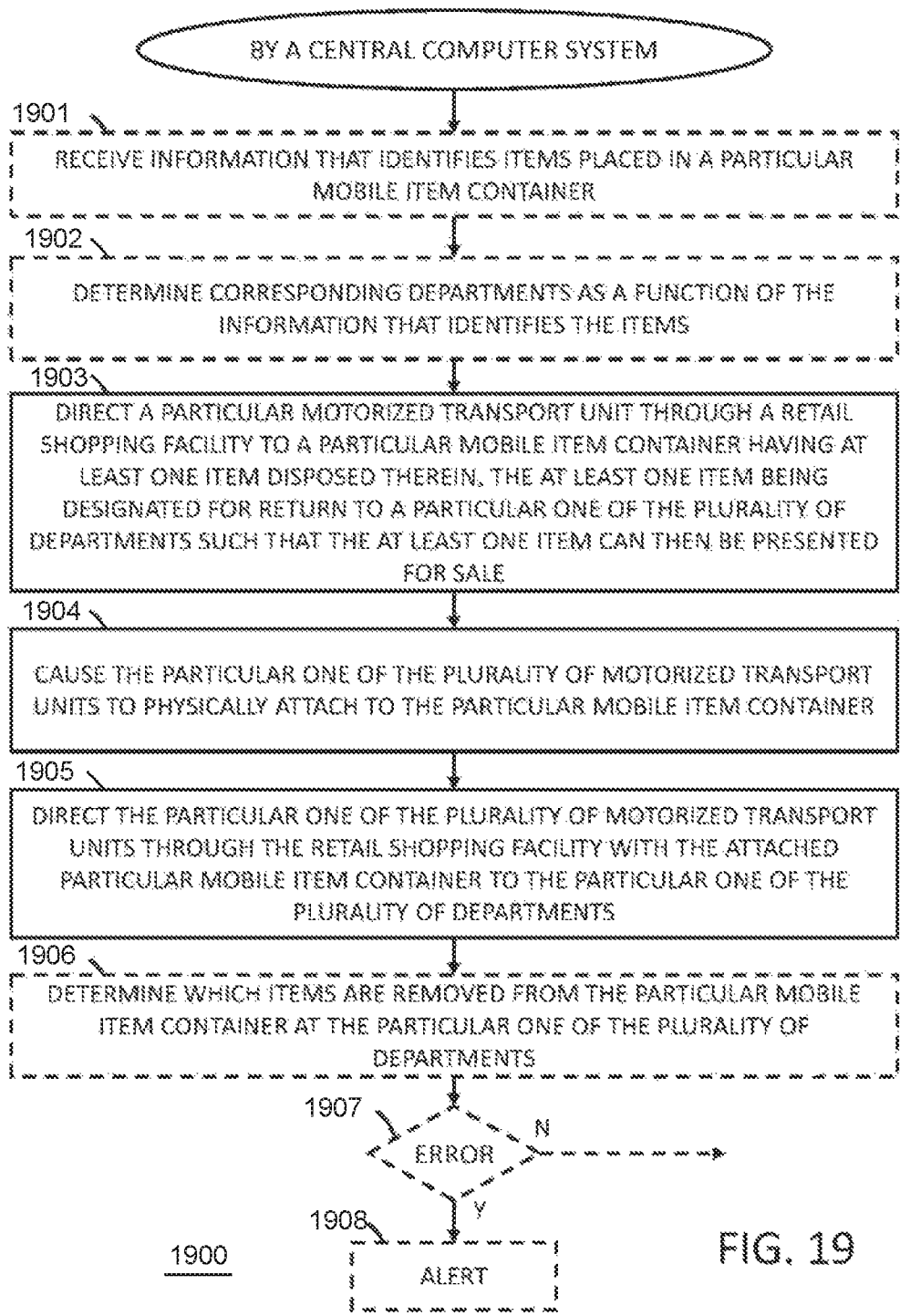
FIG. 19 comprises a flow diagram as configured in accordance with various embodiments of these teachings.

Referring now to FIG. 19, a process 1900 that accords with the foregoing will be described. For the sake of an illustrative example it will be presumed that the above-described central computer system 106 carries out the activities of this process 1900 and in particular employs its network interface to wirelessly communicate with a plurality of the above-described motorized transport units 102.

At optional block 1901, the central computer system 106 receives information that identifies items placed in a particular mobile item container (which, in this illustrative example, is presumed to be a retail-store shopping cart). These teachings will accommodate sourcing this information in any of a variety of ways. By one approach, for example, the Universal Product Code (UPC) and/or Electronic Product Code (EPC) code on each item is scanned by an associate at the time, or near the time, of placing the items in the mobile item container 104. By another approach, the central computer system 106 employs facility RFID tag readers to read identifying RFID tags on such items and perhaps on the mobile item container 104 itself. As these teachings are not particularly sensitive to any particular selections in these regards, and as these methodologies are generally well understood in the art, further elaboration is not provided here.

At optional block 1902, the central computer system 106 determines departments within the retail shopping facility that corresponds to these items as a function of the foregoing information. Again, these teachings will accommodate making these determinations in a variety of ways. By one approach, the central computer system 106 uses product-identifying information (such as UPC information or EPC information) to access a database that correlates such information with specific corresponding departments. Such an approach can readily serve, for example, to determine that a fishing lure belongs in the sporting goods department while a blouse belongs in the women's wear department.

Whether pursuant to the foregoing optional activities or via some other approach, the central computer system 106 has information regarding what items are placed in this particular mobile item container 104 and in which respective departments those items belong.

Figure 20:
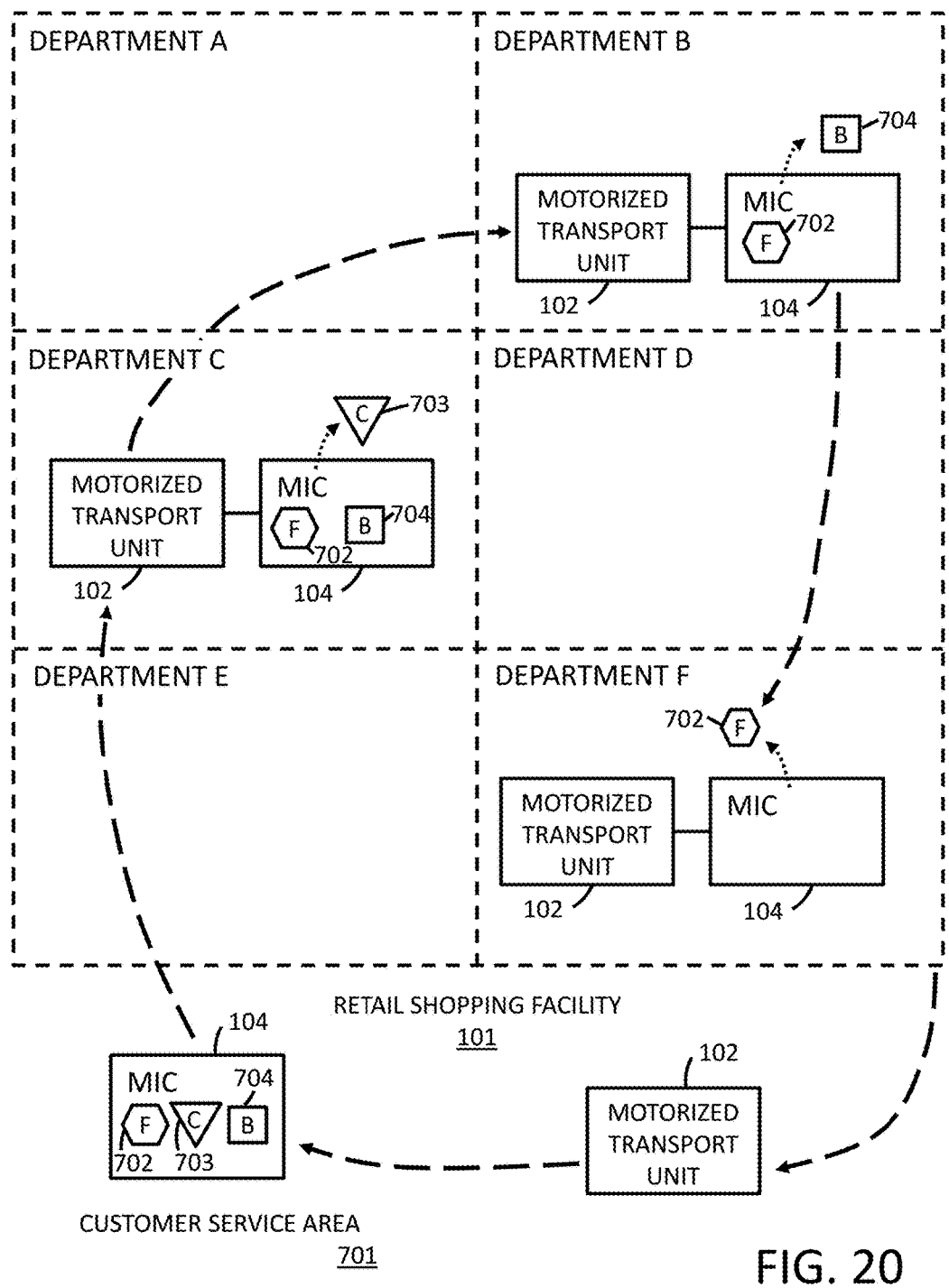
FIG. 20 comprises a top plan schematic diagram as configured in accordance with various embodiments of these teachings.

FIG. 20 provides an illustrative example in these regards. In this example, the mobile item container (MIC) 104 of interest is located in a customer service area 2001 that comprises a part of this retail shopping facility 101. This retail shopping facility 101 is logically partitioned into six different departments (denoted here as department A through department F). Accordingly, these departments may or may not have a clear physical partition separating one from the other. In some cases one department may be separated from another department by an aisle or a change in flooring material. In other cases one department may partially physically overlap in one sense or another with another adjacent department. Generally speaking, while many or most of these departments may be evident to customers as separate "departments," these teachings will accommodate a sense of departments that serves the organizational needs of facility associates and hence may not be fully or completely observable by or appreciated by customers of the facility 101. Examples of departments for a typical modern department-based retail shopping facility include but are not limited to a health and beauty department, an automotive supplies department, a sporting goods department, a housewares department, a women's fashions department, a men's fashions department, a department for children's clothing, a garden supplies department, various groceries departments (such as a fresh meats department, a canned goods department, a snacks department, a soft drinks department, and so forth), and so forth.

With continued reference to FIG. 20, in this illustrative example the mobile item container 104 contains three items. Pursuant to the above-described process 1900 the central computer system 106 has identified these items and has determined that the first item 2002 corresponds to department F, the second item 2003 corresponds to department C, and the third item 2004 corresponds to department B. In this example each of these items is an item that a customer previously purchased and then returned for a refund at the customer service area 2001 of the retail shopping facility 101. In this example it is presumed that this mobile item container 104 is designated to receive like-new items that are suitable to restock and sell once again. Items that have been returned in a condition unsuitable in those regards can be dealt with in other ways.

It will be understood that these teachings will accommodate items that need to be returned to their respective departments for other reasons. For example, a customer may have placed such items in their shopping cart and then, for whatever reason, abandoned that shopping cart and left the store without purchasing those items.

With continued reference to both FIGS. 19 and 20, at block 1903 the central computer system 106 directs a particular motorized transport unit 102 through the retail shopping facility 101 to this particular mobile item container 104 having at least one item disposed therein that is designated to be returned to a particular one of the plurality of departments such that the item or items can then be again presented for sale.

By one approach the central computer system 106 undertakes this activity on a regular, periodic basis. By another approach the central computer system 106 undertakes this activity in response to determining that the mobile item container 104 is physically filled to at least a particular level. By yet another approach the central computer system 106 undertakes this activity in response to being prompted in these regards by an associate (for example, an associate working in the customer service area 2001).

By one approach the motorized transport unit 102 that the central computer system 106 so dispatches comprises a motorized transport unit 102 that is reserved or otherwise generally assigned primarily with serving in these regards and that is not otherwise directed to other tasks. By another approach the motorized transport unit 102 simply comprises one of a fleet of available motorized transport units that can be tasked in these regards but which can also serve any number of other tasks on an as-needed basis.

At block 1904 the central computer system 106 causes this particular motorized transport unit 102 to physically attach to the particular mobile item container 104 as per the foregoing description. Then, at block 1905, the central computer system 106 directs the motorized transport unit 102 through the retail shopping facility 101 with the attached mobile item container 104 to visit the departments that correspond to the items in the mobile item container 104. By one approach, the central computer system 106 selects an efficient order of visitation to thereby at least reduce if not fully minimize the amount of time and/or energy required to complete this task.

In this illustrative example an associate located in one of the receiving departments removes the one or more items that are being returned to that particular department. Here, the motorized transport unit 102 first arrives and stops at department C. By one approach, the motorized transport unit 102 can provide one or more alerts (such as flashing lights and/or a corresponding unique sound) to attract the attention of a nearby associate. In this case, the associate removes the item 2003 that corresponds to department C. Though not a specific part of this process 1900, it is anticipated that either this associate or another then places the removed item 2003 in an appropriate display location such that the item 2003 is again presented for sale. In particular, a customer can now again physically select this item 2003 and take this item 2003 to a point of sale to consummate their purchase of the item.

The motorized transport unit 102 then travels through department A in this example and arrives and stops in department B. There, the same procedure follows and an associate removes the items 2004 that is being returned to this department. That accomplished, the motorized transport unit 102 traverses department D and arrives and stops at department F. And again, an associate removes the item 2002 being returned to this department from the mobile item container 104. The central computer system 106 can then direct the motorized transport unit 102 to its next task or elsewhere as desired.

As already noted above, this process 1900 is highly flexible and will accommodate a wide variety of modifications. As one example in these regards, at optional block 1906 the central computer system 106 determines which items are removed from the mobile item container 104 at one or more of the departments. This monitoring can be based upon, for example, visual information provided by in-facility cameras 114 and/or information provided by one or more in-facility RFID tag readers as described above. So configured, the central computer system 106 can determine at decision block 1907 when an error in these regards occurs. That is, when an associate removes the incorrect item from the mobile item container 104. In the absence of any errors, the process can simply continue as described above. Upon detecting such an error, however, the central computer system 106 can effect an alert at block 1908. This alert can comprise, for example, a visual or audible alert to alert the associate that an error has occurred with respect to removing items from the mobile item container 104 in this department. The associate can then effect a corresponding correction.

As another example in these regards, the central computer system 106 can be further configured to first confirm that at least one associate will be available in each targeted department and hence available to remove corresponding items from the mobile item container 104 four that department when the motorized transport unit 102 arrives with the mobile item container 104. This confirmation can be based, for example, upon an analysis of video information provided via in-facility video cameras. In the case where no associate is available in a particular department, by one approach the central computer system 106 can be configured to avoid such a department or to at least not stop in such a department and thereby defer returning any items to that department until an associate becomes available.

So configured, one or more items that are to be returned to a particular department (as versus, for example, taking an item to a retail floor department from a stock room for the first time) can make the greater part of that journey in a largely or wholly automated fashion. Such an approach makes it possible, for example, for more associates to work the retail sales floor in ways that more directly and immediately affect the consumer experience in a positive way.

Some embodiments provide apparatuses and/or systems comprising a plurality of motorized transport units configured to move through a retail shopping facility that is organized as a plurality of departments that present corresponding items for sale, and a central computer system having a network interface such that the central computer system wirelessly communicates with the plurality of motorized transport units. The central computer system is configured to at least in part: direct a particular one of the plurality of motorized transport units through the retail shopping facility to a particular mobile item container having at least one item disposed therein, the at least one item being designated for return to a particular one of the plurality of departments such that the at least one item can then be presented for sale; cause the particular one of the plurality of motorized transport units to physically attach to the particular mobile item container; and direct, via a wireless network connection, the particular one of the plurality of motorized transport units through the retail shopping facility with the attached particular mobile item container to the particular one of the plurality of departments. In some embodiments the mobile item container comprises a retail-store shopping cart. The particular mobile item container may be located in a customer service area of the retail shopping facility and wherein the central computer system directs the particular one of the plurality of motorized transport units to the particular mobile item container by directing the particular one of the plurality of motorized transport units to the customer service area.

In some implementations, the central computer system is further configured to: receive information that identifies items placed in the particular mobile item container; and determine the particular one of the plurality of departments as a function of the information that identifies the items in the particular mobile item container. The central computer system may be configured to determine that there are items in the particular mobile item container that should be directed to at least two different ones of the plurality of departments. The central computer system may direct the particular one of the plurality of motorized transport units through the retail shopping facility with the attached unattended mobile item container to the particular one of the plurality of departments by directing the particular one of the plurality of motorized transport units to each of the at least two different ones of the plurality of departments.

In some embodiments, the central computer system directs the particular one of the plurality of motorized transport units to each of the at least two different ones of the plurality of departments by selecting an efficient order of visitation. The central computer system may, in some applications, direct the particular one of the plurality of motorized transport units through the retail shopping facility with the attached particular mobile item container to the particular one of the plurality of departments by first confirming that at least one associate will be available in the particular one of the plurality of departments to remove corresponding items from the particular mobile item container for that department when the particular one of the plurality of motorized transport units arrives with the particular mobile item container. In some instances, the central computer system is further configured to: determine which items are removed from the particular mobile item container at the particular one of the plurality of departments; and use the particular one of the plurality of motorized transport units to alert an associate upon detecting an error with respect to removing items from the particular mobile item container at the particular one of the plurality of departments.

Some embodiments provide methods comprising: by a central computer system having a network interface such that the central computer system wirelessly communicates with a plurality of motorized transport units that are configured to move through a retail shopping facility that is organized as a plurality of departments that present corresponding items for sale: directing a particular one of the plurality of motorized transport units through the retail shopping facility to a particular mobile item container having at least one item disposed therein, the at least one item being designated for return to a particular one of the plurality of departments such that the at least one item can then be presented for sale; causing the particular one of the plurality of motorized transport units to physically attach to the particular mobile item container; and directing, via a wireless network connection, the particular one of the plurality of motorized transport units through the retail shopping facility with the attached particular mobile item container to the particular one of the plurality of departments. In some instances, the mobile item container comprises a retail-store shopping cart.

In some embodiments, the particular mobile item container is located in a customer service area of the retail shopping facility and wherein directing the particular one of the plurality of motorized transport units to the particular mobile item container comprises directing the particular one of the plurality of motorized transport units to the customer service area. Some embodiments receive information that identifies items placed in the particular mobile item container, and determine the particular one of the plurality of departments as a function of the information that identifies the items in the particular mobile item container. In some implementations, some embodiments determine that there are items in the particular mobile item container that should be directed to at least two different ones of the plurality of departments. In directing the particular one of the plurality of motorized transport units through the retail shopping facility with the attached unattended mobile item container to the particular one of the plurality of departments some embodiments direct the particular one of the plurality of motorized transport units to each of the at least two different ones of the plurality of departments. The directing the particular one of the plurality of motorized transport units to each of the at least two different ones of the plurality of departments may comprise selecting an efficient order of visitation.

Some embodiments direct the particular one of the plurality of motorized transport units through the retail shopping facility with the attached particular mobile item container to the particular one of the plurality of departments includes first confirming that at least one associate will be available in the particular one of the plurality of departments to remove corresponding items from the particular mobile item container for that department when the particular one of the plurality of motorized transport units arrives with the particular mobile item container. In implementations determine which items are removed from the particular mobile item container at the particular one of the plurality of departments; and use the particular one of the plurality of motorized transport units to alert an associate upon detecting an error with respect to removing items from the particular mobile item container at the particular one of the plurality of departments.

Some embodiments provide methods and systems of monitoring trash cans distributed about the shopping facility. The trash cans can be inside and/or outside, and the motorized transport units can be utilized in managing the trash cans. In some implementations, a central computer system 106 of a shopping facility receives communications from multiple self-propelled motorized transport units (MTU) located at the shopping facility. Typically, as described above, the motorized transport units are configured to perform multiple different tasks throughout the shopping facility as instructed by the central computer system 106. The central computer system can include one or more control circuits that couple with one or more transceiver to communicate at least with the motorized transport units. A memory couples with the one or more control circuits and storing computer instructions that when executed by at least one control circuit cause the control circuit to perform functions that least enable the central computer system to direct one or more motorized transport units to maintain trash can receptacles at the shopping facility. In some instances, the central computer system 106 identifies multiple motorized transport units that are configured to implement tasks that can support the maintenance of trash can receptacles. Routing instructions based on a mapping of the shopping facility can be communicated to each of two or more motorized transport units directing the motorized transport units to a trash can receptacle, of multiple trash can receptacles distributed about the shopping facility, identified as ready to be emptied, replaced or otherwise serviced. In some instances one of the two motorized transport units transports a replacement second trash can to the location of the trash can receptacle that is to be serviced. A trash can removal instruction can be communicated to a first motorized transport unit to cause the first motorized transport unit to remove the first trash can from the trash can receptacle. Further, a trash can replacement instruction can be communicated to a second motorized transport unit to cause the second motorized transport unit to place the second trash can into the receptacle in place of the first trash can. Accordingly, the multiple motorized transport units cooperate to service a trash can receptacle.

FIG. 21 illustrates a simplified block diagram of an exemplary first motorized transport unit 2100 and an exemplary second motorized transport unit 2102 approaching an exemplary trash can receptacle 2104 that is to be serviced (e.g., the first trash can 2108 within the trash can receptacle is scheduled to be and/or needs to be emptied), in accordance with some embodiments. The second motorized transport unit 2102 is transporting a replacement trash can 2110 that is to be placed into the trash can receptacle 2104 in place of the first trash can. Typically, the trash can receptacle includes a door with an opening 2112 through which people can put trash that is to be deposited into the trash can within the trash can receptacle.

FIG. 22 illustrates the first motorized transport unit 2100 moving into position relative to the trash can receptacle 2104, in accordance with some embodiments. Referring to FIGS. 21-22, in these examples, the first motorized transport unit 2100 may move under the trash can receptacle and the first trash can 2108 within the trash can receptacle. The first motorized transport unit can engage the first trash can and move the first trash can out of the trash can receptacle. In some implementations, the motorized transport units may include a trash can engagement rack 2118 that cooperates with a base, rim or other portion of the trash can. The engagement rack 2118, in some applications, may move to engage, grip, squeeze, interlock, and/or otherwise cooperate with the trash can to enhance the stability and cooperation between the trash can and the motorized transport unit. It is noted that in some implementations the second motorized transport unit may not be utilized, and instead, the first motorized transport unit can transport the first trash can to a disposal area, dump the trash, and then return the first trash can to the trash can receptacle 2104.

In some embodiments, the first motorized transport unit may lift the first trash can 2108 a predefined amount in order to be able to move the first trash can out of the trash can receptacle 2104. In some instances, the first trash can may be supported within the trash can receptacle 2104 through one or more supports 2114, pegs, hooks or other such structures that can cooperate with corresponding slots, grooves, holes, or the like that are configured to support a trash can and trash within the trash can. By lifting the first trash can, the first motorized transport unit 2100 can release the supports 2114 from the support slots. Once the first trash can is supported by the first motorized transport unit, the first transport unit can move the first trash can out of the trash can receptacle. In other implementations, trash cans may have wheels, and the motorized transport units pull and/or push the trash cans.

When the trash can receptacle includes a door, the door may be opened by the motorized transport unit. For example, the motorized transport unit may engage an unlock trigger on the trash can receptacle, communicate a request to the central computer system 106 that in turn communicates an open instruction to the trash receptacle, or other such activation to cause the door to open. Once opened, the first motorized transport unit can move the first trash can out of the trash can receptacle.

Figure 23:
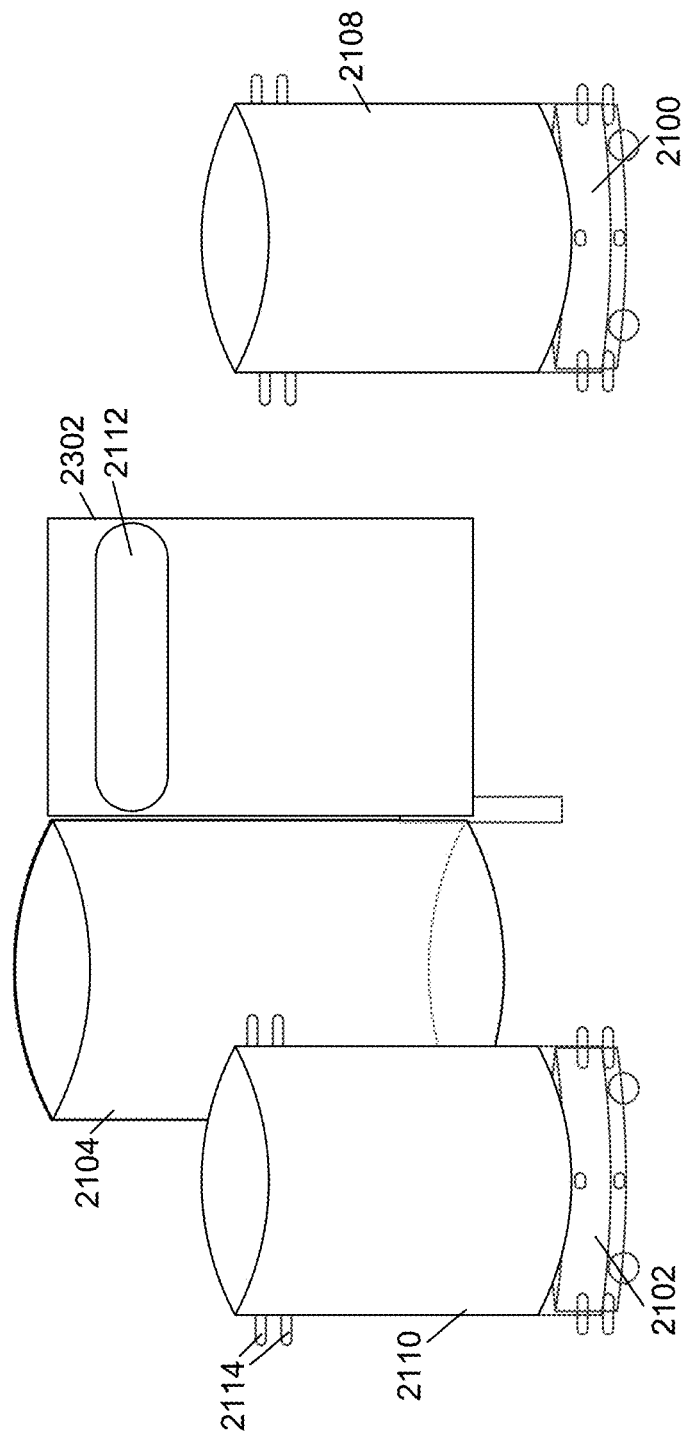
FIG. 23 illustrates a simplified block diagram of the first motorized transport unit of FIG. 21 supporting the first trash can and moved out from the trash can receptacle, while the second motorized transport unit is moving the replacement trash can into position relative to the trash receptacle, in accordance with some embodiments.

FIG. 23 illustrates a simplified block diagram of the first motorized transport unit 2100 supporting the first trash can 2108 and moved out from the trash can receptacle 2104, while the second motorized transport unit 2102 is moving the replacement trash can 2110 into position relative to the trash can receptacle 2104, in accordance with some embodiments. Referring to FIGS. 21-23, with the door 2302 open, the first motorized transport unit 2100 can move the first trash can away from the receptacle 2104. The second motorized transport unit 2102 can align with the opening and move the replacement trash can into the trash can receptacle. Further, in some implementations, the second motorized transport unit may lift the replacement trash can 2110 to an appropriate height to allow the replacement trash can to properly align with the cavity of the trash can receptacle 2104 and/or to align with one or more grooves, a shelf or other such support structures that support the replacement trash can 2110. The second motorized transport unit 2102 can then close the door 2302 and/or cause the door to be closed. For example, the second motorized transport unit may increase its height to allow it to engage the door and move the door to a closed position, the second motorized transport unit may communicate a close command to the trash can receptacle that in turn activates a motor, hydraulics, or other such mechanism to close the door, the second motorized transport unit may communicate a completion notification to the central computer system that communicates a close command to the trash can receptacle, or other such action to cause the door to be closed.

As described above, in some embodiments, the central computer system 106 of a shopping facility receives communications from multiple motorized transport units located at the shopping facility. A control circuit 108 of the central computer system 106 can identify a first motorized transport unit 2100 and a second motorized transport unit 2102 as capable of servicing a trash can receptacle. The central computer system can identified a first trash can receptacle of multiple trash can receptacles distributed about the shopping facility as ready to be emptied. This identification may be based on a schedule, based on a notification from the trash can receptacle, or the like. Routing instructions based on a mapping of the shopping facility can be communicated to each of the first and second motorized transport units directing the first and second motorized transport units to the first trash can receptacle 2104 of the multiple different trash can receptacles distributed about the shopping facility. Further, the central computer system can direct the second motorized transport unit 2102 to align with and cooperate with a replacement trash can 2110. The second motorized transport unit can transport the replacement trash can 2110 along the route to the trash can receptacle 2104.

The central computer system 106 can further communicate a trash can removal instruction to the first motorized transport unit 2100 to cause the first motorized transport unit to position itself into alignment with the first trash can 2108. For example, the first motorized transport unit may move under the trash can receptacle and the first trash can. In some instances, the first motorized transport unit may include a trash can engagement rack 2118 that can cooperate with the first trash can to stabilize the trash can during removal and/or transport. The second motorized transport unit may similarly include an engagement rack to cooperate with the second trash can. The first motorized transport unit can then remove the first trash can from the trash can receptacle. A trash can replacement instruction can be communicated to the second motorized transport unit 2102 to cause the second motorized transport unit to place the second trash can into the trash can receptacle in place of the first trash can.

In some implementations, the trash can removal instruction can comprise routing instructions to cause the first motorized transport unit 2100 to travel under the trash can receptacle and the first trash can 2108. A trash can engagement instruction can further be communicated to the first motorized transport unit that causes the first motorized transport unit to temporarily and removably couple with the first trash can, lift the first trash can at least a first threshold distance, and move the first trash can out and away from the receptacle. In some instances, the lifting of the trash can disengages the first trash can from a support on the trash can receptacles. For example, the trash can receptacle may include a shelf upon which a trash can sits, one or more grooves or channels may be included that cooperate with pins on the trash can, one or more pins or the like may cooperate with one or more grooves, channels or the like in the trash can, and/or other such support systems.

In some embodiments, the central computer system 106 communicates routing instructions to the second motorized transport unit 2102 to cause the second motorized transport unit to align the second trash at least can horizontally in two dimensions with a door opening of the trash can receptacle, and to align the second trash can vertically in a third dimension with the door opening and/or guides of the trash can receptacle. The routing instructions and/or the replacement instructions can further instruct the second motorized transport unit to move the second trash can into the trash can receptacle 2104, and in some instances move the trash can such that supports on the second trash can cooperate with the guides of the receptacle.

The central computer system may additionally communicate a trash can disengagement instruction that when implemented causes the second motorized transport unit to decouple from the second trash can. In some implementations, the trash can disengagement instruction may further cause the second motorized transport unit to lower at least a portion of the second motorized transport unit reducing a height of the second motorized transport unit, and to move out from under the trash can receptacle and the second trash can.

FIG. 24 illustrates a simplified block diagram of an exemplary trash can receptacle 2104, in accordance with some embodiments, that includes a receptacle control system 2402. The receptacle control system may include a control circuit, which may be implemented similar to the control circuit 108. The receptacle control system includes and/or couples with one or more sensors 2404. Additionally or alternatively, the trash can include one or more sensors (e.g., weight sensor, trash level sensor, etc.). The receptacle control system and/or a trash can system can receive sensor data from the one or more sensors 2404 on or within the trash can receptacle or trash can 2112. Some embodiments include a trash level sensor that detects a level of trash within the trash can positioned within the trash can receptacle. For example, a light sensor or other distance measurement sensor may measure a distance to a level of trash within a trash can. This information can be communicated to the central computer system and/or an alert can be communicated by the sensor system when a threshold level of trash is reached. The central computer system 106 may receive the trash level sensor information that is communicated from a transmitter of the receptacle control system at the trash can receptacle 2104, which couples with a sensor positioned within the receptacle. Again, the trash level sensor information notifies the central computer system of a trash level and/or that a trash level within the first trash can is at or greater than a trash level threshold. The central computer system can identify the first trash can 2108 as ready to be emptied based on a determination by the central computer system, and/or in response to receiving the trash level sensor information indicating the trash level within the first trash can is at or greater than the trash level threshold. Upon determining that the first trash can is ready to be emptied, the central computer system 106 implements the identification of the first and second motorized transport units to replace the first trash can with the replacement trash can.

In some implementations, the receptacle control system is further configured to activate a door opening system, unlatch a door latching system, and/or unlock a door lock. In some instances, the receptacle control system includes a transceiver that receives a door activation instruction from the central control system. As such, the central control system can be configured to communicate a door activation instruction to a receptacle control circuit of the receptacle control system to cause the receptacle control circuit to activate a door control system to unlatch the door 2302 of the trash can receptacle 2104 prior to the first motorized transport unit attempting to move the first trash can out of the trash can receptacle.

The central computer system 106 is further configured to identify the trash can receptacle 2104 from which the trash level sensor information is received. For example, the receptacle control system includes an identifier of the receptacle control system and/or the trash can receptacle in the communication of the trash level information. Once identified, the central computer system can identify a location of the trash can receptacle and determine routing to the trash receptacle. In determining routing, the central computer system further identifies a location of the first motorized transport unit 2100, and a location of the second motorized transport unit 2102. Based on the location information of the trash can receptacle and the first and second motorized transport units, the central computer system determines routing for each of the first and second motorized transport units.

As introduced above, in some embodiments, the trash can receptacle 2104 may include one or more guides 2408, grooves, channels, hooks or other structures. The trash cans can include supports, pegs, hooks, or other such structures to engage the guides. The guides 2408 may further aid in positioning the trash cans within the receptacle and/or retaining a trash can in a desired position. In some implementations, the guides 2408 may include a depression, recess or the like that allows the supports of the trash can to readily seat into the depression to inhibit the trash can from moving and/or leaning against the door. In such implementations, the motorized transport units typically lift the trash can a threshold distance to free the supports from the depressions when removing the trash can.

In some implementations, the central computer system 106 further routes the second motorized transport unit 2102 to cooperate with a replacement trash can 2110. As such, the central computer system may identify a location of one or more trash cans that are available to be used to replace at least the first trash can. Using the location of a replacement trash can, the central computer system can determine the routing instructions for the second motorized transport unit to direct the second motorized transport unit to the location of the second trash can, and communicate to the second motorized transport unit the routing instructions and instructions to retrieve the second trash can prior to traveling to the location of the trash can receptacle such that the second motorized transport unit retrieves and transports the second trash can to the location of the trash can receptacle.

In some implementations, the power for the receptacle control system 2402, one or more sensors of the trash can receptacle, the door control system and/or other components of the trash can receptacle may be through one or more replaceable and/or rechargeable power cells or battery, solar panels, and the like. Additionally or alternatively, some embodiments may receive power from a power source on a trash can 2112. FIG. 25 illustrates a simplified block diagram of an exemplary trash can 2108 in accordance with some embodiments. The trash can may include one or more rechargeable batteries 2502. One or more conductors 2504, 2506 can extend from the battery to a power coupler that can transfer power from the battery to the receptacle control system 2402, a trash can control system, one or more sensors, and/or other such components. In some embodiments, the supports of the trash can may include electrical conductors that enable the transfer of power from the conductors (e.g., positive conductor 2504, and negative conductor 2506) through a similar conductor cooperated with the guides 2408. Accordingly, a battery 2502 of a replacement trash can may be recharged prior to being inserted into the trash can receptacle.

After having removed the first trash can 2108, the central computer system can communicate routing instructions to the first motorized transport unit 2100 to transport the trash can 2108 to a disposal system where a worker may dump the trash, or the disposal system may automatically cause the trash to be dumped. In some instances, the disposal system may include a ramp or ledge that the motorized transport unit approaches to position the trash can near a trash bin and dumps the trash can. In other instances, the motorized transport unit deposits the trash can at a disposal location, and workers dump the trash can and prepare the trash can to be subsequently used as a replacement trash can of another trash can receptacle.

Figure 26:
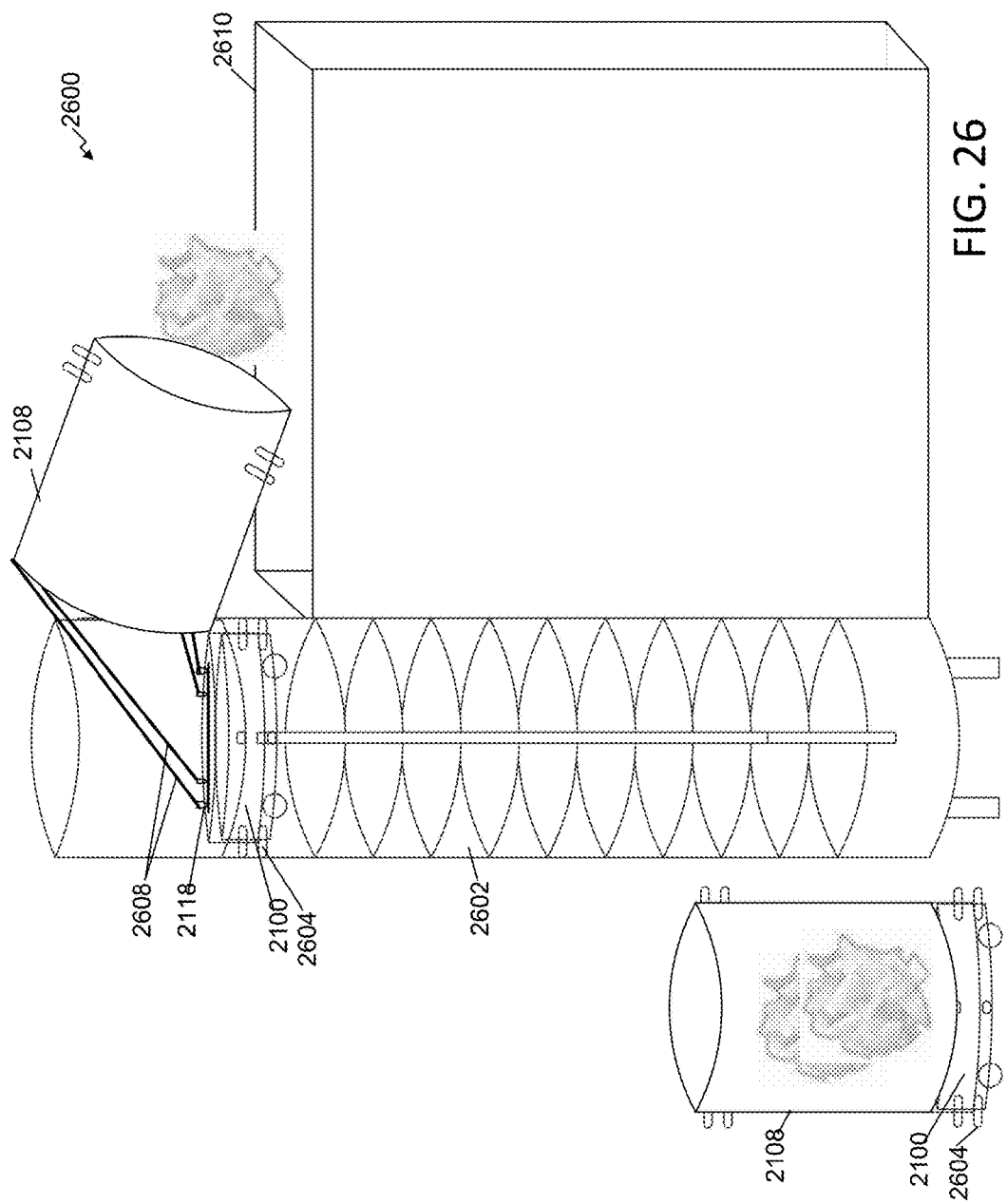
FIG. 26 illustrates a simplified block diagram of a disposal system, in accordance with some embodiments.

FIG. 26 illustrates a simplified block diagram of a disposal system 2600, in accordance with some embodiments. The disposal system is configured to receive trash cans 2108 and remove the trash out of the trash cans. In some implementations, the disposal system includes a lift system 2602 with which a motorized transport unit 2100 can cooperate while carrying a trash can 2108 to be emptied. The lift system may, in some applications, include an elevator system, crane system, or the like that can hoist the at least trash can, and in some instances the motorized transport unit and the trash can. In other implementations, the lift system includes one or more tracks, guides or the like into which guide members 2604 can engage allowing the motorized transport unit 2100 to repeatedly expand or telescope and retract while engaging the tracks allowing the motorized transport unit to lift the trash can 2108 to be emptied.

In some implementations, trash can engagement rack 2118 may further cooperate with the trash can to allow the trash can to be tipped while still being cooperated with the motorized transport unit 2100. For example, one or more cables 2608, ropes, elastic bands or the like on the trash can may be releasably secured with the engagement rack 2118. When the trash can is in a correct orientation relative to a disposal bin 2610, the trash can be tipped while still cooperated with the motorized transport unit. The lift system 2602 may include a tip mechanism that pushes the trash can. This tip mechanism may be a tapered area that the trash can contacts as the trash can is lifted. In other instances, the lift mechanism may activate a pusher or other mechanism that causes the trash can to be tipped. The lift mechanism may include features described in U.S. Patent Application No. 62/175,182, filed Jun. 12, 2015, for Donald R. High et al., entitled METHOD AND APPARATUS FOR TRANSPORTING A PLURALITY OF STACKED MOTORIZED TRANSPORT UNITS, and U.S. Patent Application No. 62/152,711, filed Apr. 24, 2014, for John P. Thompson et al., entitled RECHARGING APPARATUS AND METHOD, which are incorporated herein by reference.

The lift system or other system may detect that the trash from the trash can has been dumped and notify the central computer system. The central computer system can then remove the task from the queue and/or initiate the communication of one or more additional instructions to take the trash can to a different trash can receptacle, a storage location or the like. Similarly, the central computer system can designate the motorized transport unit as free to perform another task and when relevant issue subsequent task instructions to cause the motorized transport unit to perform one or more other tasks.

Figure 27:
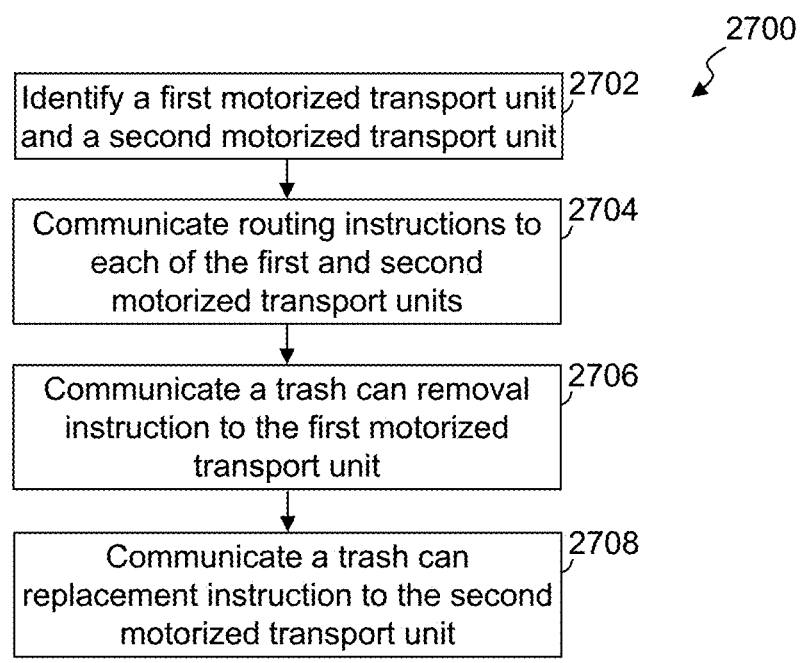
FIG. 27 illustrates a simplified flow diagram of an exemplary process of monitoring trash cans and/or trash can receptacles, in accordance with some embodiments.

FIG. 27 illustrates a simplified flow diagram of an exemplary process 2700 of monitoring trash cans 2108 and/or trash can receptacles 2104, in accordance with some embodiments. In step 2702, a control circuit 108 of the central computer system 106 of a shopping facility identifies a first motorized transport unit 2100 and a second motorized transport unit 2102 of a plurality of self-propelled motorized transport units configured to travel about a shopping facility to perform multiple different tasks throughout the shopping facility. In step 2704, routing instructions based on a mapping of the shopping facility can be communicated to each of the first and second motorized transport units directing the first and second motorized transport units to a trash can receptacle 2104, of multiple trash can receptacles distributed about the shopping facility. Typically, the central computer system further identifies that a first trash can 2108 and/or the trash can receptacle is ready to be emptied based on a schedule, sensor data or the like. Further, the second motorized transport unit is further instructed to transport a replacement trash can 2110.

In step 2706, a trash can removal instruction is communicated to the first motorized transport unit 2100 to cause the first motorized transport unit to remove the first trash can 2108 from the trash can receptacle. In some instances, routing instructions are communicated to the first motorized transport unit to cause the first motorized transport unit to travel under the trash can receptacle and the first trash can 2108. A trash can engagement instruction may further be communicated that causes the first motorized transport unit to temporarily and removably couple with the first trash can, lift the first trash can at least a first threshold distance, and move the first trash can out and away from the receptacle.

In step 2708, a trash can replacement instruction is communicated to the second motorized transport unit 2102 to cause the second motorized transport unit to place the replacement trash can 2110 into the trash can receptacle 2104 in place of the first trash can. In some applications, the second motorized transport unit aligns the trash can three dimensionally with trash can receptacle. A trash can replacement instruction communicated to the second motorized transport unit may include routing instructions to cause the second motorized transport unit to align the replacement trash can 2110 horizontally in two dimensions with a door opening of the receptacle (e.g., X-axis and Y-axis), to align the second trash can vertically in a third dimension (e.g., Z-axis) with guides 2408 of the receptacle, and to move the second trash can into the trash can receptacle such that supports 2114 on the second trash can cooperate with the guides of the trash can receptacle. Further, in some implementations, a trash can disengagement instruction may be communicated that when implemented causes the second motorized transport unit to decouple from the second trash can 2110. Additionally or alternatively, the trash can disengagement instruction may further cause the second motorized transport unit to lower at least a portion of the second motorized transport unit reducing a height of the second motorized transport unit, and to move out from under the receptacle and the second trash can. The second motorized transport unit can then be tasks by the central computer system to perform one or more other tasks, which may be to service another trash can receptacle, help a customer, transport products to a sales floor of the shopping facility, retrieve one or more movable item containers, and/or other such tasks.

In some embodiments, the central computer system may receive sensor data from a sensor system of the trash can receptacle and/or the trash can. In some instances a trash level sensor information is received at the central computer system that is communicated from a transmitter at the trash can receptacle and coupled with a sensor positioned within the trash can receptacle. The sensor information may comprise information that notifies the central computer system that a trash level within the first trash can 2108 is at or greater than a trash level threshold. The threshold may be a weight threshold, a distance threshold, a volume threshold, or other such threshold. The central computer system can identify the first trash can is ready to be emptied in response to receiving the trash level sensor information indicating the trash level within the first trash can is at or greater than the trash level threshold. In some applications, the central computer system implements the identification of the first and second motorized transport units to replace the first trash can 2108 with the second trash can 2110 in response to identifying that the first trash can is ready to be serviced. Further, the central computer system can add a trash can receptacle service task to a task queue. The task queue may prioritize one or more tasks. When the trash can receptacle service task is first in the queue the central computer system can issue commands tasking the first and/or second motorized transport units to service the trash can receptacle.

Typically, the central computer system further identifies the trash can receptacle 2104 from which the trash level sensor information is received and/or corresponds. A location of the identified trash can receptacle is further identified. In some implementations, the central computer system accesses a mapping of the shopping facility to determine coordinates of the trash can receptacle. Additionally or alternatively, the central computer system may include and/or access a database and/or spreadsheet with location coordinates of the trash can receptacle at the shopping facility. Similarly, a location of the first motorized transport unit and a location of the second motorized transport unit are determined. In some instances, the motorized transport units transmit location information to the central computer system that is used to track movements of the motorized transport units and identify current locations at the shopping facility. Routing instructions are determined for the first motorized transport unit based on the location of the trash can receptacle and the location of the first motorized transport unit. Similarly, routing instructions are determined for the second motorized transport unit based on the location of the trash can receptacle and the location of the second motorized transport unit. In some embodiments, the second motorized transport unit 2102 is further instructed to retrieve and/or cooperate with the replacement trash can 2110 prior to proceeding to the trash can receptacle. As such, the central computer system may identify a location of the second trash can that is available to be used to replace another trash can. The routing instructions can be determined for the second motorized transport unit that include instructions to direct the second motorized transport unit to the location of the second trash can, and to retrieve the second trash can prior to traveling to the location of the receptacle such that the second motorized transport unit retrieves and transports the second trash can to the location of the receptacle.

Some embodiments further activate a door opener at the trash can receptacle. A door activation instruction can be communicated to a receptacle control circuit to cause the receptacle control circuit to activate a door control system to unlatch the door of the receptacle prior to the first motorized transport unit attempting to move the first trash can. This door activation instruction may be generated and transmitted in response to receiving a notification from the first or second motorized transport unit that one or both are within a threshold distance, in response to identifying that one or both the first and second motorized transport units are within a threshold distance of the trash can receptacle (e.g., by tracking location and/or movements of the first and/or second motorized transport units), in response to a communication from the trash can receptacle, or the like.

Trash removal in a retail shopping environment can be a mundane and laborious process. It takes workers time to do these tasks therefore taking the workers away from helping customers in the store and performing other relevant tasks. The utilization of the motorized transport units, however, simplifies the process and frees up workers to perform other tasks. The central computer system in cooperation with the motorized transport units automate efficient trash cleaning operations enabling self-service store management. This self-service management can improve convenience by, in part, freeing up store workers time to help customers in store. It provides a new opportunity to increase productivity in a shopping facility and/or distribution centers because of the automated trash removal activities. The automation can perform checking trash levels, picking and/or replacing trash cans, and disposing of trash. The central computer system communicates with the one or more of the multiple motorized transport units configured to perform multiple different tasks at the shopping facility, and instructions the service of one or more trash can receptacles. The central computer system can, in some instances, identify the trash cans to be serviced. The one or more motorized transport units can be instructed to travel to the relevant trash can receptacle location. In some instances, a second trash can is placed into the trash can receptacle in place of a first trash can, and trash in the first trash can is disposed of. The motorized transport unit can properly orient and place a trash can into a trash can receptacle using sensor information (e.g., distance measurements, distance traveled, inertial sensor information, etc.) and location information to orient and place the trash can into the trash can receptacle. A motorized transport unit and/or the trash can receptacle may notify the central computer system in the event of an error (e.g., first trash can may not be able to be removed from the trash receptacle, something blocking the way of one or more motorized transport units from accessing the trash can receptacle, or the like.

One or more motorized transport units 102 operate at a shopping facility and follow instructions from the central computer system 106 to carry out trash cleaning operations. In some implementations, the central computer system receives sensory notification from one or more sensors in and/or embedded in the trash can receptacle for fullness. When a threshold level is reached, based on schedule, other such factors, or combination of such factors, the central computer system can issue instructions to one or more motorized transport units with relevant information (e.g., trash can receptacle location, trash disposal location, routing through the shopping facility, priority information, and the like). Further, in some instances, the central computer system may create one or more tasks for trash picking and disposal. The central computer system can send instructions and/or a notification to one or more motorized transport units to perform the task. In some applications, the central computer system identifies one or more motorized transport units with trash removal capability in determining which motorized transport unit is to be tasked with servicing a trash can receptacle.

In some embodiments, one or more trash can receptacles may include a transmitter to facilitate the central computer system and/or the motorized transport units to locate the trash can receptacles. For example, the motorized transport units may wirelessly receive a beacon from a trash can receptacle that aids the motorized transport unit to locate the trash can receptacle. The transmitter may transmit and/or broadcast a unique identifier for the corresponding trash can receptacle.

The one or more tasked motorized transport units travel to the trash can receptacle (e.g., using tagalong steering, route optimization, and the like provided by the central computer system and/or feedback from sensors on the motorized transport unit). When a motorized transport unit picks up a trash can, it transports the trash can to the trash disposal location. In some instances, a motorized transport unit may include a robotic arm that can cooperate with the trash can during acquisition, transport and/or disposal. In some instances, the central computer system communicates route instructions that allow the motorized transport unit to follow a predefined path to travel to the specified trash disposal location. Some embodiments further identify a trash disposal bin or container (e.g., based on the unique identifier sent by the transmitter, image processing, and short distance object sensing, object identification and movement mechanism capabilities, etc.). The central computers system may, in some implementations, further determine whether the trash can receptacle is obstructed and/or accessible. If there is an obstruction, a door cannot be opened, a trash can cannot be removed, or other error condition, the motorized transport unit can notify the central computer system and await further instructions. In some applications, the motorized transport unit may be configured to tip or pull over a trash can when oriented relative to a disposal bin (based on vision, object identification and movement mechanism) so drops the trash to the disposal bin 2610.

In some embodiments, actions taken by a motorized transport unit and/or actions detected by a worker may be recorded in video form along with a command script generated by the motorized transport unit and/or the central computer system. The video may include video captured by a motorized transport unit, video cameras of the shopping facility, and/or other sources of video content. The video and/or command scripts can be subsequently evaluated for performance evaluations and analytics.

In some embodiments, systems, apparatuses, processes and methods are provided herein useful to monitor trash cans and/or trash receptacles. Some embodiments provide systems of monitoring trash cans, comprising: a central computer system of a shopping facility, comprising: a transceiver configured to receive communications from multiple self-propelled motorized transport units located at the shopping facility; a control circuit coupled with the transceiver; and a memory coupled to the control circuit and storing computer instructions that when executed by the control circuit cause the control circuit to perform the steps of: identify a first motorized transport unit and a second motorized transport unit; communicate routing instructions based on a mapping of the shopping facility to each of the first and second motorized transport units directing the first and second motorized transport units to a trash can receptacle, of multiple trash can receptacles distributed about the shopping facility, identified as ready to be emptied, wherein the second motorized transport unit transports a replacement second trash can; communicate trash can removal instruction to the first motorized transport unit to cause the first motorized transport unit to remove the first trash can from the trash can receptacle; and communicate a trash can replacement instruction to the second motorized transport unit to cause the second motorized transport unit to place the second trash can into the trash can receptacle in place of the first trash can.

Further, some embodiments comprise methods of monitoring trash cans, comprising: by a control circuit of a shopping facility: identifying a first motorized transport unit and a second motorized transport unit of a plurality of self-propelled motorized transport units configured to travel about a shopping facility; communicating routing instructions based on a mapping of the shopping facility to each of the first and second motorized transport units directing the first and second motorized transport units to a trash can receptacle, of multiple trash can receptacles distributed about the shopping facility, identified as ready to be emptied, wherein the second motorized transport unit transports a replacement second trash can; communicating trash can removal instruction to the first motorized transport unit to cause the first motorized transport unit to remove the first trash can from the trash can receptacle; and communicating a trash can replacement instruction to the second motorized transport unit to cause the second motorized transport unit to place the second trash can into the trash can receptacle in place of the first trash can.

Some embodiments provide systems of monitoring trash cans. A central computer system of a shopping facility may be included that includes a transceiver configured to receive communications from multiple self-propelled motorized transport units located at the shopping facility, a control circuit coupled with the transceiver, and memory coupled to the control circuit and storing computer instructions. The control circuit in executing the instructions is configured to identify a first motorized transport unit and a second motorized transport unit. Routing instructions based on a mapping of the shopping facility can be communicated to each of the first and second motorized transport units directing the first and second motorized transport units to a trash can receptacle, of multiple trash can receptacles distributed about the shopping facility, identified as ready to be emptied, wherein the second motorized transport unit transports a replacement second trash can. Further, one or more trash can removal instructions can be communicated to the first motorized transport unit to cause the first motorized transport unit to remove the first trash can from the trash can receptacle. In some instances, a trash can replacement instruction can be communicated to the second motorized transport unit to cause the second motorized transport unit to place the second trash can into the trash can receptacle in place of the first trash can. In some instances, routing instructions can be communicated to cause the first motorized transport unit to travel under the trash can receptacle and the first trash can. A trash can engagement instruction can be communicated that causes the first motorized transport unit to temporarily and removably couple with the first trash can, lift the first trash can at least a first threshold distance, and move the first trash can out and away from the trash can receptacle.

In some implementations, the control circuit in communicating the trash can replacement instruction is configured to communicate routing instructions to cause the second motorized transport unit to align the second trash can horizontally in two dimensions with a door opening of the trash can receptacle, to align the second trash can vertically in a third dimension with guides of the trash can receptacle, and to move the second trash can into the trash can receptacle such that supports on the second trash can cooperate with the guides of the trash can receptacle; and communicate a trash can disengagement instruction that when implemented causes the second motorized transport unit to decouple from the second trash can. The control circuit may further cause the second motorized transport unit to lower at least a portion of the second motorized transport unit reducing a height of the second motorized transport unit, and to move out from under the trash can receptacle and the second trash can.

Some embodiments receive trash level sensor information, communicated from a transmitter at the trash can receptacle and coupled with a sensor positioned within the trash can receptacle, notifying the central computer system that a trash level within the first trash can is at or greater than a trash level threshold, and identify the first trash can is ready to be emptied in response to receiving the trash level sensor information indicating the trash level within the first trash can is at or greater than the trash level threshold. The control circuit may implement the identification of the first and second motorized transport units to replace the first trash can with the second trash can, which may be in response to the trash level sensor information. In some instances, the control circuit is further configured to identify the trash can receptacle from which the trash level sensor information is received, identify a location of the trash can receptacle, and identify a location of the first motorized transport unit, and a location of the second motorized transport unit. The routing instructions for the first motorized transport unit may be determined based on the location of the trash can receptacle and the location of the first motorized transport unit, and the routing instructions for the second motorized transport unit may similarly be determined based on the location of the trash can receptacle and the location of the second motorized transport unit. The control circuit in determining the routing instructions for the second motorized transport unit may further identify a location of the second trash can that is available to be used to replace another trash can, and determine the routing instructions for the second motorized transport unit to direct the second motorized transport unit to the location of the second trash can, and to retrieve the second trash can prior to traveling to the location of the trash can receptacle such that the second motorized transport unit retrieves and transports the second trash can to the location of the trash can receptacle. In some embodiments, the control circuit is further configured to communicate a door activation instruction to a trash can receptacle control circuit to cause the trash can receptacle control circuit to activate a door control system to unlatch the door of the trash can receptacle prior to the first motorized transport unit attempting to move the first trash can.

Some embodiments provide methods of monitoring trash cans. A control circuit of a shopping facility identifies a first motorized transport unit and a second motorized transport unit of a plurality of self-propelled motorized transport units configured to travel about a shopping facility; communicates routing instructions based on a mapping of the shopping facility to each of the first and second motorized transport units directing the first and second motorized transport units to a trash can receptacle, of multiple trash can receptacles distributed about the shopping facility, identified as ready to be emptied, wherein the second motorized transport unit transports a replacement second trash can; communicates trash can removal instruction to the first motorized transport unit to cause the first motorized transport unit to remove the first trash can from the trash can receptacle; and communicates a trash can replacement instruction to the second motorized transport unit to cause the second motorized transport unit to place the second trash can into the trash can receptacle in place of the first trash can. Some embodiments communicate routing instructions to cause the first motorized transport unit to travel under the trash can receptacle and the first trash can, and communicate a trash can engagement instruction that causes the first motorized transport unit to temporarily and removably couple with the first trash can, lift the first trash can at least a first threshold distance, and move the first trash can out and away from the trash can receptacle.

Some embodiments in communicating the trash can replacement instruction communicate routing instructions to cause the second motorized transport unit to align the second trash can horizontally in two dimensions with a door opening of the trash can receptacle, to align the second trash can vertically in a third dimension with guides of the trash can receptacle, and to move the second trash can into the trash can receptacle such that supports on the second trash can cooperate with the guides of the trash can receptacle; and communicate a trash can disengagement instruction that when implemented causes the second motorized transport unit to decouple from the second trash can. Further, the communication of the trash can disengagement instruction may further cause the second motorized transport unit to lower at least a portion of the second motorized transport unit reducing a height of the second motorized transport unit, and to move out from under the trash can receptacle and the second trash can.

Trash level sensor information, communicated from a transmitter at the trash can receptacle and coupled with a sensor positioned within the trash can receptacle, may be received notifying a central computer system that a trash level within the first trash can is at or greater than a trash level threshold, identifies the first trash can is ready to be emptied in response to receiving the trash level sensor information indicating the trash level within the first trash can is at or greater than the trash level threshold; and implements the identification of the first and second motorized transport units to replace the first trash can with the second trash can. Some embodiments identify the trash can receptacle from which the trash level sensor information is received; identify a location of the trash can receptacle; identify a location of the first motorized transport unit, and a location of the second motorized transport unit; determine the routing instructions for the first motorized transport unit based on the location of the trash can receptacle and the location of the first motorized transport unit; and determine the routing instructions for the second motorized transport unit based on the location of the trash can receptacle and the location of the second motorized transport unit.

The determining the routing instructions for the second motorized transport unit can, in some embodiments, further comprise: identifying a location of the second trash can that is available to be used to replace another trash can; and determining the routing instructions for the second motorized transport unit to direct the second motorized transport unit to the location of the second trash can, and to retrieve the second trash can prior to traveling to the location of the trash can receptacle such that the second motorized transport unit retrieves and transports the second trash can to the location of the trash can receptacle. Some embodiments communicate a door activation instruction to a trash can receptacle control circuit to cause the trash can receptacle control circuit to activate a door control system to unlatch the door of the trash can receptacle prior to the first motorized transport unit attempting to move the first trash can.

In accordance with some embodiments, further details are now provided for one or more of these and other features. For example, generally speaking, pursuant to various embodiments, systems, apparatuses, processes and methods are provided herein that automate the performance of ground treatment, such as but not limited to maintenance of exterior areas of shopping facilities as a result of at least some weather conditions, debris clean-up, and other such ground treatment. Embodiments typically further provide enhanced safety in response to some weather conditions and debris. This can include providing at least initial response to temperature dropping below one or more thresholds, snow fall, and sleet, and other such weather conditions. Further, actions can be taken, in at least some implementations, based on forecasted weather conditions. Similarly, in some areas of the shopping facility, such as lawn and garden sections of shopping facilities, debris may inadvertently be dropped, spilled or otherwise build up on the ground of these sections. Often in these sections, the debris can be relatively heavy or difficult to clean up through typical vacuums or other such cleaning devices. For example, the debris may be parts of plants, landscaping gravel and rocks, pieces of brick or other such relatively heavy products, piles of dirt, piles of fertilizer, and other such debris.

In some embodiments, one or more motorized transport units are configured to removably attached and cooperate with ground and/or weather related treatment systems (generally referred to below as ground treatment systems). The ground treatment systems can include one or more snow plow and/or shovel systems, one or more snow blower systems, one or more snow thrower systems, one or more ice melt dispenser systems, one or more brush and/or broom systems, one or more ice chipper systems, one or more sand spreader systems, one or more snow sweeper systems, one or more broom and shovel or dustpan systems, one or more broom and vacuum systems, one or more air blower systems, other such ground treatment systems, or combination of two or more of such systems. In some embodiments, the central computer system can direct one or more of these ground treatment system equipped motorized transport units to areas of the shopping facility that are exposed to weather conditions to cooperatively and in concert address ground level conditions (e.g., weather induced conditions). For example, the one or more motorized transport units cooperated with a snow plow system can be directed to one or more areas of a parking lot and/or walkways to plow snow in attempts to clear at least portions of the parking lot and/or walkway. Similarly, one or more motorized transport units can each be cooperated with a snow plow system and directed to one or more areas of a parking lot and/or walkways to plow snow in attempts to clear at least portions of the parking lot and/or walkway. In some implementations, one or more motorized transport units can each cooperate with a sweeping system, air blower system, and/or other such systems to address debris and the like at areas of the shopping facility in addressing ground level conditions.

In some implementations, different ground treatment systems are configured to detachably cooperate with any one of multiple different motorized transport units. As such, motorized transport units can be configured to perform ground treatment tasks when not assigned to perform one or more other tasks, such as but not limited to helping customers, moving movable item containers, collecting movable item containers, cleaning tasks, and other such tasks. Further, in some embodiments, the any one of multiple different motorized transport units can separately temporarily cooperate with any one of multiple different ground treatment systems and implement ground treatment as instructed by the central computer system or other system (e.g., a central ground treatment control system, which is in communication with and/or controlled by the central computer system).

Figure 28A:
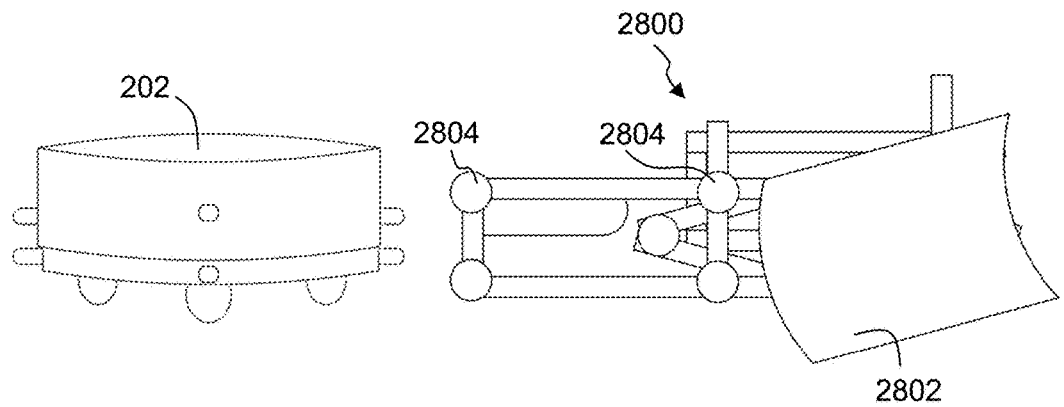
FIGS. 28A-28C illustrate some embodiments of the motorized transport unit detachably engaging a ground treatment system, embodied in this example as a snow plow system, in accordance with some embodiments.
Figure 28B:
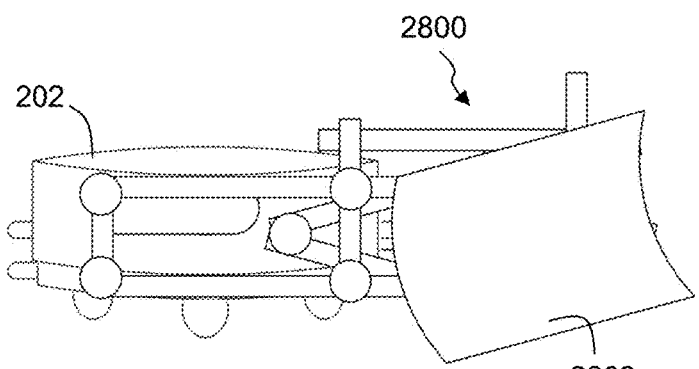
Figure 28C:
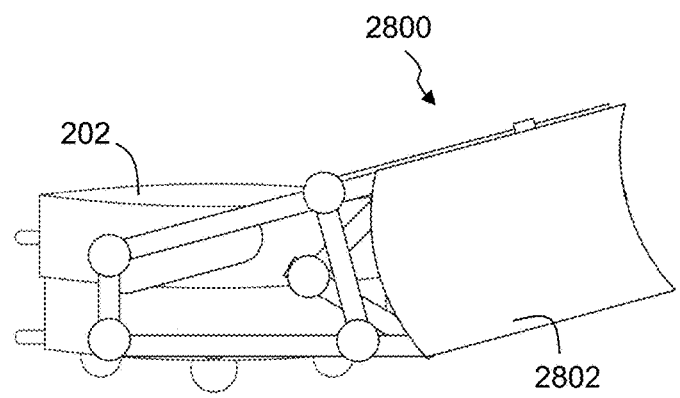

FIGS. 28A-28C illustrate some embodiments of the motorized transport unit 202 detachably engaging a ground treatment system, embodied in this example as a snow plow system 2800. It is noted that FIGS. 28A-28C illustrate a representative snow plow system; however, many of the components, features, structure, functionality, and the like illustrated and described below can similarly be employed with other relevant ground treatment systems. Further, other features, components, structure, functionality and the like described below with respect to other ground treatment systems may similarly be employed with embodiments of the snow plow system and other ground treatment systems. In FIG. 28A, the motorized transport unit 202 is approaching the snow plow system 2800 while in the orientation of FIG. 2A such that it is retracted. FIG. 28B shows the motorized transport unit moved into position (e.g., using sensors of the motorized transport unit, the snow plow system, sensors that communicate with the central computer system and/or other such sensors, or combination of such sensors) and temporarily cooperated with the snow plow system 2800.

Once the motorized transport unit 202 is in position and cooperated with the snow plow system, the motorized transport unit 202 can be instructed to control the snow plow system, including at least driving the snow plow system to desired locations and along desired snow removal routes. In some implementations, the motorized transport unit can further control an elevation of a plow 2802 of the snow plow system relative to the ground, such as the motorized transport unit being moved between the retracted position (as illustrated in FIG. 2A) and the extended position (as illustrated in FIG. 2B) to raise and lower the plow 2802. For example, instructions from the central computer system and/or the control circuit of the motorized transport unit can cause the motorized transport unit to back off and/or taking more shallow cuts at the snow. Further, in some implementations, the central computer system may instruct the motorized transport unit and snow plow system to operate as a shovel and scoop snow and move it to a designated location.

FIG. 28C illustrates the motorized transport unit, in accordance with some implementations, in the extended position while cooperated with the snow plow system such that hinges 2804, pivots, gearing, hydraulics, springs, and other such components of the snow plow system are activated to lift the plow 2802 of the snow plow system 2800 off of the ground, tilt the plow to a desired orientation relative to the ground, implement other such movement and control of the plow, or a combination of two or more of such orientation control of the plow. For example, in some implementations, the snow plow system may include a frame with one or more scissor hinges and/or gears that are activated by the transition of the motorized transport unit moving between the retracted and extended positions cause the elevation of the plow 2802 to change Additionally or alternatively, the rotation of the upper portion 206 relative to the low portion 204 may cause an increase or decrease in tilt of the plow.

Further, in some embodiments, the snow plow system may include one or more motors, hydraulics, servo motors, other such systems, or a combination of two or more of such systems that can be controlled to implement relevant position and orientation control of the plow. In some instances, the motorized transport unit controls the one or more motors or the like of the snow plow system (e.g., through a communication port with which the motorized transport unit couples when coupling with the snow plow system), and in some instances, the central computer system may issue commands to a control circuit of the snow plow system to control the one or more motors or the like. The snow plow system may further include one or more power sources (rechargeable battery, capacitor, etc.) to provide power to one or more control circuits, memory, I/O devices, transceivers, sensors, motors, and the like of the snow plow system. In some applications, the motorized transport unit provides some or all of the power for the snow plow system.

The control circuit of the motorized transport unit may communicate directly with a control circuit of the snow plow system to cooperatively control the operation of the snow plow system and provide feedback and other information to the motorized transport unit. The communication may be wireless or through other wired or physical coupling, which may be part of the coupling structure or other connection. Similarly, in some instances, the snow ploy system may communicate via one or more wireless transceivers with the central computer system. Substantially any information, instructions or other communications can be transmitted between the central computer system and the control circuit of the snow plow system. For example, the communications can include function information, instructions (e.g., detach, attached, power on or off, speed control, control for angle of snow plow, sensor data (e.g., determining resistance, torque, wet versus dry snow, ice, etc.), and the like.

In some implementations, the motorized transport unit supports the entire weight of the snow plow system. In other instances, one or more wheels, tracks, or other such movable components are included that support at least some of the weight of the snow plow system. Some embodiments may provide different types of snow plow systems, such as a small or light option snow plow system that does not include wheels or has limited numbers of wheels, and a larger or heavy duty snow plow system that includes wheels or other movement system that at least supports a portion of the weight of the snow plow system.

In some implementations, the motorized transport unit independently moves the ground treatment system between locations at the shopping facility and along ground treatment routes. In other instances, however, the ground treatment system may include one or more motorized movement systems (e.g., motorized wheel system) that aid the motorized transport unit in moving the ground treatment system. Again, the motorized transport unit may control the one or more motorized wheel systems or other movement systems of the ground treatment system and/or the central computer system may issue commands to at least in part control the motorized movement system of the ground treatment system.

Some embodiments may further include one or more heater systems on one or more of the motorized transport units. For example, one or more heaters or heating elements may be cooperated with cameras, sensors, and other components of the motorized transport unit to inhibit water from freezing on these components and/or in attempts to ensure accurate operation. Similarly, a wash and/or de-icing fluid may be dispensed by the motorized transport unit and/or other actions may be taken (e.g., wiper system, etc.).

Figure 29A:
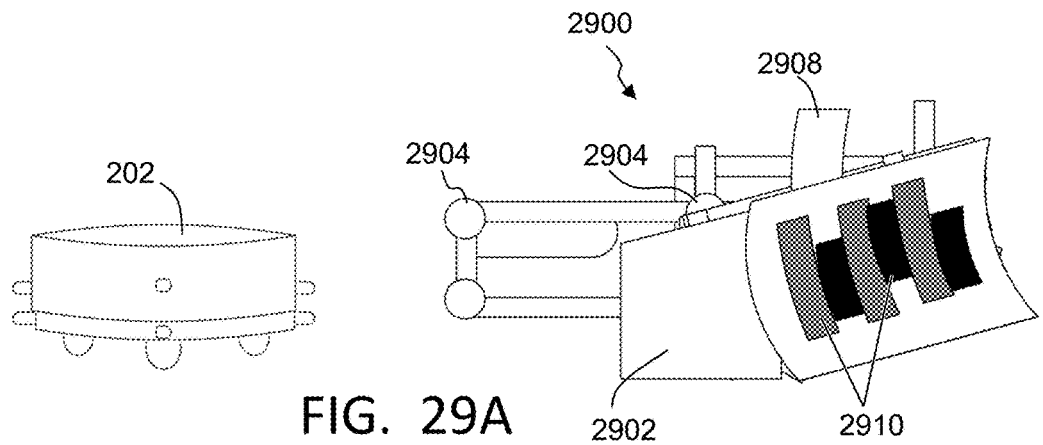
FIGS. 29A-29C illustrate a motorized transport unit moving into position and cooperating with a ground treatment system, embodied in this example as a snow blower system, in accordance with some embodiments.
Figure 29B:
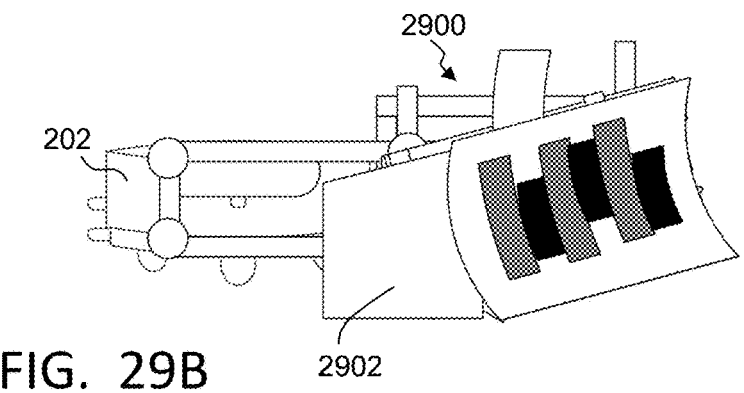
Figure 29C:
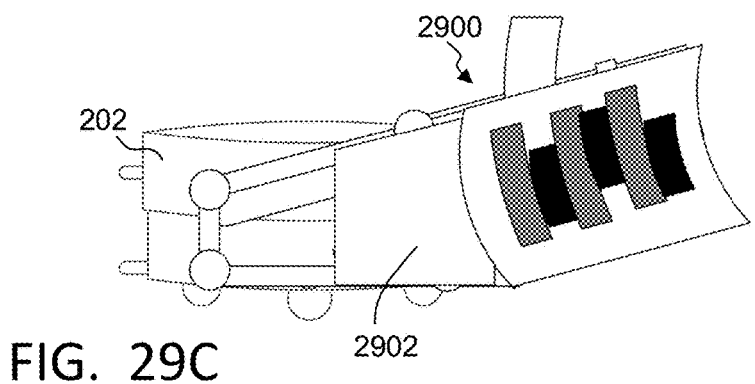

In some embodiments, the motorized transport unit may cooperate with different types of ground treatment systems. FIGS. 29A-29C illustrate a motorized transport unit 202 moving into position and cooperating with a ground treatment system, embodied in this example as a snow blower system 2900, in accordance with some embodiments. As illustrated in these examples, the snow blower system 2900 includes a snow blower 2902 that is cooperated with a frame, one or more hinges 2904, pivots, gearing, hydraulics, springs, motors, and the like. The snow blower system 2900 may further include a blower discharge chute 2908 that directs the snow, which may also be controlled by the motorized transport unit (e.g., based on rotation of the upper portion versus the low portion of the motorized transport unit), a rotation motor of the snow blower system, other such method, or combination of such methods.

In some embodiments, the snow blower system 2900 includes one or more motors to drive the one or more augers 2910 of the snow blower system. The auger motor/s may be electrical, gas or other such motors. In some instances, there is a mechanical coupling between the motorized transport unit and the snow blower system (e.g., axial drive, universal joint, etc.) allowing the motorized transport unit to transfer mechanical power to the snow blower system. For example, an axial drive can provide rotational power that can be used to drive wheels, rotate the one or more augers, and the like. Further, one or more motors may be included to control the orientation of the chute, elevation of the snow blower, and/or other such motors. Similar to the snow plow system 2800, in some embodiments, the snow blower system 2900 may include one or more control circuits, memory, I/O devices, transceivers, sensors, motors, and the like.

In some applications, the motorized transport unit controls the one or more motors or the like of the snow blower system 2900 (e.g., through a communication port with which the motorized transport unit couples when coupling with the snow plow system), and in some instances, the central computer system may issue commands to a control circuit of the snow blower system to control the one or more motors or the like. The snow blower system may further include one or more power sources (rechargeable battery, capacitor, etc.) to provide power to one or more control circuits, memory, I/O devices, transceivers, sensors, motors, and the like. Additionally or alternatively, the motorized transport unit provides some or all of the power for the snow plow system.

The control circuit of the motorized transport unit may communicate directly with a control circuit of the snow blower system to cooperatively control the operation of the snow blower system and provide feedback and other information to the motorized transport unit. The communication may be wireless or through other wired or physical coupling. Similarly, in some instances, the snow blower system may communicate via one or more wireless transceivers with the central computer system. Substantially any information, instructions or other communications can be transmitted between the central computer system and the control circuit of the snow blower system. For example, the communications can include function information, instructions (e.g., detach, attached, power on or off, speed control, direction of chute, rotation speed and/or power level of the augers, height and/or depth control, sensor data (e.g., determining resistance, torque, snow depth, wet versus dry snow, ice, etc.), and the like.

In some implementations, the motorized transport unit supports the entire weight of the snow blower system. In other instances, one or more wheels, tracks, or other such movable components are included that support at least some of the weight of the snow blower system. Some embodiments may provide different types of snow blower systems, such as a small or light option that does not include wheels or has limited numbers of wheels, and a larger or heavy duty option that includes wheels or other movement system that at least support a portion of the weight of the snow blower system.

Figure 30A:
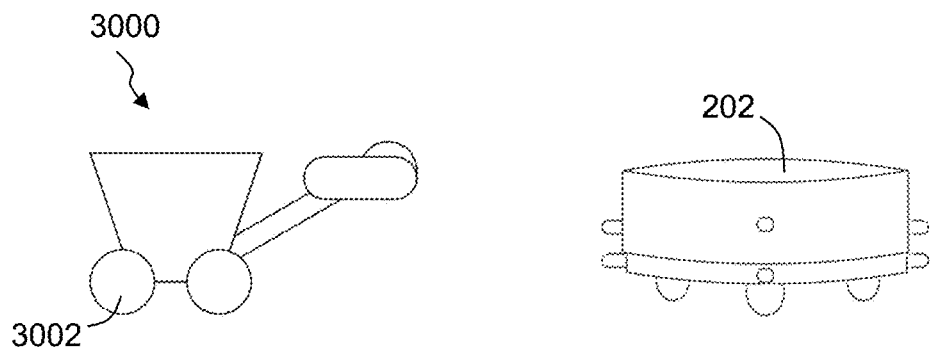
FIGS. 30A-30B similarly illustrate the motorized transport unit cooperating with a ground treatment system, embodied in this example as an ice melt dispenser system, in accordance with some embodiments.
Figure 30B:
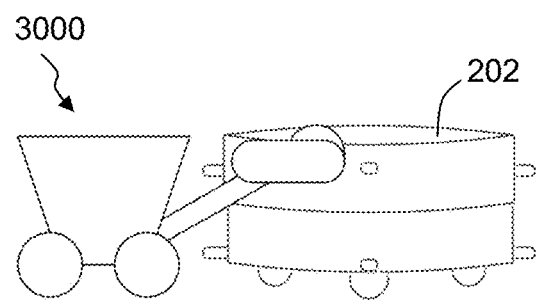

FIGS. 30A-30B similarly illustrate the motorized transport unit 202 cooperating with a ground treatment system, embodied in this example as an ice melt dispenser system 3000, in accordance with some embodiments. The ice melt dispenser system can include a receptacle, cavity or the like to receive one or more melting agents (e.g., salt, calcium chloride, etc.) or other substances the can inhibit slipping (e.g., sand, pellets, etc.) that can be dispensed by the ice melt dispenser system as it is moved by the motorized transport unit. Further, the quantity of melt agent or other agent that is dispensed typically can be controlled by a controller of the ice melt dispenser system or the motorized transport unit. For example, in some embodiments, the ice meld dispenser system may include a control circuit that activates one or more motors, screw drives, or the like in decreasing or increasing dispensing rates. Alternatively or additionally, in other embodiments, a height and/or rotation of the upper body portion of the motorized transport unit relative to the lower body portion may be used to control the flow of the melt agent. For example, a movable lever and/or cable of the ice melt dispenser system may be moved by the motorized transport unit (or locally controlled) to control a quantity or rate of disbursement of the melt agent. In some instances, gearing may be included and coupled with the cable and/or lever in controlling the quantity of disbursement.

The ice melt dispenser system may be pushed or pulled by the motorized transport unit. As described above, in some embodiments, the motorized transport unit may support the weight of the ice melt dispensing system, while in other instances the ice melt dispensing system may include one or more wheels 3002, tracks, or the like that supports some or all of the weight of the ice melt dispensing system. Further, in some implementations, the ice melt dispenser system may include one or more wheel systems and/or other such motorized movement systems that can aid the motorized transport unit is moving the ice melt dispenser system.

In some implementations, the motorized transport unit independently moves the ground treatment system between locations at the shopping facility and along ground treatment routes. In other instances, however, the ground treatment system may include one or more motorized movement systems (e.g., motorized wheel system) that aid the motorized transport unit in moving the ground treatment system. Again, the motorized transport unit may control the one or more motorized wheel systems or other movement systems of the ground treatment system and/or the central computer system may issue commands to at least in part control the motorized movement system of the ground treatment system.

The motorized transport unit may cooperate with other such ground treatment systems to move and/or direct the ground treatment systems to implement one or more tasks. Other ground treatment systems can include, but are not limited to, snow sweepers, sweepers, ice chipper, sand spreader, heating system, air blower system, vacuum system, ground sprayer systems, ground washing systems, and/or other such ground treatment systems, or combination of such systems. Accordingly, the motorized transport unit provides a modularity for ground treatment by readily coupling with and decoupling from one or more different types of ground treatment systems.

Figure 30C:
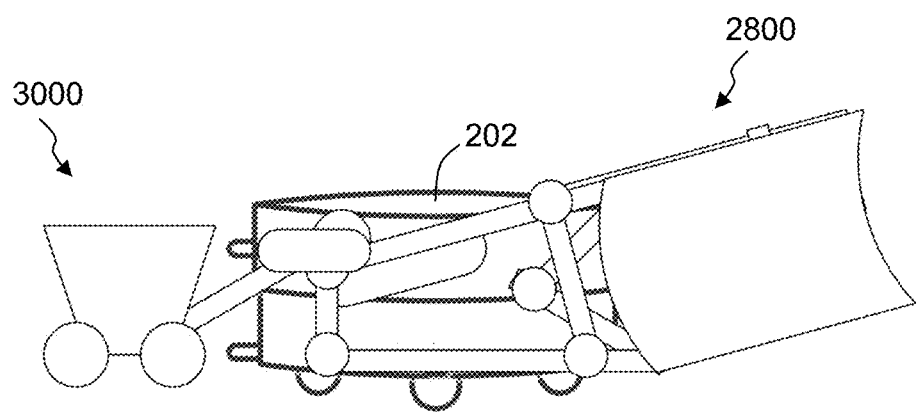
FIG. 30C illustrates a motorized transport unit cooperated with multiple ground treatment systems, embodied in this example as a snow plow system and an ice melt dispenser system, in accordance with some embodiments.

Further, in some instances, a single motorized transport unit may simultaneously temporarily cooperate with multiple different ground treatment systems. FIG. 30C illustrates a motorized transport unit 202 cooperated with multiple ground treatment systems, embodied in this example as a snow plow system 2800 and an ice melt dispenser system 3000, in accordance with some embodiments. In this configuration, the motorized transport unit can drive both ground treatment systems allowing the ground treatment systems to implement respective ground treatments. In some implementations, the multiple ground treatment systems may be operated simultaneously for at least a period of time. For example, the first ground treatment system may be a snow plow system and the second ground treatment system may be an ice melt dispenser system. The motorized transport unit can drive the snow plow system to plow snow while simultaneously pulling the ice melt dispenser system to dispense one or more ice melt agents along the just plowed surface.

Figure 31:
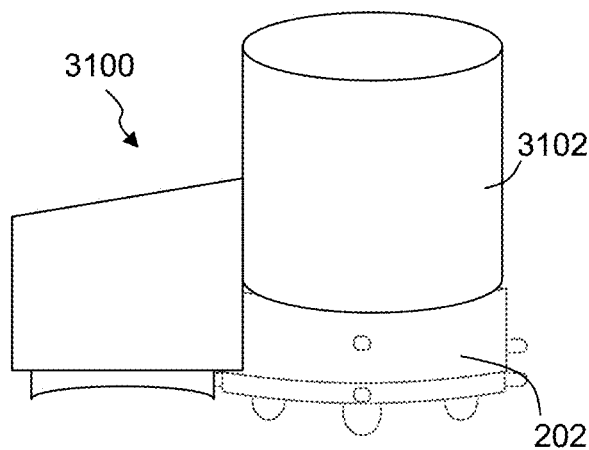
FIG. 31 illustrates a motorized transport unit cooperated with a ground treatment system, embodied in this example as a ground cleaning system, in accordance with some embodiments.

FIG. 31 illustrates a motorized transport unit 202 cooperated with a ground treatment system, embodied in this example as a ground cleaning system 3100, in accordance with some embodiments. The ground cleaning system 3100 can be moved by the cooperated motorized transport unit through one or more routes as the ground cleaning system addresses ground level conditions. The ground cleaning system 3100 can include, one or more brushes (e.g., rotating brushes) that can sweepdebris, one or more vacuums, a shovel of the ground cleaning system or other such component that can receive the debris, an air blower that can blow debris, a liquid spray component, and/or other such components. One or more motors can be cooperated with the brushes to rotate and/or pivot brushes, the vacuum, and the like. In some instances, the speed of the motors can be controlled by the motorized transport unit (e.g., through communication between the ground cleaning system and the motorized transport unit, through the control of one or more toggles or levers through the retraction and expansion of the height of the motorized transport unit, etc.), controlled by the central computer system (e.g., based on sensor feedback, based on size of pieces of debris, based on quantity of debris, based on location of the ground cleaning system, and other such factors), and the like. Similarly, one or more motors can be included to implement a vacuum system of the ground cleaning, which may also be variably controlled.

In some embodiments, a bin or tank 3102 may be included in and/or cooperated with the ground cleaning system 3100 to receive and retain debris collected by the ground cleaning system in addressing ground level conditions. For example, a vacuum system may deposit debris into the bin. The bin can be substantially any size, and in some applications may be dependent upon expected quantities of debris to be retrieved, capabilities of the motorized transport unit, expected type of debris, and other such factors. In some instances, the bin may be detachable such that a bin can be selected from different sizes of bins and cooperated with the ground cleaning system 3100 (e.g., as part of the cooperation of the motorized transport unit with the ground cleaning system).

As with the other ground treatment systems, the central computer system directs the motorized transport units to cooperate with the ground cleaning system 3100 and drive the ground cleaning system through one or more areas associated with the shopping facility, and typically exterior areas (e.g., lawn and garden areas, walkways, parking lots, etc.). The central computer system can, in some instances, detect debris or other material that is to be picked up or otherwise cleaned up in the designated areas. For example, the central computer system may evaluate images and/or video to identify a change in the ground level condition (e g, change in color, change in contour, etc.) and/or a difference in a floor pattern, based on images from shopping facility cameras, cameras on the motorized transport unit and/or ground treatment systems, and/or other such cameras. The size and/or quantity of the debris and/or area to be cleaned can further be determined in selecting one or more relevant ground cleaning systems and/or the number of ground cleaning systems to activate. Further, the central computer system can provide routing to one or more motorized transport units to implement desired cleaning and/or debris disposal, and often coordinate multiple motorized transport units, each cooperated with a ground cleaning system, to cooperatively address one or more tasks. For example, the central computer system can communicate one or more exterior area cleaning routing instructions to each of two or more motorized transport units to drive separate ground cleaning systems to cooperatively implement a cleaning of exterior areas of the shopping facility in addressing ground level conditions.

The routing can be predefined, such as preforming ground treatment tasks during hours when customers are not present, determined routes dependent on the area and/or debris being addressed (e.g., based on sensor data from the ground cleaning system, the motorized transport unit, shopping facility cameras, and the like), or a combination of predefined and determined routes. Further, the routing can take into consideration long term and/or short term obstacles. The obstacles may be detected based on image analysis and/or sensor data from the motorized transport unit, ground cleaning system and/or other sources. In some implementations, the ground treatment system and/or motorized transport unit includes one or more infrared sensors, sonar sensors, distance measurement sensors, and/or other such sensors to detect customers, obstacles, and other obstructions accounted for and unaccounted for when a route is determined. Again, the central computer system can cooperatively utilize multiple motorized transport units to implement the ground treatment tasks. In some instances, the central computer system can communicate exterior area cleaning routing instructions to multiple motorized transport units that are each temporarily and removably cooperated with ground a cleaning system, to cause the motorized transport units to travel over portions of an external area along defined ground treatment routes while driving the ground cleaning systems along the surface of the portions of the external area as the ground treatment systems are activated to perform respective cleaning tasks.

The central computer system can further direct the motorized transport unit to disposal stations where debris picked up by the ground cleaning system can be deposited for disposal. For example, a ground cleaning system may be driven up a ramp and over a trash bin and one or more doors can be opened to release the debris, a bin 3102 can be tipped, etc. The selected disposal station may depend on the debris retrieved by the ground treatment system (e.g., leaves and other plant material to a compost bin; trash, cans, bottles and the like to a trash bin; rock and the like to another bin, and other such disposal stations).

In some embodiments, the central computer system may activate one or more motorized transport units to cooperate with and drive ground cleaning systems based on a predefined schedule (e.g., when the shopping facility is closed, as defined by a manager, during non-peak times, and the like), and/or in response to detecting a need (e.g., based on image analysis). Similarly, a shopping facility worker may request the activation of a ground cleaning system or other ground treatment system, such as in response to identifying an area to be cleaned, in response to a spill, and the like. The type of ground cleaning system utilized and/or the use of one of multiple functionalities of a single ground cleaning system can depend on the area to be cleaned, the ground level condition or conditions being addressed, debris being addressed, and other such factors.

In some embodiments, the central computer system can further verify the completion of the ground treatment task. For example, the central computer system can further analyze images from the motorized transport unit, the ground treatment system, shopping facility cameras, user interface unit cameras and the like, and evaluate those relative to one or more other images to confirm the completion of the task. Additionally, in some implementations, a shopping facility worker may provide feedback regarding whether the ground treatment task is completed, partially completed, and/or not addressed.

Again, the ground cleaning systems can include one or more ground cleaning components, such as but not limited to one or more brushes, one or more dustpans, one or more shovels, one or more vacuums, one or more liquid sprayers, one or more air blowers, and other such ground cleaning components. Often, a motor is cooperated with the ground cleaning component to activate the ground cleaning component. Similarly, the motorized transport unit may include other motors, hydraulics, levers, actuators, mechanical couplings, and the like to control the ground cleaning components, such as but not limited to the speed of brush rotation, the vacuum pressure, airflow pressure, airflow direction for a blower, and other such controls. Again, the central computer system typically controls the motorized transport unit and the ground cleaning system to achieve the desired cleaning. In some applications, the motorized transport unit controls the one or more motors or the like of the ground cleaning system 3100 (e.g., through a communication port with which the motorized transport unit couples when coupling with the ground cleaning system), and in some instances, the central computer system may issue commands to a control circuit of the ground cleaning system to control the one or more motors or the like. The ground cleaning system may further include one or more power sources (rechargeable battery, capacitor, etc.) to provide power to one or more control circuits, memory, I/O devices, transceivers, sensors, motors, and the like of the ground treatment system. Additionally or alternatively, the motorized transport unit provides some or all of the power for the ground cleaning system.

The control circuit of the motorized transport unit may communicate directly with a control circuit of the ground cleaning system 3100 to cooperatively control the operation of the ground cleaning system and provide feedback and other information to the motorized transport unit. The communication may be wireless or through other wired or physical coupling. Similarly, in some instances, the ground cleaning system may communicate via one or more wireless transceivers with the central computer system. Substantially any information, instructions or other communications can be transmitted between the central computer system and the control circuit of the ground cleaning system. For example, the communications can include function information, instructions (e.g., detach, attached, power on or off, speed control, direction of blowing, rotation speed and/or power level of the brushes and/or vacuum, height control), sensor data, and the like.

In some implementations, the motorized transport unit supports the entire weight of the ground cleaning system. In other instances, one or more wheels, tracks, or other such movable components are included in the ground cleaning system that support at least some of the weight of the ground cleaning system. Some embodiments may provide different types of ground cleaning systems, such as a small or light option that does not include wheels or has limited numbers of wheels, and a larger or heavy duty option that includes wheels or other movement system that at least support a portion of the weight of the ground cleaning system.

Keeping areas and customers' pathways clean and clear is part of maintaining a shopping facility and keeping customers coming back. Further, this task typically needs to be done regularly and efficiently. Often, shopping facilities do not have specific workers assigned to cleaning garden and/or patio areas, and workers assigned other work are usually asked to leave that other work to perform this infrequent activity. Accordingly, in some embodiments, the central computer system implements one or more set schedules for cleaning based upon prior experience in attempts to avoid wasted time, to keep areas clean, and the like. Further, using one or more available motorized transport units to drive one or more ground treatment system allows workers to perform other activities.

In some implementations, the ground cleaning systems are used on a timely regiment to address multiple and typically exterior areas of the shopping facility. Further, in some embodiments, the motorized transport units can be tasked to patrol the specified areas to detect trash, spills or other debris. By cooperating with a ground cleaning system, the motorized transport unit can drive a ground cleaning system to address detected debris (e.g., activating a vacuuming sweeper equipment system), clean spills, and address other cleaning task. A cleaning task can be performed, for example, by the motorized transport unit driving the ground cleaning system along a pre-specified path set by the central computer system. Often this routine cleaning is performed at low traffic times for each location depending on prior store activity and the need. Additionally, workers may call for an on-demand cleaning. Once the task is complete, the motorized transport unit can drive the ground cleaning system to a disposal station, when relevant, and the cleaning system can be activated to dump any debris. Again, the motorized transport units can perform multiple different tasks, and once a ground cleaning task is completed, the motorized transport unit can be instructed to disconnect from the ground treatment system, and return to other activities throughout the store.

Different ground cleaning systems can be provided to perform different types of ground cleaning tasks. In some embodiments, the motorized transport unit can cooperate, for example, with a vacuum/blower type dry debris sweeper system that sweeps debris into a special compartment or blows debris in an intended direction. In some embodiments, the ground cleaning system includes electrically operated motors that provide noise reduction over other types of motors, such as gas powered motors. Further, in some instances, one or more of the ground treatment systems can be configured with a relative low height profile to allow the cleaning system to move under shelves and the like. The motorized transport unit may further cooperate with the low profile cleaning systems while in the retracted position to provide a lower profile of the motorized transport unit. Some systems include brushes, vacuums, blowers and/or other such systems that allow cleaning against walls and in corners. Further, some ground cleaning systems are configured to reverse the flow of air from vacuum to blower as the need arises. For example, in low traffic states, a blower can be activated to clean and dust while a vacuum can be activated when customers are present and/or in other circumstances. Further, the air blowing capability may allow the ground cleaning system to reach locations otherwise untouchable by a vacuum. Additionally, the blower speed may be adjusted by the system as a more delicate cleaning is desired.

The motorized transport units may cooperate with a ground treatment system through one or more coupling structures 422 of the motorized transport unit and/or ground treatment system. The coupling structures 422 can be substantially any relevant coupling structure that can cooperate the motorized transport unit with the one or more intended ground treatment systems. For example, the coupling structures may include one or more clamps, hooks, latches, posts, pins, recesses, tethers, magnets, tongue and grooves, locking mechanisms, other such coupling structures, or combination of two or more of such coupling structures. Additionally or alternatively, the ground treatment systems may include one or more coupling structures that cooperate with one or more coupling structures or other structure of the motorized transport units. Some implementations include one or more actuatable clamps controlled by the control circuit 406. For example, the control circuit, in response to the motorized transport unit being positioned relative to a ground treatment system, can activate the clamps to engage and removably clamp to a frame or other structure of the ground treatment system and temporarily secure the motorized transport unit with the ground treatment system.

Further, the coupling structures and/or one or more arms of the motorized transport unit can be configured to accommodate slight variations between the frame or other structure of the ground treatment system and positioning of the motorized transport unit when trying to cooperate with the ground treatment system. In some instances, the coupling structure and/or ground treatment system may include one or more guides or other such structure to help achieve desired alignment of the coupling structure and the part of the ground treatment system with which the coupling structure is coupling (e.g., lateral bar of the frame, hooks, rings, etc.). Additionally, a ground treatment system coupling structure may be configured to move horizontally and/or vertically relative to the motorized transport unit to allow for alignment. Some embodiments include coupling structure sensors to ensure the coupling structures have achieved a secure cooperation with the ground treatment system. In some applications, the coupling structure further includes communication port that mate upon couple and establishing a communication link between the motorized transport unit and the ground treatment system.

In some embodiments, the central computer system utilizes sensor data (e.g., video camera information, RFID information of a ground treatment system, one or more radio beacons (e.g., Wi-Fi, Bluetooth, RF, etc.) at known positions throughout the shopping facility, light sources (e.g., LEDs) that emit identifier information, location identifiers (e.g., barcodes), and the like) to identify a location of each ground treatment system and the one or more motorized transport units. The location information may be received directly from a detector, from one or more sensors on the ground treatment systems, sensor data from one or more motorized transport units, other sources, or combination of such sources. Based on the detected location of the ground treatment systems and the motorized transport units, the central computer system can route a motorized transport unit to a location of a selected ground treatment system.

Once proximate the ground treatment system, the motorized transport unit can then move to a location and/or orientation relative to the ground treatment system where the motorized transport unit can temporarily cooperate with the ground treatment system. In some instances, the central computer system continues to track sensor data and communicates routing information to the motorized transport unit to cause the motorized transport unit to move to a predefined location and/or orientation relative to the ground treatment system. Additionally or alternatively, the motorized transport unit may utilize its own internal sensors in positioning and/or orienting itself relative to the ground treatment system. For example, in some embodiments, the central computer system routes the motorized transport unit to a location proximate the ground treatment system. Once positioned proximate the ground treatment system, the motorized transport unit autonomously moves itself into position, based on sensor data (e.g., distance measurement sensor/s, camera/s, image processing, RFID scanner/s, barcode reader/s, light ID detector/s, antenna/s, directional antenna/s, other such sensors, or typically a combination of two or more of such sensors and/or sensor data). Furthermore, the central computer system may communicate sensor data to the motorized transport unit that can be used by the motorized transport unit in addition to local sensor data in orienting and positioning itself relative to the ground treatment system.

In some embodiments, one or more ground treatment systems may include one or more RFID transmitters or other such transmitters that can be detected by the motorized transport unit and/or the central computer system to obtain an identifier of the ground treatment system, and/or may be used in part to determine a location of the ground treatment system. Utilizing one or more sensors (e.g., camera/s, distance sensor/s, other such sensors, or a combination of two or more of such sensors), the motorized transport unit, once positioned proximate the ground treatment system, may recognize a shape of the ground treatment system (e.g., a virtual modeled shape that corresponds to a reference model) and based on the shape (e.g., a difference between the orientation of the detected modeled shape relative to a reference shape, such as differences in lengths, angles, etc.) can identify an orientation of the motorized transport unit relative to the ground treatment system. For example, the motorized transport unit can recognize ground treatment system and its relative orientation based on angles and/or rotation of the model. Additionally or alternatively, some embodiments may recognize one or more key features of the ground treatment system. For example, the motorized transport unit may, based on the detected model, identify a frame, base, marker, or the like, and/or a specific aspect of the frame and its orientation relative to that key feature.

Utilizing the determined relative position and/or orientation, the motorized transport unit can move itself (and/or be instructed by the central computer system) into a desired position relative to the ground treatment system. Typically, during movement, the motorized transport unit can continue to use sensor data (e.g., distance measurements, video and/or image data, etc.) to continue to track its position relative to the ground treatment system and its orientation relative to a desired positioning and orientation relative to the ground treatment system to allow cooperation between the motorized transport unit and the ground treatment system.

In some embodiments, one or more of the ground treatment systems can include one or more tags, beacons or the like (e.g., RFID tag, radio beacon, distance tags providing distance information, etc.) placed at predefined locations on the ground treatment system. The proximity and/or orientation of the motorized transport unit relative to the ground treatment system, in some implementations, depends on the signal strength of the tags, interference, and other such factors. Again, the central computer system may provide routing instructions to guide the motorized transport unit through one or more portions of the shopping facility to a location proximate the ground treatment system (e.g., within a predefined threshold distance where it has been determined the motorized transport unit can accurately detect the tags). In some embodiments, the motorized transport unit wirelessly receives positioning route instructions from the central computer system. Based on the route instructions, the control circuit of the motorized transport unit can activate the motorized wheel system to move the motorized transport unit to position the motorized transport unit, in accordance with the positioning route instructions, proximate the ground treatment system such that the one or more wireless tag sensors are capable of sensing at least one of the wireless tags on the ground treatment system.

The motorized transport unit can then utilize one or more sensors (e.g., camera/s, distance sensor/s, antenna/s, directional antenna/s, other such sensors, or a combination of two or more of such sensors) to detect and/or recognize the ground treatment system and/or determine a relative position and/or orientation of the ground treatment system relative to a position and/or orientation of the ground treatment system. In some embodiments, the motorized transport unit utilizes one or more tag sensors, directional antennas or the like to detect and locate the one or more tags (e.g., determine distance and angle of tags relative to a position and orientation of the motorized transport unit). Based on the predefined location of the tags on the ground treatment system, the motorized transport unit can use the determined location and orientation of the ground treatment system relative to the motorized transport unit as the motorized transport unit moves into a desired position relative to the ground treatment system so that the motorized transport unit can cooperate with the ground treatment system. For example, based on the detected tags, the motorized transport unit can apply triangulation relative to the multiple tags to determine a precise location of the motorized transport unit relative to the ground treatment system.

Again, the location information determined from the tags may be utilized in combination with other sensor data, such as distance measurement data, image processing data and other such information. The number of tags can vary depending on one or more factors, such as but not limited to size of the ground treatment system, precision of the sensors of the motorized transport unit, input from the central computer system (e.g., movement and/or routing instructions, sensor data, etc.), and other such factors. In some implementations, for example, the ground treatment system may include three or more tags that allow the motorized transport unit and/or the central computer system to determine positioning and/or orientation of the motorized transport unit relative to the ground treatment system as the motorized transport unit moves into a desired position. As a specific example, in some applications four tags are secured in predefined locations on the ground treatment system, where three tags can be used for horizontal positioning and/or orientation while the fourth can be used for vertical positioning Typically, the tags have unique identifiers that allow the motorized transport unit and/or the central computer system to distinguish between the tags. In some implementations, the orientation is utilized to accurately orient the motorized transport unit relative to the ground treatment system, such as to accurately position one or more coupling structures 422.

Further, in some implementations, one or more sensors of the motorized transport unit may be overridden and/or ignored. For example, a bump sensor may be ignored as the motorized transport unit moves into position relative to the ground treatment system. Similarly, in some instances the motorized transport unit may intentionally bump one or more parts of the ground treatment system as part of a positioning process. As such, the bump sensor may be used not as a warning but as a confirmation.

The motorized transport unit receives routing instructions from the central computer system. The routing instructions can include routing the motorized transport unit to cooperate with a ground treatment system, driving the ground treatment system through one or more predefined routes while implementing ground treatment, driving the ground treatment system through ad hoc routing (e.g., to avoid obstacles, changing conditions, problems experienced by the motorized transport unit and/or ground treatment system, etc.), and the like.

Figure 32:
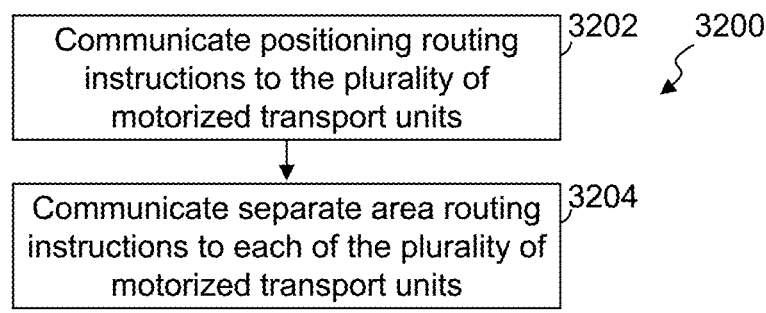
FIG. 32 illustrates a simplified flow diagram of an exemplary process of providing enhanced safety in response to one or more ground conditions, in accordance with some embodiments.

FIG. 32 illustrates a simplified flow diagram of an exemplary process 3200 of providing enhanced safety in response to one or more ground level conditions and/or weather conditions, in accordance with some embodiments. In step 3202, the central computer system that is separate and distinct from a plurality of self-propelled motorized transport units communicates positioning routing instructions to the plurality of motorized transport units directing the plurality of motorized transport units to one or more external areas of a shopping facility that are exposed to weather conditions. The plurality of motorized transport units are each cooperated with one or more ground treatment systems. Further, two or more motorized transport units may be cooperated with the same types of ground treatment systems, and/or different motorized transport units may be cooperated with different ground treatment systems. The central computer system can evaluate ground level conditions, current and/or forecasted weather conditions, and the like, to determine one or more ground treatments that are to be implemented. Based on the intended ground treatments to be implemented, the central computer system can identify what types and numbers of ground treatment systems to be employed in implementing the desired ground treatments.

In some implementations, the central computer system can further take into consideration an area to be treated with respect to each desired ground treatment relative to a time expected for one or more motorized transport units to perform the intended ground treatment, and/or current and/or forecasted weather conditions. For example, the central computer system may have parameters, tables and the like defining rates or predicted amounts of time it takes a motorized transport unit to drive a snow plow (or other ground treatment system) over one or more predefined areas, which may be dependent on the type of ground, expected obstacles, weather conditions (e.g., measured and/or forecasted rates of snow fall, forecasted and/or current temperatures, etc.) and other such factors. Based on the area or areas to be treated, the central computer system can prepare and/or activate one or more motorized transport units and/or ground treatment systems to perform the desired one or more ground treatments. In some embodiments, one or more snow accumulation detectors may be utilized in tracking current conditions and/or the effectiveness of the ground treatment (e.g., one or more snow accumulation detectors may be included on one or more the motorized transport units, ground treatment systems, fixed to permanent structures (e.g., light posts, support posts, etc.), other locations, or combinations thereof).

Further, the central computer system can identify available motorized transport units and/or free up motorized transport units to perform the relevant ground treatment tasks. Once identified, the central computer system can direct the motorized transport units to cooperate with one or more ground treatment systems when the identified motorized transport units are not already cooperated with desired ground treatment systems.

In step 3204, the central computer system communicates separate area routing instructions to each of the plurality of motorized transport units intended to perform the desired one or more ground treatments. When implemented, the area routing instructions cause the corresponding one of the plurality of motorized transport units to cooperatively and in concert travel in accordance with the area routing instructions over at least predefined portions of one or more external areas that are accessible by the plurality of motorized transport units to cause the ground treatment systems to perform one or more intended ground treatments to address ground level conditions and/or ground level weather induced conditions. Again, the ground treatments can be scheduled, can be dependent on detected conditions, can be dependent on the current and/or forecasted weather conditions (e.g., temperature, precipitation rate, perception quantity, etc.), forecasted based on scheduled activity in one or more areas (e.g., stocking of plants or other gardening products that often result in debris, and the like. As such, the relevant ground treatment systems are selected to implement the intended ground treatments.

In some embodiments the control circuit of the central computer system can communicate one or more treatment instructions to a motorized transport unit of the plurality of motorized transport units causing the motorized transport unit, which is temporarily and removably cooperated with a ground treatment system (e.g., snow plow system) that is configured to perform a first ground treatment (e.g., plow and/or shovel snow), to position the ground treatment system relative to a surface of a portion of an external area (e.g., walkway, parking lot, etc.). The area routing instructions can cause the motorized transport unit to travel over at least a portion of an external area along a defined treatment route while driving a ground treatment system along the surface of the portion of the external area as the ground treatment system performs the ground treatment to address one or more of the ground level conditions (e.g., ground level weather induced conditions). In some embodiments, the defined routes are predefined based on an evaluation of the area or areas to be treated (e.g., defined by a user, calculated based on expected areas, speeds, etc., provided by a third party, or other such sources or combination of sources). In other instances, the routing may be more generic such that the motorized transport unit is provided with an area information with instructions regarding how the ground treatment system operates (e.g., length of plow, etc.), and the motorized transport unit driving the ground treatment system determines relevant routes to achieve a desired ground treatment and uses sensor data in implementing the routes.

Again, multiple motorized transport units can be cooperatively and/or concurrently activated to cooperatively implement one or more ground treatments. Accordingly, in some implementations the control circuit of the central computer system can cause one or more second treatment instructions to be communicated to a second motorized transport unit of the plurality of motorized transport units causing the second motorized transport unit, which is temporarily and removably cooperated with a second ground treatment system, to position the second ground treatment system relative to the surface of the first portion of the first external area or to a surface of a second portion of a second external area. Further, second treatment routing instructions can be communicated to the second motorized transport unit causing the second motorized transport unit to travel over, for example, the second portion of the second external area along a defined second treatment route while driving the second ground treatment system along the surface of the second portion of the second external area as the second ground treatment system performs the second ground treatment to address one or more of the ground level conditions (e.g., ground level weather induced conditions, debris, scheduled cleaning, etc.).

In some instances the routing instruction may further direct the motorized transport unit in implementing the intended ground treatment. For example, the motorized transport unit may be directed to move snow (e.g., plow, shovel, blow, etc.) to one or more identified locations. In some instances, the central computer system identifies one or more locations where snow is to be moved, areas to avoid while directing snow, and other locations. The identification of the location may be predefined, identified based on sensor data, based on previous ground treatments (e.g., where snow was directed, estimated quantities of snow directed to previous locations, etc.), other such factors, or a combination of two or more of such factors. Routing can be identified between each one or more motorized transport units and at least one of the one or more locations. The central computer system can then cause the area routing instructions to be communicated to each of the motorized transport units (and often multiple transport units that are cooperatively performing a ground treatment or treatments) such that each of the motorized transport units, in implementing the area routing instructions, drives a respective ground treatment system to moved snow to at least one of the one or more locations.

Multiple different ground treatments can be performed independently or cooperatively. For example, one or more motorized transport units can drive snow blower systems, ice melt dispenser systems, snow sweeper systems, and the like. In some implementations, for example, the control circuit of the central computer system can communicate area routing instructions that include ice melt dispenser routing instructions to a motorized transport unit, which is temporarily and removably cooperated with an ice melt dispenser system, causing the motorized transport unit to travel over at least a portion of an external area along a defined melt dispenser route while driving the ice melt dispenser system along the surface of the first portion of the first external area as the ice melt dispenser system dispenses a melt agent. The central computer system may further communicate ground treatment instructions to configure one or more ground treatment systems when performing the relevant ground treatment. For example, ice melt dispenser instructions may be communicated to a motorized transport unit and/or the ice melt dispenser system regarding configuring the ice melt dispenser system and/or setting parameters of the ice melt dispenser system (e.g., amount of melt agent to dispense, angle and/or orientation of a dispensing portion, and the like). For example, the ice melt dispenser instructions can cause the motorized transport unit and/or the ice melt dispenser system to position a dispenser of the ice melt dispenser system relative to the surface of a portion of an external area. Further, with the use of multiple different motorized transport units and multiple different ground treatment systems, different types of ground treatments can concurrently be performed.

As another example, the central computer system in communicating the area routing instructions can communicate exterior area cleaning routing instructions to first and second motorized transport units of the plurality of motorized transport units. The first and second motorized transport units can temporarily and removably be cooperated with first and second ground cleaning systems, respectively. The area routing instructions can cause the first and second motorized transport units to travel over the portions of an external area along defined ground treatment routes while driving the first and second ground cleaning systems along the surface of the portions of the external area as the first and second ground cleaning systems are activated to perform respective cleaning tasks.

Typically, the central computer system receives route condition information, which may have an effect on the route a motorized transport unit travels and/or the ground treatment being performed. The route condition information can be received from the motorized transport units, ground treatment systems, and/or other sources external to the motorized transport units and ground treatment systems (e.g., shopping facility video cameras, shopping facility tag detectors, etc.). The route condition information can include, but is not limited to, sensor information from sensors of one or more motorized transport units and/or ground treatment systems (e.g., distance sensor information, location sensor information, machine readable code information, motion sensor information, distance traveled information, image and/or video information from one or more cameras, and other such information), sensor information from other units or devices (e.g., sensor information from another motorized transport unit, a movable item container 104, one or more user interface units 114, docking and/or recharge stations 122, motorized transport dispensers 120, and the like), and/or sensor information from one or more sensor units of the shopping facility (e.g., cameras 118, distance sensors, location detection system 116, wireless network access points, and the like). The central computer system is configured to utilize the route condition information in determining whether an action is to be taken and what actions are to be taken by a motorized transport unit and/or a ground treatment system.

Many of the areas to be ground treated may have short term or long obstacles. For example, people, cars, shopping carts, trash cans, light poles, parking blocks, planters, buildings or parts of buildings (e.g., doors, windows, walkways), etc. may be in, enter and/or are adjacent the one or more areas. The motorized transport units are configured to avoid the obstacles, and in some instances the routing takes into account the obstacles (e.g., plowing snow away or toward the obstacle, directing blown snow away or toward the obstacle, routing the motorized transport unit around the obstacle/s, etc.). Similarly, the ground treatment may temporarily be interrupted because of the detection of an obstacle (e.g., a customer enters an area where snow is being or is about to be directed by a snow blower system). Further, in some embodiments, the central computer system 106 is configured to detect objects that may affect the routes of travel of one or more motorized transport units 102 and ground treatment system. Based on the detected object and/or how it may affect the route of travel and/or the ground treatment being implemented, one or more instructions can be issued to one or more motorized transport units and/or the ground treatment system to take one or more actions with regard to the detected object.

In some embodiments, the central computer system can identify an object as a short term or long term obstacle. With long term or relatively permanent obstacles, the central computer system typically has location data of these obstacles and/or identifies obstacles as permanent or long term (e.g., based on obstacle being in the identified location for a threshold duration of time), and when generating the area routing instructions directs the motorized transport unit taking into count these obstacles (e.g., around and/or avoid these objects). In some instances, the central computer system may additionally direct the motorized transport units to take advantage of these objects, such as directing snow toward these objects (e.g., causing snow to be plowed and/or blown toward and/or on one or more of these long term obstacles).

Further, in some embodiments, the control circuit of the central computer system, while the plurality of motorized transport units travel in accordance with the area routing instructions and addressing the ground level weather induced conditions, is further configured to identify, typically based on sensor data (e.g., video data, distance sensor data from one or more motorized transport units and/or ground treatment systems, movement detector data, tag detector data, etc.), an object or obstacle entering an area that affects an intended route of one or more motorized transport units and/or a ground treatment being performed. Based on the detected obstacle, the central computer system can communicate, to the motorized transport unit, modifications to the area routing instructions causing the motorized transport unit to implement a modified route to avoid the obstacle. The modified routing can include directing the motorized transport unit to travel along a different route, stop for a period of time, change how the ground treatment system operates (e.g., change a direction a snow blower system is blowing snow), other such changes or a combination of two or more of such changes. Further, in some instances the obstacle may be identified, and the modified routing instructions can be selected based on the identification of the obstacle (e.g., whether the obstacle is a car, a person, a child, an item container, etc.).

It is noted that the detection of an obstacle is not limited to obstacles in an intended path of the motorized transport unit, and can include areas around the motorized transport unit and/or cooperated ground treatment system. The size of the area can depend on the ground treatment being performed, the ground treatment system being driven, the capabilities of the ground treatment system, other such factors, and typically a combination of two or more of such factors. For example, when a snow blower system is being used, the direction and distance of the blown snow can be considered in evaluating potential objects or obstacles that may be taken into consideration in adjusting and/or interrupting ground treatment and/or the movement of the motorized transport unit. In some embodiments, the central computer system, in identifying that one or more obstacles is entering an area that affects the intended route of a motorized transport unit, can further identify the obstacle is approaching and/or entering an area where snow is intended to be directed by a snow blower system being driven by the motorized transport unit. Further consideration of wind, wind speed and other factors can be considered. Based on this detection, the central computer system can communicate to the motorized transport unit one or more modifications to the area routing instructions and/or modified routing instructions causing the motorized transport unit to implement the modified route to avoid snow being blown toward the obstacle. Again, this modification can include one or more actions such as, but not limited to, temporarily stopping the motorized transport unit, pausing or turning off the snow blower system, changing a direction that the snow is blown (e.g., changing an orientation of a discharge chute), changing a direction of travel of the motorized transport unit, and the like.

The central computer system typically continues to track a location of the motorized transport units and/or ground treatment systems as the motorized transport units drive one or more ground treatment systems through external areas to perform ground treatment tasks. The location information can include location data from one or more geo-location sensors and/or global positioning information from the motorized transport units and/or ground treatment systems. In some instances, a light detector and/or location detector system may detect and/or receive light identifiers encoded by lights of the location detection system 116. In some instances, the light identifiers may be detected by sensors in the motorized transport unit and/or ground treatment system, and communicated to the central computer system. Some embodiments may further detect and/or receive distance measurements, such as measurements performed by one or more distance measurement units of a motorized transport unit and/or ground treatment system providing distances measurements of an immediate surrounding and/or boundaries proximate the motorized transport unit and/or ground treatment system. Other location information may be provided such as one or more machine readable codes, such as codes positioned and distributed throughout at least some of the areas into which motorized transport units are configured and/or authorized to travel, and can be communicated to the central computer system.

The central computer system can evaluate and/or analyze the geo-location information and/or other information in determining a location of one or more motorized transport units and/or ground treatment systems. Typically, this evaluation includes evaluating the location information relative to one or more shopping facility mappings of the known positioning of lights, light posts, boundaries, walls, planters, parking blocks, and the like. The evaluation of the location information can be used in cooperation with other route condition information, such as but not limited to image and/or video information, information from other motorized transport units, and the like.

In some embodiments, the central computer system can determine, based at least in part on the location information, whether an intended route of travel is blocked. When the path is not blocked, the central computer system can continue to communicate one or more instructions to the motorized transport unit that are configured to cause the motorized transport unit to continue along the intended route, and/or determines not to modify the route of the motorized transport unit. When the route is obstructed, the central computer system can determine whether the obstruction is a temporary or short term obstruction. As described above, in some instances, the central computer system can evaluate the route condition information and additional route condition information, which can include the geo-location information, in determining whether an object is predicted to obstruct the intended route of travel for less than a short term threshold period of time. When it is determined that the obstruction is a short term obstruction, one or more instructions can be communicated to cause the motorized transport unit to slow, stop and/or wait in accordance with one or more parameters (e.g., speed, duration, etc.), and in some instances instructions can be communicated to affect the ground treatment and/or the operation of the ground treatment system. The central computer system can continue to evaluate and/or continuously evaluates the sensor information to determine whether route changes should be implemented.

When the obstruction is not identified as a short term obstruction, the central computer system can identify one or more instructions to cause the motorized transport unit to go around the object and/or along an alternative route. Some embodiments further evaluate the alternate route to confirm that the alternate route is available. When unavailable, an alarm or alert may be issued.

Typically, the motorized transport units are configured to temporarily cooperate with any one of multiple different ground treatment systems. Additionally or alternatively, the ground treatment systems are configured to cooperate with any one of multiple different motorized transport units. Accordingly, the motorized transport units can switch between ground treatment systems providing a modularity to the system. Taking advantage of this modularity, the central computer system can utilize a single motorized transport unit to implement multiple different ground treatments using different ground treatment systems. For example, the central computer system can communicate a disengagement instruct to a motorized transport unit to disengage with a first ground treatment system that is configured to provide a first ground treatment while the motorized transport unit drives the first ground treatment system in accordance with the area routing instructions. Subsequently, an engagement instruction can be communicated to the motorized transport unit to engage with a second ground treating system configured to provide a second ground treatment that is different than the first ground treatment. The central computer system can communicate additional area routing instructions to the motorized transport unit to cause the motorized transport unit to drive the second ground treatment system in accordance with the additional area routing instructions as the second ground treatment system performs the second ground treatment to address one or more of the ground level weather induced conditions.

Similarly, the modularity allows the central computer system can select any one of multiple different motorized transport units to cooperate with a particular ground treatment system. The selection of the motorized transport unit may be based on one or more factors, such as but not limited to location of the motorized transport unit, location of the ground treatment system, location of the motorized transport unit relative to the location of the ground treatment system, whether a motorized transport unit is actively implementing a task, whether the motorized transport unit is cooperated with another device (e.g., another ground treatment system, a movable item container, cleaning equipment and/or system, and the like), parameters and/or capabilities of the motorized transport unit (e.g., movement speed, movement power, whether treads or tracks are cooperated with the locomotion system, and the like), stored electrical power, other such factors, or a combination of two or more of such factors. One or more prioritize may be associated with different factors such that the priorities are taken into consideration when selecting a motorized transport unit. The central computer system can communicate routing instructions to a selected motorized transport unit directing the motorized transport unit to the location of the relevant ground treatment system, and an engagement instruction can be communicated to the selected motorized transport unit to engage with the ground treating system.

The modularity further allows the same motorized transport units that are utilized to drive one or more ground treatment systems to perform other relevant tasks, such as but not limited to helping customers, moving movable item containers, collecting movable item containers, cleaning tasks, other different ground treatment tasks, and other such tasks. For example, in some embodiments the central computer system can cause a disengagement instruct to be communicated to a motorized transport unit to disengage with a first ground treating system configured to provide a first ground treatment while the motorized transport unit drives the first ground treatment system in accordance with the area routing instructions, and communicate a movable item container engagement instruction to the motorized transport unit to engage with a movable item container. This may include communicating routing instructions to the motorized transport unit to move to a location of the movable item container. In response to the engagement instructions, the motorized transport unit can temporarily cooperate with the movable item container to drive the movable item container to one or more locations and/or through areas of the shopping facility. In some instances, the central computer system can cause shopping routing instructions to be communicated to the motorized transport unit to cause the motorized transport unit to drive the movable item container through at least portions of the shopping facility, such as in assisting a customer as the customer shops for one or more products in the shopping facility.

In some embodiments, the sensors 414 of the motorized transport unit may include one or more traction and/or slip sensors. For example, a traction sensor may be cooperated with one or more of the wheels and/or axles of the motorized transport unit and can detect and/or index the rotation of one or more wheels and/or axles of the wheels. As such, in some instances, the control circuit and/or the motorized wheel system can receive traction sensor data that may indicate a reduction in traction of one or more wheels of the motorized wheel system (e.g., can detect when a wheel is moving faster than expected). In some instances, the control circuit and/or the motorized wheel system can detect a reduction or lack of traction relative to one or more wheels based on the rate of rotation of a the wheel relative to the rate of rotation of one or more other wheel (e.g., rate of rotation is different by a threshold amount).

The control circuit of the motorized transport unit and/or the central computer system can issue one or more instructions to implement one or more actions in response to a detection of a reduction or loss of traction. In some implementations, the one or more traction sensors cooperate with the motorized wheel system and are configured to detect a reduction in traction of one or more wheels of the motorized wheel system. In some embodiments, the control circuit is configured to adjust a positioning of the ground treatment in an attempt to increase pressure on one or more wheels of the motorized transport unit corresponding to the detected reduction in traction. Additionally or alternatively, the motorized wheel system can be controlled to slow down or speed up one or more wheels in attempts to enhance traction of the one or more wheels or others of the one or more wheels. Still further, one or more notifications can be communicated to the central computer system and/or to a customer or other user (e.g., through a communication to a corresponding user interface unit, a display on the movable item container, lights and/or sounds from the motorized transport unit and/or the movable item container, other such notification, or combinations of two or more of such notifications).

Further, in some embodiments, the motorized transport units may include alternative locomotion systems, such as tracks, treads, and the like that may provide further traction. Similarly, tracks may be retrofitted to the wheels and/or axles of the motorized transport units during certain times of the year and/or as part of utilizing a motorized transport unit in implementing ground treatment. Similarly, different wheels may be used during certain times of the year and/or on certain motorized transport units that may be prioritized to perform some of the ground treatment tasks over other tasks.

As described above, in some implementations, the central computer system activates one or more motorized transport units to drive one or more ground treatment systems based on forecasted weather conditions. The weather data can be received from one or more third party sources, local sensors and/or other such sources. This allows the shopping facility to be proactive in addressing ground conditions and/or enhancing safety. For example, when it is predicted the temperature is going to drop below a threshold, one or more ice melt dispenser systems may be driven over one or more areas (e.g., walkways) in advance of the temperature drop to inhibit or prevent potential ice forming. Similarly, local sensors can be used to confirm forecasts, make adjustments based on local conditions, and/or to allow for quick responses to detected events and/or changes. Some implementations may take into consideration different conditions at different areas of the shopping facility, such as with multiple sensor sets to accommodate for different conditions on different exterior areas of the shopping facility (e.g., one side of the shopping facility may be protected from wind while the other side is directly in the path of the wind and directly affected).

Some embodiments may utilize one or more snow depth sensors and/or other sensors (e.g., using image analytics and evaluating pictures and/or video in looking for patterns and/or color changes, such as consistent white) may and/or reports may be considered in determining when and/or whether to dispatch one or more snow plow systems and/or snow blower systems (e.g., snow less than a threshold depth is address by snow plows, while snow greater than a threshold depth may be addressed by the dispatch of one or more snow blowers and/or snow plows). The central computer system can further priority the ground treatment relative to other tasks that the motorized transport units are configured to perform. As such, the central computer system may divert one or more motorized transport units from other tasks to perform ground treatment tasks when the ground treatment task has a higher priority than the other task or tasks. The ability to activate multiple motorized transport units and ground treatment systems allows the central computer system to escalate or decrease the ground condition response based on current and/or forecasted information.

In some embodiments, the central computer system may develop and/or maintain one or more ground treatment management solutions and/or resource management plans that can be dependent on current and/or forecasted weather conditions, time of day, time of year, other resources, and the like. This can include routing instructions, locations where snow is to be directed, number of ground treatment systems to be utilized, and other such information. Further, the ground treatment plan or plans can take advantage of multiple ground treatment systems and an effective allocation of motorized transport units and ground treatment systems. The use of the ground treatment systems driven by the motorized transport units limits and in some instances prevents works and/or third party services from having to perform these tasks. This can further enhance safety for the workers as the workers do not have to be exposed to the weather conditions and/or be in potentially dangerous locations (e.g., parking lots). Further, the system can operate autonomously without worker interaction, and allow works to continue to support customers and perform other tasks.

Other snow removal systems typically are dedicated machine that can only serve one purpose. Accordingly, for most of the year these machines are unused and a wasted resource and space. Issues also arise when ice accumulates and becomes dangerous for customers. Workers do not always know about what is going on outside due to their attention being inside the shopping facility and taking care of customers. Accordingly, the use of the motorized transport units with the one or more ground treatment systems can greatly improve ground treatment and often increase safety. The motorized transport unit system can be a proactive way of taking care of parking lots, loading areas, walkways and the like. Further, snow plows and road treatments are typically reactive as snow plows take up large amounts of space and may leave mounds of snow through the parking lot in undesired locations. Often the equipment is left in the parking areas unattended and cars parked in the areas exacerbate the issues as reactive equipment pile snow beside them. The use of the motorized transport unit system allows ground treatment to occur based on forecasting and/or does not have to wait for a large accumulation of snow to make it cost effective to implement a ground treatment plan. This also avoid having to wait for these snow removal companies to show up.

Accordingly, the motorized transport unit system enables equipment to have multiple purposes by using the motorized transport units to drive ground treatment systems (e.g., to remove snow through a snow plow and/or snow blower, ice melt spreader, etc.). Further, ground treatment can be a proactive solution to inclement weather effecting shopping facilities, their parking lots, walkways, loading areas, etc. Further, the use of the ground treatment can help prevent the buildup of ice and snow, and also remove ice and snow when accumulated. The motorized transport units operate in concert with the central computer system, which can grid out the parking lot and other areas when inclement weather is forecasted and/or occurs. In some implementations, one or more of the motorized transport units can be fitted with tracks for adequate movement in adverse weather conditions. Similarly, in some embodiments, one or more of the motorized transport units can be fitted with a heater to protect its camera and/or other capabilities to clear the camera and/or keep other components free of ice and/or from freezing. Using the central computer system, video cameras (e.g., walkway, loading area and/or parking video cameras), and sensors, the central computer to distinguish the difference between a movable item container, person, vehicle, light pole, other fixed objects that are accountable, and the like. In some implementations, permanent and/or long term obstacles are typically identified to avoid with routing being predetermined relative to those obstacles, and sensors and cameras can be used to avoid temporary obstacles.

In some embodiments, apparatuses and methods are provided herein useful to enhance safety based on weather. Some embodiments provide a system providing enhanced safety, comprising: a central computer system that is separate and distinct from a plurality of self-propelled motorized transport units, wherein the central computer system comprises: a transceiver configured to communicate with the motorized transport units located at a shopping facility; a control circuit coupled with the transceiver; and a memory coupled to the control circuit and storing computer instructions that when executed by the control circuit cause the control circuit to perform the steps of: communicate positioning routing instructions to the plurality of motorized transport units directing the plurality of motorized transport units to one or more external areas of a shopping facility that are exposed to weather conditions; and communicate separate area routing instructions to each of the plurality of motorized transport units that when implemented cause the plurality of motorized transport units to cooperatively and in concert travel in accordance with the area routing instructions over at least predefined portions of one or more external areas that are accessible by the plurality of motorized transport units, while each is driving at least one detachable ground treatment system, to cause the ground treatment systems to address ground level conditions.

Some implementations provide methods of providing enhanced safety, comprising: by a control circuit of an automated central computer system that is separate and distinct from a plurality of self-propelled motorized transport units: communicating positioning routing instructions to the plurality of motorized transport units directing the plurality of motorized transport units to one or more external areas of a shopping facility that are exposed to weather conditions; and communicating separate area routing instructions to each of the plurality of motorized transport units that when implemented cause the plurality of motorized transport units to cooperatively and in concert travel in accordance with the area routing instructions over at least predefined portions of one or more external areas that are accessible by the plurality of motorized transport units, while each is driving at least one detachable ground treatment system, to cause the ground treatment systems to address ground level conditions.

In some embodiments, a system comprises: a central computer system that is separate and distinct from a plurality of self-propelled motorized transport units, wherein the central computer system comprises: a transceiver configured to communicate with the motorized transport units located at a shopping facility; a control circuit coupled with the transceiver; and a memory coupled to the control circuit and storing computer instructions that when executed by the control circuit cause the control circuit to perform the steps of: communicate positioning routing instructions to the plurality of motorized transport units directing the plurality of motorized transport units to one or more external areas of a shopping facility that are exposed to weather conditions; and communicate separate area routing instructions to each of the plurality of motorized transport units that when implemented cause the plurality of motorized transport units to cooperatively and in concert travel in accordance with the area routing instructions over at least predefined portions of one or more external areas that are accessible by the plurality of motorized transport units, while each is driving at least one detachable ground treatment system, to cause the ground treatment systems to address ground level weather induced conditions.

In some embodiments, a method of providing enhanced safety based on weather, comprises: by a control circuit of an automated central computer system that is separate and distinct from a plurality of self-propelled motorized transport units: communicating positioning routing instructions to the plurality of motorized transport units directing the plurality of motorized transport units to one or more external areas of a shopping facility that are exposed to weather conditions; and communicating separate area routing instructions to each of the plurality of motorized transport units that when implemented cause the plurality of motorized transport units to cooperatively and in concert travel in accordance with the area routing instructions over at least predefined portions of one or more external areas that are accessible by the plurality of motorized transport units, while each is driving at least one detachable ground treatment system, to cause the ground treatment systems to address ground level weather induced conditions.

In some implementations, the control circuit is further configured to communicate first treatment instructions to a first motorized transport unit of the plurality of motorized transport units causing the first motorized transport unit, which is temporarily and removably cooperated with a first ground treatment system configured to perform a first ground treatment, to position the first ground treatment system relative to a surface of a first portion of a first external area. The communication of the area routing instructions can include communicating first treatment routing instructions to the first motorized transport unit causing the first motorized transport unit to travel over the first portion of the first external area along a defined first treatment route while driving the first ground treatment system along the surface of the first portion of the first external area as the first ground treatment system performs the first ground treatment to address one or more ground level weather induced conditions. Further, in some embodiments the control circuit is further configured to communicate second treatment instructions to a second motorized transport unit of the plurality of motorized transport units causing the second motorized transport unit, which is temporarily and removably cooperated with a second ground treatment system, to position the second ground treatment system relative to a surface of a second portion of a second external area. The communication of the area routing instructions may further include communicating second treatment routing instructions to the second motorized transport unit causing the second motorized transport unit to travel over the second portion of the second external area along a defined second treatment route while driving the second ground treatment system along the surface of the second portion of the second external area as the second ground treatment system performs the second ground treatment to address one or more of the ground level weather induced conditions.

The control circuit, while the plurality of motorized transport units travel in accordance with the area routing instructions and addressing the ground level weather induced conditions, may be further configured to identify, based on sensor data, an obstacle entering an area that affects an intended route of a first motorized transport unit, and communicate, to the first motorized transport unit, modifications to the area routing instructions causing the first motorized transport unit to implement a modified route to avoid the obstacle. In some instances, the control circuit in identifying the obstacle is entering the area that affects the intended route of the first motorized transport unit is configured to identify the obstacle is entering an area where snow is intended to be directed by a snow blower system being driven by the first motorized transport unit. The modifications to the area routing instructions can be communicated to the first motorized transport unit causing the first motorized transport unit to implement the modified route to avoid snow being blown toward the obstacle.

In some embodiments, the control circuit is further configured to communicate a disengagement instruct to a first motorized transport unit to disengage with a first ground treatment system configured to provide a first ground treatment while the first motorized transport unit drives the first ground treatment system in accordance with the area routing instructions. An engagement instruction can be communicated to the first motorized transport unit to engage with a second ground treating system configured to provide a second ground treatment that is different than the first ground treatment. Further, additional area routing instructions may be communicated to at least the first motorized transport unit to cause the first motorized transport unit to drive the second ground treatment system in accordance with the additional area routing instructions as the second ground treatment system performs the second ground treatment to address one or more of the ground level conditions. Some implementations further communicate a disengagement instruct to a first motorized transport unit to disengage with a first ground treating system configured to provide a first ground treatment while the first motorized transport unit drives the first ground treatment system in accordance with the area routing instructions. A movable item container engagement instruction may be communicated to the first motorized transport unit to engage with a movable item container, and shopping routing instructions can be communicated to the first motorized transport unit to cause the first motorized transport unit to drive the movable item container through at least portions of the shopping facility in assisting a customer as the customer shops for one or more products in the shopping facility.

In some applications, the control circuit is further configured to identify, based on sensor data, one or more locations where snow is to be moved, and identify routing between each of two or more motorized transport units of the plurality of motorized transport units and at least one of the one or more locations. The control circuit in communicating the area routing instructions may further be configured to communicate the area routing instructions to each of the at least two or more motorized transport units such that each of the two or more motorized transport units, in implementing the area routing instructions, drives a respective ground treatment system to moved snow to at least one of the one or more locations. Some embodiments in communicating the area routing instructions may communicate ice melt dispenser routing instructions to a first motorized transport unit of the plurality of motorized transport units, which is temporarily and removably cooperated with an ice melt dispenser system, causing the first motorized transport unit to travel over a first portion of a first external area along a defined melt dispenser route while driving the ice melt dispenser system along the surface of the first portion of the first external area as the ice melt dispenser system dispenses a melt agent. Additionally or alternatively, some embodiments in communicating the area routing instructions communicate exterior area cleaning routing instructions to first and second motorized transport units of the plurality of motorized transport units, wherein the first and second motorized transport units are temporarily and removably cooperated with first and second ground cleaning systems, respectively, causing the first and second motorized transport units to travel over the portions of a first external area along defined ground treatment routes while driving the first and second ground cleaning systems along the surface of the portions of the first external area as the first and second ground cleaning systems are activated to perform respective cleaning tasks.

Some embodiments provide methods of, at least in part, enhancing safety by a control circuit of an automated central computer system that is separate and distinct from a plurality of self-propelled motorized transport units. In some implementations, positioning routing instructions are communicated to the plurality of motorized transport units directing the plurality of motorized transport units to one or more external areas of a shopping facility that are exposed to weather conditions. Separate area routing instructions may further be communicated to each of the plurality of motorized transport units that when implemented cause the plurality of motorized transport units to cooperatively and in concert travel in accordance with the area routing instructions over at least predefined portions of one or more external areas that are accessible by the plurality of motorized transport units, while each is driving at least one detachable ground treatment system, to cause the ground treatment systems to address ground level conditions.

In some implementations, first treatment instructions are communicated to a first motorized transport unit of the plurality of motorized transport units causing the first motorized transport unit, which is temporarily and removably cooperated with a first ground treatment system configured to perform a first ground treatment, to position the first ground treatment system relative to a surface of a first portion of a first external area. The communication of the area routing instructions may comprise communicating first treatment routing instructions to the first motorized transport unit causing the first motorized transport unit to travel over the first portion of the first external area along a defined first treatment route while driving the first ground treatment system along the surface of the first portion of the first external area as the first ground treatment system performs the first ground treatment to address one or more ground level weather induced conditions. Second treatment instructions may be communicated to a second motorized transport unit of the plurality of motorized transport units causing the second motorized transport unit, which is temporarily and removably cooperated with a second ground treatment system, to position second ground treatment system relative to a surface of a second portion of a second external area. The communication of the area routing instructions can comprise communicating second treatment routing instructions to the second motorized transport unit causing the second motorized transport unit to travel over the second portion of the second external area along a defined second treatment route while driving the second ground treatment system along the surface of the second portion of the second external area as the second ground treatment system performs the second ground treatment to address one or more of the ground level weather induced conditions.

Some embodiments may further identify, based on sensor data and while the plurality of motorized transport units travel in accordance with the area routing instructions and address the ground level weather induced conditions, an obstacle entering an area that affects an intended route of a first motorized transport unit. Modifications to the area routing instructions can be communicated to the first motorized transport unit causing the first motorized transport unit to implement a modified route to avoid the obstacle. The identification that an obstacle is entering the area that affects the intended route of the first motorized transport unit can comprise identifying the obstacle is entering an area where snow is intended to be directed by a snow blower system being driven by the first motorized transport unit. The modifications to the area routing instructions can be communicated to the first motorized transport unit causing the first motorized transport unit to implement the modified route to avoid snow being blown toward the obstacle.

In some embodiments, a disengagement instruct can be communicated to a first motorized transport unit to disengage with a first ground treatment system configured to provide a first ground treatment while the first motorized transport unit drives the first ground treatment system in accordance with the area routing instructions, and an engagement instruction can be communicated to the first motorized transport unit to engage with a second ground treating system configured to provide a second ground treatment that is different than the first ground treatment. One or more additional area routing instructions can be communicated to at least the first motorized transport unit to cause the first motorized transport unit to drive the second ground treatment system in accordance with the additional area routing instructions as the second ground treatment system performs the second ground treatment to address one or more of the ground level conditions. Similarly, some embodiments may further communicate a disengagement instruct to a first motorized transport unit to disengage with a first ground treating system configured to provide a first ground treatment while the first motorized transport unit drives the first ground treatment system in accordance with the area routing instructions, and communicate a movable item container engagement instruction to the first motorized transport unit to engage with a movable item container. One or more shopping routing instructions can be communicated to the first motorized transport unit to cause the first motorized transport unit to drive the movable item container through at least portions of the shopping facility in assisting a customer as the customer shops for one or more products in the shopping facility.

Further, some embodiments identify, based on sensor data, one or more locations where snow is to be moved. Routing can be identified between each of two or more motorized transport units of the plurality of motorized transport units and at least one of the one or more locations. The communication of the area routing instructions can comprise communicating the area routing instructions to each of the at least two or more motorized transport units such that each of the two or more motorized transport units, in implementing the area routing instructions, drives a respective ground treatment system to moved snow to at least one of the one or more locations. In some embodiments, the communication of the area routing instructions further comprises communicating ice melt dispenser routing instructions to a first motorized transport unit of the plurality of motorized transport units, which is temporarily and removably cooperated with an ice melt dispenser system, causing the first motorized transport unit to travel over a first portion of a first external area along a defined melt dispenser route while driving the ice melt dispenser system along the surface of the first portion of the first external area as the ice melt dispenser system dispenses a melt agent. Similarly, some implementations in communicating the area routing instructions further communicate exterior area cleaning routing instructions to first and second motorized transport units of the plurality of motorized transport units, where the first and second motorized transport units are temporarily and removably cooperated with first and second ground cleaning systems, respectively. The exterior area cleaning routing instructions are configured to cause the first and second motorized transport units to travel over the portions of a first external area along defined ground treatment routes while driving the first and second ground cleaning systems along the surface of the portions of the first external area as the first and second ground cleaning systems are activated to perform respective cleaning tasks.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
a plurality of motorized transport units configured to move through a retail shopping facility that is organized as a plurality of departments that present corresponding items for sale;
a central computer system having a network interface such that the central computer system wirelessly communicates with the plurality of motorized transport units and wherein the central computer system is configured to:
direct a particular one of the plurality of motorized transport units through the retail shopping facility to a particular mobile item container having at least one item disposed therein, the at least one item being designated for return to a particular one of the plurality of departments such that the at least one item can then be presented for sale;
cause the particular one of the plurality of motorized transport units to physically attach to the particular mobile item container; and
direct, via a wireless network connection, the particular one of the plurality of motorized transport units through the retail shopping facility with the attached particular mobile item container to the particular one of the plurality of departments by first confirming that at least one associate will be available in the particular one of the plurality of departments to remove corresponding items from the particular mobile item container for that department when the particular one of the plurality of motorized transport units arrives with the particular mobile item container.

2. The apparatus of claim 1 wherein the mobile item container comprises a retail-store shopping cart.

3. The apparatus of claim 1 wherein the particular mobile item container is located in a customer service area of the retail shopping facility and wherein the central computer system directs the particular one of the plurality of motorized transport units to the particular mobile item container by directing the particular one of the plurality of motorized transport units to the customer service area.

4. The apparatus of claim 1 wherein the central computer system is further configured to:
 receive information that identifies items placed in the particular mobile item container; and
 determine the particular one of the plurality of departments as a function of the information that identifies the items in the particular mobile item container.

5. The apparatus of claim 4 wherein the central computer system is further configured to:
 determine that there are items in the particular mobile item container that should be directed to at least two different ones of the plurality of departments.

6. The apparatus of claim 5 wherein the central computer system directs the particular one of the plurality of motorized transport units through the retail shopping facility with the attached unattended mobile item container to the particular one of the plurality of departments by directing the particular one of the plurality of motorized transport units to each of the at least two different ones of the plurality of departments.

7. The apparatus of claim 6 wherein the central computer system directs the particular one of the plurality of motorized transport units to each of the at least two different ones of the plurality of departments by selecting an efficient order of visitation.

8. An apparatus comprising:
 a plurality of motorized transport units configured to move through a retail shopping facility that is organized as a plurality of departments that present corresponding items for sale;
 a central computer system having a network interface such that the central computer system wirelessly communicates with the plurality of motorized transport units and wherein the central computer system is configured to:
  direct a particular one of the plurality of motorized transport units through the retail shopping facility to a particular mobile item container having at least one item disposed therein, the at least one item being designated for return to a particular one of the plurality of departments such that the at least one item can then be presented for sale;
  cause the particular one of the plurality of motorized transport units to physically attach to the particular mobile item container;
  direct, via a wireless network connection, the particular one of the plurality of motorized transport units through the retail shopping facility with the attached particular mobile item container to the particular one of the plurality of departments
  determine which items are removed from the particular mobile item container at the particular one of the plurality of departments; and
  use the particular one of the plurality of motorized transport units to alert an associate upon detecting an error with respect to removing items from the particular mobile item container at the particular one of the plurality of departments.

9. A method comprising:
 by a central computer system having a network interface such that the central computer system wirelessly communicates with a plurality of motorized transport units that are configured to move through a retail shopping facility that is organized as a plurality of departments that present corresponding items for sale:
 directing a particular one of the plurality of motorized transport units through the retail shopping facility to a particular mobile item container having at least one item disposed therein, the at least one item being designated for return to a particular one of the plurality of departments such that the at least one item can then be presented for sale;
 causing the particular one of the plurality of motorized transport units to physically attach to the particular mobile item container;
 directing, via a wireless network connection, the particular one of the plurality of motorized transport units through the retail shopping facility with the attached particular mobile item container to the particular one of the plurality of departments by first confirming that at least one associate will be available in the particular one of the plurality of departments to remove corresponding items from the particular mobile item container for that department when the particular one of the plurality of motorized transport units arrives with the particular mobile item container;
 determining which items are removed from the particular mobile item container at the particular one of the plurality of departments; and
 using the particular one of the plurality of motorized transport units to alert an associate upon detecting an error with respect to removing items from the particular mobile item container at the particular one of the plurality of departments.

10. The method of claim 9 wherein the mobile item container comprises a retail-store shopping cart.

11. The method of claim 9 wherein the particular mobile item container is located in a customer service area of the retail shopping facility and wherein directing the particular one of the plurality of motorized transport units to the particular mobile item container comprises directing the particular one of the plurality of motorized transport units to the customer service area.

12. The method of claim 9 further comprising:
 receiving information that identifies items placed in the particular mobile item container; and
 determining the particular one of the plurality of departments as a function of the information that identifies the items in the particular mobile item container.

13. The method of claim 9 further comprising:
 determining that there are items in the particular mobile item container that should be directed to at least two different ones of the plurality of departments.

14. The method of claim 13 wherein directing the particular one of the plurality of motorized transport units through the retail shopping facility with the attached unattended mobile item container to the particular one of the plurality of departments comprises directing the particular one of the plurality of motorized transport units to each of the at least two different ones of the plurality of departments.

15. The method of claim 14 wherein directing the particular one of the plurality of motorized transport units to each of the at least two different ones of the plurality of departments comprises selecting an efficient order of visitation.

* * * * *